(12) United States Patent
Schowengerdt

(10) Patent No.: US 10,629,004 B2
(45) Date of Patent: Apr. 21, 2020

(54) VIRTUAL AND AUGMENTED REALITY SYSTEMS AND METHODS

(71) Applicant: MAGIC LEAP, INC., Plantation, FL (US)

(72) Inventor: Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/729,462

(22) Filed: Oct. 10, 2017

(65) Prior Publication Data

US 2018/0039084 A1    Feb. 8, 2018

Related U.S. Application Data

(63) Continuation of application No. 14/555,585, filed on Nov. 27, 2014, now Pat. No. 9,791,700.
(Continued)

(51) Int. Cl.
*G06T 11/60* (2006.01)
*G06T 19/00* (2011.01)
(Continued)

(52) U.S. Cl.
CPC .......... *G06T 19/006* (2013.01); *G02B 3/0006* (2013.01); *G02B 3/0037* (2013.01);
(Continued)

(58) Field of Classification Search
CPC .......... G06T 19/006; G06T 7/50; G06T 7/73; H04N 13/383; H04N 13/117;
(Continued)

(56) References Cited

U.S. PATENT DOCUMENTS 3,566,021 A    2/1971    Jakes, Jr.
4,786,150 A    11/1988   Tsuji
(Continued)

FOREIGN PATENT DOCUMENTS

EP    1312969       5/2003
JP    03-084516     4/1991
(Continued)

OTHER PUBLICATIONS

Notice of Allowance dated Oct. 5, 2017 for U.S. Appl. No. 14/705,748.
(Continued)

*Primary Examiner* — Sarah Lhymn
(74) *Attorney, Agent, or Firm* — Vista IP Law Group, LLP

(57) ABSTRACT

A system for displaying virtual content to a user includes at least one light source to multiplex a plurality of light beams to display a respective plurality of light patterns associated with one or more frames of image data. The system also includes a plurality of waveguides to receive the plurality of light beams and to direct the plurality of light beams toward an exit pupil, wherein the plurality of waveguides are stacked along an optical axis of the user. The system further includes at least one optical element to modify a focus of a light beam of the plurality of light beams directed by the plurality of waveguides.

20 Claims, 152 Drawing Sheets

Related U.S. Application Data

(60) Provisional application No. 61/909,774, filed on Nov. 27, 2013.

(51) Int. Cl.

| | | |
|---|---|---|
| H04N 5/21 | (2006.01) | |
| G06T 15/50 | (2011.01) | |
| G06T 5/00 | (2006.01) | |
| H04N 13/117 | (2018.01) | |
| H04N 13/286 | (2018.01) | |
| H04N 13/341 | (2018.01) | |
| H04N 13/344 | (2018.01) | |
| H04N 13/361 | (2018.01) | |
| H04N 13/366 | (2018.01) | |
| H04N 13/383 | (2018.01) | |
| G02B 27/01 | (2006.01) | |
| G06T 7/73 | (2017.01) | |
| H04N 13/363 | (2018.01) | |
| H04N 13/239 | (2018.01) | |
| G06T 7/50 | (2017.01) | |
| G02B 6/00 | (2006.01) | |
| G02B 5/00 | (2006.01) | |
| G02F 1/01 | (2006.01) | |
| G02F 1/17 | (2019.01) | |
| G02B 3/00 | (2006.01) | |
| G06K 9/52 | (2006.01) | |
| G06T 19/20 | (2011.01) | |
| G06F 3/01 | (2006.01) | |
| G09G 5/00 | (2006.01) | |
| H04N 5/74 | (2006.01) | |
| G09G 5/10 | (2006.01) | |
| G09G 5/02 | (2006.01) | |
| G02B 5/18 | (2006.01) | |
| G02B 26/08 | (2006.01) | |
| G02B 6/02 | (2006.01) | |
| G02B 27/00 | (2006.01) | |
| G02B 6/06 | (2006.01) | |
| G02B 5/20 | (2006.01) | |
| G02F 1/1334 | (2006.01) | |
| G02F 1/29 | (2006.01) | |
| G06T 13/40 | (2011.01) | |
| G02B 6/34 | (2006.01) | |
| G02B 6/40 | (2006.01) | |
| G02B 27/22 | (2018.01) | |
| H04N 5/225 | (2006.01) | |
| G02B 6/32 | (2006.01) | |
| G02B 17/08 | (2006.01) | |
| G06T 15/10 | (2011.01) | |
| G06K 9/00 | (2006.01) | |
| G06T 17/10 | (2006.01) | |
| G09G 5/18 | (2006.01) | |
| G06F 3/14 | (2006.01) | |
| G06T 15/00 | (2011.01) | |
| G02C 7/04 | (2006.01) | |
| G02C 7/10 | (2006.01) | |
| G06T 5/50 | (2006.01) | |
| G02B 27/42 | (2006.01) | |
| G02F 1/31 | (2006.01) | |
| H04N 13/00 | (2018.01) | |

(52) U.S. Cl.
CPC ........... *G02B 5/005* (2013.01); *G02B 5/1814* (2013.01); *G02B 5/1828* (2013.01); *G02B 5/20* (2013.01); *G02B 6/00* (2013.01); *G02B 6/02042* (2013.01); *G02B 6/06* (2013.01); *G02B 6/32* (2013.01); *G02B 6/34* (2013.01); *G02B 6/40* (2013.01); *G02B 17/08* (2013.01); *G02B 26/0808* (2013.01); *G02B 27/0087* (2013.01); *G02B 27/0093* (2013.01); *G02B 27/01* (2013.01); *G02B 27/017* (2013.01); *G02B 27/0172* (2013.01); *G02B 27/0176* (2013.01); *G02B 27/2264* (2013.01); *G02B 27/4205* (2013.01); *G02C 7/049* (2013.01); *G02C 7/104* (2013.01); *G02F 1/0105* (2013.01); *G02F 1/1334* (2013.01); *G02F 1/17* (2013.01); *G02F 1/29* (2013.01); *G02F 1/292* (2013.01); *G02F 1/31* (2013.01); *G06F 3/011* (2013.01); *G06F 3/013* (2013.01); *G06F 3/017* (2013.01); *G06F 3/1423* (2013.01); *G06K 9/0061* (2013.01); *G06K 9/52* (2013.01); *G06T 5/002* (2013.01); *G06T 5/003* (2013.01); *G06T 5/50* (2013.01); *G06T 7/50* (2017.01); *G06T 7/73* (2017.01); *G06T 13/40* (2013.01); *G06T 15/00* (2013.01); *G06T 15/10* (2013.01); *G06T 15/506* (2013.01); *G06T 17/10* (2013.01); *G06T 19/003* (2013.01); *G06T 19/20* (2013.01); *G09G 5/003* (2013.01); *G09G 5/02* (2013.01); *G09G 5/10* (2013.01); *G09G 5/18* (2013.01); *H04N 5/21* (2013.01); *H04N 5/225* (2013.01); *H04N 5/74* (2013.01); *H04N 13/117* (2018.05); *H04N 13/239* (2018.05); *H04N 13/286* (2018.05); *H04N 13/341* (2018.05); *H04N 13/344* (2018.05); *H04N 13/361* (2018.05); *H04N 13/363* (2018.05); *H04N 13/366* (2018.05); *H04N 13/383* (2018.05); *G02B 2006/0098* (2013.01); *G02B 2027/014* (2013.01); *G02B 2027/0118* (2013.01); *G02B 2027/0123* (2013.01); *G02B 2027/0125* (2013.01); *G02B 2027/0134* (2013.01); *G02B 2027/0163* (2013.01); *G02B 2027/0178* (2013.01); *G02C 2202/16* (2013.01); *G02F 2001/294* (2013.01); *G06T 2207/10021* (2013.01); *G06T 2207/30201* (2013.01); *G06T 2213/08* (2013.01); *H04N 2013/0085* (2013.01)

(58) Field of Classification Search
CPC .. H04N 13/344; H04N 13/361; H04N 13/341; H04N 13/239; H04N 13/286
USPC ......................................... 345/619, 632, 633
See application file for complete search history.

(56) References Cited

U.S. PATENT DOCUMENTS

| | | | |
|---|---|---|---|
| 4,848,884 A | 7/1989 | Enomoto | |
| 5,061,049 A | 10/1991 | Hornbeck | |
| 5,081,615 A * | 1/1992 | Sunagawa | G02B 6/34 |
| | | | 369/112.27 |
| 5,082,342 A | 1/1992 | Wight et al. | |
| 5,233,673 A | 8/1993 | Vali et al. | |
| 5,334,333 A | 8/1994 | Goetz | |
| 5,377,287 A | 12/1994 | Lee et al. | |
| 5,453,877 A | 9/1995 | Gerbe et al. | |
| 5,493,426 A | 2/1996 | Johnson | |
| 5,699,194 A | 12/1997 | Takahashi et al. | |
| 5,701,132 A | 12/1997 | Kollin et al. | |
| 5,768,025 A | 6/1998 | Togino et al. | |
| 5,801,477 A | 9/1998 | Macaulay | |
| 5,885,822 A | 3/1999 | Paslin | |
| 6,023,373 A | 2/2000 | Inoguchi et al. | |
| 6,100,862 A | 8/2000 | Sullivan | |
| 6,243,350 B1 | 6/2001 | Knight et al. | |
| 6,333,820 B1 | 12/2001 | Hayakawa et al. | |
| 6,341,136 B1 | 1/2002 | Hiiro | |

(56) References Cited

U.S. PATENT DOCUMENTS

| | | |
|---|---|---|
| 6,415,087 B1 | 7/2002 | Yang et al. |
| 6,574,043 B2 | 6/2003 | Ramanujan |
| 6,856,712 B2 | 2/2005 | Fauver et al. |
| 6,873,376 B1 | 3/2005 | Rofe |
| 7,463,783 B1 | 12/2008 | Dugan et al. |
| 8,582,209 B1 | 11/2013 | Amirparviz |
| 9,116,337 B1 | 8/2015 | Miao |
| 2001/0000677 A1 | 5/2001 | Takagi et al. |
| 2001/0010598 A1 | 8/2001 | Aritake et al. |
| 2001/0011968 A1 | 8/2001 | Tidwell |
| 2001/0040535 A1 | 11/2001 | Tidwell et al. |
| 2001/0043208 A1 | 11/2001 | Furness, III et al. |
| 2001/0055462 A1 | 12/2001 | Seibel |
| 2002/0034016 A1 | 3/2002 | Inoguchi et al. |
| 2002/0118464 A1 | 8/2002 | Nishioka et al. |
| 2002/0146202 A1 | 10/2002 | Reed et al. |
| 2003/0156253 A1 | 8/2003 | Watanabe et al. |
| 2003/0169405 A1* | 9/2003 | Agostinelli .......... G02B 27/225 353/7 |
| 2004/0027576 A1 | 2/2004 | De Groot et al. |
| 2004/0114231 A1 | 6/2004 | Lo |
| 2004/0151466 A1 | 8/2004 | Crossman-Bosworth et al. |
| 2004/0208466 A1 | 10/2004 | Mossberg et al. |
| 2005/0179868 A1 | 8/2005 | Seo et al. |
| 2005/0180678 A1 | 8/2005 | Pannepucci et al. |
| 2005/0201429 A1 | 9/2005 | Rice et al. |
| 2005/0219671 A1 | 10/2005 | Inoguchi et al. |
| 2006/0114430 A1 | 6/2006 | Masubuchi et al. |
| 2006/0232665 A1 | 10/2006 | Schowengerdt et al. |
| 2006/0232846 A1 | 10/2006 | Himmer et al. |
| 2007/0058261 A1 | 3/2007 | Sugihara et al. |
| 2007/0159673 A1 | 7/2007 | Freeman et al. |
| 2007/0237476 A1 | 10/2007 | Jamison et al. |
| 2007/0296644 A1 | 12/2007 | Hong et al. |
| 2008/0117289 A1 | 5/2008 | Schowengerdt et al. |
| 2008/0180596 A1 | 7/2008 | Fujimoto |
| 2008/0304123 A1* | 12/2008 | Wang .................. A61B 1/00183 359/196.1 |
| 2009/0028407 A1 | 1/2009 | Seibel et al. |
| 2009/0088363 A1 | 4/2009 | Panandiker et al. |
| 2009/0122412 A1 | 5/2009 | Steenblik et al. |
| 2009/0201575 A1 | 8/2009 | Fermann et al. |
| 2009/0219541 A1 | 9/2009 | Farah |
| 2009/0322653 A1 | 12/2009 | Putilin et al. |
| 2010/0149073 A1 | 6/2010 | Chaum et al. |
| 2010/0157400 A1 | 6/2010 | Dimov et al. |
| 2011/0007277 A1 | 1/2011 | Solomon |
| 2011/0037953 A1 | 2/2011 | Nizani et al. |
| 2011/0075257 A1* | 3/2011 | Hua .................... G02B 27/017 359/464 |
| 2011/0083741 A1 | 4/2011 | Munro |
| 2011/0157667 A1* | 6/2011 | Lacoste .............. G02B 27/2271 359/9 |
| 2011/0193814 A1 | 8/2011 | Gay et al. |
| 2011/0221658 A1 | 9/2011 | Haddick et al. |
| 2011/0229840 A1 | 9/2011 | Liang et al. |
| 2011/0279355 A1 | 11/2011 | Yasue et al. |
| 2012/0062998 A1 | 3/2012 | Schultz et al. |
| 2012/0133676 A1 | 5/2012 | Kitahara |
| 2012/0147038 A1 | 6/2012 | Perez et al. |
| 2012/0176613 A1 | 7/2012 | Marple et al. |
| 2012/0212400 A1 | 8/2012 | Border et al. |
| 2013/0050070 A1 | 2/2013 | Lewis et al. |
| 2013/0050432 A1 | 2/2013 | Perez et al. |
| 2013/0088780 A1* | 4/2013 | Jarvenpaa ................ G02B 5/18 359/566 |
| 2013/0108229 A1 | 5/2013 | Starner et al. |
| 2013/0128230 A1 | 5/2013 | Macnamara |
| 2013/0135359 A1 | 5/2013 | Gally et al. |
| 2013/0169626 A1 | 7/2013 | Balan et al. |
| 2013/0222896 A1 | 8/2013 | Komatsu et al. |
| 2013/0222929 A1 | 8/2013 | Park |
| 2013/0250207 A1* | 9/2013 | Bohn ...................... G02B 6/00 349/61 |
| 2013/0250430 A1 | 9/2013 | Robbins et al. |
| 2013/0250431 A1 | 9/2013 | Robbins et al. |
| 2013/0280858 A1 | 10/2013 | Kimura |
| 2013/0300635 A1 | 11/2013 | White et al. |
| 2013/0314793 A1 | 11/2013 | Robbins et al. |
| 2013/0321462 A1 | 12/2013 | Salter et al. |
| 2013/0342814 A1 | 12/2013 | Atkins |
| 2014/0043320 A1 | 2/2014 | Tosaya et al. |
| 2014/0064687 A1 | 3/2014 | Hoover et al. |
| 2014/0118360 A1 | 5/2014 | Ma et al. |
| 2014/0250401 A1 | 9/2014 | Matsumoto et al. |
| 2015/0235471 A1 | 8/2015 | Schowengerdt |

FOREIGN PATENT DOCUMENTS

| | | |
|---|---|---|
| JP | 03-96913 | 4/1991 |
| JP | 5-46161 | 2/1993 |
| JP | 2001-004955 | 1/2001 |
| JP | 2001-021831 | 1/2001 |
| JP | 2001-290101 | 10/2001 |
| JP | 2005-227324 | 8/2005 |
| JP | 2006-003879 | 1/2006 |
| JP | 2006-195084 A | 7/2006 |
| JP | 2007-012530 | 1/2007 |
| JP | 2007-041877 | 2/2007 |
| JP | 2008-268846 | 11/2008 |
| JP | 2008-304580 | 12/2008 |
| JP | 2010-8948 | 1/2010 |
| JP | 2011-017969 | 1/2011 |
| JP | 2011-090230 | 5/2011 |
| JP | 2011-150231 A | 8/2011 |
| JP | 2011-164545 | 8/2011 |
| JP | 2013-013450 | 1/2013 |
| WO | WO 98/49927 | 11/1998 |
| WO | WO 2000055676 | 9/2000 |
| WO | WO 2002082168 | 10/2002 |
| WO | WO 2005024491 | 3/2005 |
| WO | WO 2006004743 | 1/2006 |
| WO | WO 20060017771 | 2/2006 |
| WO | WO 2006102368 | 9/2006 |
| WO | WO 2007119063 | 10/2007 |
| WO | WO 2008/024101 | 2/2008 |
| WO | WO 2010062616 | 6/2010 |
| WO | WO 2010123934 | 10/2010 |
| WO | WO 2012088478 | 6/2012 |
| WO | WO 2013077895 | 5/2013 |
| WO | WO 2013170074 | 11/2013 |
| WO | WO2015006784 | 1/2015 |

OTHER PUBLICATIONS

Notice of Allowance dated Nov. 3, 2017 for U.S. Appl. No. 14/705,804.

Amendment and Response to Non Final Office Action filed Dec. 14, 2017 for U.S. Appl. No. 14/705,741.

Notice of Allowance dated Jan. 11, 2018 for U.S. Appl. No. 14/705,748.

Notice of Allowance dated Feb. 1, 2018 for U.S. Appl. No. 14/705,741.

Office Action dated Feb. 1, 2018 for Chinese Application No. 201480074051.7, including English translation provided by foreign associate, 13 pages.

Office Action dated Sep. 26, 2018 for Japanese Application No. 2017-225726 with English translation provided by Foreign Associate.

Office Action dated Sep. 26, 2018 for Japanese Application No. 2017-225728 with English translation provided by Foreign Associate.

Office Action dated Sep. 25, 2018 for Japanese Application No. 2017-225732 with English translation provided by Foreign Associate.

Office Action dated Sep. 25, 2018 for Japanese Application No. 2017-225729 with English translation provided by Foreign Associate.

Office Action dated Sep. 25, 2018 for Japanese Application No. 2017-225733 with English translation provided by Foreign Associate.

(56) References Cited

OTHER PUBLICATIONS

Office Action dated Sep. 25, 2018 for Japanese Application No. 2017-225734 with English translation provided by Foreign Associate.
Office Action dated Sep. 26, 2018 for Japanese Application No. 2017-225731 with English translation provided by Foreign Associate.
Office Action 1 dated Sep. 28, 2018 for Australian Application No. 2017254813.
Office Action 1 dated Sep. 14, 2018 for Australian Application No. 2017254803.
Office Action dated Sep. 28, 2018 for Japanese Application No. 2016-534677 with English translation provided by Foreign Associate.
Office Action dated Oct. 3, 2018 for Japanese Application No. 2017-225727 with English translation provided by Foreign Associate.
Office Action dated Oct. 1, 2018 for Japanese Application No. 2017-225736 with English translation provided by Foreign Associate.
Office Action 1 dated Nov. 8, 2018 for Australian Application No. 2017254811.
Office Action 1 dated Nov. 13, 2018 for Australian Application No. 2017254807.
Kantonen "Mixed Reality in Virtual World Teleconferencing" IEEE Virtual Reality Mar. 20-24, 2010, Waltham, MA.
Office Action 1 dated Nov. 1, 2018 for Australian Application No. 2017254800.
Schowengerdt "Miniature Wide-Throw-Angle Scanning Fiber Projection Display" SID 08 Digest.
Office Action 1 dated Nov. 15, 2018 for Australian Application No. 2017254798.
Cheng "Design of an optical see-through head-mounted display with a low f-number and large field of view using freeform prism" Published Applied Optics / vol. 48, No. 14 / May 10, 2009.
Wang "Design, tolerance and fabrication of an opitical see-through head-mounted display with free-form surface elements" Published Applied Optics / vol. 52, No. 7 / Mar. 1, 2013.
Zheng "Design and fabrication of an off-axis see-through head-mounted display withan x-y polynomial surface" Published Applied Optics / vol. 49, No. 19 / Jul. 1, 2010.
International Search Report and Written Opinion dated Jun. 5, 2015 for PCT/US2014/067791, Applicant Magic Leap, Inc., filed Nov. 27, 2014, 14 pages.
Non final Office action dated Feb. 11, 2016 for U.S. Appl. No. 14/555,585, 30 pages.
Response filed May 11, 2016 to non final office action for U.S. Appl. No. 14/555,585, 21 pages.
Final Office action dated Jun. 24, 2016 for U.S. Appl. No. 14/555,585, 30 pages.
Response filed on Nov. 23, 2016 to final office action for U.S. Appl. No. 14/555,585, 17 pages.
Non final Office action dated Aug. 17, 2016 for U.S. Appl. No. 14/704,983, 18 pages.
Wu H, Kong D, Ruan Z, Hsu PC, Wang S, Yu Z, Carney TJ, Hu L, Fan S, Cui Y, "A Transparent Electrode Based on a Metal Nanotrough Network," Nature Nanotechnology, Jun. 1, 2013;8(6):pp. 421-425.
Yamazki, S., et al., "Thin Wide-Field-Of-View HMD With Free-Form-Surface Prism and Applications", (May 1999) in Electronic Imaging'99 (pp. 453-462), International Society for Optics and Photonics.
Cheng, D., et al., "Design of an Optical See-Through Head-Mounted Display with a F-Number and Large Field of View Using a Freeform Prism," Applied Optics, 48(14), pp. 2655-2668 (2009).
Forbes, G.W., 2012, "Characterizing the Shape of Freeform Optics," Optics express, 20(3), pp. 2483-2499.
Meister, D. (1998): "Aspheric Lenses: Optics and Applications", Lens Talk, 26(25), pp. 1-5.

Van Dam, M., et al., "Wavefront sensing for adaptive optics", Center for Adaptive Optics, W.M. Keck Observatory; www.cfao.ucolick.org/aosummer/2007/pdfs/Wavefront_Sensing_van_Dam.pdf, 2007.
Douglass, M. R., Lifetime Estimates and unique failure mechanism of the digital Micromirror Device (DMD), Reliability Physics Symposium Proceedings, 1998, 36th Annual 1998 IEEE International.
Charissis, V., et al., "Evaluation of Prototype Automotive Head-Up Display Interface: Testing Driver's Focusing Ability through a VR Stimulation," IEEE Intelligent Vehicles, 2007.
Non Final Office Action dated Aug. 10, 2016 for U.S. Appl. No. 14/705,741.
Amendment and Response to Non Final Office Action dated Aug. 16, 2016, filed on Dec. 16, 2016 for U.S. Appl. No. 14/705,769.
Non Final Office Action dated Aug. 16, 2016 for U.S. Appl. No. 14/705,769.
Non Final Office Action dated Oct. 14, 2016 for U.S. Appl. No. 14/705,804.
Non Final Office Action dated Jul. 21, 2016 for U.S. Appl. No. 14/705,275.
Non Final Office Action dated Jul. 29, 2016 for U.S. Appl. No. 14/703,168.
Non Final Office Action dated Sep. 29, 2016 for U.S. Appl. No. 14/705,867.
Non Final Office Action dated Sep. 15, 2016 for U.S. Appl. No. 14/705,748.
Non Final Office Action dated Jan. 12, 2017 for U.S. Appl. No. 14/555,585, 30 pages.
Response filed on Jan. 17, 2017 to non-final office action for U.S. Appl. No. 14/704,983, 15 pages.
Response filed Jan. 26, 2017 to non-final office action for U.S. Appl. No. 14/703,168, 16 pages.
Final Office action dated Jan. 27, 2017 for U.S. Appl. No. 14/705,769, 18 pages.
Response filed Feb. 8, 2017 to non-final office action for U.S. Appl. No. 14/705,741.
Response filed Feb. 14, 2017 to non-final office action for U.S. Appl. No. 14/705,804.
Response filed Feb. 15, 2017 to non-final office action for U.S. Appl. No. 14/705,748.
Final Office action dated Feb. 22, 2017 for U.S. Appl. No. 14/703,168, 18 pages.
Response filed Feb. 28, 2017 to Non-Final Office Action for U.S. Appl. No. 14/705,867.
Final Office action dated Mar. 9, 2017 for U.S. Appl. No. 14/704,983, 16 pages.
Final Office action dated Mar. 24, 2017 for U.S. Appl. No. 14/705,741, 16 pages.
Final Office Action dated Apr. 7, 2017 for U.S. Appl. No. 14/705,748 (33 pages).
Response filed Apr. 12, 2017 to Non-Final Office Action for U.S. Appl. No. 14/555,585.
Final Office Action dated Apr. 13, 2017 for U.S. Appl. No. 14/705,867; 35 pages.
Final Office Action dated Apr. 13, 2017 for U.S. Appl. No. 14/705,804; 39 pages.
Response to Final Office Action filed Apr. 26, 2017 for U.S. Appl. No. 14/705,769.
Response to Final Office Action filed May 22, 2017 for U.S. Appl. No. 14/703,168.
Response to Final Office Action (AAF) filed May 23, 2017 for U.S. Appl. No. 14/705,741.
Notice of allowance dated Jun. 9, 2017 for U.S. Appl. No. 14/555,585.
Response to Final Office Action filed Jun. 9, 2017 for U.S. Appl. No. 14/704,983.
Response to Final Office action (RCE) filed Jun. 26, 2017 for U.S. Appl. No. 14/705,741.
Response to Final Office action (RCE) filed Jul. 6, 2017 for U.S. Appl. No. 14/705,748.
Extended European Search Report dated Jul. 5, 2017 for EP application No. 14866595.3, Applicant Magic Leap, Inc. 8 pages.

(56) References Cited

OTHER PUBLICATIONS

Response to Final Office action (RCE) filed Aug. 4, 2017 for U.S. Appl. No. 14/705,804.
Notice of Allowance dated Jun. 23, 2017 for U.S. Appl. No. 14/705,769.
Advisory Action for U.S. Appl. No. 14/705,741 dated Jun. 7, 2017.
Interview Summary for U.S. Appl. No. 14/705,741 dated Jul. 11, 2017.
Response to Final Office action (RCE) filed Aug. 11, 2017 for U.S. Appl. No. 14/705,867.
Notice of Allowance dated Aug. 14, 2017 for U.S. Appl. No. 14/703,168.
Notice of Allowance dated Aug. 28, 2017 for U.S. Appl. No. 14/704,983.
Notice of Allowance dated Aug. 29, 2017 for U.S. Appl. No. 14/705,867.
Non final office action dated Sep. 14, 2017 for U.S. Appl. No. 14/705,741.
Non-final Office Action dated Jan. 7, 2019 for U.S. Appl. No. 15/729,494.
Office Action dated Dec. 29, 2018 for Chinese Application No. 201710242143.7 with English translation provided by Foreign Associate.
Amendment Response to Office Action filed Mar. 22, 2019 for Japanese Application Serial No. 2017-225727.
Amendment and Response to Office Action filed Apr. 8, 2019 for U.S. Appl. No. 15/729,494.
Final office action dated Apr. 17, 2019 for U.S. Appl. No. 15/729,494.
Notice of Allowance for Japanese Patent Application No. 2017-225727 dated May 9, 2019.
Office Action dated May 15, 2019 for Japanese Application No. 2017-225736 with English translation provided by Foreign Associate.
Office Action dated Apr. 24, 2019 for Chinese Application No. 201710242150.7 with English translation provided by Foreign Associate.
RCE Amendment and Response to Final Office Action filed Jul. 16, 2019 for U.S. Appl. No. 15/729,494.
Non-Final Office Action dated Jul. 31, 2019 for U.S. Appl. No. 15/970,552.
Non-Final Office Action dated Aug. 29, 2019 for U.S. Appl. No. 15/729,494.
Response to Non-Final Office Action filed on Oct. 30, 2019 for U.S. Appl. No. 15/970,552.
Notice of Allowance dated Nov. 19, 2019 for U.S. Appl. No. 15/970,552.
Response to Non-Final Office Action filed on Nov. 26, 2019 for U.S. Appl. No. 15/729,494.
Notice of Allowance dated Dec. 26, 2019 for U.S. Appl. No. 15/729,494.

* cited by examiner

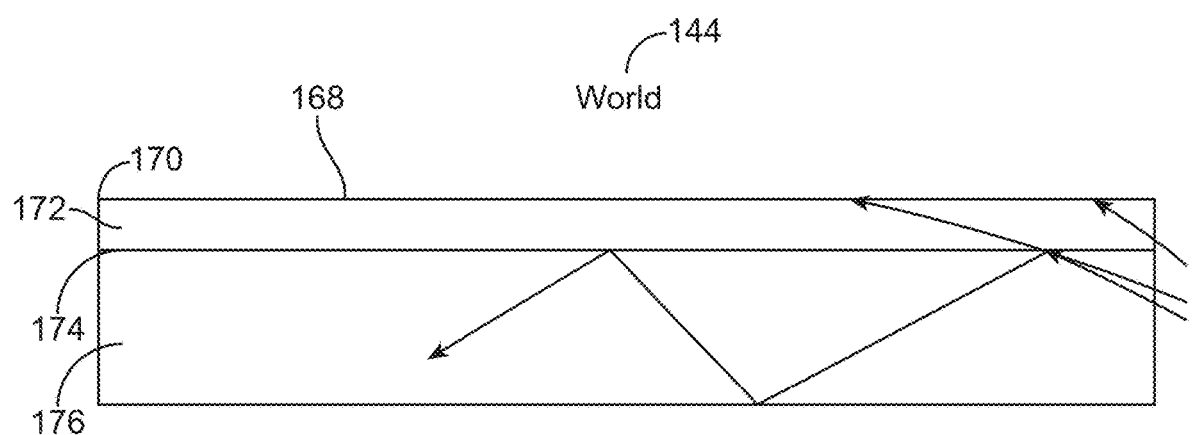
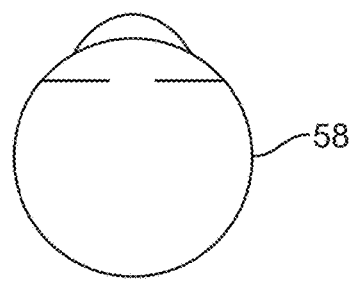
FIG. 7B

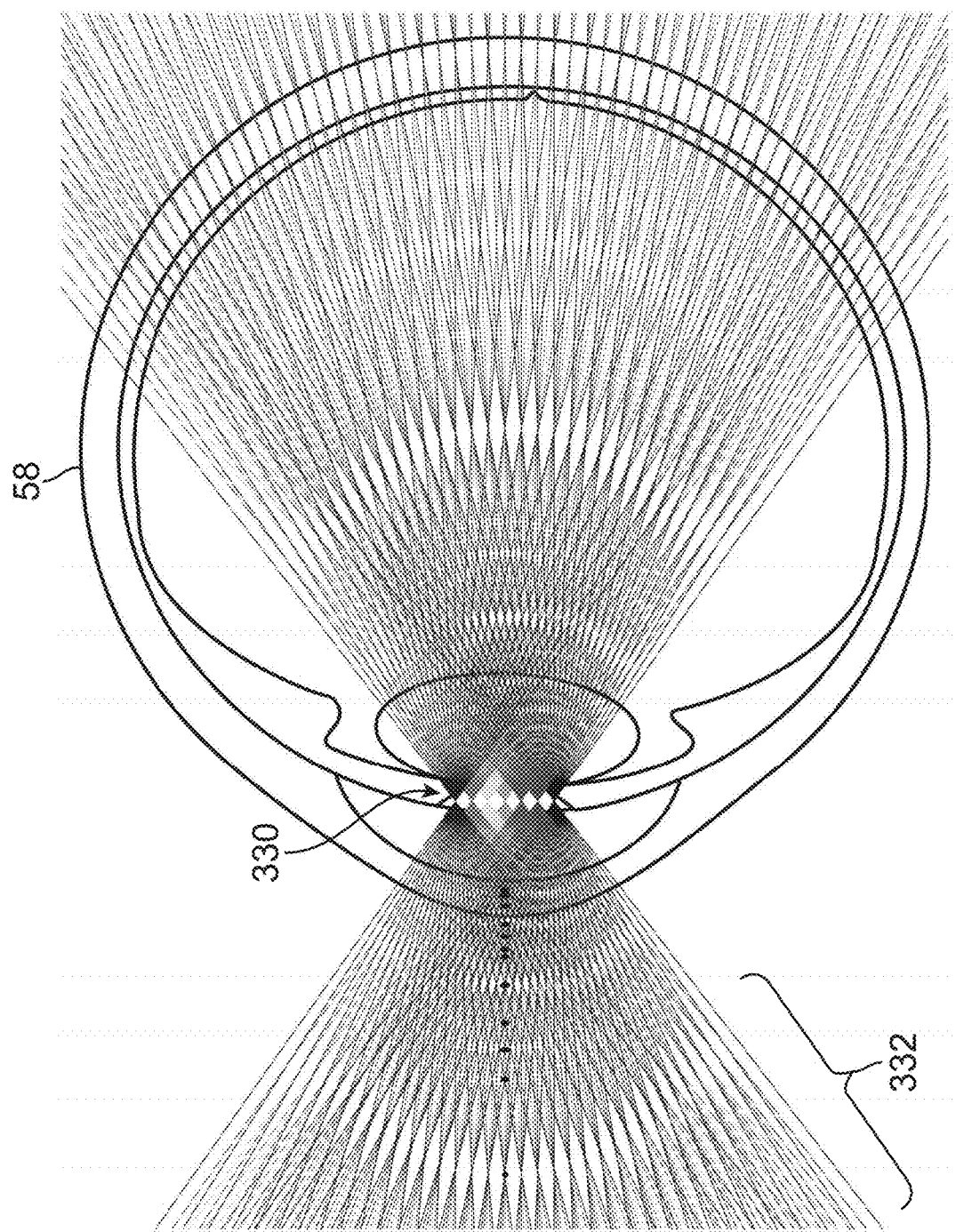

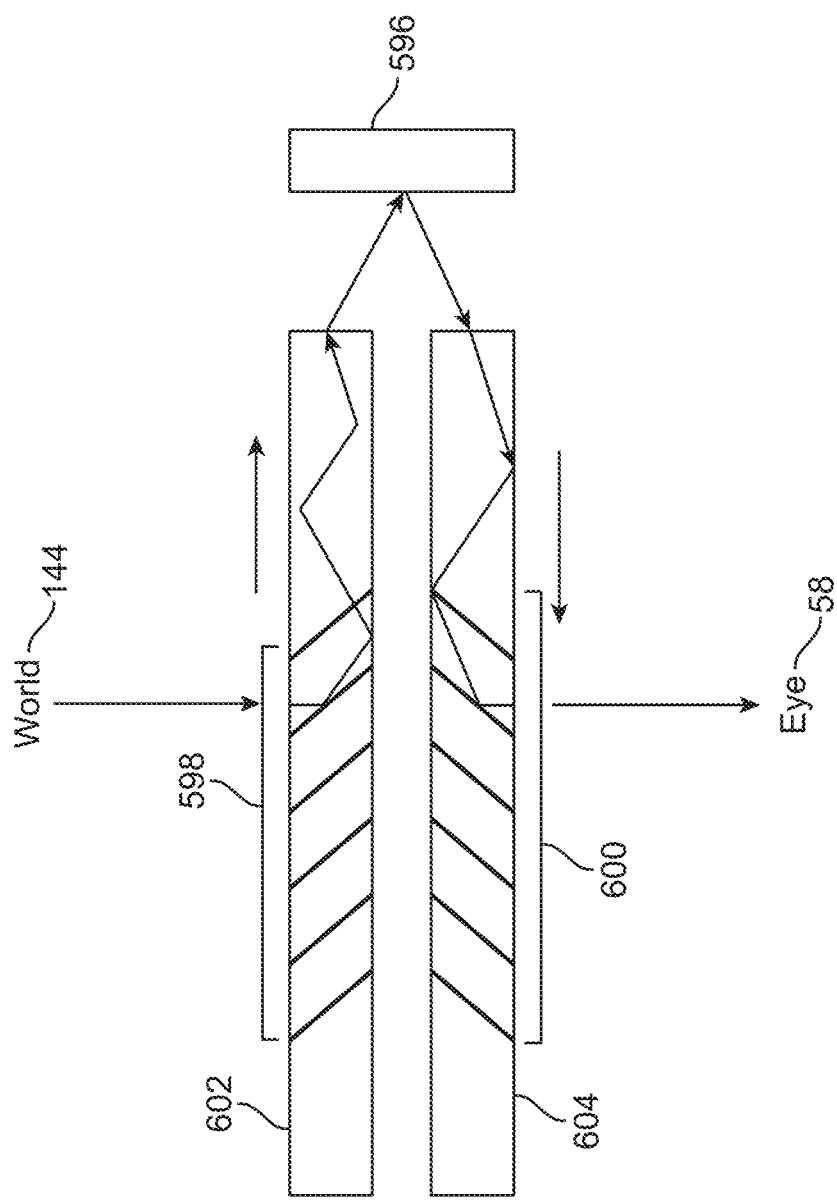

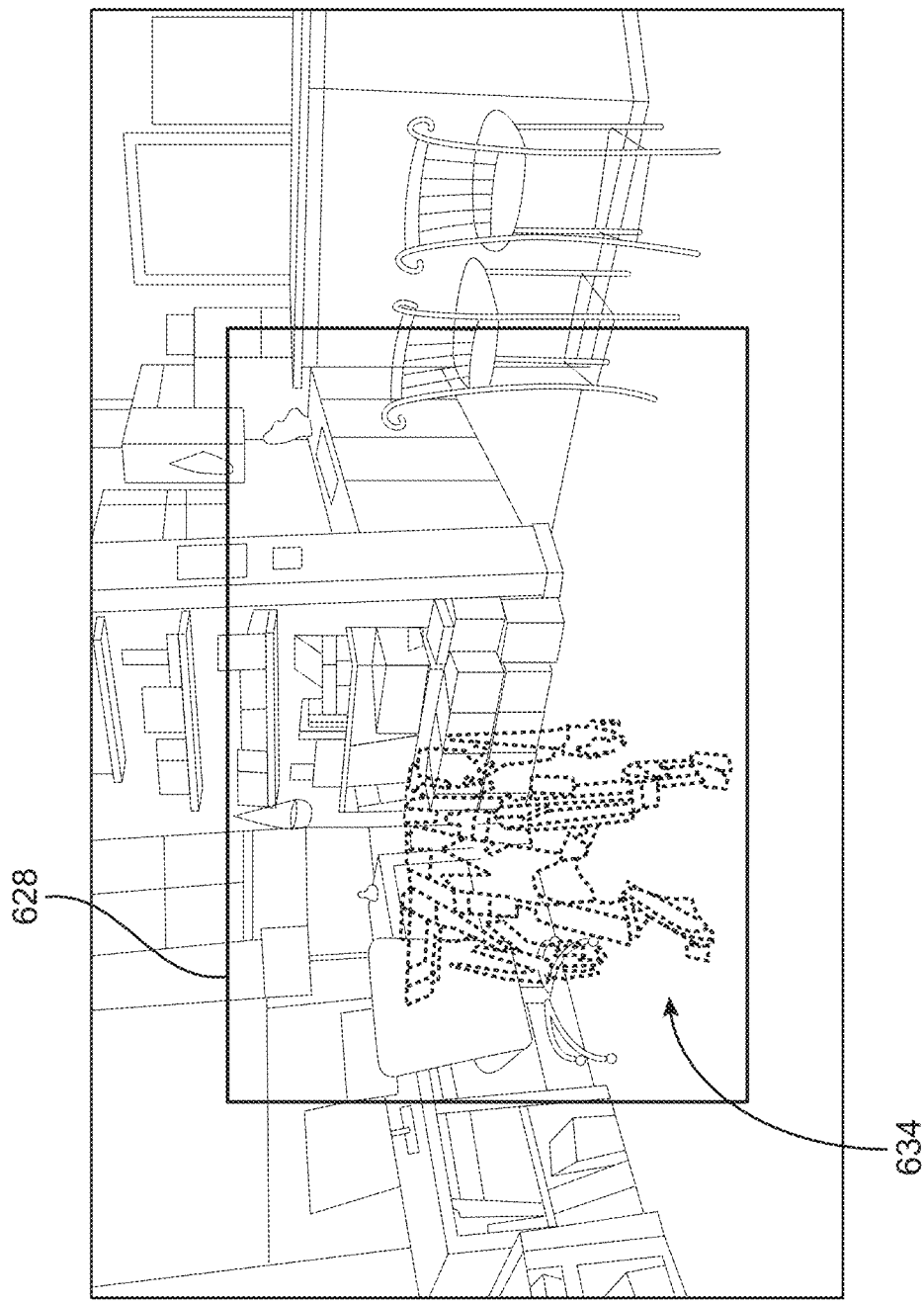

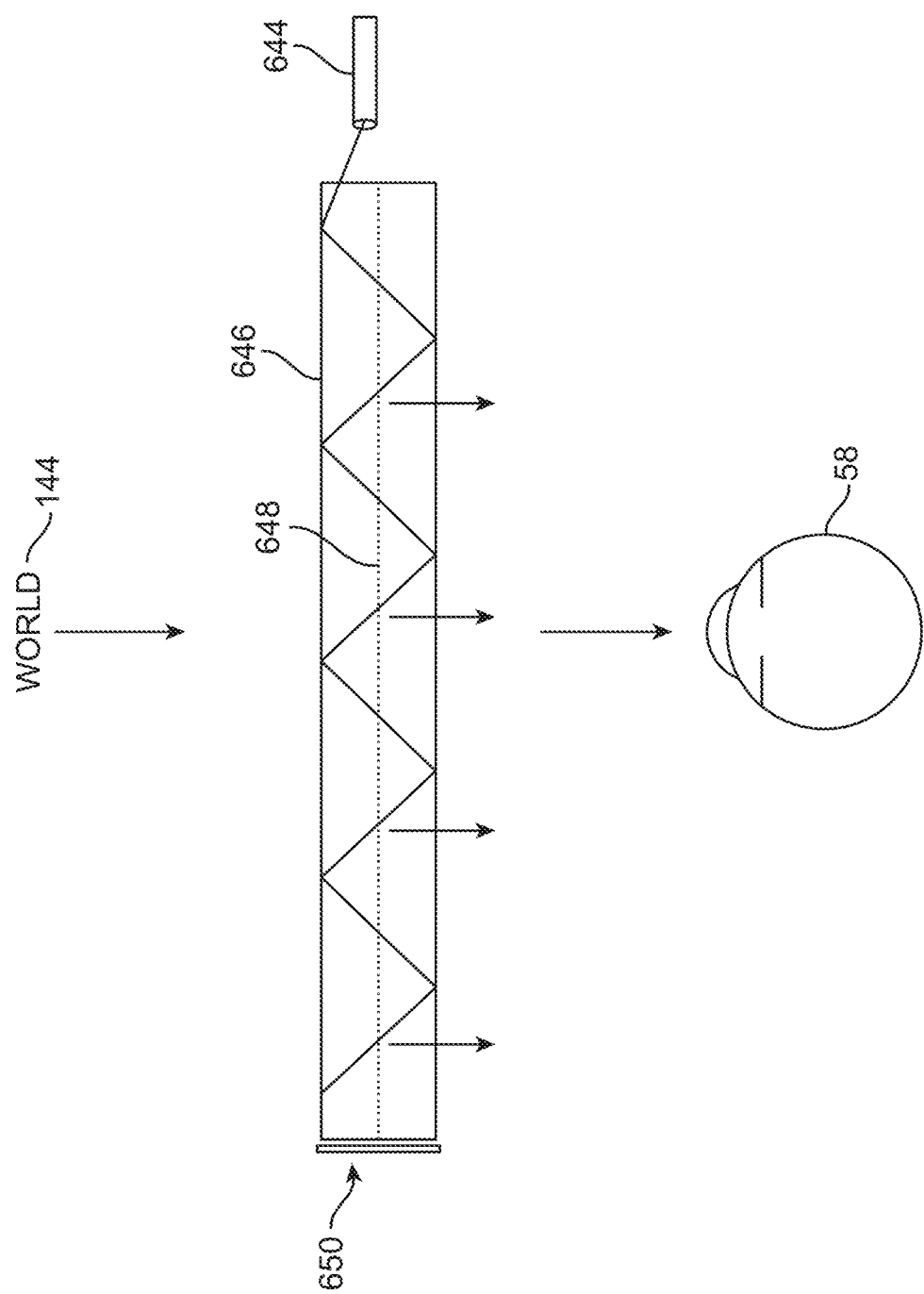

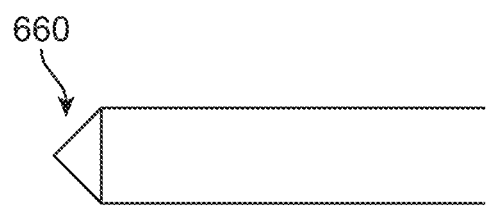
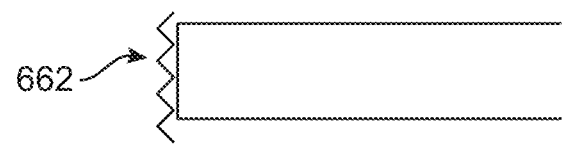
FIG. 20D

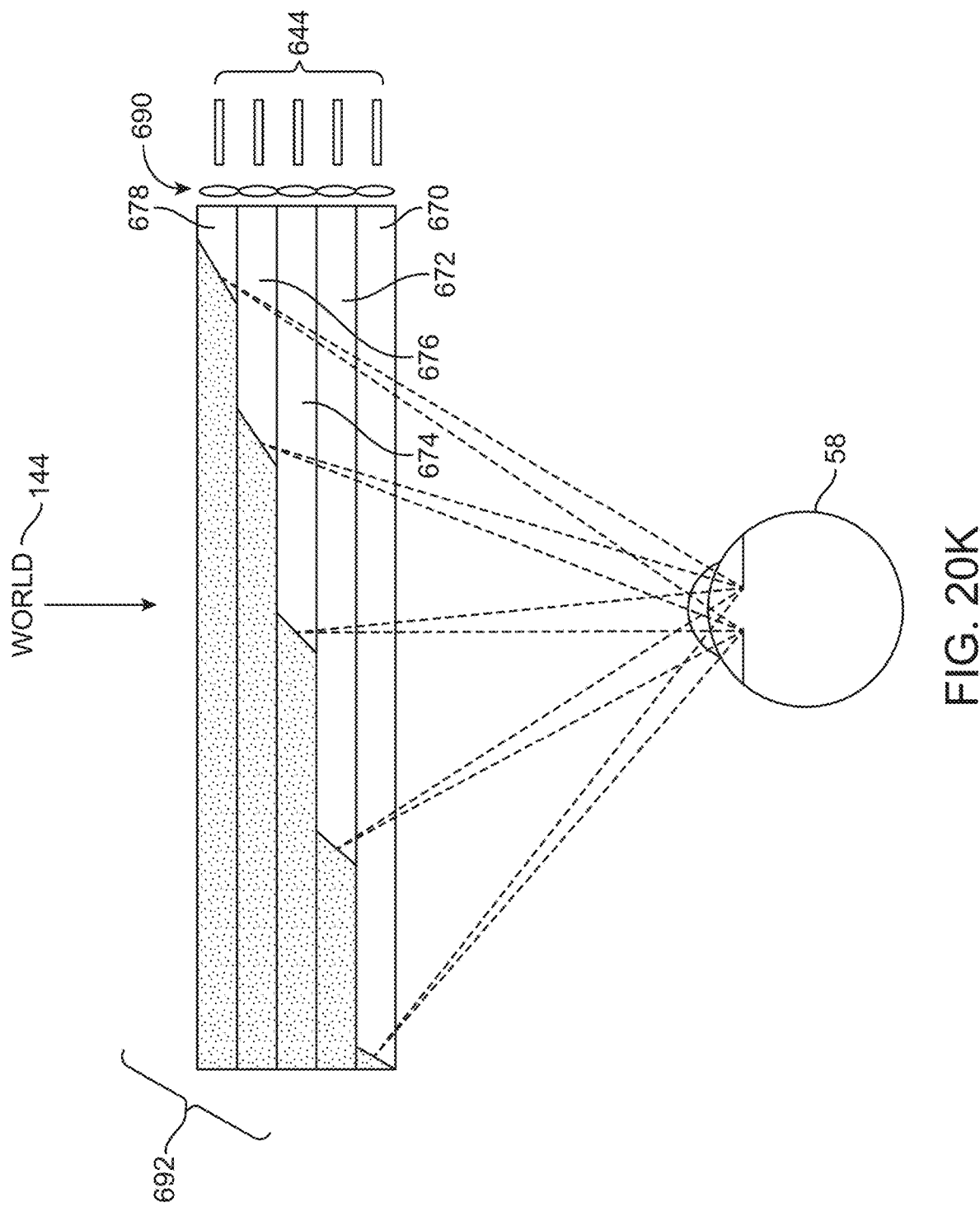

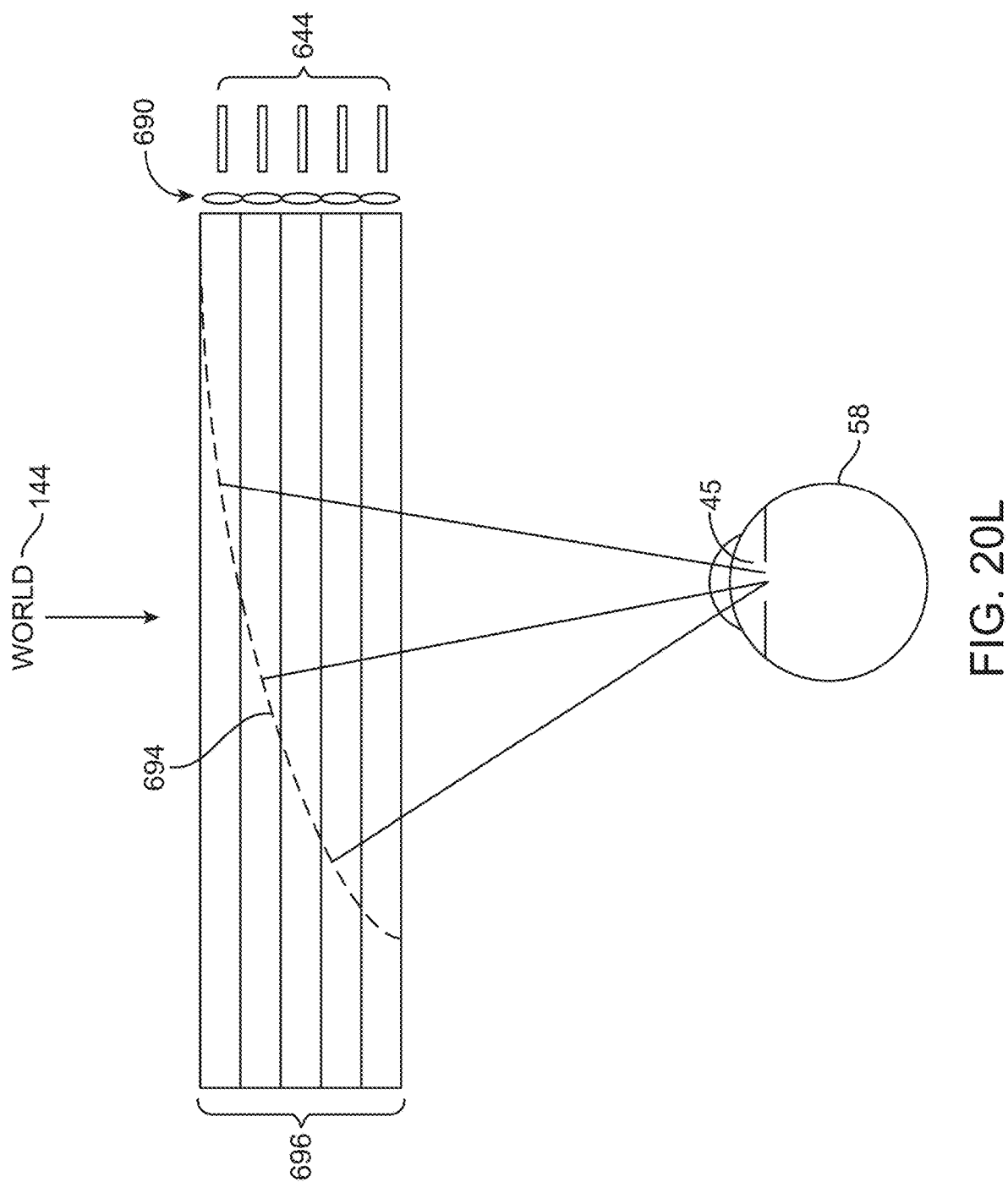

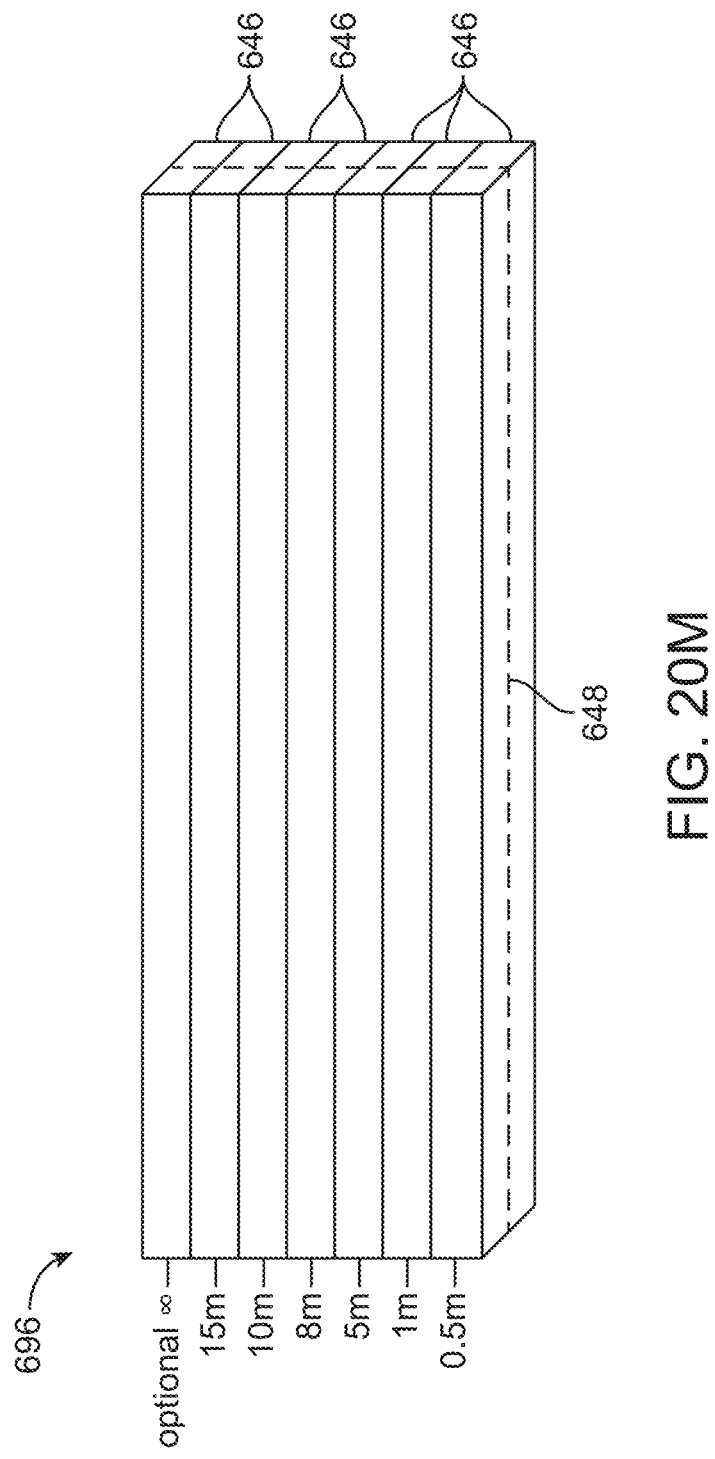

VIRTUAL AND AUGMENTED REALITY SYSTEMS AND METHODS

CROSS-REFERENCE TO RELATED APPLICATION(S)

This application is a continuation of pending U.S. patent application Ser. No. 14/555,585, filed Nov. 27, 2014, entitled "VIRTUAL AND AUGMENTED REALITY SYSTEMS AND METHODS", which claims priority from U.S. Provisional Patent Application Ser. No. 61/909,774 filed on Nov. 27, 2013 entitled "VIRTUAL AND AUGMENTED REALITY SYSTEMS AND METHODS." The content of the aforementioned patent applications are hereby expressly incorporated by reference in their entirety.

FIELD OF THE INVENTION

The present disclosure relates to virtual reality and augmented reality imaging and visualization systems.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. As it turns out, the human visual perception system is very complex, and producing a VR or AR technology that facilitates a comfortable, natural-feeling, rich presentation of virtual image elements amongst other virtual or real-world imagery elements is challenging.

Referring to FIG. 2A, stereoscopic wearable glasses (8) type configurations have been developed which generally feature two displays (10, 12) that are configured to display images with slightly different element presentation such that a three-dimensional perspective is perceived by the human visual system. Such configurations have been found to be uncomfortable for many users due to a mismatch between vergence and accommodation which must be overcome to perceive the images in three dimensions; indeed, some users are not able to tolerate stereoscopic configurations. FIG. 2B shows another stereoscopic wearable glasses (14) type configuration featuring two forward-oriented cameras (16, 18) configured to capture images for an augmented reality presentation to the user through stereoscopic displays. The position of the cameras (16, 18) and displays generally blocks the natural field of view of the user when the glasses (14) are mounted on the user's head.

Referring to FIG. 2C, an augmented reality configuration (20) is shown which features a visualization module (26) coupled to a glasses frame (24) which also holds conventional glasses lenses (22). The user is able to see an at least partially unobstructed view of the real world with such a system, and has a small display (28) with which digital imagery may be presented in an AR configuration to one eye—for a monocular AR presentation. FIG. 2D features a configuration wherein a visualization module (32) may be coupled to a hat or helmet (30) and configured to present monocular augmented digital imagery to a user through a small display (34). FIG. 2E illustrates another similar configuration wherein a frame (36) couple-able to a user's head in a manner similar to an eyeglasses coupling so that a visualization module (38) may be utilized to capture images and also present monocular augmented digital imagery to a user through a small display (40). Such a configuration is available, for example, from Google, Inc., of Mountain View, Calif. under the trade name GoogleGlass®. None of these configurations is optimally suited for presenting a rich, binocular, three-dimensional augmented reality experience in a manner that will be comfortable and maximally useful to the user, in part because prior systems fail to address some of the fundamental aspects of the human perception system, including the photoreceptors of the retina and their interoperation with the brain to produce the perception of visualization to the user.

Referring to FIG. 3, a simplified cross-sectional view of a human eye (58) is depicted featuring a cornea (42), iris (44), lens—or "crystalline lens" (46), sclera (48), choroid layer (50), macula (52), retina (54), and optic nerve pathway (56) to the brain. The macula is the center of the retina, which is utilized to see moderate detail; at the center of the macula is a portion of the retina that is referred to as the "fovea", which is utilized for seeing the finest details, and which contains more photoreceptors (approximately 120 cones per visual degree) than any other portion of the retina. The human visual system is not a passive sensor type of system; it is configured to actively scan the environment. In a manner somewhat akin to use of a flatbed scanner to capture an image, or use of a finger to read Braille from a paper, the photoreceptors of the eye fire in response to changes in stimulation, rather than constantly responding to a constant state of stimulation. Thus motion is required to present photoreceptor information to the brain (as is motion of the linear scanner array across a piece of paper in a flatbed scanner, or motion of a finger across a word of Braille imprinted into a paper). Indeed, experiments with substances such as cobra venom, which has been utilized to paralyze the muscles of the eye, have shown that a human subject will experience blindness if positioned with his eyes open, viewing a static scene with venom-induced paralysis of the eyes. In other words, without changes in stimulation, the photoreceptors do not provide input to the brain and blindness is experienced. It is believed that this is at least one reason that the eyes of normal humans have been observed to move back and forth, or dither, in side-to-side motion in what are called "microsaccades".

As noted above, the fovea of the retina contains the greatest density of photoreceptors, and while humans typically have the perception that they have high-resolution visualization capabilities throughout their field of view, they generally actually have only a small high-resolution center that they are mechanically sweeping around a lot, along with a persistent memory of the high-resolution information recently captured with the fovea. In a somewhat similar manner, the focal distance control mechanism of the eye (ciliary muscles operatively coupled to the crystalline lens in a manner wherein ciliary relaxation causes taut ciliary connective fibers to flatten out the lens for more distant focal lengths; ciliary contraction causes loose ciliary connective fibers, which allow the lens to assume a more rounded geometry for more close-in focal lengths) dithers back and forth by approximately ¼ to ½ diopter to cyclically induce a small amount of what is called "dioptric blur" on both the close side and far side of the targeted focal length; this is utilized by the accommodation control circuits of the brain as cyclical negative feedback that helps to constantly correct course and keep the retinal image of a fixated object approximately in focus.

The visualization center of the brain also gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR or VR configurations, is known to produce eye fatigue, headaches, or other forms of discomfort in users.

Movement of the head, which houses the eyes, also has a key impact upon visualization of objects. Humans move their heads to visualize the world around them; they often are in a fairly constant state of repositioning and reorienting the head relative to an object of interest. Further, most people prefer to move their heads when their eye gaze needs to move more than about 20 degrees off center to focus on a particular object (i.e., people do not typically like to look at things "from the corner of the eye"). Humans also typically scan or move their heads in relation to sounds—to improve audio signal capture and utilize the geometry of the ears relative to the head. The human visual system gains powerful depth cues from what is called "head motion parallax", which is related to the relative motion of objects at different distances as a function of head motion and eye vergence distance (i.e., if a person moves his head from side to side and maintains fixation on an object, items farther out from that object will move in the same direction as the head; items in front of that object will move opposite the head motion; these are very salient cues for where things are spatially in the environment relative to the person—perhaps as powerful as stereopsis). Head motion also is utilized to look around objects, of course.

Further, head and eye motion are coordinated with something called the "vestibulo-ocular reflex", which stabilizes image information relative to the retina during head rotations, thus keeping the object image information approximately centered on the retina. In response to a head rotation, the eyes are reflexively and proportionately rotated in the opposite direction to maintain stable fixation on an object. As a result of this compensatory relationship, many humans can read a book while shaking their head back and forth (interestingly, if the book is panned back and forth at the same speed with the head approximately stationary, the same generally is not true—the person is not likely to be able to read the moving book; the vestibulo-ocular reflex is one of head and eye motion coordination, generally not developed for hand motion). This paradigm may be important for augmented reality systems, because head motions of the user may be associated relatively directly with eye motions, and the system preferably will be ready to work with this relationship.

Indeed, given these various relationships, when placing digital content (e.g., 3-D content such as a virtual chandelier object presented to augment a real-world view of a room; or 2-D content such as a planar/flat virtual oil painting object presented to augment a real-world view of a room), design choices may be made to control behavior of the objects. For example, the 2-D oil painting object may be head-centric, in which case the object moves around along with the user's head (e.g., as in a GoogleGlass approach); or the object may be world-centric, in which case it may be presented as though it is part of the real world coordinate system, so that the user may move his head or eyes without moving the position of the object relative to the real world.

Thus when placing virtual content into the augmented reality world presented with an augmented reality system, whether the object should be presented as world centric (i.e., the virtual object stays in position in the real world so that the user may move his body, head, eyes around it without changing its position relative to the real world objects surrounding it, such as a real world wall); body, or torso, centric, in which case a virtual element may be fixed relative to the user's torso, so that the user can move his head or eyes without moving the object, but that is slaved to torso movements; head centric, in which case the displayed object (and/or display itself) may be moved along with head movements, as described above in reference to GoogleGlass; or eye centric, as in a "foveated display" configuration, as is described below, wherein content is slewed around as a function of what the eye position is.

With world-centric configurations, it may be desirable to have inputs such as accurate head pose measurement, accurate representation and/or measurement of real world objects and geometries around the user, low-latency dynamic rendering in the augmented reality display as a function of head pose, and a generally low-latency display.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one or more embodiment, the system comprises an image-generating source to provide one or more frames of image data in a time-sequential manner, a light modulator configured to transmit light associated with the one or more frames of image data, a substrate to direct image information to a user's eye, wherein the substrate houses a plurality of reflectors, a first reflector of the plurality of reflectors to reflect light associated with a first frame of image data at a first angle to the user's eye, and a second reflector of the plurality of reflectors to reflect light associated with a second frame of image data at a second angle to the user's eye.

In another embodiment, a system for displaying virtual content comprises an image-generating source to provide one or more frames of image data in a time-sequential manner, a display assembly to project light rays associated with the one or more frames of image data, the display assembly comprises a first display element corresponding to a first frame-rate and a first bit depth, and a second display element corresponding to a second frame-rate and a second bit depth, and a variable focus element (VFE) configurable to vary a focus of the projected light and transmit the light to the user's eye.

In yet another embodiment, a system for displaying virtual content comprises an array of optical fibers to transmit light beams associated with an image to be presented to a user, and a lens coupled to the array of the optical fibers to deflect a plurality of light beams output by the array of optical fibers through a single nodal point, wherein the lens is physically attached to the optical fibers such that a movement of the optical fiber causes the lens to move, and wherein the single nodal point is scanned.

In another embodiment, a virtual reality display system comprises a plurality of optical fibers to generate light beams associated with one or more images to be presented to a user, and a plurality of phase modulators coupled to the plurality of optical fibers to modulate the light beams, wherein the plurality of phase modulators modulate the light in a manner that affects a wavefront generated as a result of the plurality of light beams.

In one embodiment, a system for displaying virtual content to a user comprises a light projection system to project light associated with one or more frames of image data to a user's eyes, the light project system configured to project light corresponding to a plurality of pixels associated with the image data and a processor to modulate a size of the plurality of pixels displayed to the user.

In one embodiment, a system of displaying virtual content to a user, comprises an image-generating source to provide one or more frames of image data, a multicore assembly comprising a plurality of multicore fibers to project light associated with the one or more frames of image data, a multicore fiber of the plurality of multicore fibers emitting light in a wavefront, such that the multicore assembly produces an aggregate wavefront of the projected light, and a phase modulator to induce phase delays between the multicore fibers in a manner such that the aggregate wavefront emitted by the multicore assembly is varied, thereby varying a focal distance at which the user perceives the one or more frames of image data.

In another embodiment, a system for displaying virtual content to a user comprises an array of microprojectors to project light beams associated with one or more frames of image data to be presented to the user, wherein the microprojector is configurable to be movable relative to one or more microprojectors of the array of the microprojectors, a frame to house the array of microprojectors, a processor operatively coupled to the one or more microprojectors of the array of microprojectors to control one or more light beams transmitted from the one or more projectors in a manner such that the one or more light beams are modulated as a function of a position of the one or more microprojectors relative to the array of microprojectors, thereby enabling delivery of a lightfield image to the user.

Additional and other objects, features, and advantages of the invention are described in the detail description, figures and claims.

BRIEF DESCRIPTION OF THE DRAWINGS

FIGS. 7A and 7B illustrate embodiments of using one or more waveguides to transmit light to a user.

FIGS. 11A-11C illustrate a set of beamlets projected into a user's pupil, according to the illustrated embodiments.

DETAILED DESCRIPTION

Figure 1:
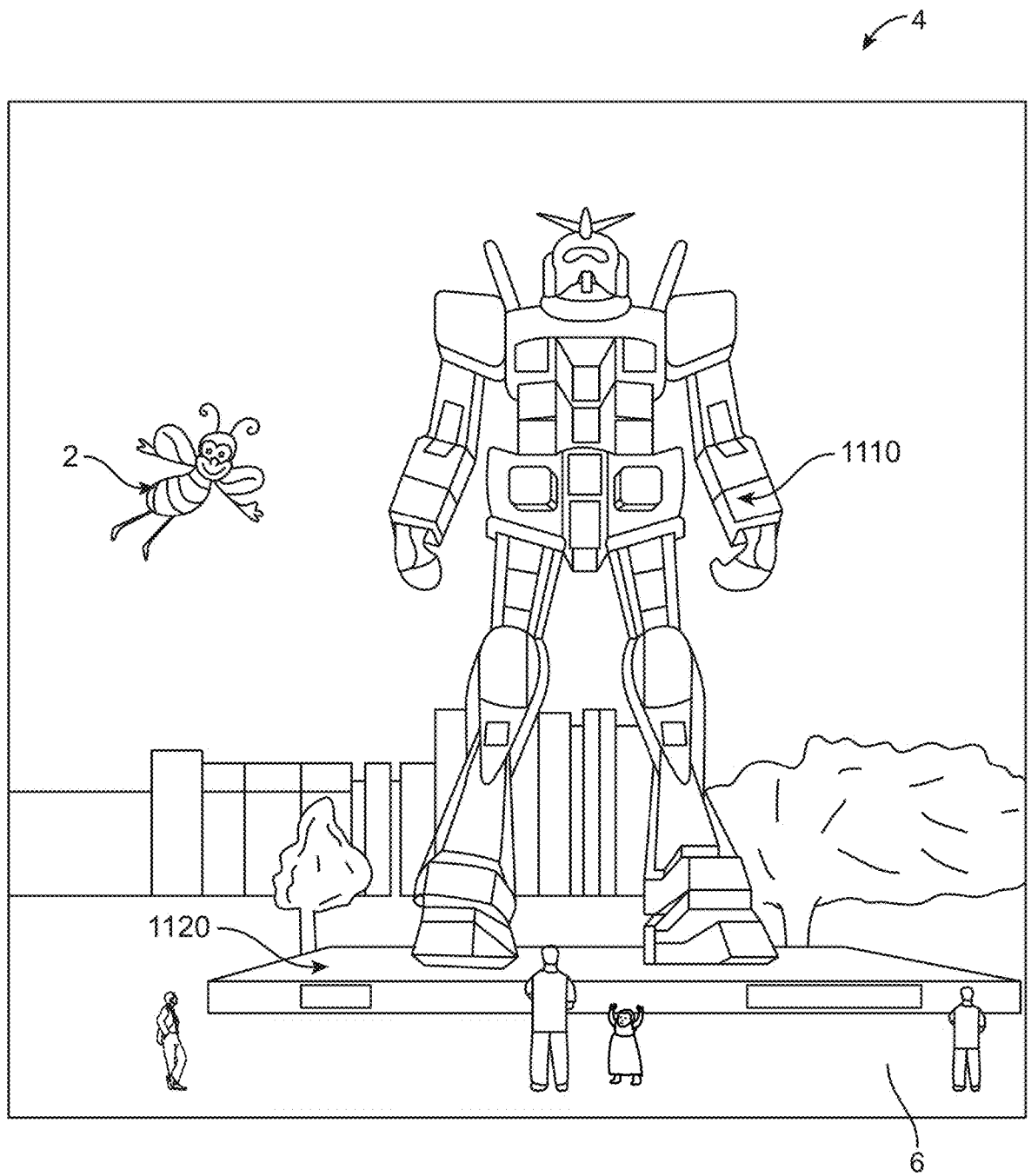
FIG. 1 illustrates a user's view of augmented reality (AR) through a wearable AR user device, in one illustrated embodiment.
Figure 2A:
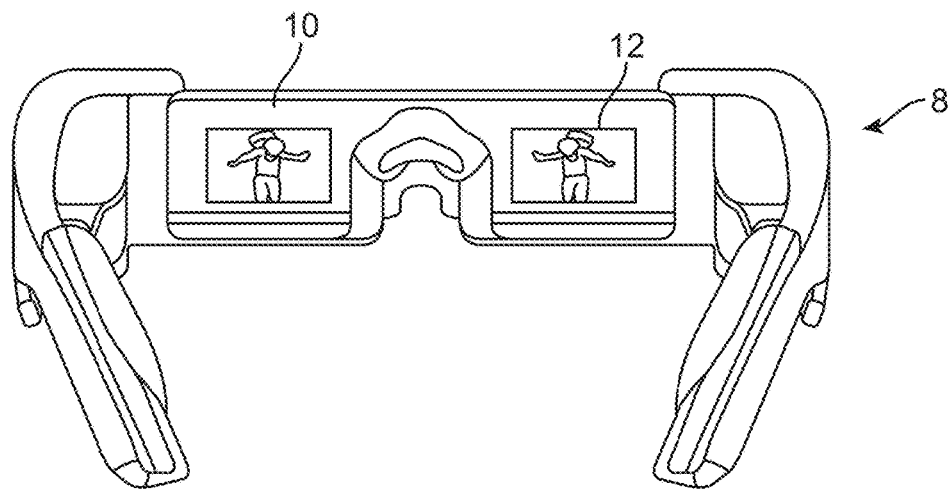
FIGS. 2A-2E illustrates various prior art wearable AR devices.
Figure 2B:
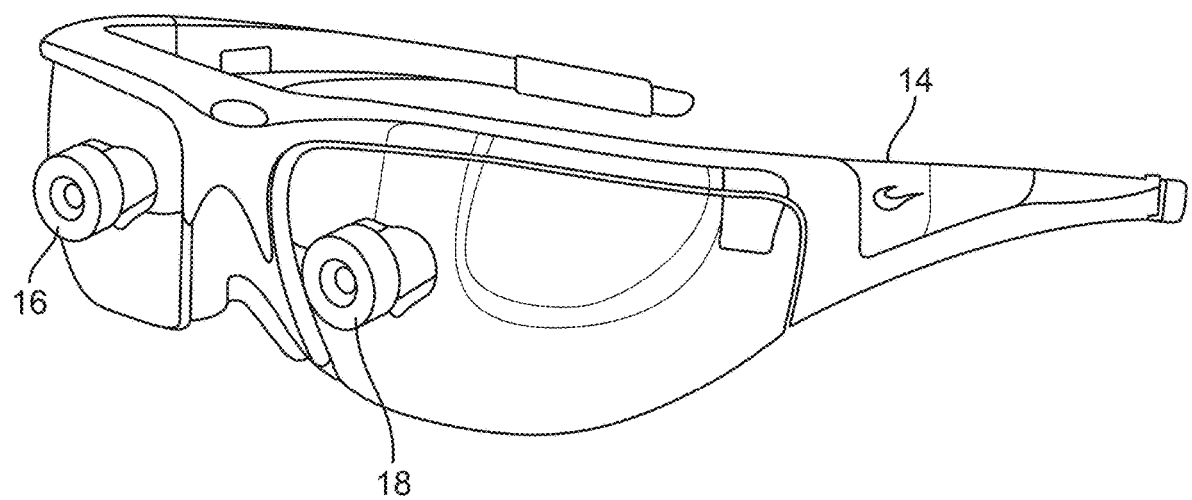
Figure 2C:
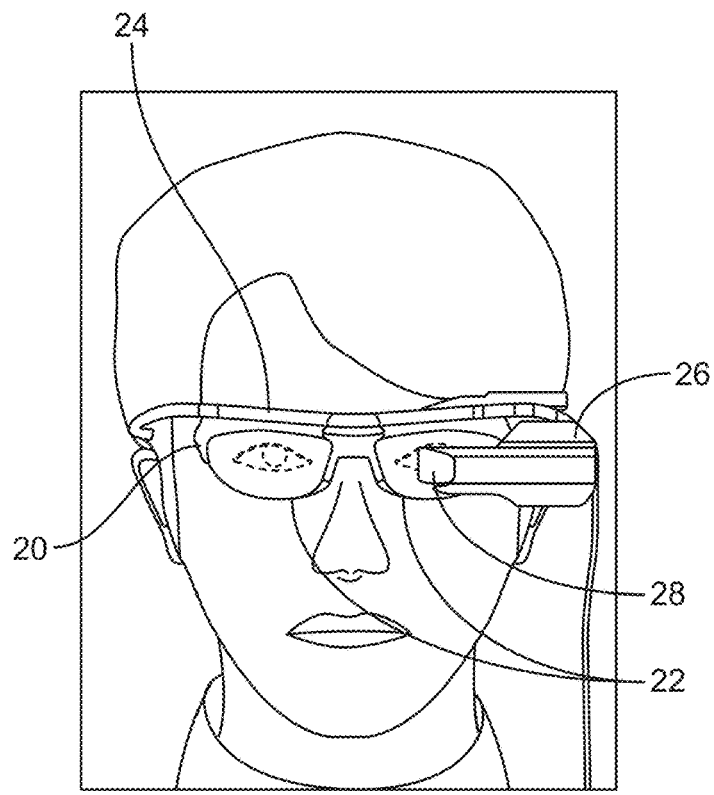
Figure 2D:
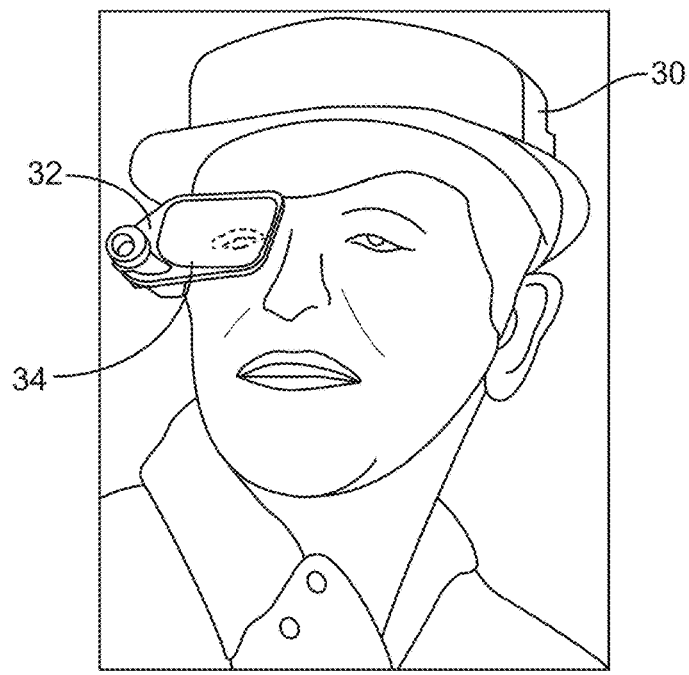
Figure 2E:
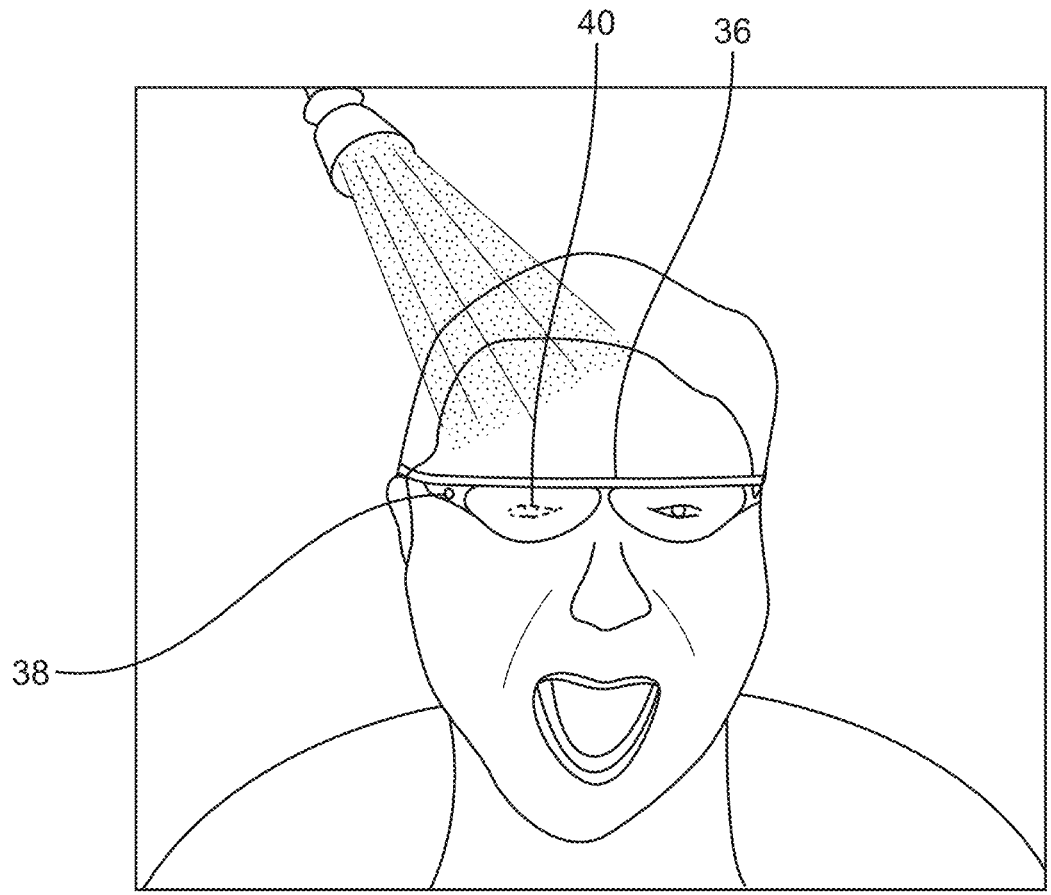
Figure 3:
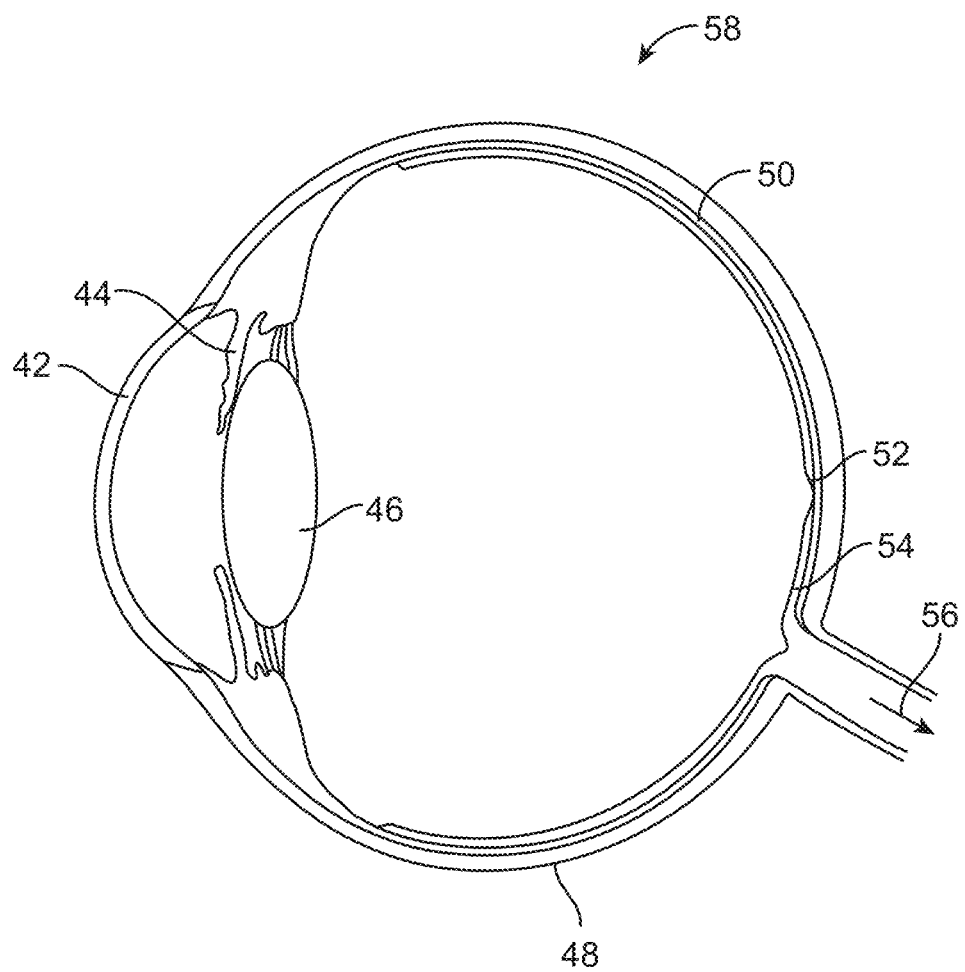
FIG. 3 illustrates a cross-sectional view of the human eye, in prior art.

FIG. 1 depicts an augmented reality scene (4) according to one embodiment wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world.

Referring to FIGS. 4A-4D, some general componentry options are illustrated. In the portions of the detailed description which follow the discussion of FIGS. 4A-4D, various systems, subsystems, and components are presented for addressing the objectives of providing a high-quality, comfortably-perceived display system for human VR and/or AR.

Figure 4A:
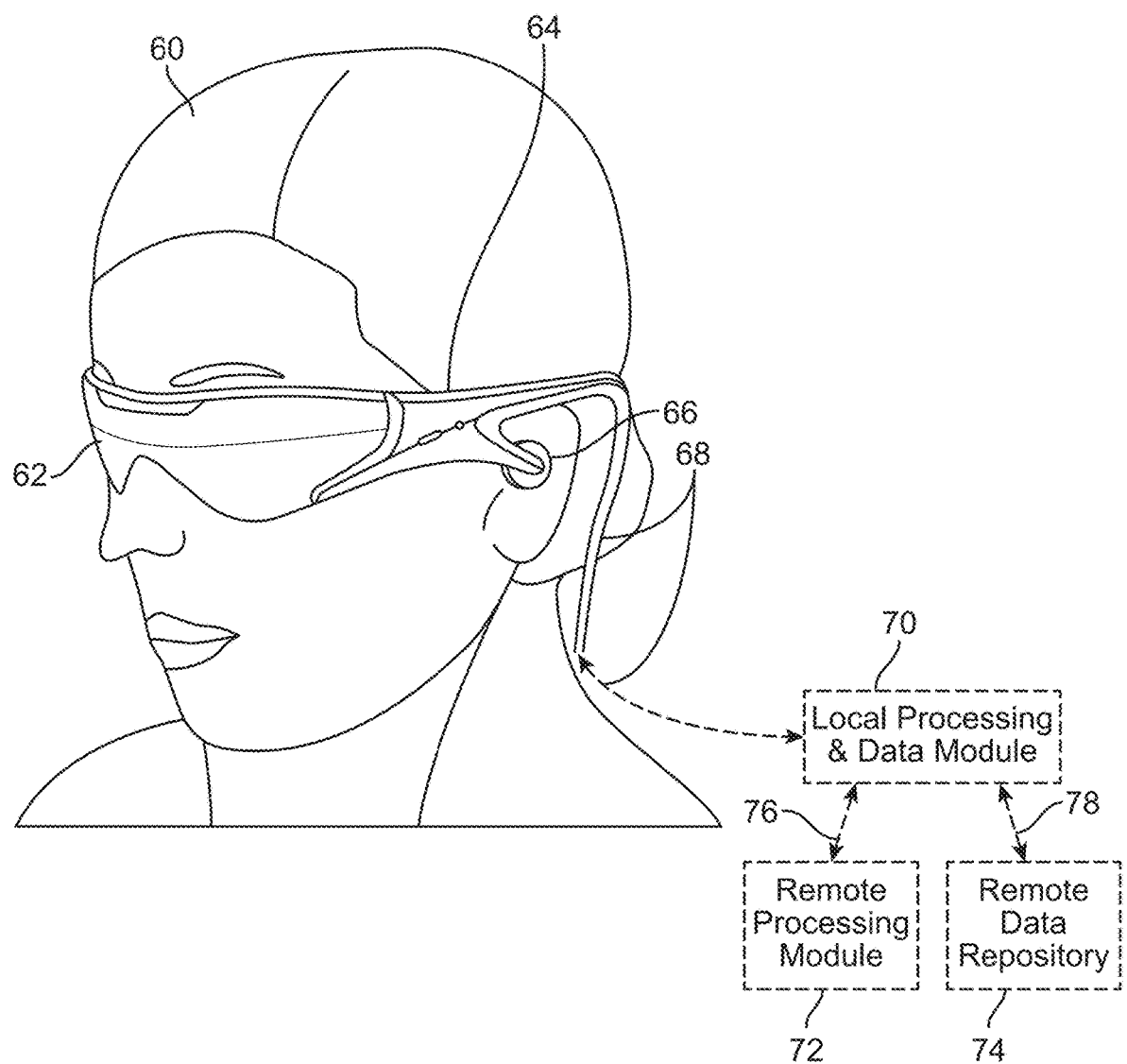
FIGS. 4A-4D illustrate one or more embodiments of various internal processing components of the wearable AR device.
Figure 4B:
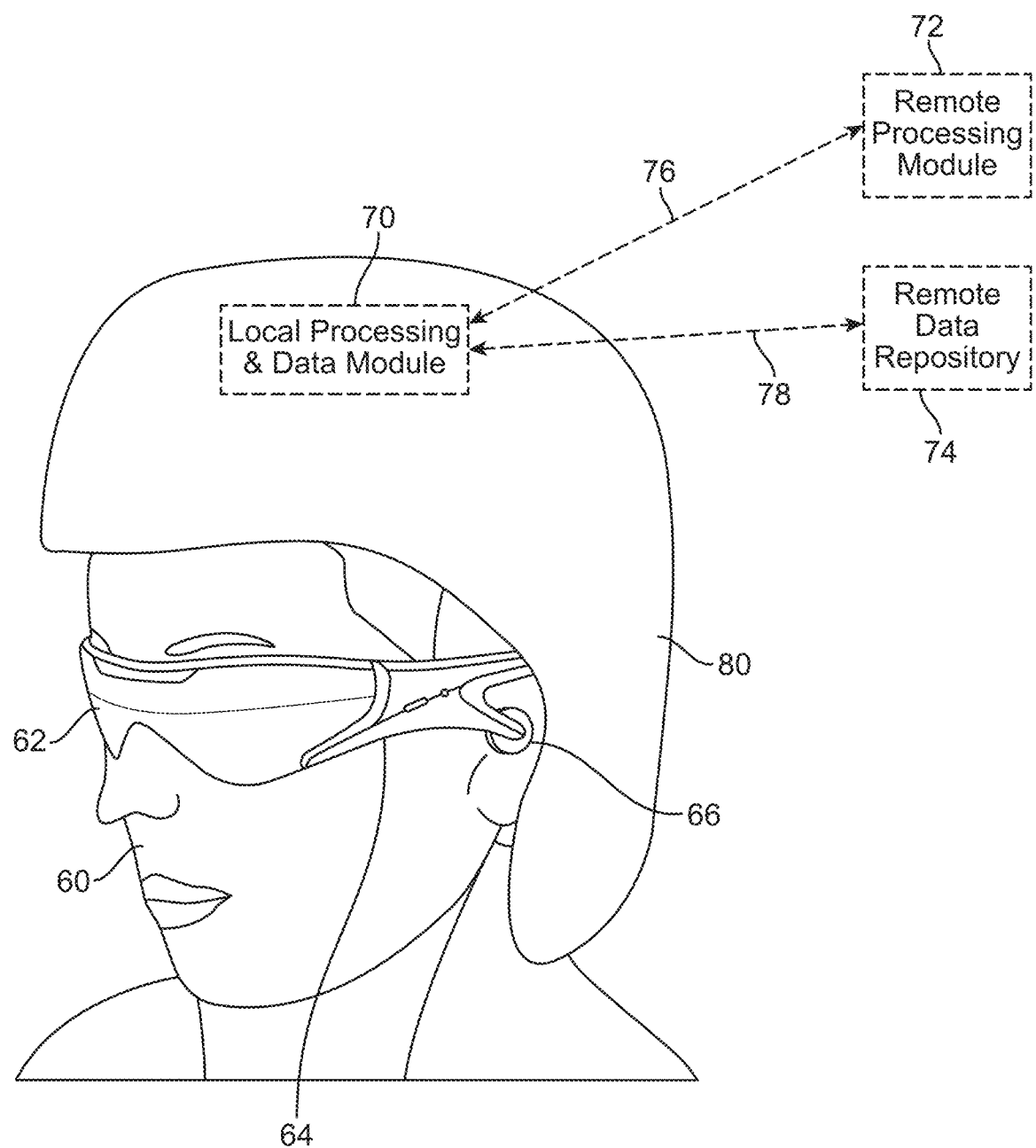
Figure 4C:
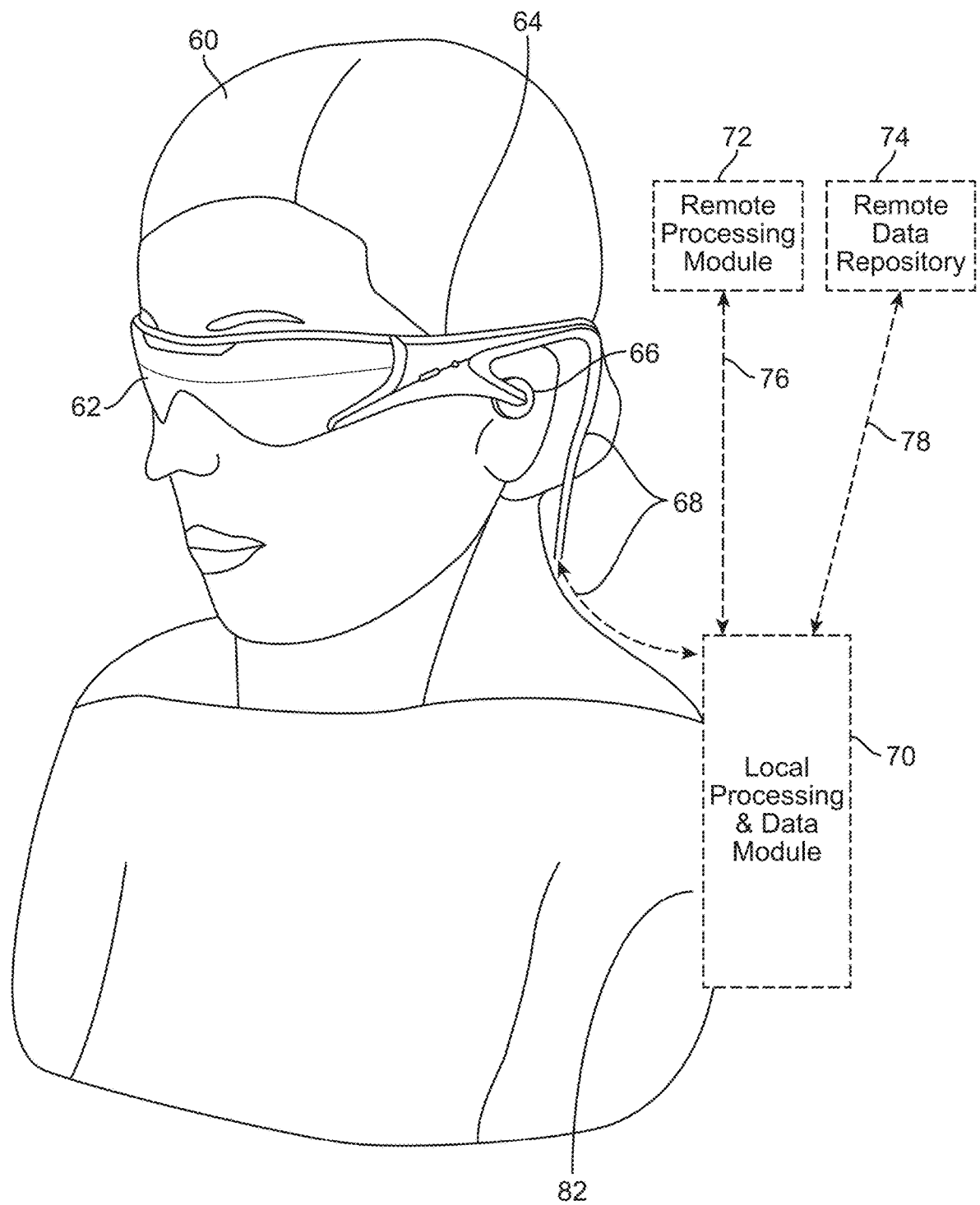
Figure 4D:
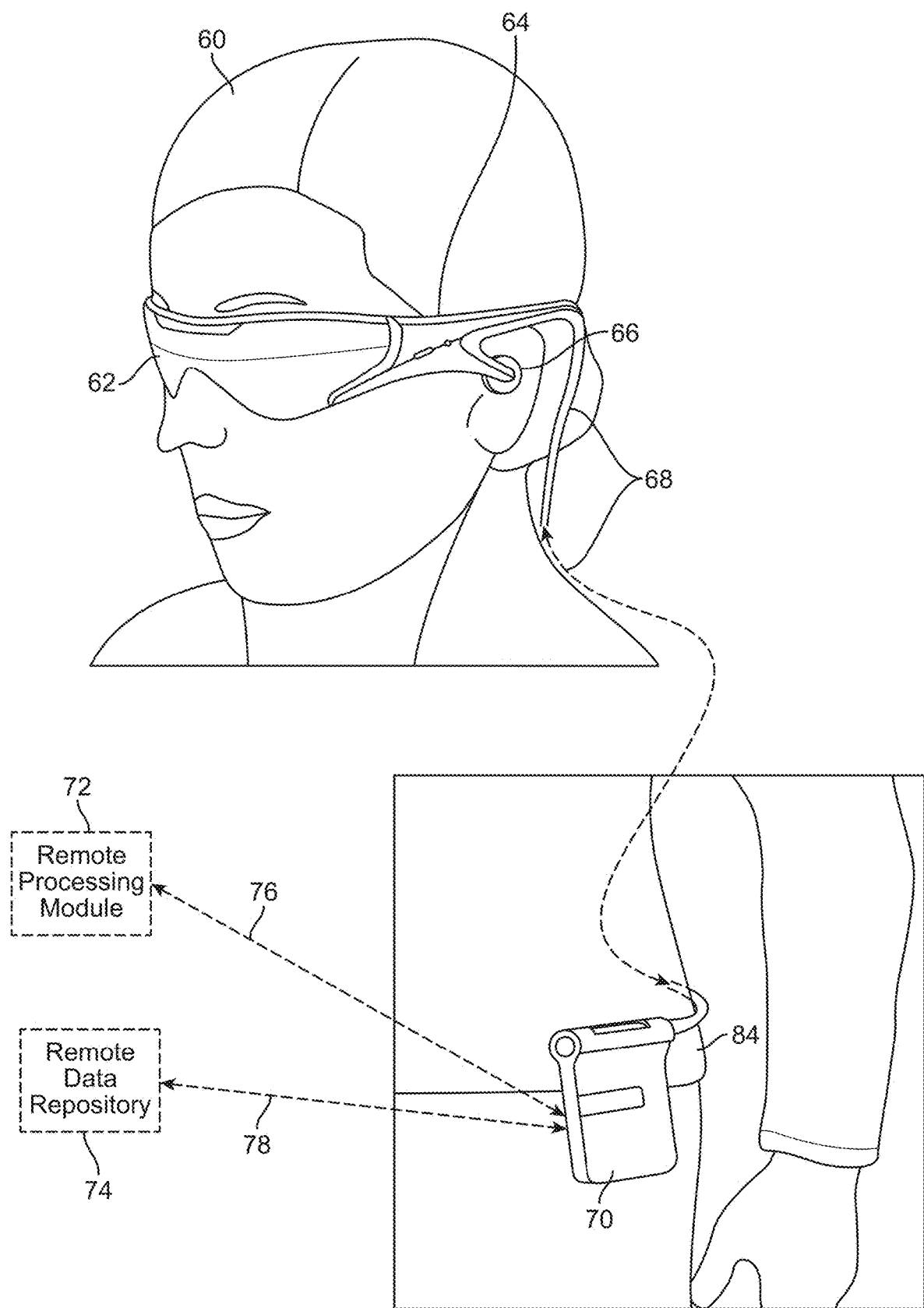

As shown in FIG. 4A, an AR system user (60) is depicted wearing a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 4B, embedded in headphones, removably attached to the torso (82) of the user (60) in a backpack-style configuration as shown in the embodiment of FIG. 4C, or removably attached to the hip (84) of the user (60) in a belt-coupling style configuration as shown in the embodiment of FIG. 4D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Referring to FIGS. 5A through 22Y, various display configurations are presented that are designed to present the human eyes with photon-based radiation patterns that can be comfortably perceived as augmentations to physical reality, with high-levels of image quality and three-dimensional perception, as well as being capable of presenting two-dimensional content.

Figure 5A:
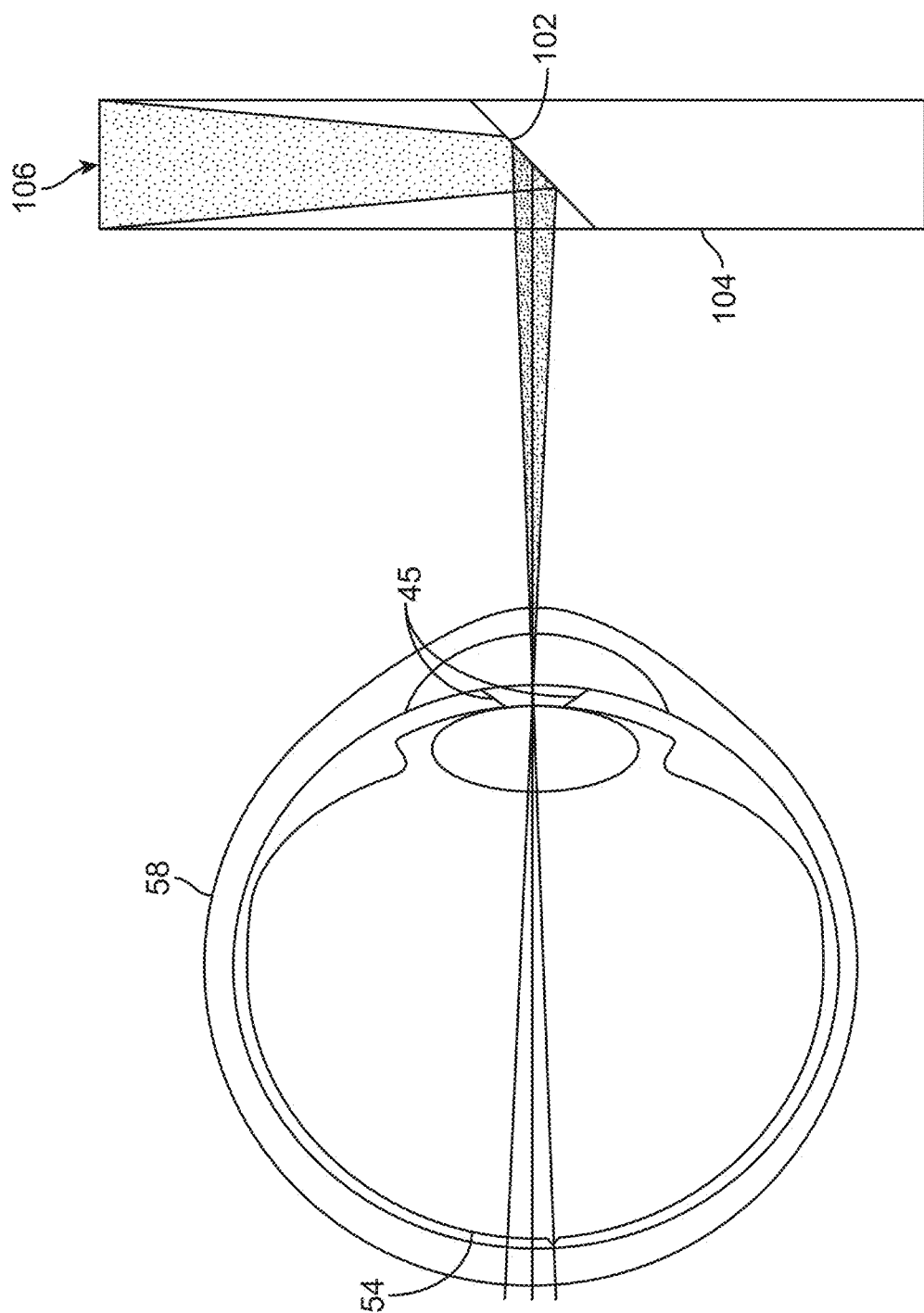
FIGS. 5A-5H illustrate embodiments of transmitting focused light to a user through a transmissive beamsplitter substrate.

Referring to FIG. 5A, in a simplified example, a transmissive beamsplitter substrate (104) with a 45-degree reflecting surface (102) directs incoming radiation (106), which may be output from a lens (not shown), through the pupil (45) of the eye (58) and to the retina (54). The field of view for such a system is limited by the geometry of the beamsplitter (104). To accommodate the desire to have comfortable viewing with minimal hardware, in one embodiment, a larger field of view can be created by aggregating the outputs/reflections of various different reflective and/or diffractive surfaces and using, e.g., a frame-sequential configuration wherein eye (58) is presented with a sequence of frames at high frequency that provides the perception of a single coherent scene. As an alternative to, or in addition to, presenting different image data via different reflectors in a time-sequential fashion, the reflectors may separate content by other means, such as polarization selectivity or wavelength selectivity. In addition to being capable of relaying two-dimensional images, the reflectors can relay the three-dimensional wavefronts associated with true-three-dimensional viewing of actual physical objects.

Figure 5B:
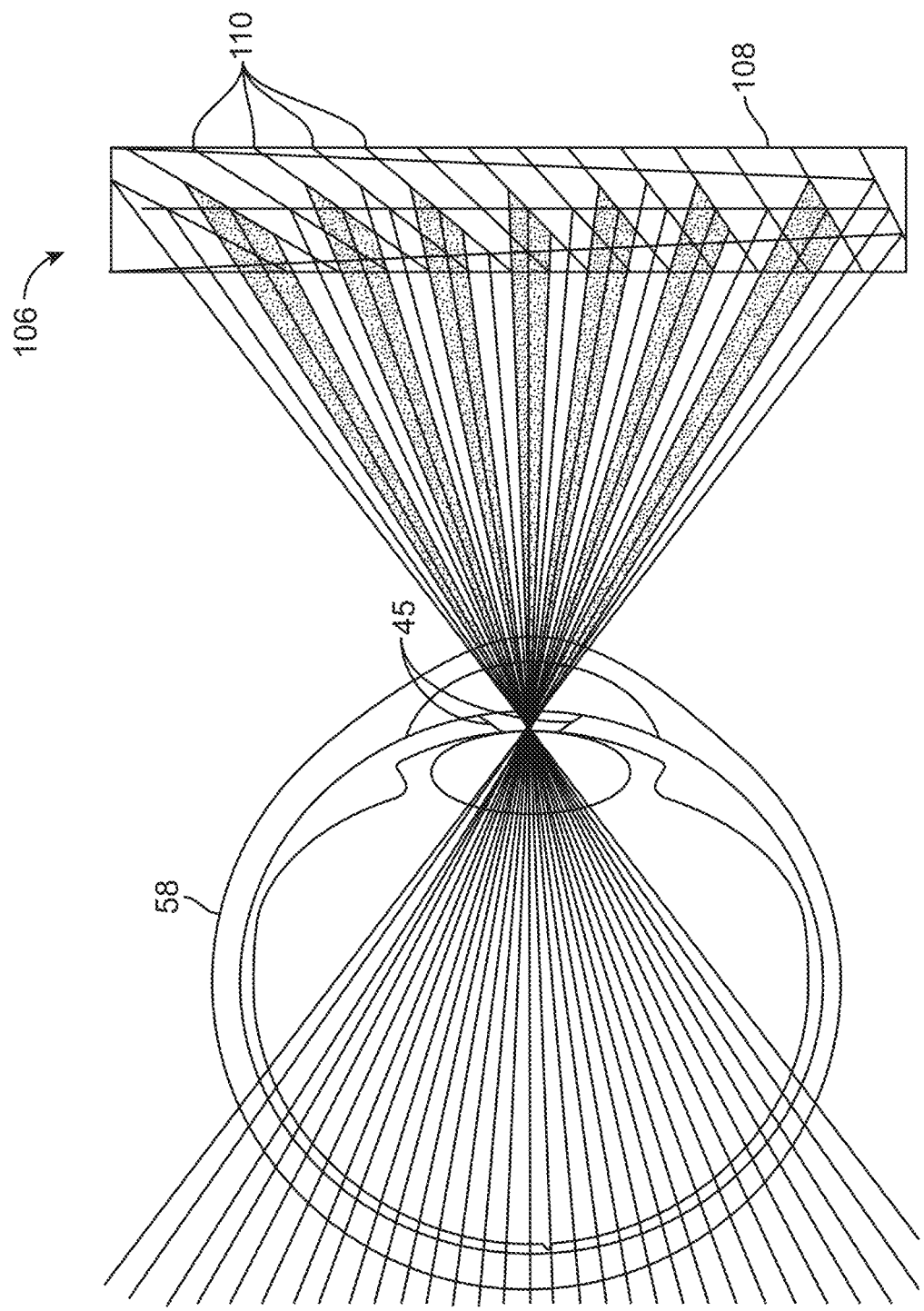

Referring to FIG. 5B, a substrate (108) comprising a plurality of reflectors at a plurality of angles (110) is shown, with each reflector actively reflecting in the depicted configuration for illustrative purposes. The reflectors may be switchable elements to facilitate temporal selectivity. In one embodiment, the reflective surfaces would intentionally be sequentially activated with frame-sequential input information (106), in which each reflective surface presents a narrow field of view sub-image which is tiled with other narrow field of view sub-images presented by the other reflective surfaces to form a composite wide field of view image. For example, referring to FIGS. 5C, 5D, and 5E, surface (110), about in the middle of substrate (108), is switched "on" to a reflecting state, such that it reflects incoming image information (106) to present a relatively narrow field of view sub-image in the middle of a larger field of view, while the other potential reflective surfaces are in a transmissive state.

Figure 5C:
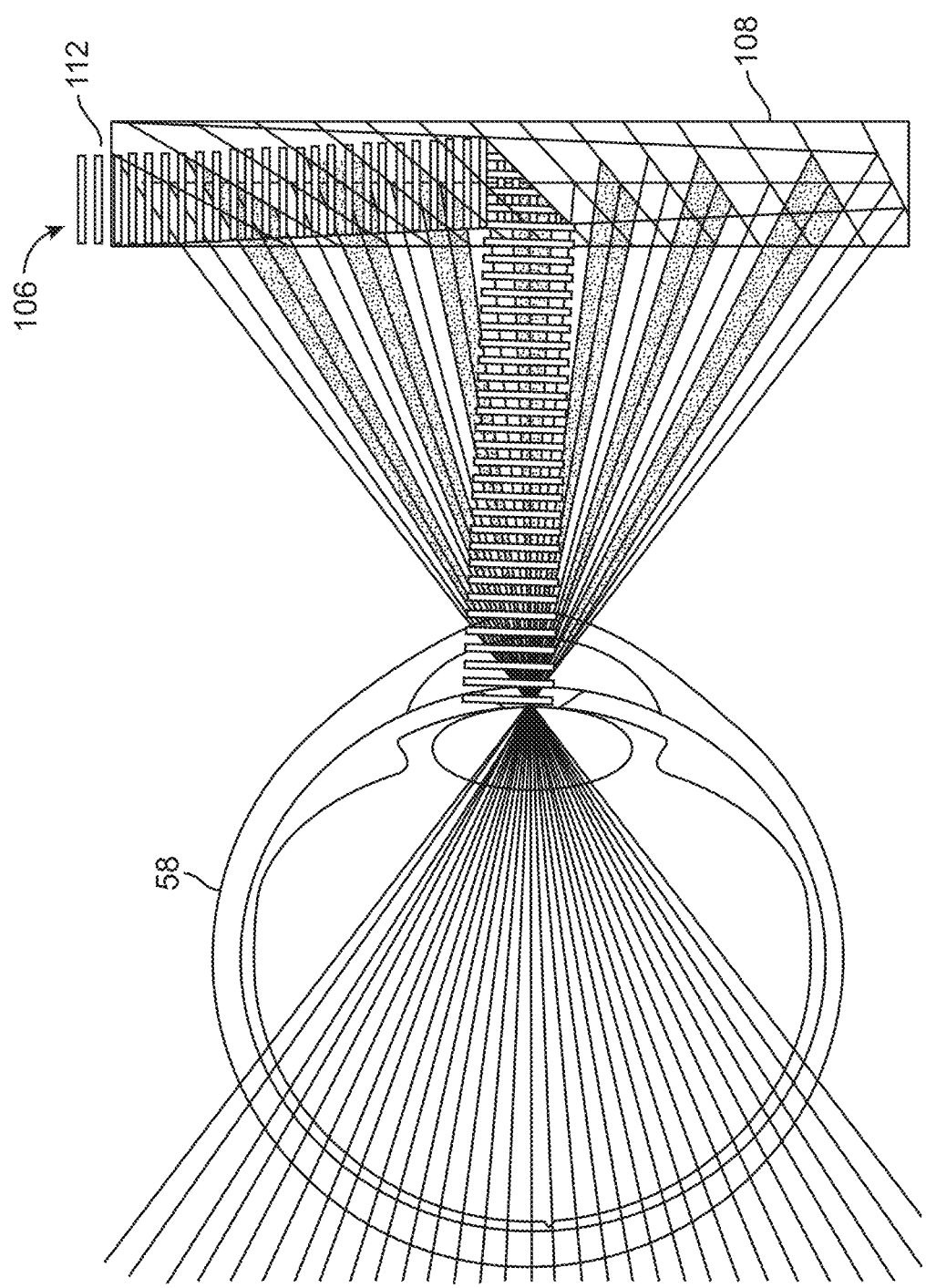
Figure 5D:
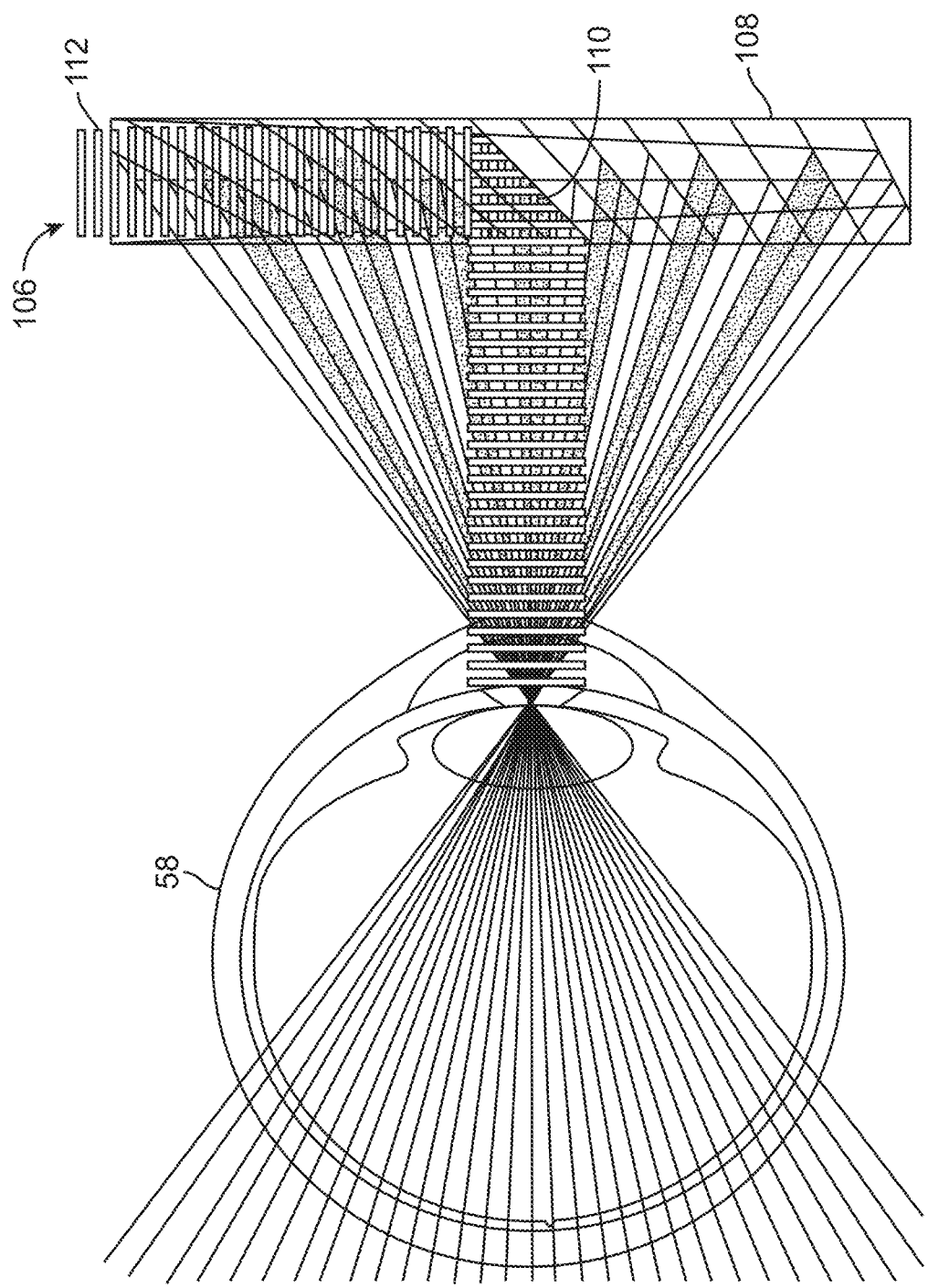
Figure 5E:
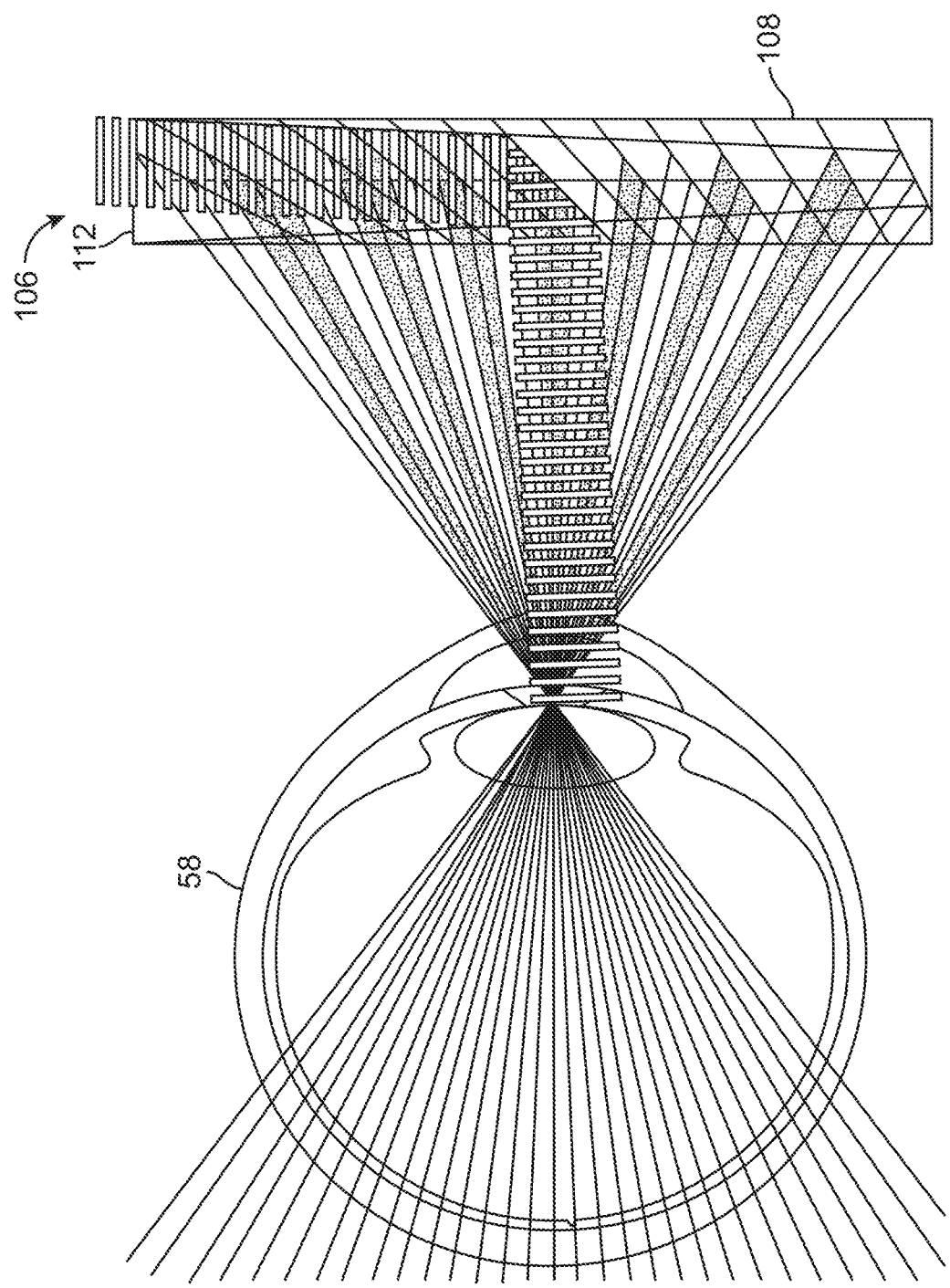
Figure 5F:
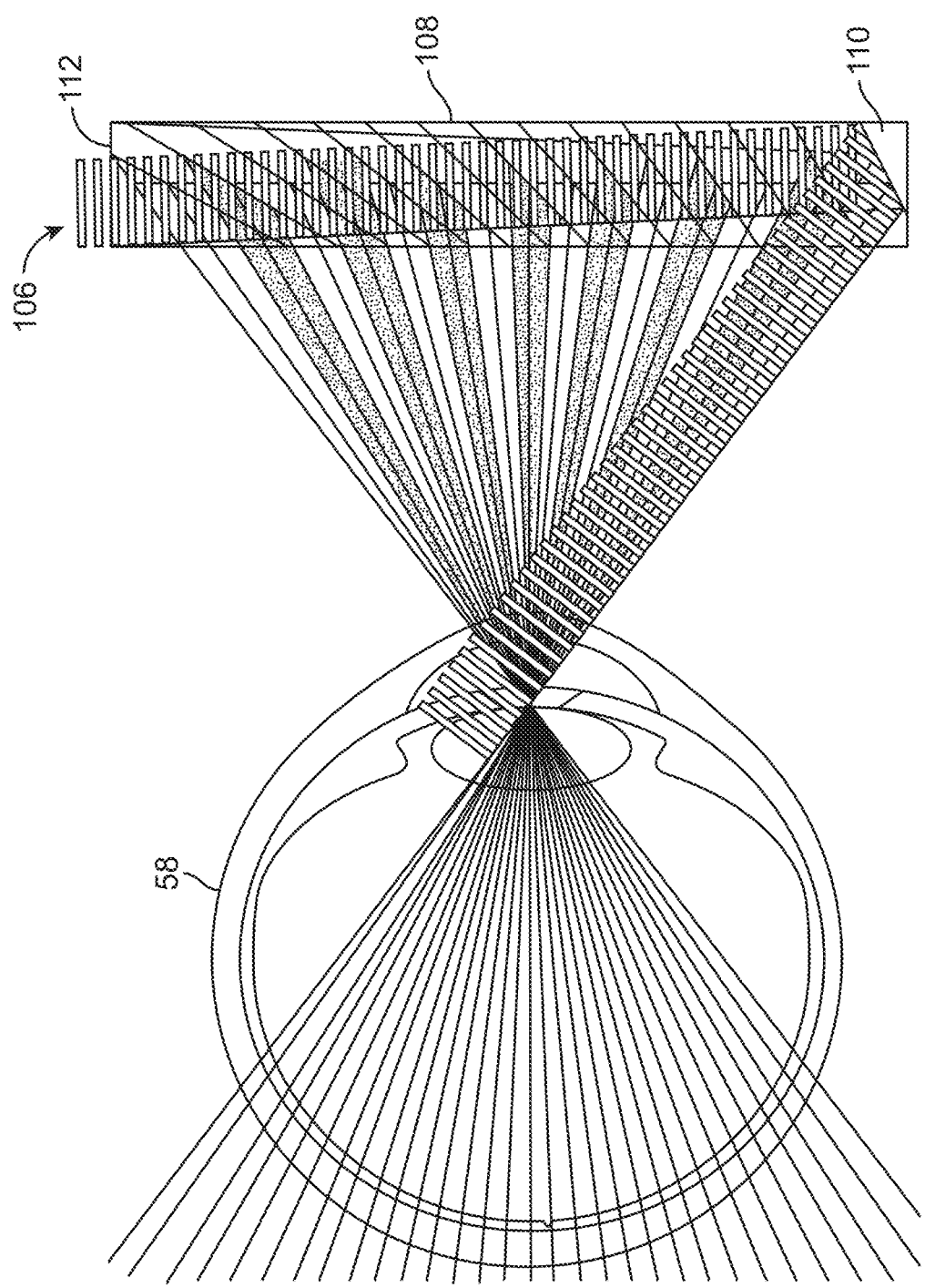

Referring to FIG. 5C, incoming image information (106) coming from the right of the narrow field of view sub-image (as shown by the angle of incoming beams 106 relative to the substrate 108 input interface 112, and the resultant angle at which they exit the substrate 108) is reflected toward the eye (58) from reflective surface (110). FIG. 5D illustrates the same reflector (110) active, with image information coming from the middle of the narrow field of view sub-image, as shown by the angle of the input information (106) at the input interface (112) and its angle as it exits substrate (108). FIG. 5E illustrates the same reflector (110) active, with image information coming from the left of the field of view, as shown by the angle of the input information (106) at the input interface (112) and the resultant exit angle at the surface of the substrate (108). FIG. 5F illustrates a configuration wherein the bottom reflector (110) is active, with image information (106) coming in from the far right of the overall field of view. For example, FIGS. 5C, 5D, and 5E can illustrate one frame representing the center of a frame-sequential tiled image, and FIG. 5F can illustrate a second frame representing the far right of that tiled image.

In one embodiment, the light carrying the image information (106) may strike the reflective surface (110) directly after entering substrate (108) at input interface (112), without first reflecting from the surfaces of substrate (108). In one embodiment, the light carrying the image information (106) may reflect from one or more surfaces of substrate (108) after entering at input interface (112) and before striking the reflective surface (110); for instance, substrate (108) may act as a planar waveguide, propagating the light carrying image information (106) by total internal reflection. Light may also reflect from one or more surfaces of the substrate (108) from a partially reflective coating, a wavelength-selective coating, an angle-selective coating, and/or a polarization-selective coating.

In one embodiment, the angled reflectors may be constructed using an electro-active material, such that upon application of a voltage and/or current to a particular reflector, the refractive index of the material comprising such reflector changes from an index substantially matched to the rest of the substrate (108), in which case the reflector is in a transmissive configuration, to a reflective configuration wherein the refractive index of the reflector mismatches the refractive index of the substrate (108) such that a reflection effect is created. Example electro-active material includes lithium niobate and electro-active polymers. Suitable substantially transparent electrodes for controlling a plurality of such reflectors may comprise materials such as indium tin oxide, which is utilized in liquid crystal displays.

In one embodiment, the electro-active reflectors (110) may comprise liquid crystal, embedded in a substrate (108) host medium such as glass or plastic. In some variations, liquid crystal may be selected that changes refractive index as a function of an applied electric signal, so that more analog changes may be accomplished as opposed to binary (from one transmissive state to one reflective state). In an embodiment wherein 6 sub-images are to be presented to the eye frame-sequential to form a large tiled image with an overall refresh rate of 60 frames per second, it is desirable to have an input display that can refresh at the rate of about 360 Hz, with an electro-active reflector array that can keep up with such frequency. In one embodiment, lithium niobate may be utilized as an electro-active reflective material as opposed to liquid crystal; lithium niobate is utilized in the photonics industry for high-speed switches and fiber optic networks and has the capability to switch refractive index in response to an applied voltage at a very high frequency; this high frequency may be used to steer line-sequential or pixel-sequential sub-image information, especially if the input display is a scanned light display, such as a fiber-scanned display or scanning mirror-based display.

In another embodiment, a variable switchable angled mirror configuration may comprise one or more high-speed mechanically repositionable reflective surfaces, such as a MEMS (micro-electro-mechanical system) device. A MEMS device may include what is known as a "digital mirror device", or "DMD", (often part of a "digital light processing", or "DLP" system, such as those available from Texas Instruments, Inc.). In another electromechanical embodiment, a plurality of air-gapped (or in vacuum) reflective surfaces could be mechanically moved in and out of place at high frequency. In another electromechanical embodiment, a single reflective surface may be moved up and down and re-pitched at very high frequency.

Figure 5G:
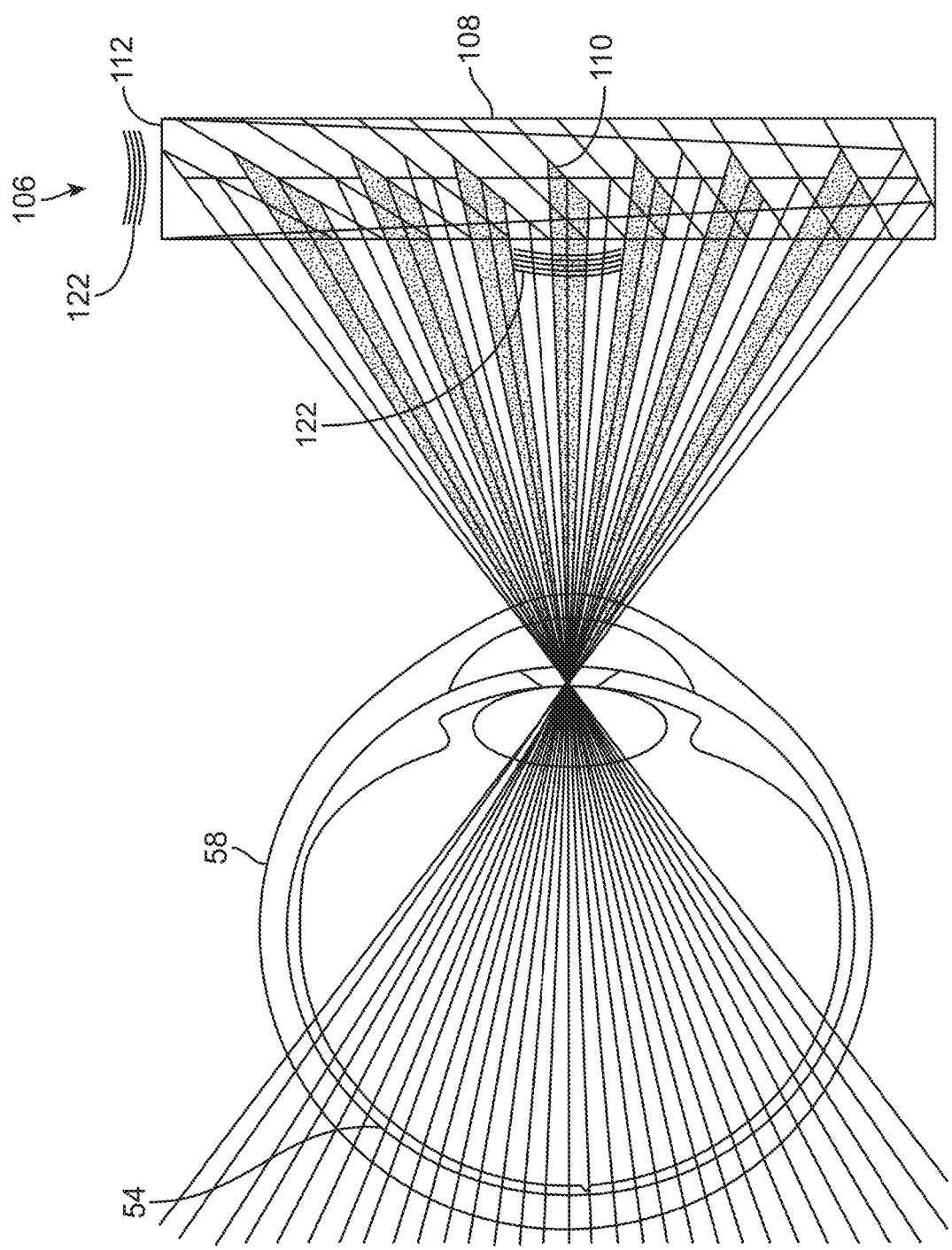

Referring to FIG. 5G, it is notable that the switchable variable angle reflector configurations described herein are capable of passing not only collimated or flat wavefront information to the retina (54) of the eye (58), but also curved wavefront (122) image information, as shown in the illustration of FIG. 5G. This generally is not the case with other waveguide-based configurations, wherein total internal reflection of curved wavefront information causes undesirable complications, and therefore the inputs generally must be collimated. The ability to pass curved wavefront information facilitates the ability of configurations such as those shown in FIGS. 5B-5H to provide the retina (54) with input perceived as focused at various distances from the eye (58), not just optical infinity (which would be the interpretation of collimated light absent other cues).

Figure 5H:
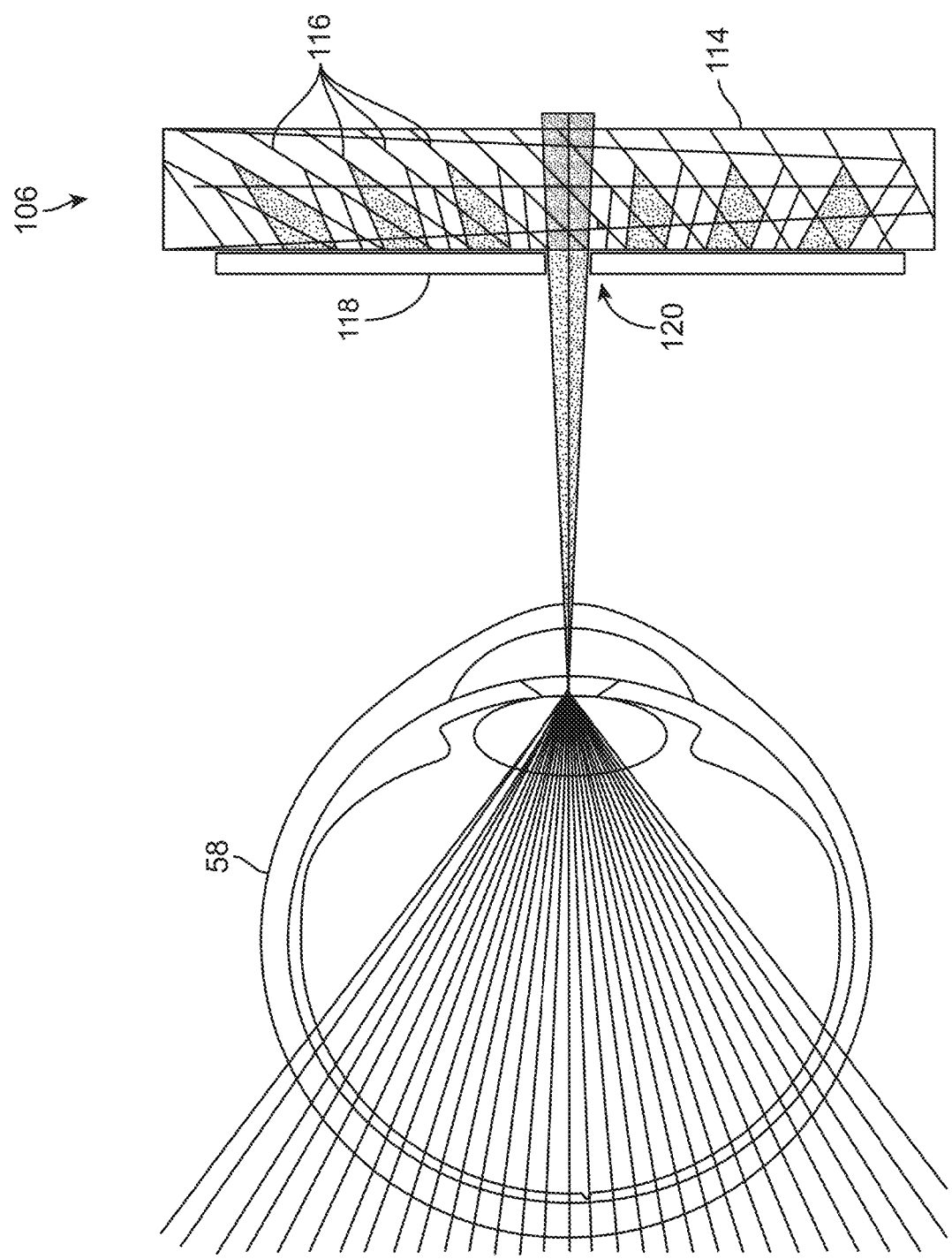

Referring to FIG. 5H, in another embodiment, an array of static partially reflective surfaces (116) (i.e., always in a reflective mode; in another embodiment, they may be electro-active, as above) may be embedded in a substrate (114) with a high-frequency gating layer (118) controlling outputs to the eye (58) by only allowing transmission through an aperture (120) which is controllably movable. In other words, everything may be selectively blocked except for transmissions through the aperture (120). The gating layer (118) may comprise a liquid crystal array, a lithium niobate array, an array of MEMS shutter elements, an array of DLP DMD elements, or an array of other MEMS devices configured to pass or transmit with relatively high-frequency switching and high transmissibility upon being switched to transmission mode.

Figure 6A:
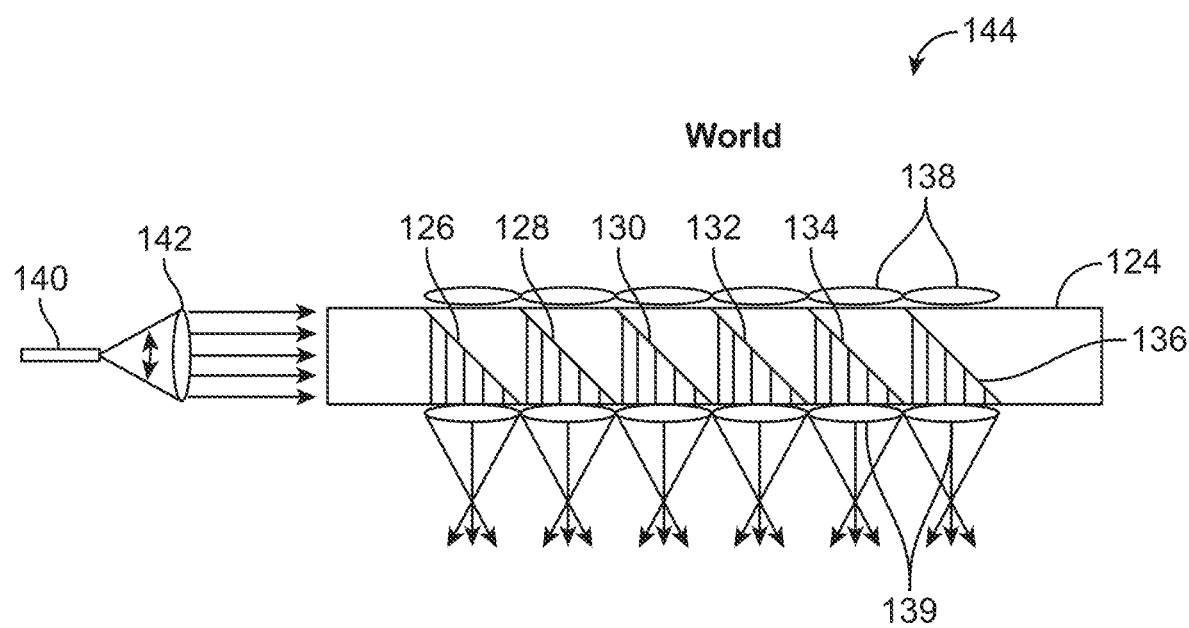
FIGS. 6A and 6B illustrate embodiments of coupling a lens element with the transmissive beamsplitter substrate of FIGS. 5A-5H.
Figure 6B:
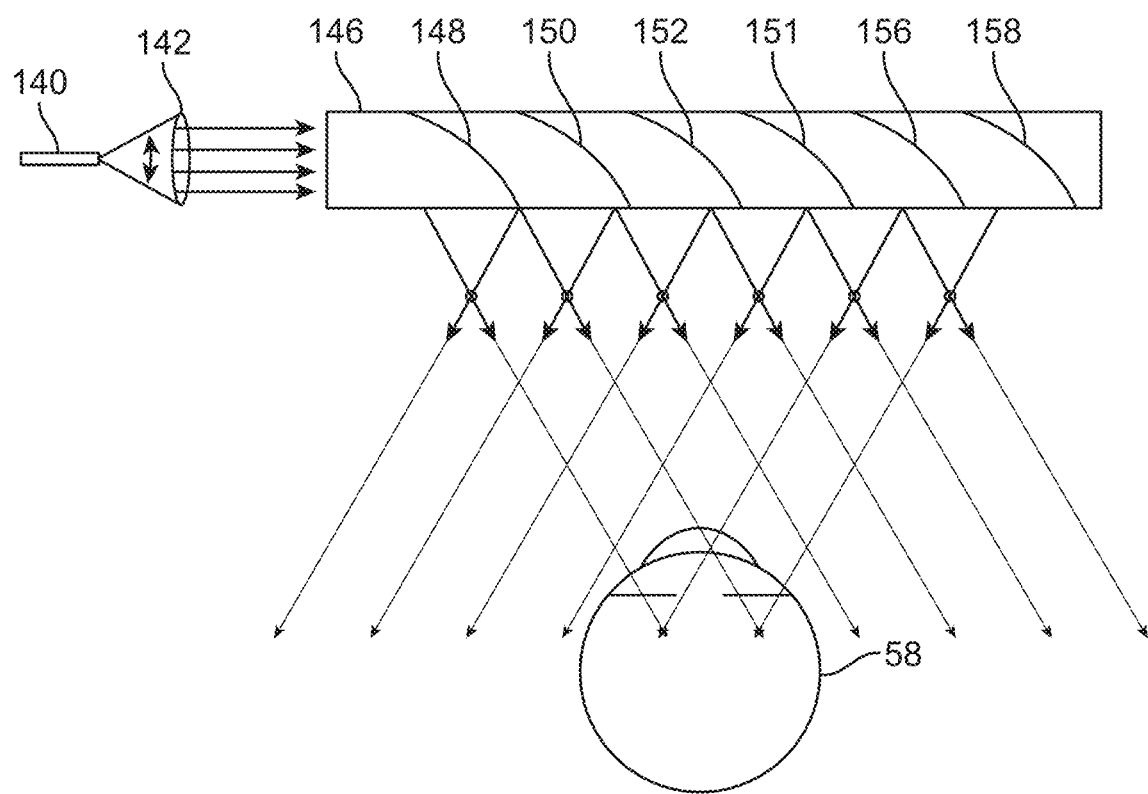

Referring to FIGS. 6A-6B, other embodiments are depicted wherein arrayed optical elements may be combined with exit pupil expansion configurations to assist with the comfort of the virtual or augmented reality experience of the user. With a larger "exit pupil" for the optics configuration, the user's eye positioning relative to the display (which, as in FIGS. 4A-4D, may be mounted on the user's head in an eyeglasses sort of configuration) is not as likely to disrupt his experience—because due to the larger exit pupil of the system, there is a larger acceptable area wherein the user's anatomical pupil may be located to still receive the information from the display system as desired. In other words, with a larger exit pupil, the system is less likely to be sensitive to slight misalignments of the display relative to the user's anatomical pupil, and greater comfort for the user may be achieved through less geometric constraint on his or her relationship with the display/glasses.

As shown in FIG. 6A, the display (140) on the left feeds a set of parallel rays into the substrate (124). In one embodiment, the display may be a scanned fiber display scanning a narrow beam of light back and forth at an angle as shown to project an image through the lens or other optical element (142), which may be utilized to collect the angularly-scanned light and convert it to a parallel bundle of rays. The rays may be reflected from a series of reflective surfaces (126, 128, 130, 132, 134, 136) which may be configured to partially reflect and partially transmit incoming light so that the light may be shared across the group of reflective surfaces (126, 128, 130, 132, 134, 136) approximately equally. With a small lens (138) placed at each exit point from the waveguide (124), the exiting light rays may be steered through a nodal point and scanned out toward the eye (58) to provide an array of exit pupils, or the functional equivalent of one large exit pupil that is usable by the user as he or she gazes toward the display system.

For virtual reality configurations wherein it is desirable to also be able to see through the waveguide to the real world (144), a similar set of lenses (139) may be presented on the opposite side of the waveguide (124) to compensate for the lower set of lenses; thus creating a the equivalent of a zero-magnification telescope. The reflective surfaces (126, 128, 130, 132, 134, 136) each may be aligned at approximately 45 degrees as shown, or may be configured to have different alignments, akin to the configurations of FIGS. 5B-5H, for example). The reflective surfaces (126, 128, 130, 132, 134, 136) may comprise wavelength-selective reflectors, band pass reflectors, half silvered mirrors, or other reflective configurations. The lenses (138, 139) shown are refractive lenses, but diffractive lens elements may also be utilized.

Referring to FIG. 6B, a somewhat similar configuration is depicted wherein a plurality of curved reflective surfaces (148, 150, 152, 154, 156, 158) may be utilized to effectively combine the lens (element 138 of FIG. 6A) and reflector (elements 126, 128, 130, 132, 134, 136 of FIG. 6A) functionality of the embodiment of FIG. 6A, thereby obviating the need for the two groups of lenses (element 138 of FIG. 6A). The curved reflective surfaces (148, 150, 152, 154, 156, 158) may be various curved configurations selected to both reflect and impart angular change, such as parabolic or elliptical curved surfaces. With a parabolic shape, a parallel set of incoming rays will be collected into a single output point; with an elliptical configuration, a set of rays diverging from a single point of origin are collected to a single output point. As with the configuration of FIG. 6A, the curved reflective surfaces (148, 150, 152, 154, 156, 158) preferably are configured to partially reflect and partially transmit so that the incoming light is shared across the length of the waveguide (146). The curved reflective surfaces (148, 150, 152, 154, 156, 158) may comprise wavelength-selective notch reflectors, half silvered mirrors, or other reflective configurations. In another embodiment, the curved reflective surfaces (148, 150, 152, 154, 156, 158) may be replaced with diffractive reflectors configured to reflect and also deflect.

Figure 7A:
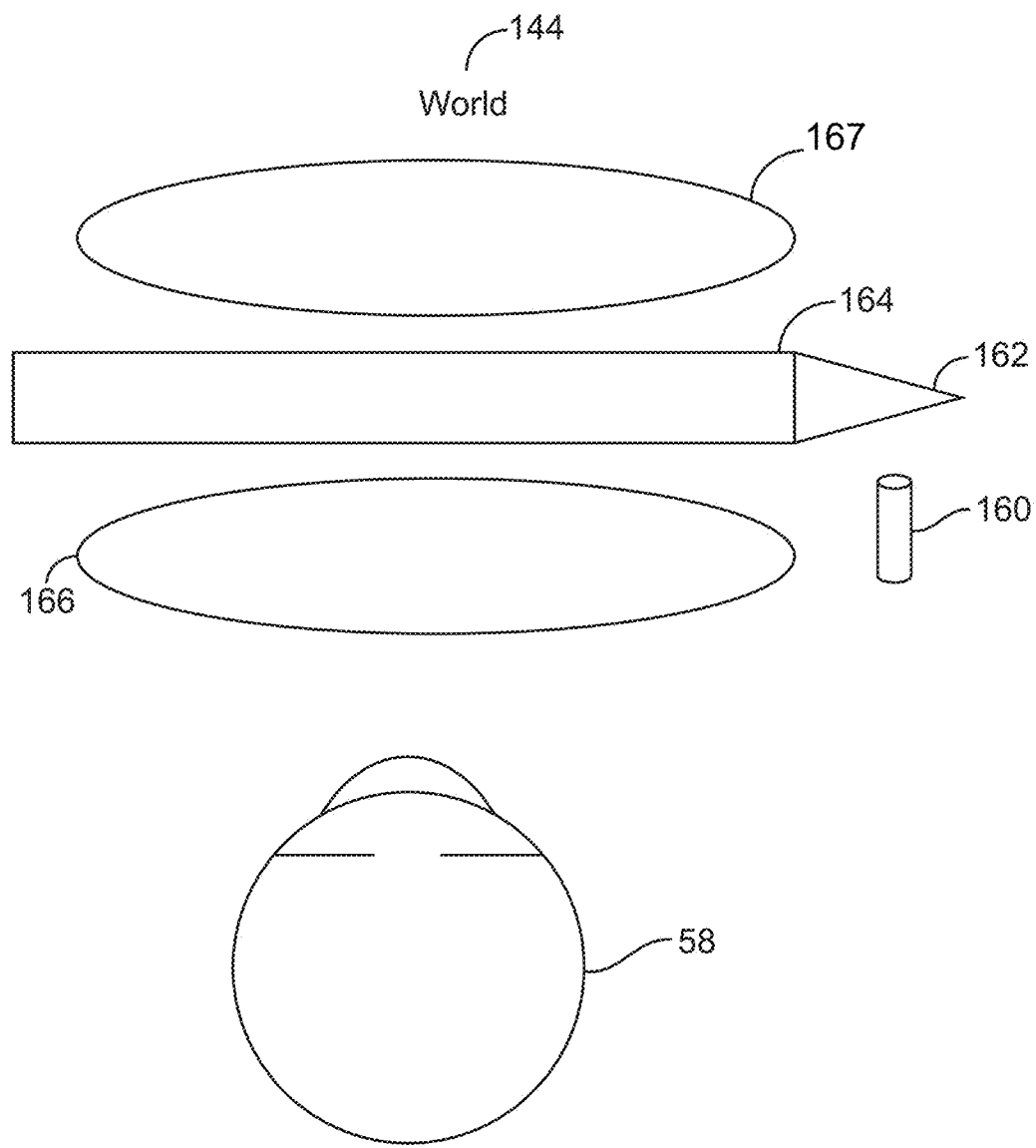

Referring to FIG. 7A, perceptions of Z-axis difference (i.e., distance straight out from the eye along the optical axis) may be facilitated by using a waveguide in conjunction with a variable focus optical element configuration. As shown in FIG. 7A, image information from a display (160) may be collimated and injected into a waveguide (164) and distributed in a large exit pupil manner using, e.g., configurations such as those described in reference to FIGS. 6A and 6B, or other substrate-guided optics methods known to those skilled in the art—and then variable focus optical element capability may be utilized to change the focus of the wavefront of light emerging from the waveguide and provide the eye with the perception that the light coming from the waveguide (164) is from a particular focal distance. In other words, since the incoming light has been collimated to avoid challenges in total internal reflection waveguide configurations, it will exit in collimated fashion, requiring a viewer's eye to accommodate to the far point to bring it into focus on the retina, and naturally be interpreted as being from optical infinity—unless some other intervention causes the light to be refocused and perceived as from a different viewing distance; one suitable such intervention is a variable focus lens.

In the embodiment of FIG. 7A, collimated image information is injected into a piece of glass (162) or other material at an angle such that it totally internally reflects and is passed into the adjacent waveguide (164). The waveguide (164) may be configured akin to the waveguides of FIG. 6A or 6B (124, 146, respectively) so that the collimated light from the display is distributed to exit somewhat uniformly across the distribution of reflectors or diffractive features along the length of the waveguide. Upon exit toward the eye (58), in the depicted configuration the exiting light is passed through a variable focus lens element (166) wherein, depending upon the controlled focus of the variable focus lens element (166), the light exiting the variable focus lens element (166) and entering the eye (58) will have various levels of focus (a collimated flat wavefront to represent optical infinity, more and more beam divergence/wavefront curvature to represent closer viewing distance relative to the eye 58).

To compensate for the variable focus lens element (166) between the eye (58) and the waveguide (164), another similar variable focus lens element (167) is placed on the opposite side of the waveguide (164) to cancel out the optical effects of the lenses (166) for light coming from the world (144) for augmented reality (i.e., as described above, one lens compensates for the other, producing the functional equivalent of a zero-magnification telescope).

The variable focus lens element (166) may be a refractive element, such as a liquid crystal lens, an electro-active lens, a conventional refractive lens with moving elements, a mechanical-deformation-based lens (such as a fluid-filled membrane lens, or a lens akin to the human crystalline lens wherein a flexible element is flexed and relaxed by actuators), an electrowetting lens, or a plurality of fluids with different refractive indices. The variable focus lens element (166) may also comprise a switchable diffractive optical element (such as one featuring a polymer dispersed liquid crystal approach wherein a host medium, such as a polymeric material, has microdroplets of liquid crystal dispersed within the material; when a voltage is applied, the molecules reorient so that their refractive indices no longer match that of the host medium, thereby creating a high-frequency switchable diffraction pattern).

One embodiment includes a host medium in which microdroplets of a Kerr effect-based electro-active material, such as lithium niobate, is dispersed within the host medium, enabling refocusing of image information on a pixel-by-pixel or line-by-line basis, when coupled with a scanning light display, such as a fiber-scanned display or scanning-mirror-based display. In a variable focus lens element (166) configuration wherein liquid crystal, lithium niobate, or other technology is utilized to present a pattern, the pattern spacing may be modulated to not only change the focal power of the variable focus lens element (166), but also to change the focal power of the overall optical system—for a zoom lens type of functionality.

In one embodiment, the lenses (166) could be telecentric, in that focus of the display imagery can be altered while keeping magnification constant—in the same way that a photography zoom lens may be configured to decouple focus from zoom position. In another embodiment, the lenses (166) may be non-telecentric, so that focus changes will also slave zoom changes. With such a configuration, such magnification changes may be compensated for in software with dynamic scaling of the output from the graphics system in sync with focus changes).

Referring back to the projector or other video display unit (160) and the issue of how to feed images into the optical display system, in a "frame sequential" configuration, a stack of sequential two-dimensional images may be fed to the display sequentially to produce three-dimensional perception over time; in a manner akin to the manner in which a computed tomography system uses stacked image slices to represent a three-dimensional structure. A series of two-dimensional image slices may be presented to the eye, each at a different focal distance to the eye, and the eye/brain would integrate such a stack into a perception of a coherent three-dimensional volume. Depending upon the display type, line-by-line, or even pixel-by-pixel sequencing may be conducted to produce the perception of three-dimensional viewing. For example, with a scanned light display (such as a scanning fiber display or scanning mirror display), then the display is presenting the waveguide (164) with one line or one pixel at a time in a sequential fashion.

If the variable focus lens element (166) is able to keep up with the high-frequency of pixel-by-pixel or line-by-line presentation, then each line or pixel may be presented and dynamically focused through the variable focus lens element (166) to be perceived at a different focal distance from the eye (58). Pixel-by-pixel focus modulation generally requires an extremely fast/high-frequency variable focus lens element (166). For example, a 1080P resolution display with an overall frame rate of 60 frames per second typically presents around 125 million pixels per second. Such a configuration also may be constructed using a solid state switchable lens, such as one using an electro-active material, e.g., lithium niobate or an electro-active polymer. In addition to its compatibility with the system illustrated in FIG. 7A, a frame sequential multi-focal display driving approach may be used in conjunction with a number of the display system and optics embodiments described in this disclosure.

Referring to FIG. 7B, with an electro-active layer (172) (such as one comprising liquid crystal or lithium niobate) surrounded by functional electrodes (170, 174) which may be made of indium tin oxide, a waveguide (168) with a conventional transmissive substrate (176, such as one made from glass or plastic with known total internal reflection characteristics and an index of refraction that matches the on or off state of the electro-active layer 172) may be controlled such that the paths of entering beams may be dynamically altered to essentially create a time-varying light field.

Figure 8A:
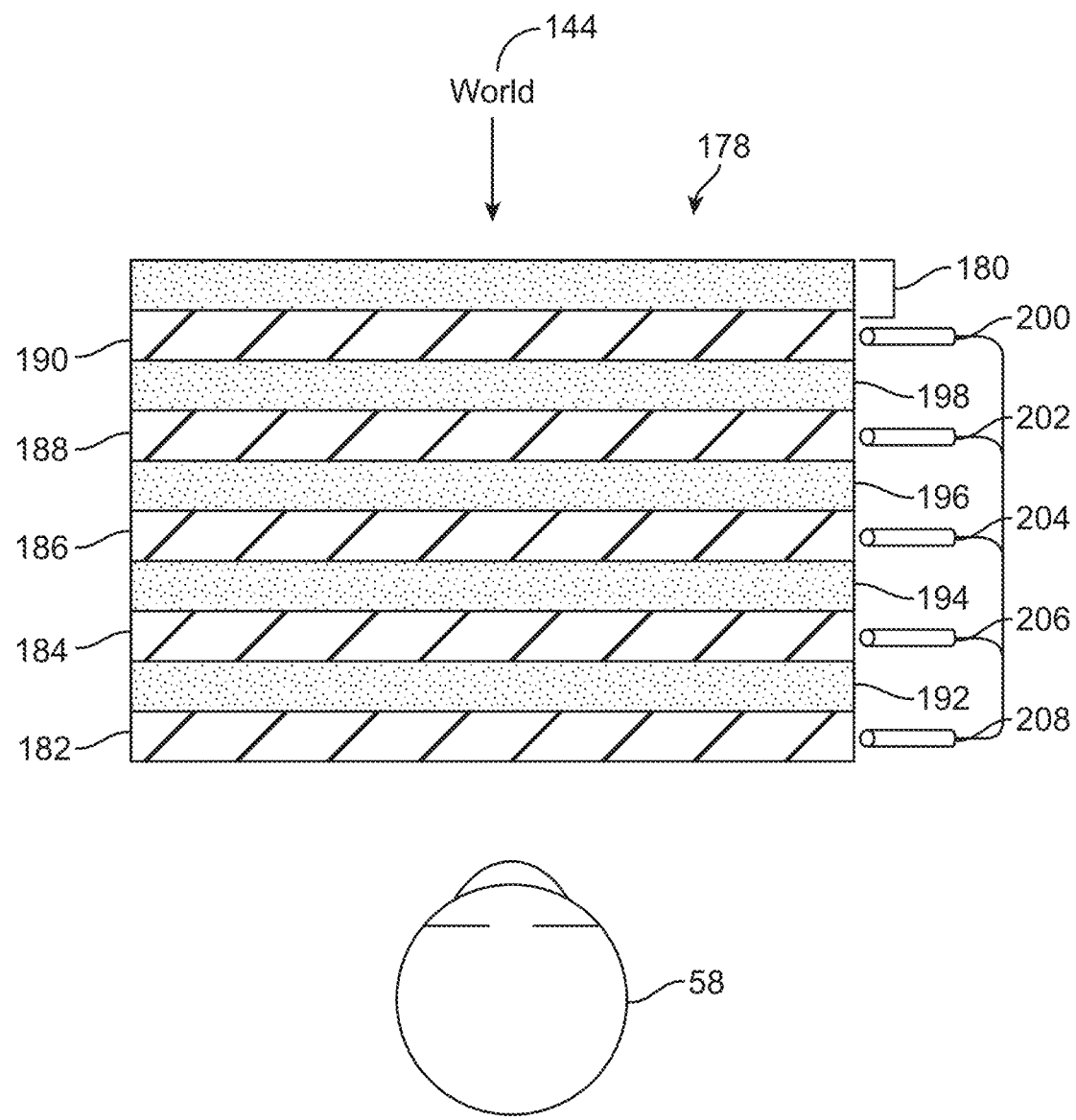
FIGS. 8A-8Q illustrate embodiments of a diffractive optical element (DOE).

Referring to FIG. 8A, a stacked waveguide assembly (178) may be utilized to provide three-dimensional perception to the eye/brain by having a plurality of waveguides (182, 184, 186, 188, 190) and a plurality of weak lenses (198, 196, 194, 192) configured together to send image information to the eye with various levels of wavefront curvature for each waveguide level indicative of focal distance to be perceived for that waveguide level. A plurality of displays (200, 202, 204, 206, 208), or in another embodiment a single multiplexed display, may be utilized to inject collimated image information into the waveguides (182, 184, 186, 188, 190), each of which may be configured, as described above, to distribute incoming light substantially equally across the length of each waveguide, for exit down toward the eye.

The waveguide (182) nearest the eye is configured to deliver collimated light, as injected into such waveguide (182), to the eye, which may be representative of the optical infinity focal plane. The next waveguide up (184) is configured to send out collimated light which passes through the first weak lens (192; e.g., a weak negative lens) before it can reach the eye (58); such first weak lens (192) may be configured to create a slight convex wavefront curvature so that the eye/brain interprets light coming from that next waveguide up (184) as coming from a first focal plane closer inward toward the person from optical infinity. Similarly, the third up waveguide (186) passes its output light through both the first (192) and second (194) lenses before reaching the eye (58); the combined optical power of the first (192) and second (194) lenses may be configured to create another incremental amount of wavefront divergence so that the eye/brain interprets light coming from that third waveguide up (186) as coming from a second focal plane even closer inward toward the person from optical infinity than was light from the next waveguide up (184).

The other waveguide layers (188, 190) and weak lenses (196, 198) are similarly configured, with the highest waveguide (190) in the stack sending its output through all of the weak lenses between it and the eye for an aggregate focal power representative of the closest focal plane to the person. To compensate for the stack of lenses (198, 196, 194, 192) when viewing/interpreting light coming from the world (144) on the other side of the stacked waveguide assembly (178), a compensating lens layer (180) is disposed at the top of the stack to compensate for the aggregate power of the lens stack (198, 196, 194, 192) below. Such a configuration provides as many perceived focal planes as there are available waveguide/lens pairings, again with a relatively large exit pupil configuration as described above. Both the reflective aspects of the waveguides and the focusing aspects of the lenses may be static (i.e., not dynamic or electro-active). In an alternative embodiment they may be dynamic using electro-active features as described above, enabling a small number of waveguides to be multiplexed in a time sequential fashion to produce a larger number of effective focal planes.

Figure 8B:
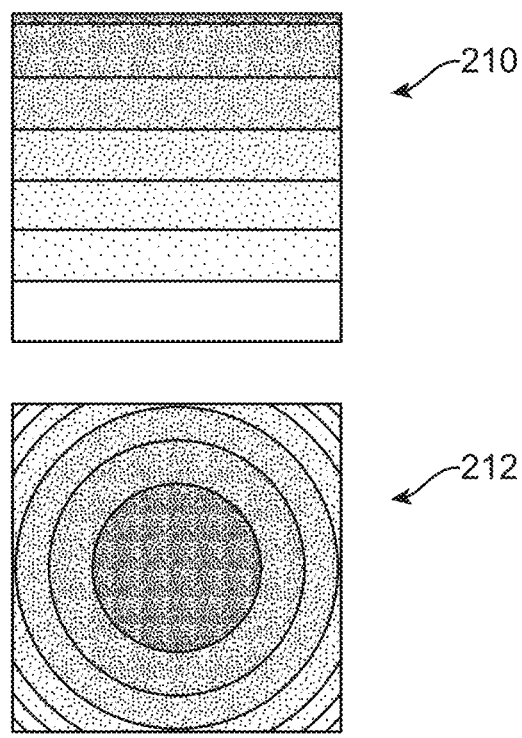
Figure 8C:
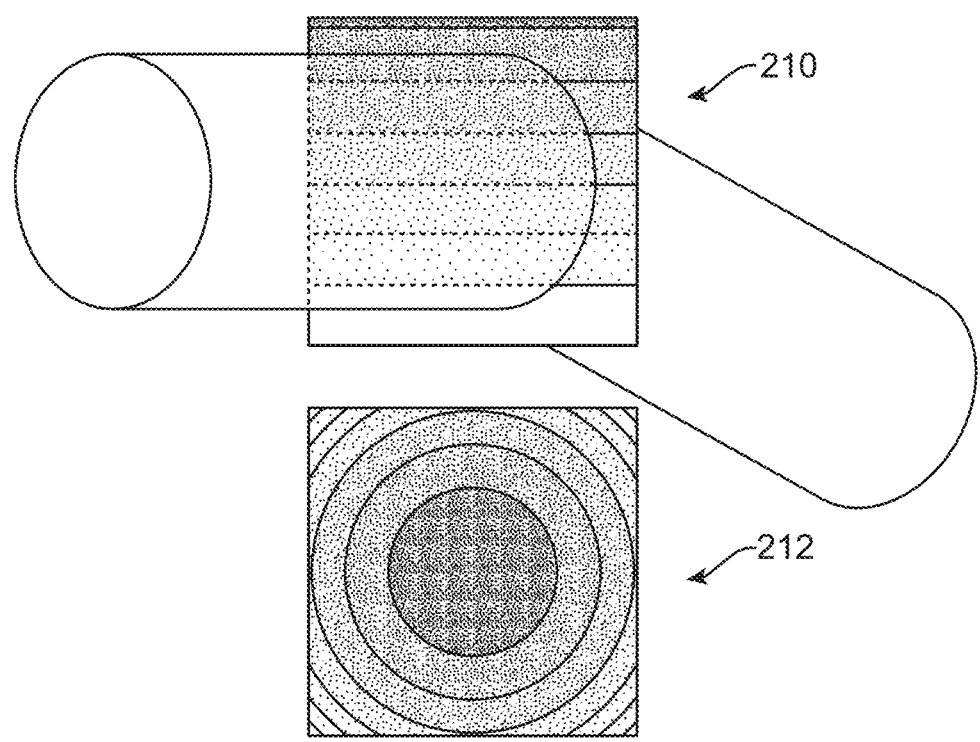
Figure 8D:
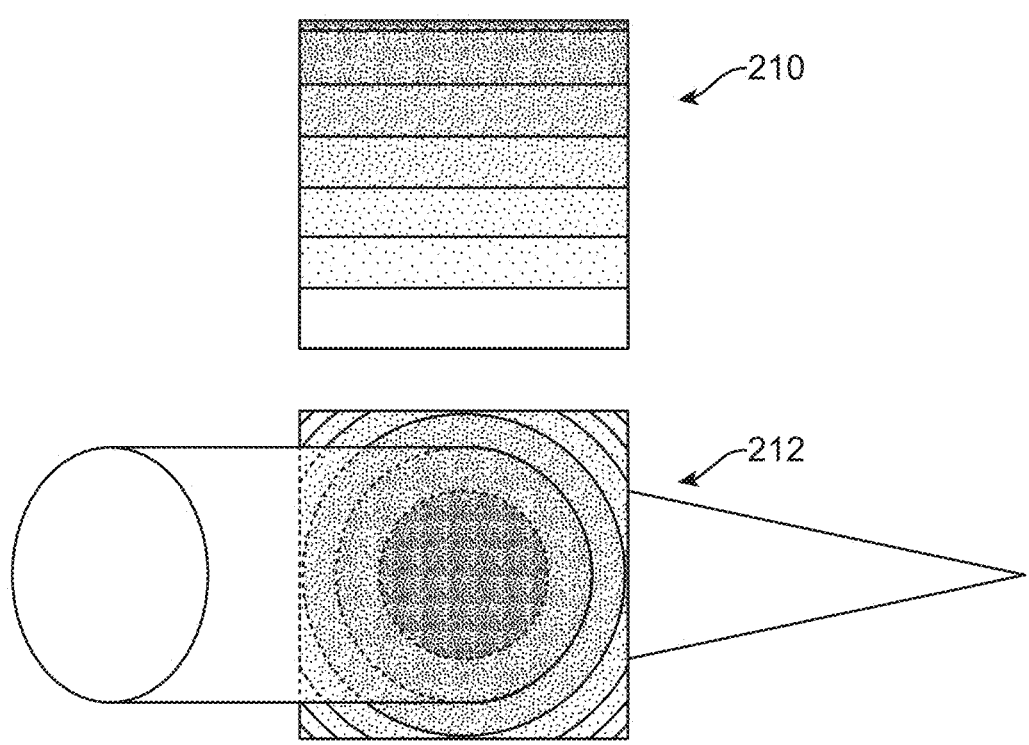

Referring to FIGS. 8B-8N, various aspects of diffraction configurations for focusing and/or redirecting collimated beams are depicted. Other aspects of diffraction systems for such purposes are disclosed in U.S. Patent Application Ser. No. 61/845,907 (U.S. patent application Ser. No. 14/331, 218), which is incorporated by reference herein in its entirety. Referring to FIG. 8B, passing a collimated beam through a linear diffraction pattern (210), such as a Bragg grating, will deflect, or "steer", the beam. Passing a collimated beam through a radially symmetric diffraction pattern (212), or "Fresnel zone plate", will change the focal point of the beam. FIG. 8C illustrates the deflection effect of passing a collimated beam through a linear diffraction pattern (210); FIG. 8D illustrates the focusing effect of passing a collimated beam through a radially symmetric diffraction pattern (212).

Figure 8E:
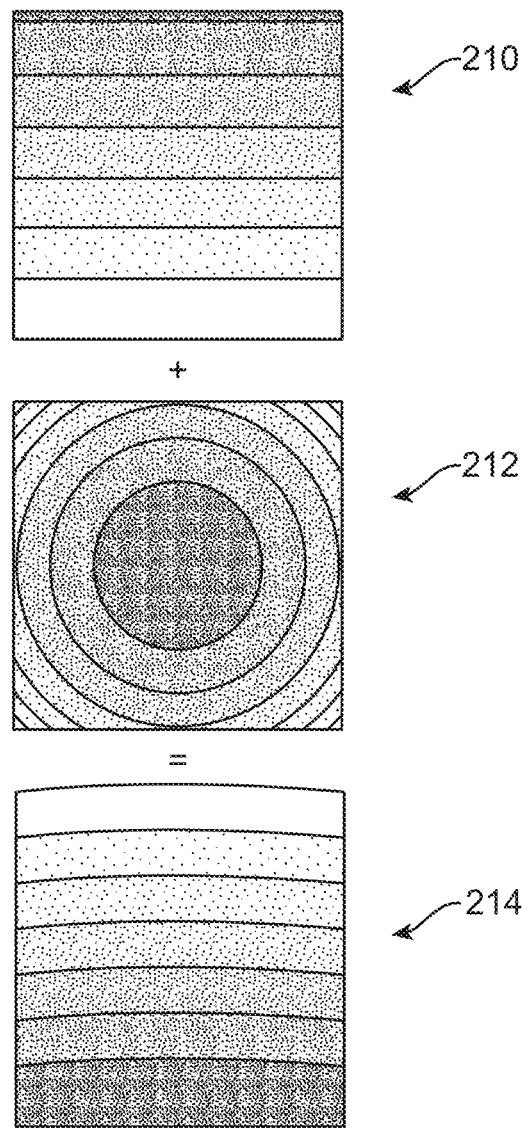
Figure 8F:
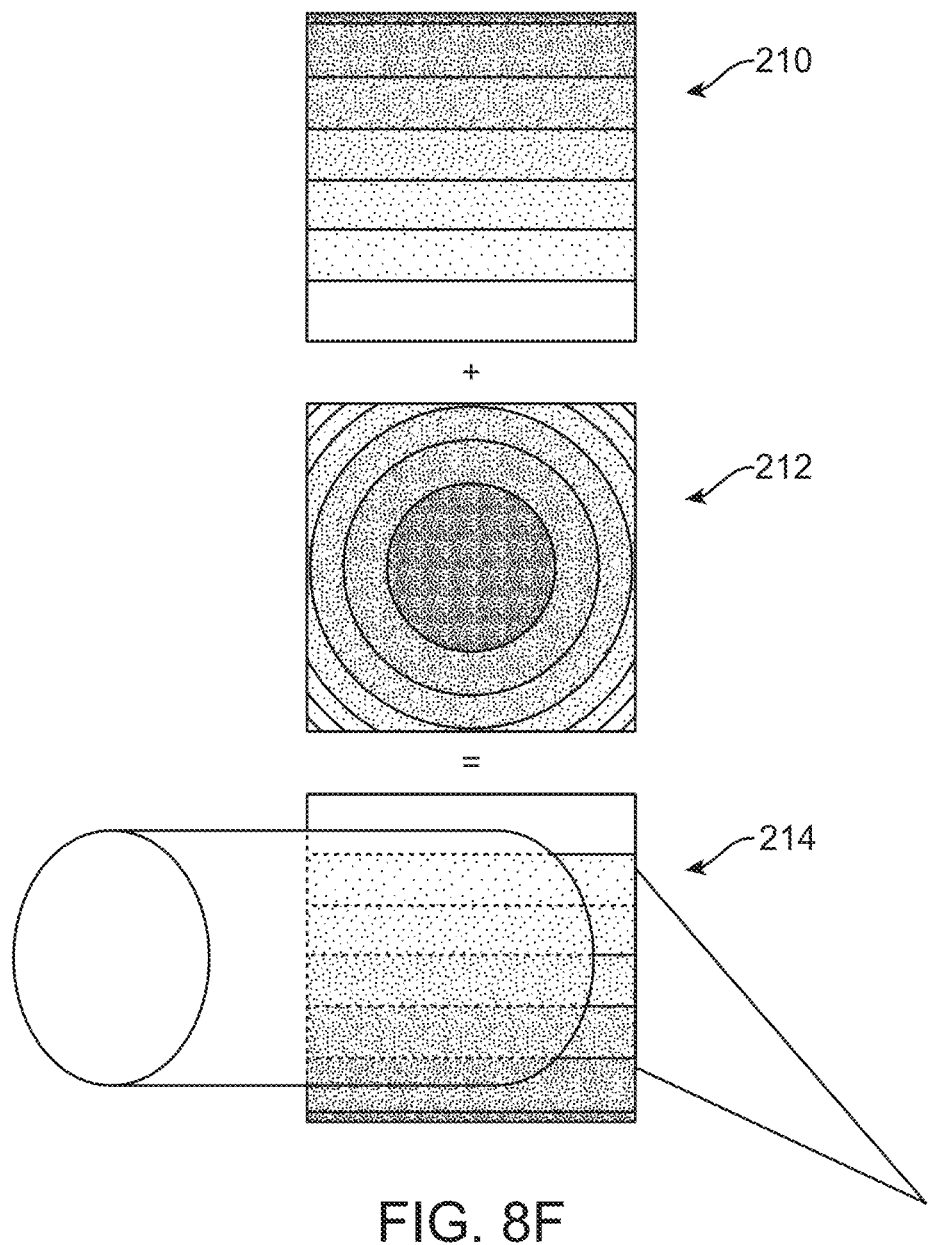
Figure 8G:
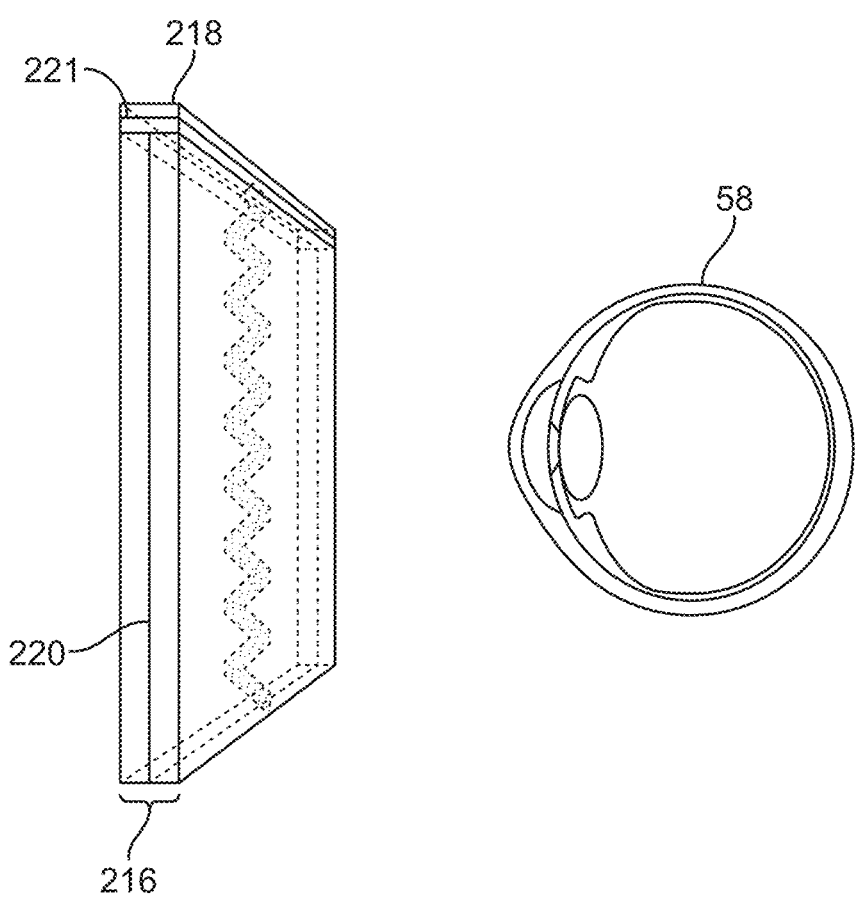

Referring to FIGS. 8E and 8F, a combination diffraction pattern that has both linear and radial elements (214) produces both deflection and focusing of a collimated input beam. These deflection and focusing effects can be produced in a reflective as well as transmissive mode. These principles may be applied with waveguide configurations to allow for additional optical system control, as shown in FIGS. 8G-8N, for example. As shown in FIGS. 8G-8N, a diffraction pattern (220), or "diffractive optical element" (or "DOE") has been embedded within a planar waveguide (216) such that as a collimated beam is totally internally reflected along the planar waveguide (216), it intersects the diffraction pattern (220) at a multiplicity of locations.

Figure 8H:
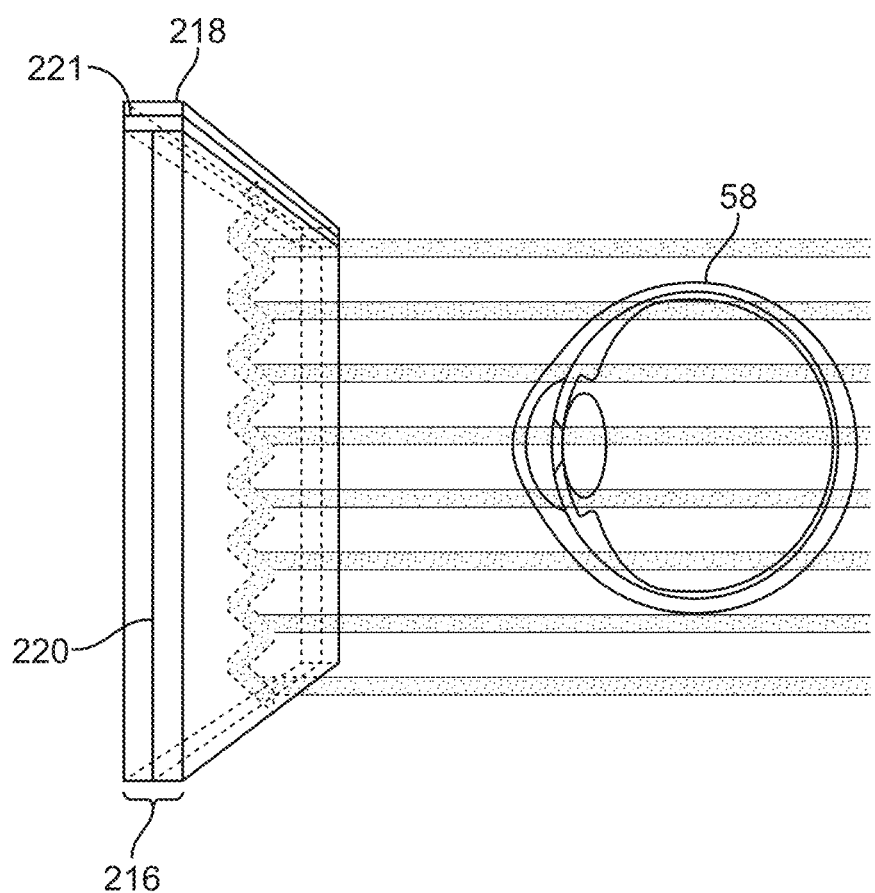
Figure 8I:
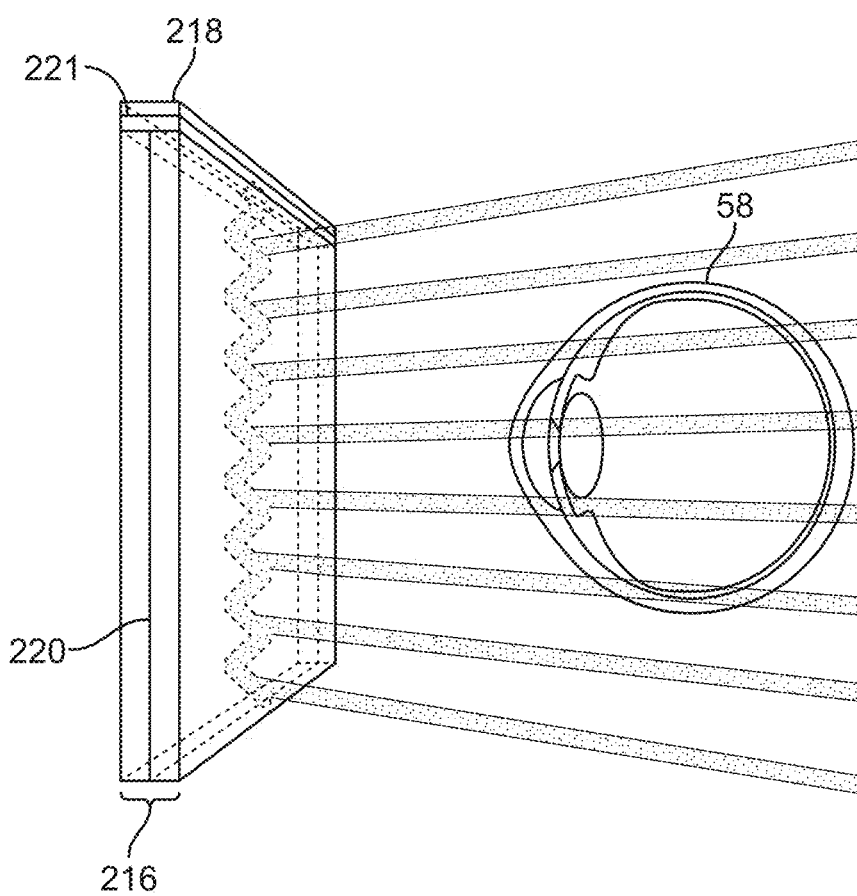

Preferably, the DOE (220) has a relatively low diffraction efficiency so that only a portion of the light of the beam is deflected away toward the eye (58) with each intersection of the DOE (220) while the rest continues to move through the planar waveguide (216) via total internal reflection; the light carrying the image information is thus divided into a number of related light beams that exit the waveguide at a multiplicity of locations and the result is a fairly uniform pattern of exit emission toward the eye (58) for this particular collimated beam bouncing around within the planar waveguide (216), as shown in FIG. 8H. The exit beams toward the eye (58) are shown in FIG. 8H as substantially parallel, because, in this case, the DOE (220) has only a linear diffraction pattern. As shown in the comparison between FIGS. 8L, 8M, and 8N, changes to this linear diffraction pattern pitch may be utilized to controllably deflect the exiting parallel beams, thereby producing a scanning or tiling functionality.

Figure 8J:
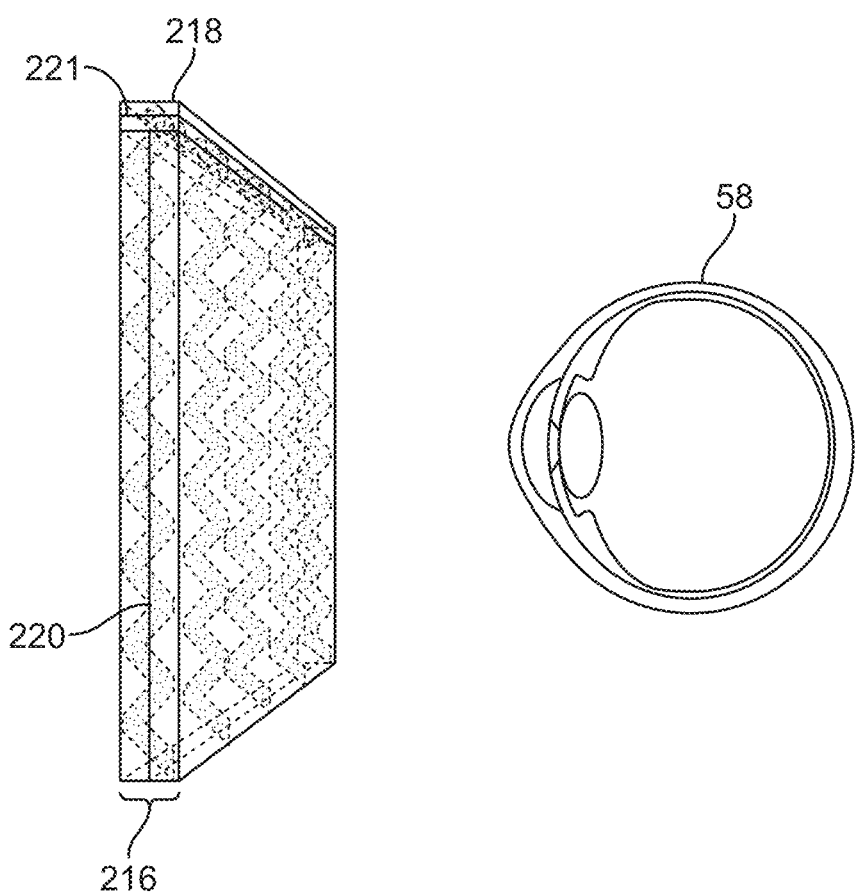

Referring back to FIG. 8I, with changes in the radially symmetric diffraction pattern component of the embedded DOE (220), the exit beam pattern is more divergent, which would require the eye to accommodation to a closer distance to bring it into focus on the retina and would be interpreted by the brain as light from a viewing distance closer to the eye than optical infinity. Referring to FIG. 8J, with the addition of another waveguide (218) into which the beam may be injected (by a projector or display, for example), a DOE (221) embedded in this other waveguide (218), such as a linear diffraction pattern, may function to spread the light across the entire larger planar waveguide (216), which functions to provide the eye (58) with a very large incoming field of incoming light that exits from the larger planar waveguide (216), i.e., a large eye box, in accordance with the particular DOE configurations at work.

Figure 8K:
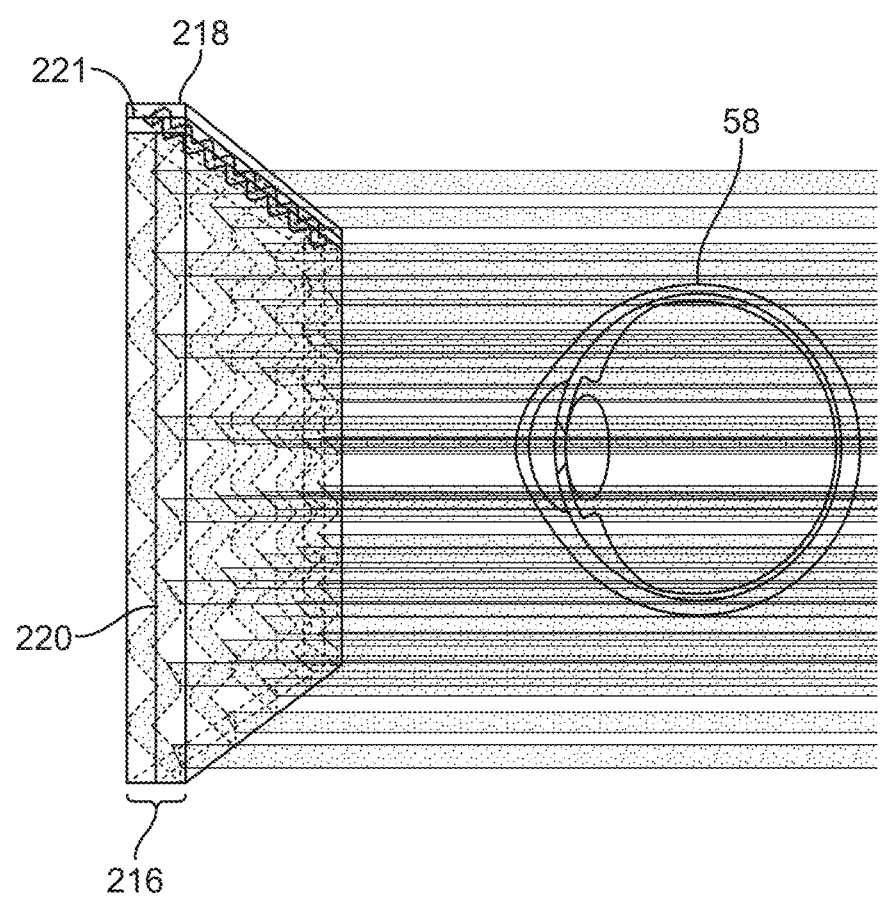
Figure 8L:
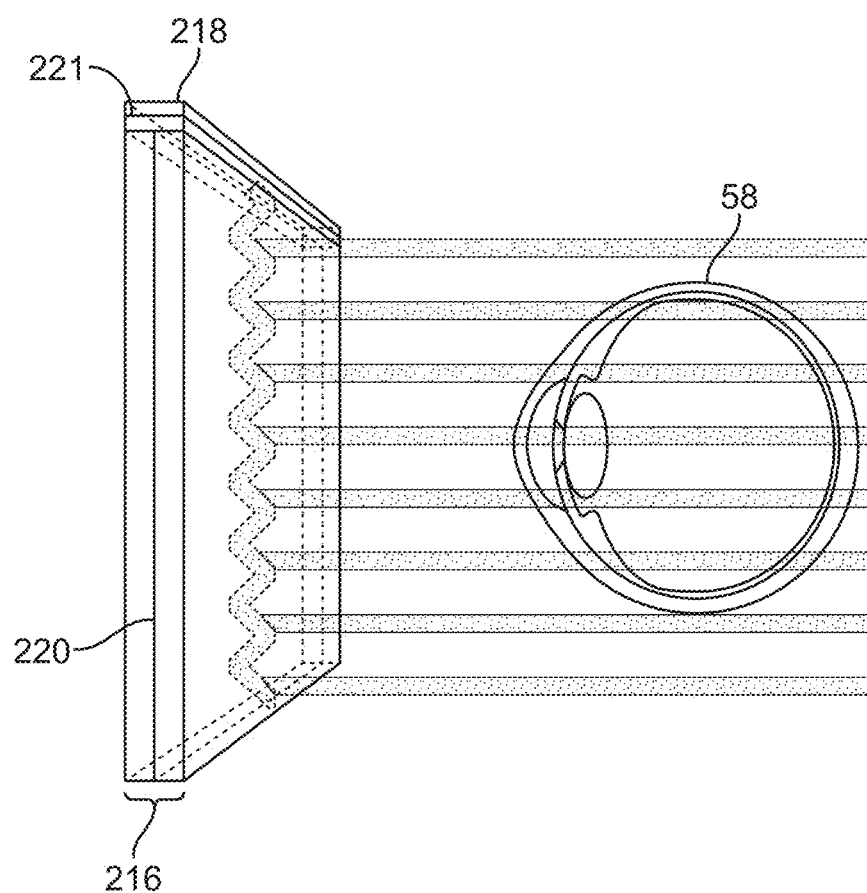
Figure 8M:
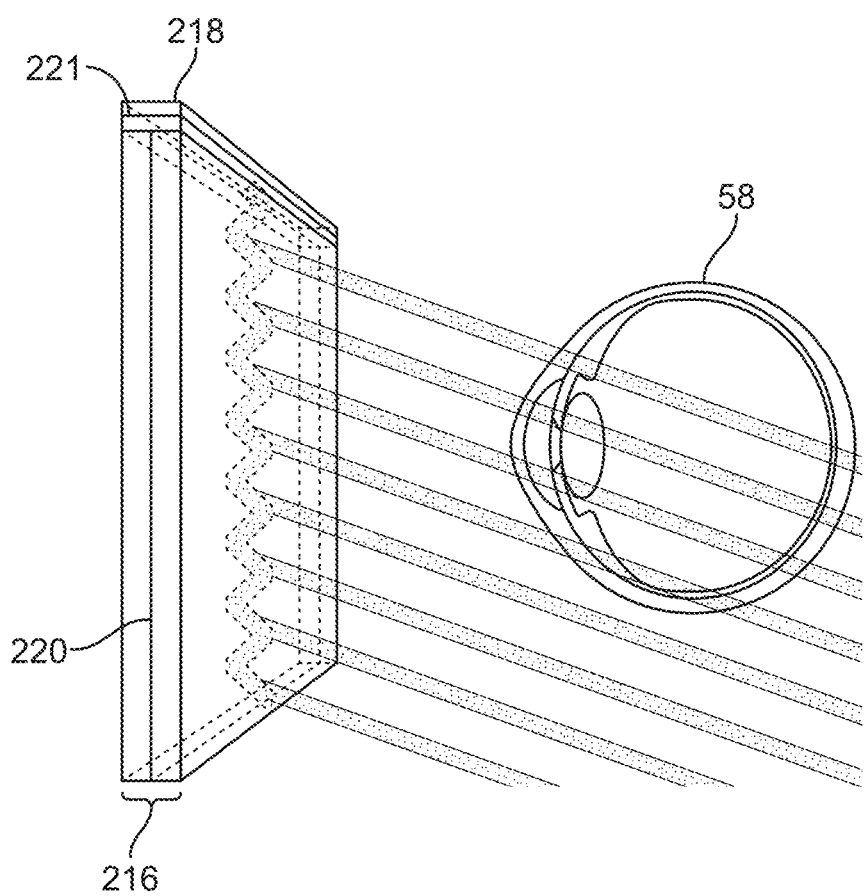
Figure 8N:
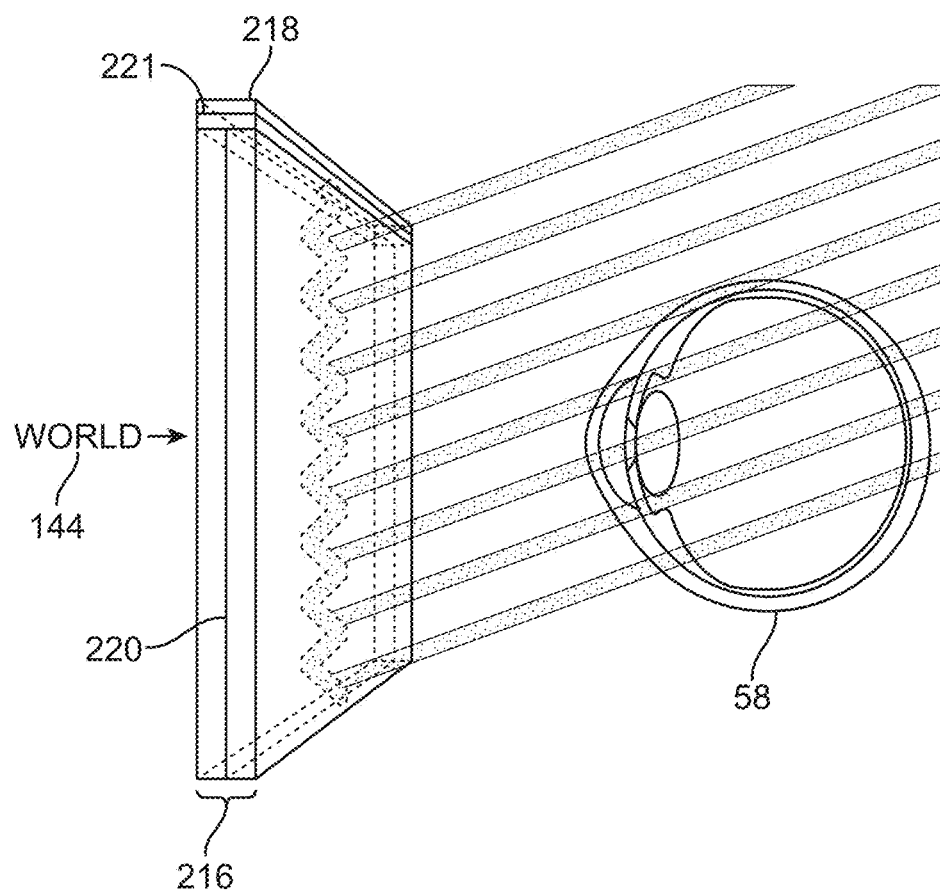
Figure 80:
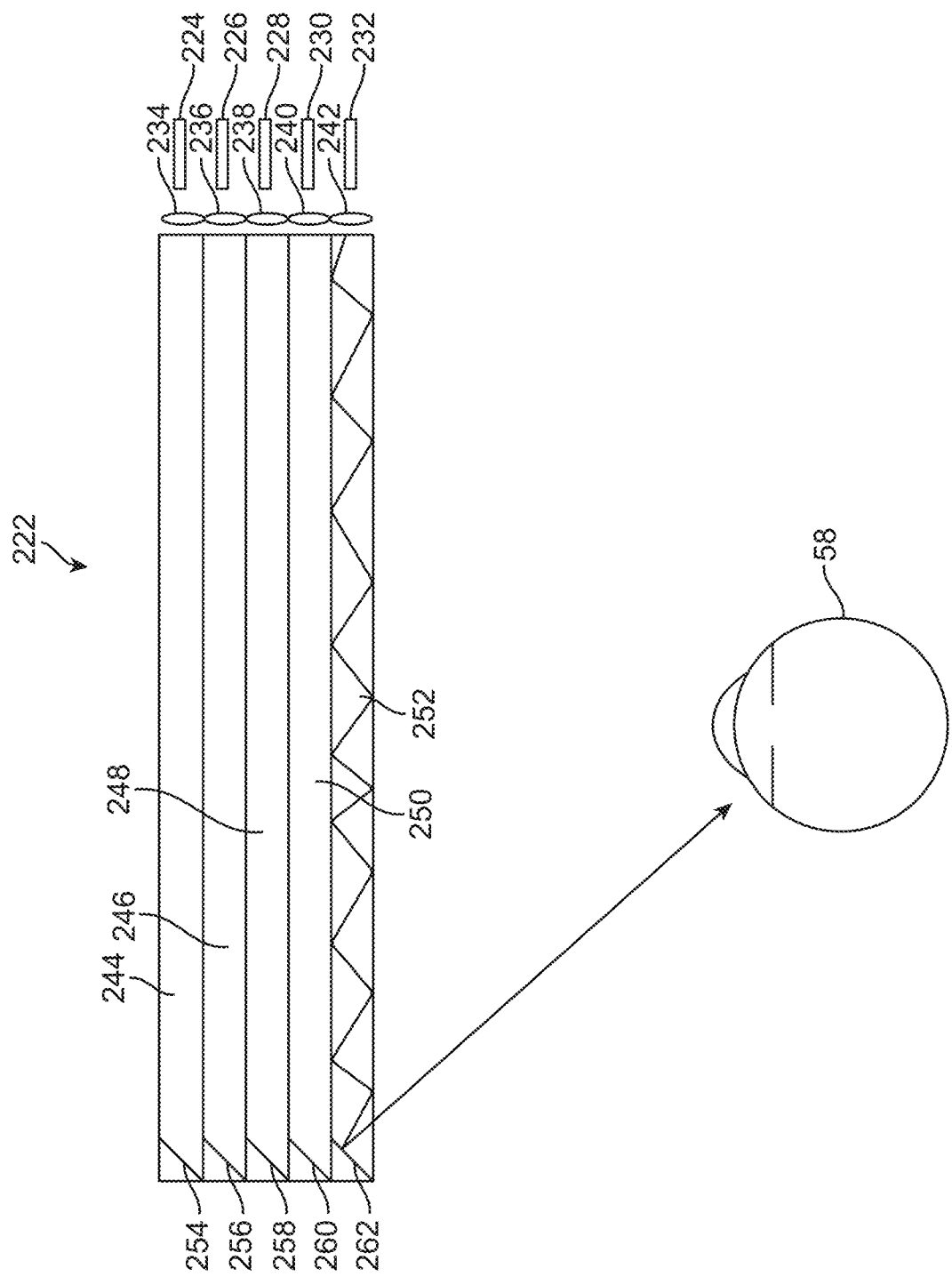

The DOEs (220, 221) are depicted bisecting the associated waveguides (216, 218) but this need not be the case; they could be placed closer to, or upon, either side of either of the waveguides (216, 218) to have the same functionality. Thus, as shown in FIG. 8K, with the injection of a single collimated beam, an entire field of cloned collimated beams may be directed toward the eye (58). In addition, with a combined linear diffraction pattern/radially symmetric diffraction pattern scenario such as that depicted in FIGS. 8F (214) and 8I (220), a beam distribution waveguide optic (for functionality such as exit pupil functional expansion; with a configuration such as that of FIG. 8K, the exit pupil can be as large as the optical element itself, which can be a very significant advantage for user comfort and ergonomics) with Z-axis focusing capability is presented, in which both the divergence angle of the cloned beams and the wavefront curvature of each beam represent light coming from a point closer than optical infinity.

In one embodiment, one or more DOEs are switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light). Further, with dynamic changes to the diffraction terms, such as the linear diffraction pitch term as in FIGS. 8L-8N, a beam scanning or tiling functionality may be achieved. As noted above, it is desirable to have a relatively low diffraction grating efficiency in each of the DOEs (220, 221) because it facilitates distribution of the light, and also because light coming through the waveguides that is desirably transmitted (for example, light coming from the world 144 toward the eye 58 in an augmented reality configuration) is less affected when the diffraction efficiency of the DOE that it crosses (220) is lower—so a better view of the real world through such a configuration is achieved.

Configurations such as those illustrated in FIG. 8K preferably are driven with injection of image information in a time sequential approach, with frame sequential driving being the most straightforward to implement. For example, an image of the sky at optical infinity may be injected at time1 and the diffraction grating retaining collimation of light may be utilized; then an image of a closer tree branch may be injected at time2 while a DOE controllably imparts a focal change, say one diopter or 1 meter away, to provide the eye/brain with the perception that the branch light information is coming from the closer focal range. This kind of paradigm can be repeated in rapid time sequential fashion such that the eye/brain perceives the input to be all part of the same image. This is just a two focal plane example; preferably the system will be configured to have more focal planes to provide a smoother transition between objects and their focal distances. This kind of configuration generally assumes that the DOE is switched at a relatively low speed (i.e., in sync with the frame-rate of the display that is injecting the images—in the range of tens to hundreds of cycles/second).

The opposite extreme may be a configuration wherein DOE elements can shift focus at tens to hundreds of MHz or greater, which facilitates switching of the focus state of the DOE elements on a pixel-by-pixel basis as the pixels are scanned into the eye (58) using a scanned light display type of approach. This is desirable because it means that the overall display frame-rate can be kept quite low; just low enough to make sure that "flicker" is not a problem (in the range of about 60-120 frames/sec).

In between these ranges, if the DOEs can be switched at KHz rates, then on a line-by-line basis the focus on each scan line may be adjusted, which may afford the user with a visible benefit in terms of temporal artifacts during an eye motion relative to the display, for example. For instance, the different focal planes in a scene may, in this manner, be interleaved, to minimize visible artifacts in response to a head motion (as is discussed in greater detail later in this disclosure). A line-by-line focus modulator may be operatively coupled to a line scan display, such as a grating light valve display, in which a linear array of pixels is swept to form an image; and may be operatively coupled to scanned light displays, such as fiber-scanned displays and mirror-scanned light displays.

A stacked configuration, similar to those of FIG. 8A, may use dynamic DOEs (rather than the static waveguides and lenses of the embodiment of FIG. 8A) to provide multi-planar focusing simultaneously. For example, with three simultaneous focal planes, a primary focus plane (based upon measured eye accommodation, for example) could be presented to the user, and a + margin and − margin (i.e., one focal plane closer, one farther out) could be utilized to provide a large focal range in which the user can accommodate before the planes need be updated. This increased focal range can provide a temporal advantage if the user switches to a closer or farther focus (i.e., as determined by accommodation measurement); then the new plane of focus could be made to be the middle depth of focus, with the + and − margins again ready for a fast switchover to either one while the system catches up.

Referring to FIG. 8O, a stack (222) of planar waveguides (244, 246, 248, 250, 252) is shown, each having a reflector (254, 256, 258, 260, 262) at the end and being configured such that collimated image information injected in one end by a display (224, 226, 228, 230, 232) bounces by total internal reflection down to the reflector, at which point some or all of the light is reflected out toward an eye or other target. Each of the reflectors may have slightly different angles so that they all reflect exiting light toward a common destination such as a pupil. Such a configuration is somewhat similar to that of FIG. 5B, with the exception that each different angled reflector in the embodiment of FIG. 8O has its own waveguide for less interference when projected light is travelling to the targeted reflector. Lenses (234, 236, 238, 240, 242) may be interposed between the displays and waveguides for beam steering and/or focusing.

Figure 8P:
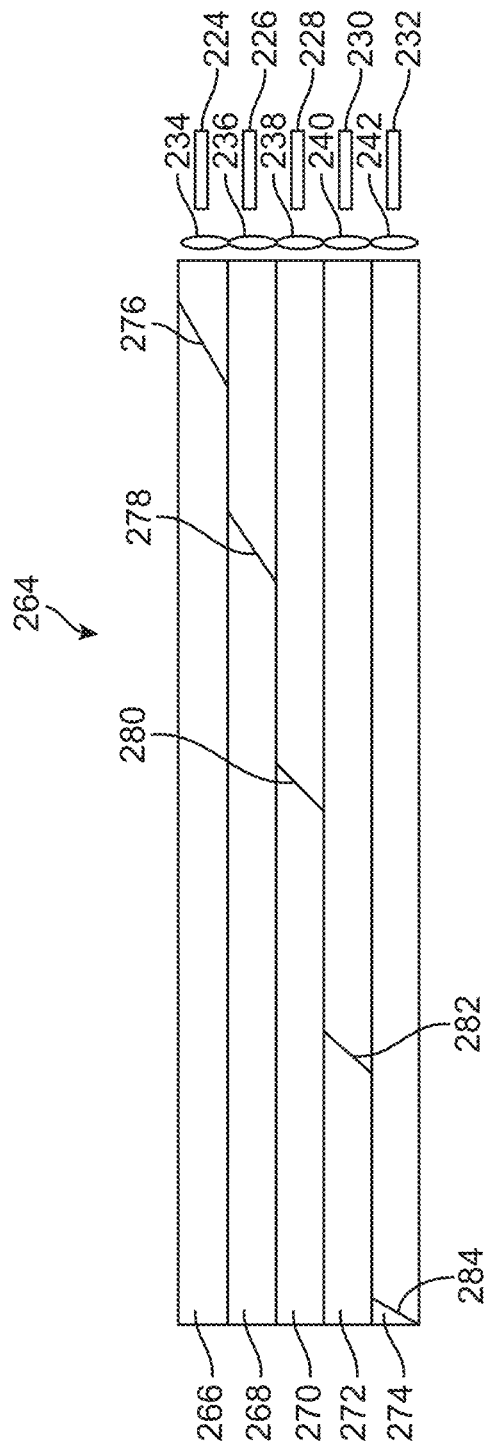

FIG. 8P illustrates a geometrically staggered version wherein reflectors (276, 278, 280, 282, 284) are positioned at staggered lengths in the waveguides (266, 268, 270, 272, 274) so that exiting beams may be relatively easily aligned with objects such as an anatomical pupil. With knowledge of how far the stack (264) is going to be from the eye (such as 28 mm between the cornea of the eye and an eyeglasses lens, a typical comfortable geometry), the geometries of the reflectors (276, 278, 280, 282, 284) and waveguides (266, 268, 270, 272, 274) may be set up to fill the eye pupil (typically about 8 mm across or less) with exiting light. By directing light to an eye box larger than the diameter of the eye pupil, the viewer may make eye movements while retaining the ability to see the displayed imagery. Referring back to the discussion related to FIGS. 5A and 5B about field of view expansion and reflector size, an expanded field of view is presented by the configuration of FIG. 8P as well, and it does not involve the complexity of the switchable reflective elements of the embodiment of FIG. 5B.

Figure 8Q:
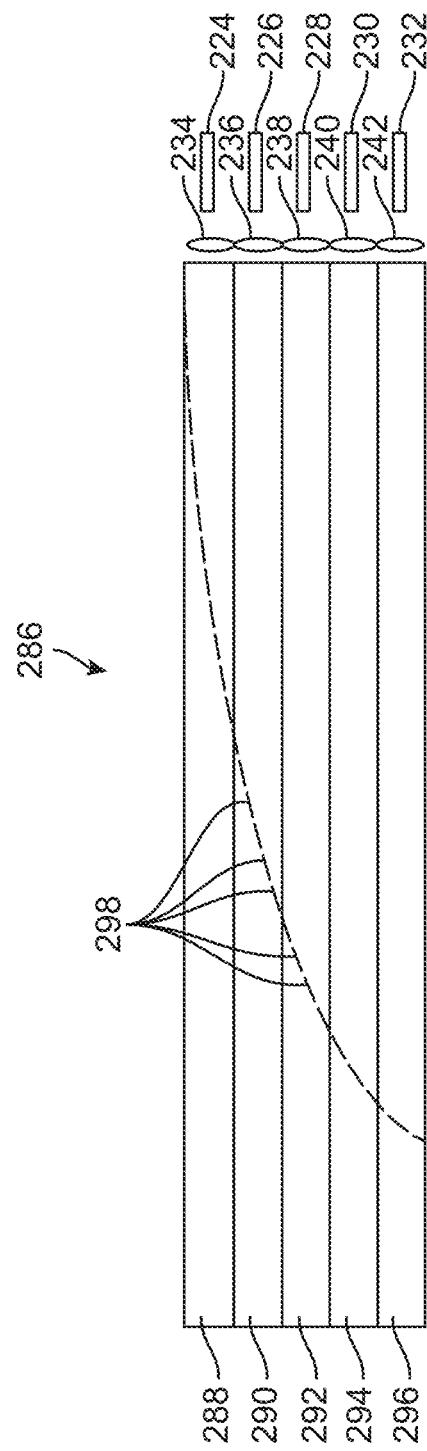

FIG. 8Q illustrates a version wherein many reflectors (298) of a stack (286) form a relatively continuous curved reflection surface in the aggregate or discrete flat facets that are oriented to align with an overall curve. The curve could a parabolic or elliptical curve and is shown cutting across a plurality of waveguides (288, 290, 292, 294, 296) to minimize any crosstalk issues, although it also could be utilized with a monolithic waveguide configuration.

In one implementation, a high-frame-rate and lower persistence display may be combined with a lower-frame-rate and higher persistence display and a variable focus element to comprise a relatively high-frequency frame sequential volumetric display. In one embodiment, the high-frame-rate display has a lower bit depth and the lower-frame-rate display has a higher bit depth, and are combined to comprise an effective high-frame-rate and high bit depth display, that is well suited to presenting image slices in a frame sequential fashion. With such an approach, a three-dimensional volume that is desirably represented is functionally divided into a series of two-dimensional slices. Each of those two-dimensional slices is projected to the eye frame sequentially, and in sync with this presentation, the focus of a variable focus element is changed.

In one embodiment, to get enough frame rate to support such a configuration, two display elements may be integrated: a full-color, high-resolution liquid crystal display ("LCD"; a backlighted ferroelectric panel display also may be utilized in another embodiment; in a further embodiment a scanning fiber display may be utilized) operating at 60 frames per second, and aspects of a higher-frequency DLP system. Instead of illuminating the back of the LCD panel in a conventional manner (i.e., with a full size fluorescent lamp or LED array), the conventional lighting configuration may be removed to accommodate using the DLP projector to project a mask pattern on the back of the LCD (in one embodiment, the mask pattern may be binary in that the DLP either projects illumination, or not-illumination; in another embodiment described below, the DLP may be utilized to project a grayscale mask image).

DLP projection systems can operate at very high frame rates; in one embodiment for 6 depth planes at 60 frames per second, a DLP projection system can be operated against the back of the LCD display at 360 frames/second. Then the DLP projector is utilized to selectively illuminate portions of the LCD panel in sync with a high-frequency variable focus element (such as a deformable membrane mirror) that is disposed between the viewing side of the LCD panel and the eye of the user, the variable focus element being used to change the global display focus on a frame by frame basis at 360 frames/second. In one embodiment, the variable focus element is positioned to be optically conjugate to the exit pupil, to enable adjustments of focus without simultaneously affecting image magnification or "zoom." In another embodiment, the variable focus element is not conjugate to the exit pupil, such that image magnification changes accompany focus adjustments, and software is used to compensate for these optical magnification changes and any distortions by pre-scaling or warping the images to be presented.

Operationally, it's useful to consider an example again wherein a three-dimensional scene is to be presented to a user wherein the sky in the background is to be at a viewing distance of optical infinity, and wherein a branch coupled to a tree located at a certain location closer to the user than optical infinity extends from the tree trunk in a direction toward the user, so that the tip of the branch is closer to the user than is the proximal portion of the branch that joins the tree trunk.

In one embodiment, for a given global frame, the system may be configured to present on an LCD a full-color, all in-focus image of the tree branch in front the sky. Then at subframe1, within the global frame, the DLP projector in a binary masking configuration (i.e., illumination or absence of illumination) may be used to only illuminate the portion of the LCD that represents the cloudy sky while functionally black-masking (i.e., failing to illuminate) the portion of the LCD that represents the tree branch and other elements that are not to be perceived at the same focal distance as the sky, and the variable focus element (such as a deformable membrane mirror) may be utilized to position the focal plane at optical infinity so that the eye sees a sub-image at subframe1 as being clouds that are infinitely far away.

Then at subframe2, the variable focus element may be switched to focusing on a point about 1 meter away from the user's eyes (or whatever distance is required; here 1 meter for the branch location is used for illustrative purposes), the pattern of illumination from the DLP can be switched so that the system only illuminates the portion of the LCD that represents the tree branch while functionally black-masking (i.e., failing to illuminate) the portion of the LCD that represents the sky and other elements that are not to be perceived at the same focal distance as the tree branch. Thus the eye gets a quick flash of cloud at optical infinity followed by a quick flash of tree at 1 meter, and the sequence is integrated by the eye/brain to form a three-dimensional perception. The branch may be positioned diagonally relative to the viewer, such that it extends through a range of viewing distances, e.g., it may join with the trunk at around 2 meters viewing distance while the tips of the branch are at the closer position of 1 meter.

In this case, the display system can divide the 3-D volume of the tree branch into multiple slices, rather than a single slice at 1 meter. For instance, one focus slice may be used to represent the sky (using the DLP to mask all areas of the tree during presentation of this slice), while the tree branch is divided across 5 focus slices (using the DLP to mask the sky and all portions of the tree except one, for each part of the tree branch to be presented). Preferably, the depth slices are positioned with a spacing equal to or smaller than the depth of focus of the eye, such that the viewer will be unlikely to notice the transition between slices, and instead perceive a smooth and continuous flow of the branch through the focus range.

In another embodiment, rather than utilizing the DLP in a binary (illumination or darkfield only) mode, it may be utilized to project a grayscale (for example, 256 shades of grayscale) mask onto the back of the LCD panel to enhance three-dimensional perception. The grayscale shades may be utilized to impart to the eye/brain a perception that something resides in between adjacent depth or focal planes. Back to the branch and clouds scenario, if the leading edge of the branch closest to the user is to be in focalplane1, then at subframe1, that portion branch on the LCD may be lit up with full intensity white from the DLP system with the variable focus element at focalplane1.

Then at subframe2, with the variable focus element at focalplane2 right behind the part that was lit up, there would be no illumination. These are similar steps to the binary DLP masking configuration above. However, if there is a portion of the branch that is to be perceived at a position between focalplane1 and focalplane1, e.g., halfway, grayscale masking can be utilized. The DLP can project an illumination mask to that portion during both subframe1 and subframe2, but at half-illumination (such as at level 128 out of 256 grayscale) for each subframe. This provides the perception of a blending of depth of focus layers, with the perceived focal distance being proportional to the illuminance ratio between subframe1 and subframe2. For instance, for a portion of the tree branch that should lie ¾ths of the way between focalplane1 and focalplane2, an about 25% intensity grayscale mask can be used to illuminate that portion of the LCD at subframe1 and an about 75% grayscale mask can be used to illuminate the same portion of the LCD at subframe2.

In one embodiment, the bit depths of both the low-frame-rate display and the high-frame-rate display can be combined for image modulation, to create a high dynamic range display. The high dynamic range driving may be conducted in tandem with the focus plane addressing function described above, to comprise a high dynamic range multi-focal 3-D display.

In another embodiment that may be more efficient on computation resources, only a certain portion of the display (i.e., LCD) output may be mask-illuminated by the DMD and variably focused enroute to the user's eye. For example, the middle portion of the display may be mask illuminated, with the periphery of the display not providing varying accommodation cues to the user (i.e. the periphery could be uniformly illuminated by the DLP DMD, while a central portion is actively masked and variably focused enroute to the eye).

In the above described embodiment, a refresh rate of about 360 Hz allows for 6 depth planes at about 60 frames/second each. In another embodiment, even higher refresh rates may be achieved by increasing the operating frequency of the DLP. A standard DLP configuration uses a MEMS device and an array of micro-mirrors that toggle between a mode of reflecting light toward the display or user to a mode of reflecting light away from the display or user, such as into a light trap—thus they are inherently binary. DLPs typically create grayscale images using a pulse width modulation schema wherein the mirror is left in the "on" state for a variable amount of time for a variable duty cycle in order to create a brighter pixel, or pixel of interim brightness. Thus, to create grayscale images at moderate frame rate, they are running at a much higher binary rate.

In the above described configurations, such setup works well for creating grayscale masking. However, if the DLP drive scheme is adapted so that it is flashing subimages in a binary pattern, then the frame rate may be increased significantly—by thousands of frames per second, which allows for hundreds to thousands of depth planes being refreshed at 60 frames/second, which may be utilized to obviate the between-depth-plane grayscale interpolating as described above. A typical pulse width modulation scheme for a Texas Instruments DLP system has an 8-bit command signal (first bit is the first long pulse of the mirror; second bit is a pulse that is half as long as the first; third bit is half as long again; and so on)—so that the configuration can create 2 to the 8th power different illumination levels. In one embodiment, the backlighting from the DLP may have its intensity varied in sync with the different pulses of the DMD to equalize the brightness of the subimages that are created, which is a practical workaround to get existing DMD drive electronics to produce significantly higher frame rates.

In another embodiment, direct control changes to the DMD drive electronics and software may be utilized to have the mirrors always have an equal on-time instead of the variable on-time configuration that is conventional, which would facilitate higher frame rates. In another embodiment, the DMD drive electronics may be configured to present low bit depth images at a frame rate above that of high bit depth images but lower than the binary frame rate, enabling some grayscale blending between focus planes, while moderately increasing the number of focus planes.

In another embodiment, when limited to a finite number of depth planes, such as 6 in the example above, it is desirable to functionally move these 6 depth planes around to be maximally useful in the scene that is being presented to the user. For example, if a user is standing in a room and a virtual monster is to be placed into his augmented reality view, the virtual monster being about 2 feet deep in the Z axis straight away from the user's eyes, then it makes sense to cluster all 6 depth planes around the center of the monster's current location (and dynamically move them with him as he moves relative to the user)—so that more rich accommodation cues may be provided for the user, with all six depth planes in the direct region of the monster (for example, 3 in front of the center of the monster, 3 in back of the center of the monster). Such allocation of depth planes is content dependent.

For example, in the scene above the same monster is to be presented in the same room, but also to be presented to the user is a virtual window frame element, and then a virtual view to optical infinity out of the virtual window frame, it will be useful to spend at least one depth plane on optical infinity, one on the depth of the wall that is to house the virtual window frame, and then perhaps the remaining four depth planes on the monster in the room. If the content causes the virtual window to disappear, then the two depth planes may be dynamically reallocated to the region around the monster, and so on—content-based dynamic allocation of focal plane resources to provide the most rich experience to the user given the computing and presentation resources.

Figures 9A, 9B:
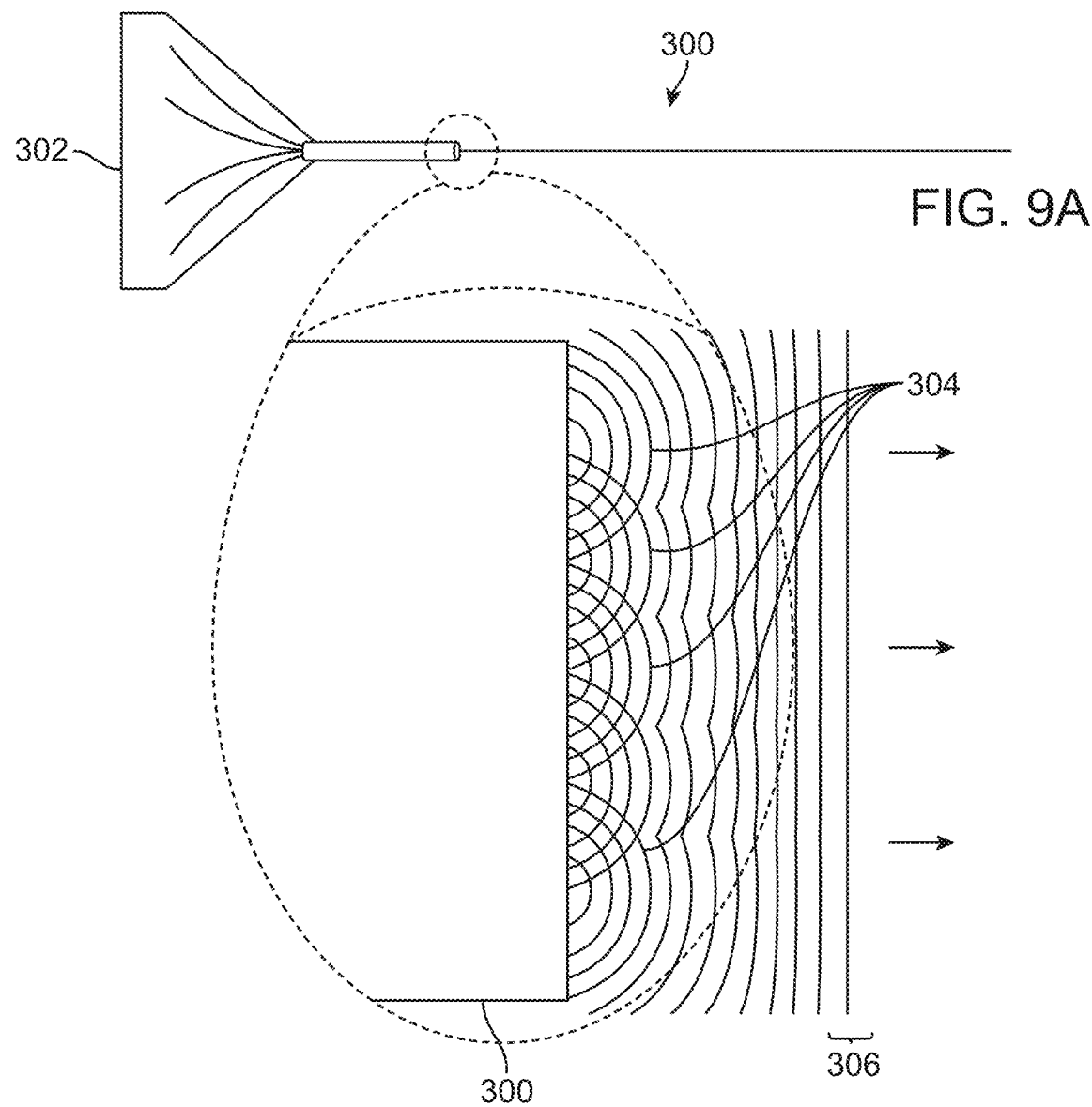
FIGS. 9A and 9B illustrate a wavefront produced from a light projector, according to one illustrated embodiment.

In another embodiment, phase delays in a multicore fiber or an array of single-core fibers may be utilized to create variable focus light wavefronts. Referring to FIG. 9A, a multicore fiber (300) may comprise the aggregation of multiple individual fibers (302); FIG. 9B shows a close-up view of a multicore assembly, which emits light from each core in the form of a spherical wavefront (304) from each. If the cores are transmitting coherent light, e.g., from a shared laser light source, these small spherical wavefronts ultimately constructively and destructively interfere with each other, and if they were emitted from the multicore fiber in phase, they will develop an approximately planar wavefront (306) in the aggregate, as shown. However, if phase delays are induced between the cores (using a conventional phase modulator such as one using lithium niobate, for example, to slow the path of some cores relative to others), then a curved or spherical wavefront may be created in the aggregate, to represent at the eyes/brain an object coming from a point closer than optical infinity, which presents another option that may be used in place of the variable focus elements described above. In other words, such a phased multicore configuration, or phased array, may be utilized to create multiple optical focus levels from a light source.

In another embodiment related to the use of optical fibers, a known Fourier transform aspect of multi-mode optical fiber or light guiding rods or pipes may be utilized for control of the wavefronts that are output from such fiber. Optical fibers typically are available in two categories: single mode and multi-mode. Multi-mode optical fiber typically has larger core diameters and allows light to propagate along multiple angular paths, rather than just the one of single mode optical fiber. It is known that if an image is injected into one end of a multi-mode fiber, that angular differences that are encoded into that image will be retained to some degree as it propagates through the multi-mode fiber, and for some configurations the output from the fiber will be significantly similar to a Fourier transform of the image that was input.

Thus in one embodiment, the inverse Fourier transform of a wavefront (such as a diverging spherical wavefront to represent a focal plane nearer to the user than optical infinity) may be input so that, after passing through the fiber that optically imparts a Fourier transform, the output is the desired shaped, or focused, wavefront. Such output end may be scanned about to be used as a scanned fiber display, or may be used as a light source for a scanning mirror to form an image, for instance. Thus such a configuration may be utilized as yet another focus modulation subsystem. Other kinds of light patterns and wavefronts may be injected into a multi-mode fiber, such that on the output end, a certain spatial pattern is emitted. This may be utilized to have the equivalent of a wavelet pattern (in optics, an optical system may be analyzed in terms of what are called the Zernicke coefficients; images may be similarly characterized and decomposed into smaller principal components, or a weighted combination of comparatively simpler image components). Thus if light is scanned into the eye using the principal components on the input side, a higher resolution image may be recovered at the output end of the multi-mode fiber.

In another embodiment, the Fourier transform of a hologram may be injected into the input end of a multi-mode fiber to output a wavefront that may be used for three-dimensional focus modulation and/or resolution enhancement. Certain single fiber core, multi-core fibers, or concentric core + cladding configurations also may be utilized in the aforementioned inverse Fourier transform configurations.

In another embodiment, rather than physically manipulating the wavefronts approaching the eye of the user at a high frame rate without regard to the user's particular state of accommodation or eye gaze, a system may be configured to monitor the user's accommodation and rather than presenting a set of multiple different light wavefronts, present a single wavefront at a time that corresponds to the accommodation state of the eye. Accommodation may be measured directly (such as by infrared autorefractor or eccentric photorefraction) or indirectly (such as by measuring the convergence level of the two eyes of the user; as described above, vergence and accommodation are strongly linked neurologically, so an estimate of accommodation can be made based upon vergence geometry). Thus with a determined accommodation of, say, 1 meter from the user, then the wavefront presentations at the eye may be configured for a 1 meter focal distance using any of the above variable focus configurations. If an accommodation change to focus at 2 meters is detected, the wavefront presentation at the eye may be reconfigured for a 2 meter focal distance, and so on.

Thus in one embodiment incorporating accommodation tracking, a variable focus element may be placed in the optical path between an outputting combiner (e.g., a waveguide or beamsplitter) and the eye of the user, so that the focus may be changed along with (i.e., preferably at the same rate as) accommodation changes of the eye. Software effects may be utilized to produce variable amounts blur (e.g., Gaussian) to objects which should not be in focus to simulate the dioptric blur expected at the retina if an object were at that viewing distance and enhance the three-dimensional perception by the eyes/brain.

Figure 10:
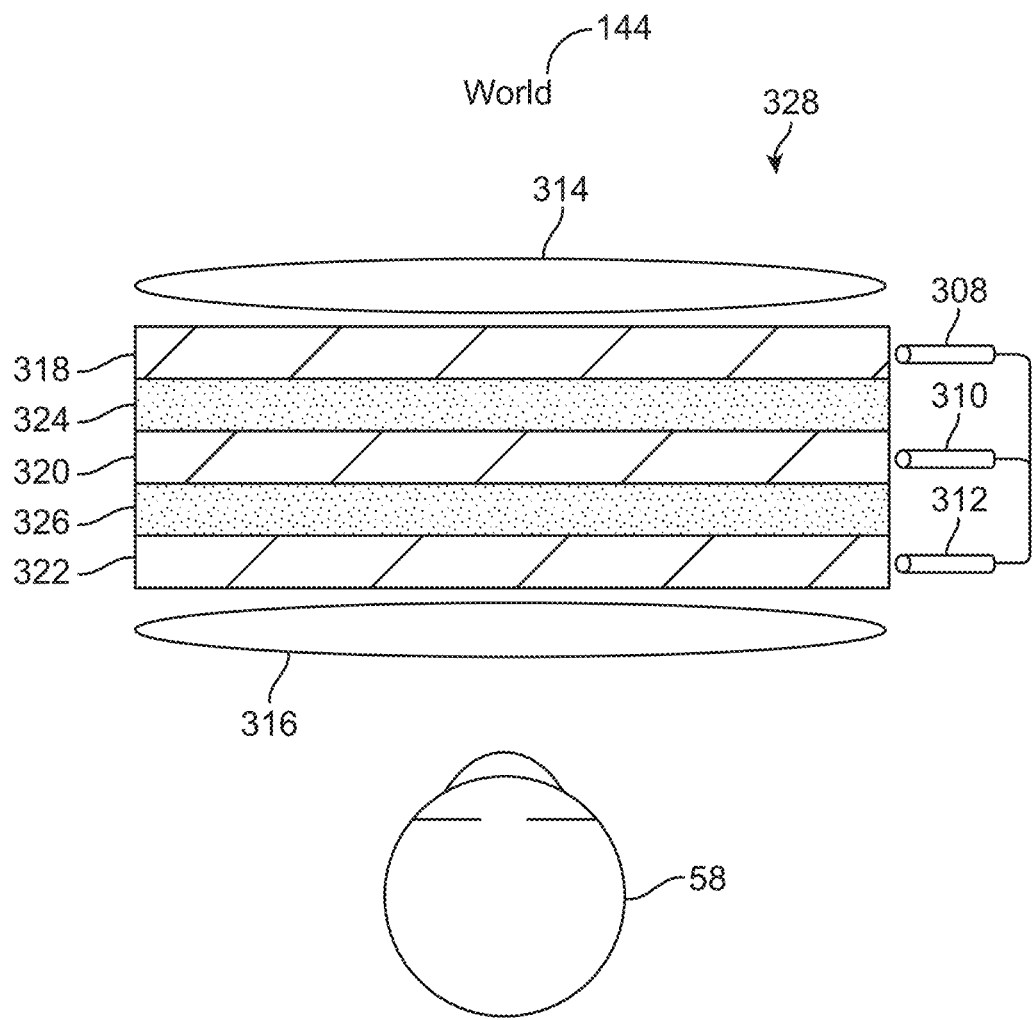
FIG. 10 illustrates an embodiment of a stacked configuration of multiple transmissive beamsplitter substrate coupled with optical elements, according to one illustrated embodiment.

A simple embodiment is a single plane whose focus level is slaved to the viewer's accommodation level, however the performance demands on the accommodation tracking system can be relaxed if even a low number of multiple planes are used. Referring to FIG. 10, in another embodiment, a stack (328) of about 3 waveguides (318, 320, 322) and three light sources (308, 310, 312) may be utilized to create three focal planes worth of wavefronts simultaneously. In one embodiment, the weak lenses (324, 326) may have static focal distances, and a variable focal lens (316) may be slaved to the accommodation tracking of the eyes such that one of the three waveguides (say the middle waveguide 320) outputs what is deemed to be the in-focus wavefront, while the other two waveguides (322, 318) output a + margin wavefront and a − margin wavefront (i.e., a little farther than detected focal distance, a little closer than detected focal distance) which may improve the three-dimensional perception and also provide enough difference for the brain/eye accommodation control system to sense some blur as negative feedback, which enhances the perception of reality, and allows a range of accommodation before an physical adjustment of the focus levels is necessary.

A variable focus compensating lens (314) is also shown to ensure that light coming in from the real world (144) in an augmented reality configuration is not refocused or magnified by the assembly of the stack (328) and output lens (316). The variable focus in the lenses (316, 314) may be achieved, as discussed above, with refractive, diffractive, or reflective techniques.

In another embodiment, each of the waveguides in a stack may contain their own capability for changing focus (such as by having an included electronically switchable DOE) so that the variable focus element need not be centralized as in the stack (328) of the configuration of FIG. 10.

In another embodiment, variable focus elements may be interleaved between the waveguides of a stack (i.e., rather than fixed focus weak lenses as in the embodiment of FIG. 10) to obviate the need for a combination of fixed focus weak lenses plus whole-stack-refocusing variable focus element.

Such stacking configurations may be used in accommodation tracked variations as described herein, and also in a frame-sequential multi-focal display approach.

In a configuration wherein light enters the pupil with a small exit pupil, such as ½ mm diameter or less, one has the equivalent of a pinhole lens configuration wherein the beam is always interpreted as in-focus by the eyes/brain—e.g., a scanned light display using a 0.5 mm diameter beam to scan images to the eye. Such a configuration is known as a Maxwellian view configuration, and in one embodiment, accommodation tracking input may be utilized to induce blur using software to image information that is to be perceived as at a focal plane behind or in front of the focal plane determined from the accommodation tracking. In other words, if one starts with a display presenting a Maxwellian view, then everything theoretically can be in focus, and to provide a rich and natural three-dimensional perception, simulated dioptric blur may be induced with software, and may be slaved to the accommodation tracking status.

In one embodiment a scanning fiber display is well suited to such configuration because it may be configured to only output small-diameter beams in a Maxwellian form. In another embodiment, an array of small exit pupils may be created to increase the functional eye box of the system (and also to reduce the impact of a light-blocking particle which may reside in the vitreous or cornea of the eye), such as by one or more scanning fiber displays, or by a DOE configuration such as that described in reference to FIG. 8K, with a pitch in the array of presented exit pupils that ensure that only one will hit the anatomical pupil of the user at any given time (for example, if the average anatomical pupil diameter is 4 mm, one configuration may comprise ½ mm exit pupils spaced at intervals of approximate 4 mm apart). Such exit pupils may also be switchable in response to eye position, such that only the eye always receives one, and only one, active small exit pupil at a time; allowing a denser array of exit pupils. Such user will have a large depth of focus to which software-based blur techniques may be added to enhance perceived depth perception.

As discussed above, an object at optical infinity creates a substantially planar wavefront; an object closer, such as 1 m away from the eye, creates a curved wavefront (with about 1 m convex radius of curvature). The eye's optical system needs to have enough optical power to bend the incoming rays of light so that they end up focused on the retina (convex wavefront gets turned into concave, and then down to a focal point on the retina). These are basic functions of the eye.

In many of the embodiments described above, light directed to the eye has been treated as being part of one continuous wavefront, some subset of which would hit the pupil of the particular eye. In another approach, light directed to the eye may be effectively discretized or broken down into a plurality of beamlets or individual rays, each of which has a diameter less than about 0.5 mm and a unique propagation pathway as part of a greater aggregated wavefront that may be functionally created with the an aggregation of the beamlets or rays. For example, a curved wavefront may be approximated by aggregating a plurality of discrete neighboring collimated beams, each of which is approaching the eye from an appropriate angle to represent a point of origin that matches the center of the radius of curvature of the desired aggregate wavefront.

When the beamlets have a diameter of about 0.5 mm or less, it is as though it is coming through a pinhole lens configuration, which means that each individual beamlet is always in relative focus on the retina, independent of the accommodation state of the eye—however the trajectory of each beamlet will be affected by the accommodation state. For instance, if the beamlets approach the eye in parallel, representing a discretized collimated aggregate wavefront, then an eye that is correctly accommodated to infinity will deflect the beamlets to all converge upon the same shared spot on the retina, and will appear in focus. If the eye accommodates to, say, 1 m, the beams will be converged to a spot in front of the retina, cross paths, and fall on multiple neighboring or partially overlapping spots on the retina—appearing blurred.

If the beamlets approach the eye in a diverging configuration, with a shared point of origin 1 meter from the viewer, then an accommodation of 1 m will steer the beams to a single spot on the retina, and will appear in focus; if the viewer accommodates to infinity, the beamlets will converge to a spot behind the retina, and produce multiple neighboring or partially overlapping spots on the retina, producing a blurred image. Stated more generally, the accommodation of the eye determines the degree of overlap of the spots on the retina, and a given pixel is "in focus" when all of the spots are directed to the same spot on the retina and "defocused" when the spots are offset from one another. This notion that all of the 0.5 mm diameter or less beamlets are always in focus, and that they may be aggregated to be perceived by the eyes/brain as though they are substantially the same as coherent wavefronts, may be utilized in producing configurations for comfortable three-dimensional virtual or augmented reality perception.

In other words, a set of multiple narrow beams may be used to emulate what is going on with a larger diameter variable focus beam, and if the beamlet diameters are kept to a maximum of about 0.5 mm, then they maintain a relatively static focus level, and to produce the perception of out-of-focus when desired, the beamlet angular trajectories may be selected to create an effect much like a larger out-of-focus beam (such a defocussing treatment may not be the same as a Gaussian blur treatment as for the larger beam, but will create a multimodal point spread function that may be interpreted in a similar fashion to a Gaussian blur).

In a preferred embodiment, the beamlets are not mechanically deflected to form this aggregate focus effect, but rather the eye receives a superset of many beamlets that includes both a multiplicity of incident angles and a multiplicity of locations at which the beamlets intersect the pupil; to represent a given pixel from a particular viewing distance, a subset of beamlets from the superset that comprise the appropriate angles of incidence and points of intersection with the pupil (as if they were being emitted from the same shared point of origin in space) are turned on with matching color and intensity, to represent that aggregate wavefront, while beamlets in the superset that are inconsistent with the shared point of origin are not turned on with that color and intensity (but some of them may be turned on with some other color and intensity level to represent, e.g., a different pixel).

Figure 11B:
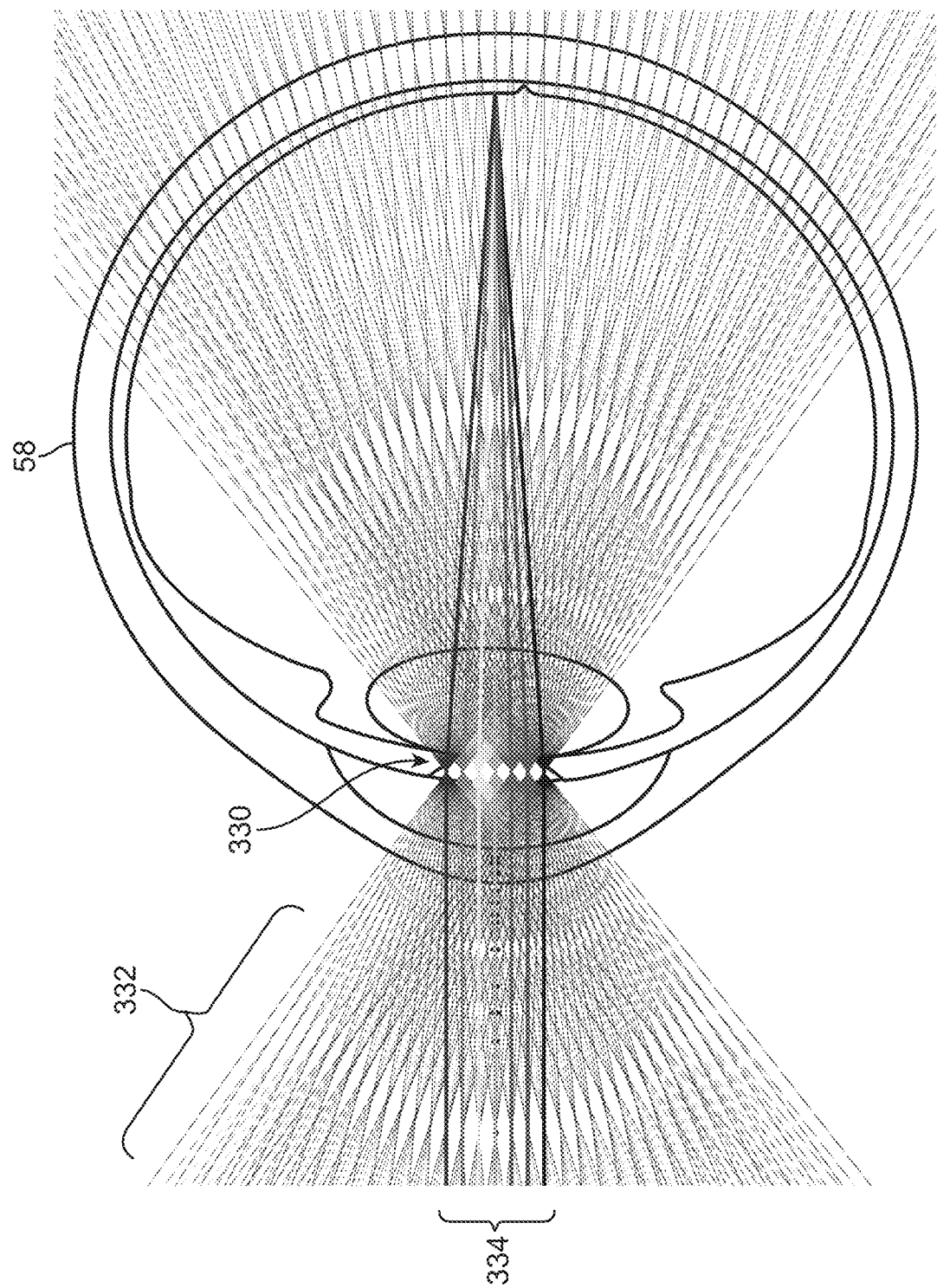

Referring to FIG. 11A, each of a multiplicity of incoming beamlets (332) is passing through a small exit pupil (330) relative to the eye (58) in a discretized wavefront display configuration. Referring to FIG. 11B, a subset (334) of the group of beamlets (332) may be driven with matching color and intensity levels to be perceived as though they are part of the same larger-sized ray (the bolded subgroup 334 may be deemed an "aggregated beam"). In this case, the subset of beamlets are parallel to one another, representing a collimated aggregate beam from optical infinity (such as light coming from a distant mountain). The eye is accommodated to infinity, so the subset of beamlets are deflected by the eye's cornea and lens to all fall substantially upon the same location of the retina and are perceived to comprise a single in focus pixel.

Figure 11C:
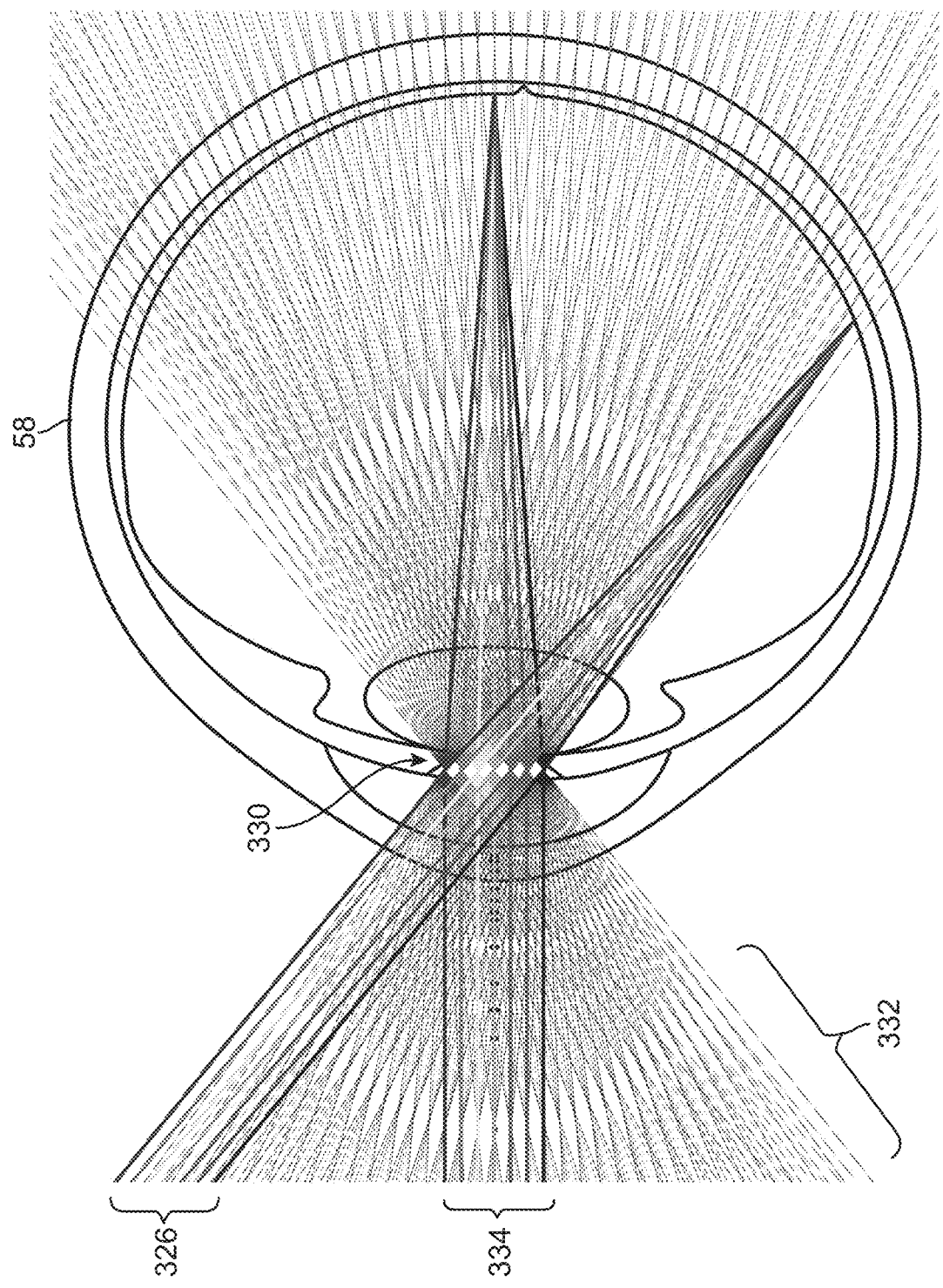

FIG. 11C shows another subset of beamlets representing an aggregated collimated beam (336) coming in from the right side of the field of view of the user's eye (58) if the eye (58) is viewed in a coronal-style planar view from above. Again, the eye is shown accommodated to infinity, so the beamlets fall on the same spot of the retina, and the pixel is perceived to be in focus. If, in contrast, a different subset of beamlets were chosen that were reaching the eye as a diverging fan of rays, those beamlets would not fall on the same location of the retina (and be perceived as in focus) until the eye were to shift accommodation to a near point that matches the geometrical point of origin of that fan of rays.

Figure 12A:
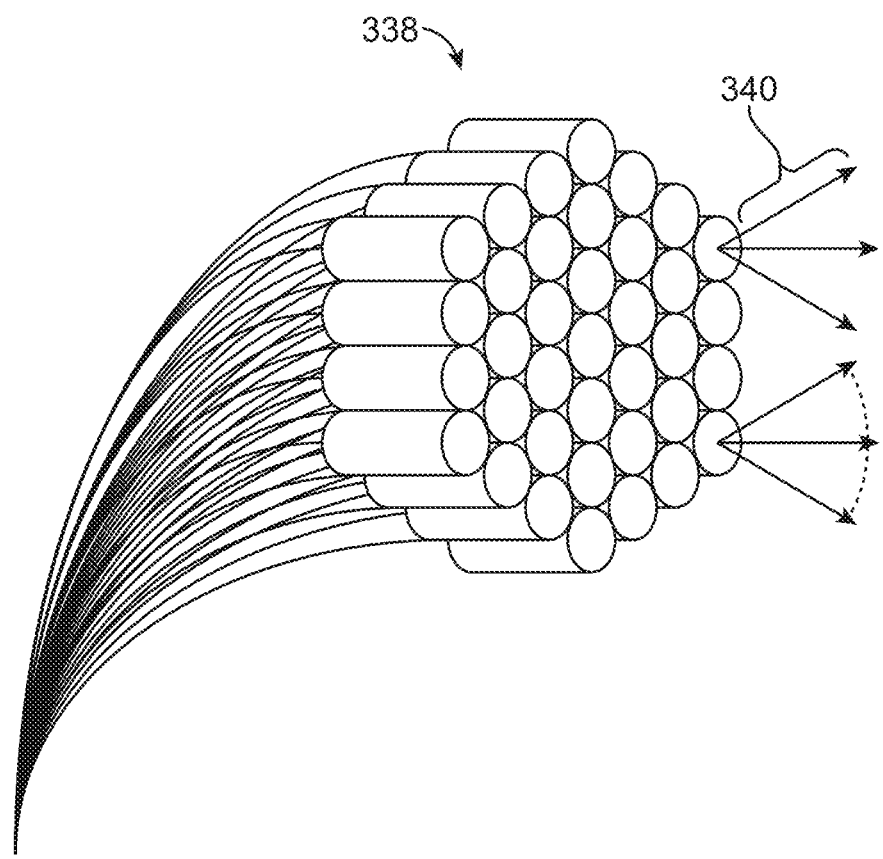
FIGS. 12A and 12B illustrate configurations of an array of microprojectors, according to the illustrated embodiments.

As regards patterns of points of intersection of beamlets with the anatomical pupil of the eye (i.e., the pattern of exit pupils), they may be organized in configurations such as a cross-sectionally efficient hex-lattice (for example, as shown in FIG. 12A) or a square lattice or other two-dimensional array. Further, a three-dimensional array of exit pupils could be created, as well as time-varying arrays of exit pupils.

Discretized aggregate wavefronts may be created using several configurations, such as an array of microdisplays or microprojectors placed optically conjugate with the exit pupil of viewing optics, microdisplay or microprojector arrays coupled to a direct field of view substrate (such as an eyeglasses lens) such that they project light to the eye directly, without additional intermediate viewing optics, successive spatial light modulation array techniques, or waveguide techniques such as those described in relation to FIG. 8K.

Referring to FIG. 12A, in one embodiment, a lightfield may be created by bundling a group of small projectors or display units (such as scanned fiber displays). FIG. 12A depicts a hexagonal lattice projection bundle (338) which may, for example, create a 7 mm-diameter hex array with each fiber display outputting a sub-image (340). If such an array has an optical system, such as a lens, placed in front of it such that the array is placed optically conjugate with the eye's entrance pupil, this will create an image of the array at the eye's pupil, as shown in FIG. 12B, which essentially provides the same optical arrangement as the embodiment of FIG. 11A.

Each of the small exit pupils of the configuration is created by a dedicated small display in the bundle (338), such as a scanning fiber display. Optically, it's as though the entire hex array (338) is positioned right into the anatomical pupil (45). Such embodiments are means for driving different subimages to different small exit pupils within the larger anatomical entrance pupil (45) of the eye, comprising a superset of beamlets with a multiplicity of incident angles and points of intersection with the eye pupil. Each of the separate projectors or displays may be driven with a slightly different image, such that subimages may be created that pull out different sets of rays to be driven at different light intensities and colors.

Figure 12B:
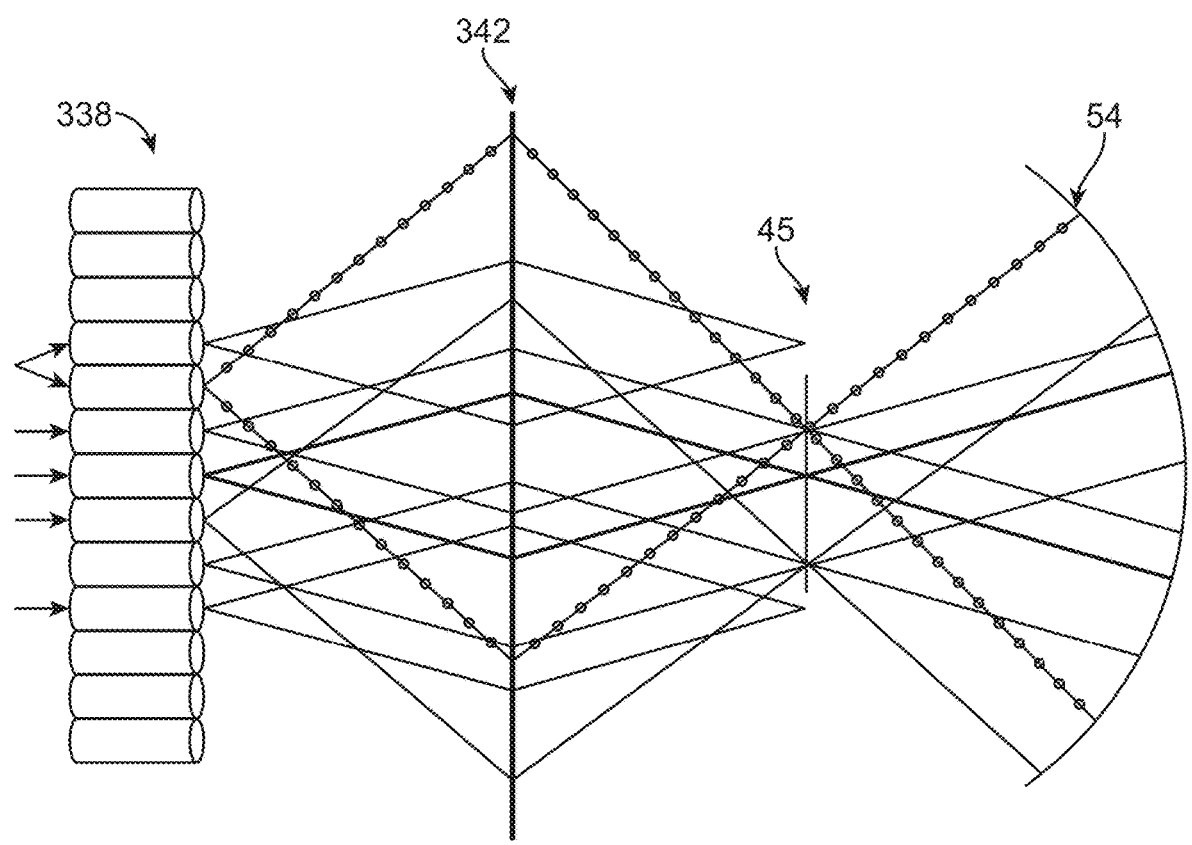

In one variation, a strict image conjugate may be created, as in the embodiment of FIG. 12B, wherein there is direct 1-to-1 mapping of the array (338) with the pupil (45). In another variation, the spacing may be changed between displays in the array and the optical system (lens 342, in FIG. 12B) so that instead of getting a conjugate mapping of the array to the eye pupil, the eye pupil may be catching the rays from the array at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Figure 13A:
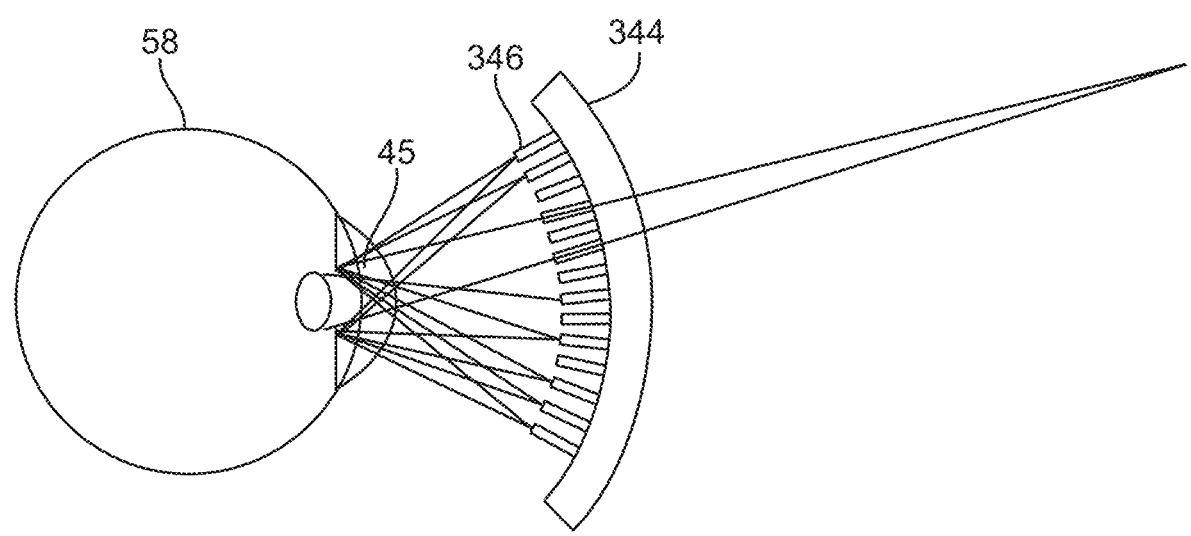
FIGS. 13A-13M illustrate embodiments of coupling microprojectors with optical elements, according to the illustrated embodiments.

Referring to FIG. 13A, another lightfield creating embodiment is depicted wherein an array of microdisplays or microprojectors (346) may be coupled to a frame (344; such as an eyeglasses frame) to be positioned in front of the eye (58). The depicted configuration is a nonconjugate arrangement wherein there are no large-scale optical elements interposed between the displays (for example, scanning fiber displays) of the array (346) and the eye (58). One can imagine a pair of glasses, and coupled to those glasses are a plurality of displays, such as scanning fiber engines, positioned orthogonal to the eyeglasses surface, and all angled inward so they are pointing at the pupil of the user. Each display may be configured to create a set of rays representing different elements of the beamlet superset.

Figure 13B:
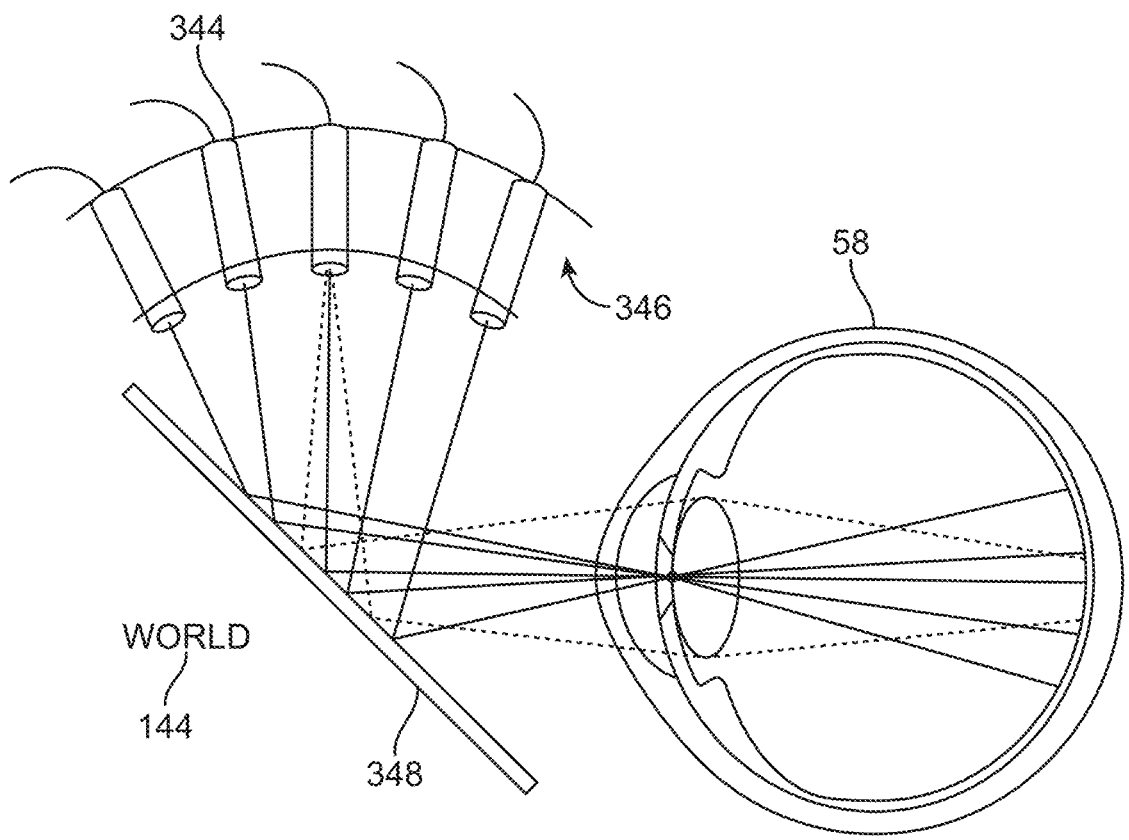

With such a configuration, at the anatomical pupil (45) the user is going to receive a similar result as received in the embodiments discussed in reference to FIG. 11A, in which every point at the user's pupil is receiving rays with a multiplicity of angles of incidence and points of intersection that are being contributed from the different displays. FIG. 13B illustrates a nonconjugate configuration similar to that of FIG. 13A, with the exception that the embodiment of FIG. 13B features a reflecting surface (348) to facilitate moving the display array (346) away from the eye's (58) field of view, while also allowing views of the real world (144) through the reflective surface (348).

Thus another configuration for creating the angular diversity necessary for a discretized aggregate wavefront display is presented. To optimize such a configuration, the sizes of the displays may be decreased to the maximum. Scanning fiber displays which may be utilized as displays may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array. For example, referring to FIG. 13D, a GRIN lens (354) is shown fused to the end of a single mode optical fiber. An actuator (350; such as a piezoelectric actuator) is coupled to the fiber (352) and may be used to scan the fiber tip.

In another embodiment the end of the fiber may be shaped into a hemispherical shape using a curved polishing treatment of an optical fiber to create a lensing effect. In another embodiment a standard refractive lens may be coupled to the end of each optical fiber using an adhesive. In another embodiment a lens may be built from a dab of transmissive polymeric material or glass, such as epoxy. In another embodiment the end of an optical fiber may be melted to create a curved surface for a lensing effect.

Figures 1, 2, 13C:
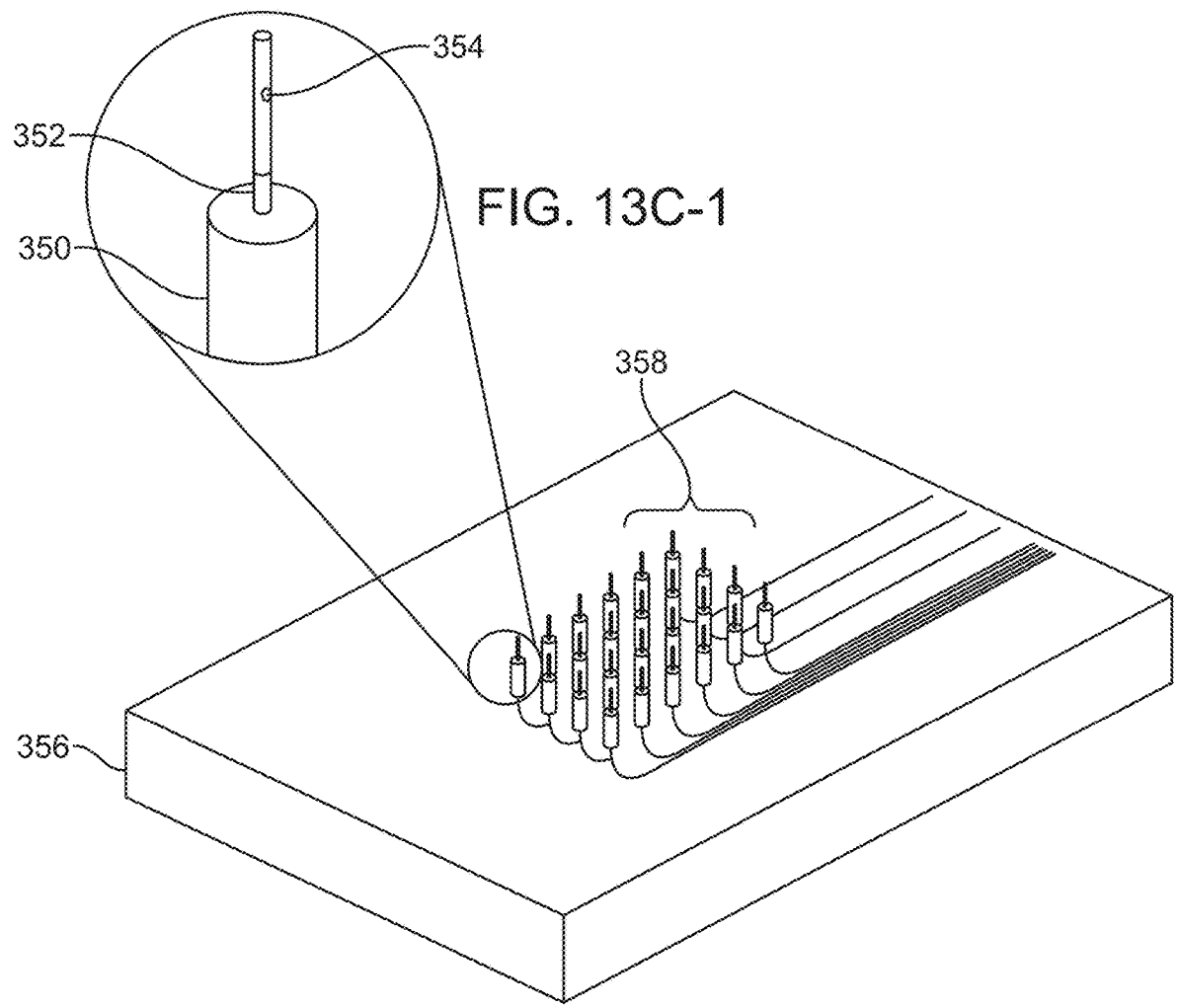
Figure 13D:
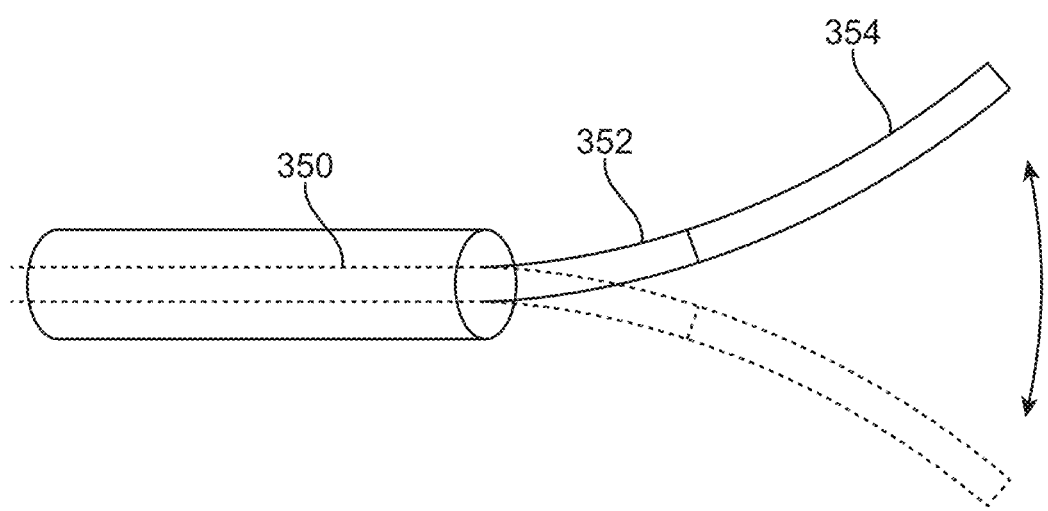

FIG. 13C-2 shows an embodiment wherein display configurations (i.e., scanning fiber displays with GRIN lenses; shown in close-up view of FIG. 13C-1) such as that shown in FIG. 13D may be coupled together through a single transparent substrate (356) preferably having a refractive index that closely matches the cladding of the optical fibers (352) so that the fibers themselves are not very visible for viewing of the outside world across the depicted assembly (if the index matching of the cladding is done precisely, then the larger cladding/housing becomes transparent and only the tiny cores, which preferably are about 3 microns in diameter, will be obstructing the view. In one embodiment the matrix (358) of displays may all be angled inward so they are directed toward the anatomic pupil of the user (in another embodiment, they may stay parallel to each other, but such a configuration is less efficient).

Figure 13E:
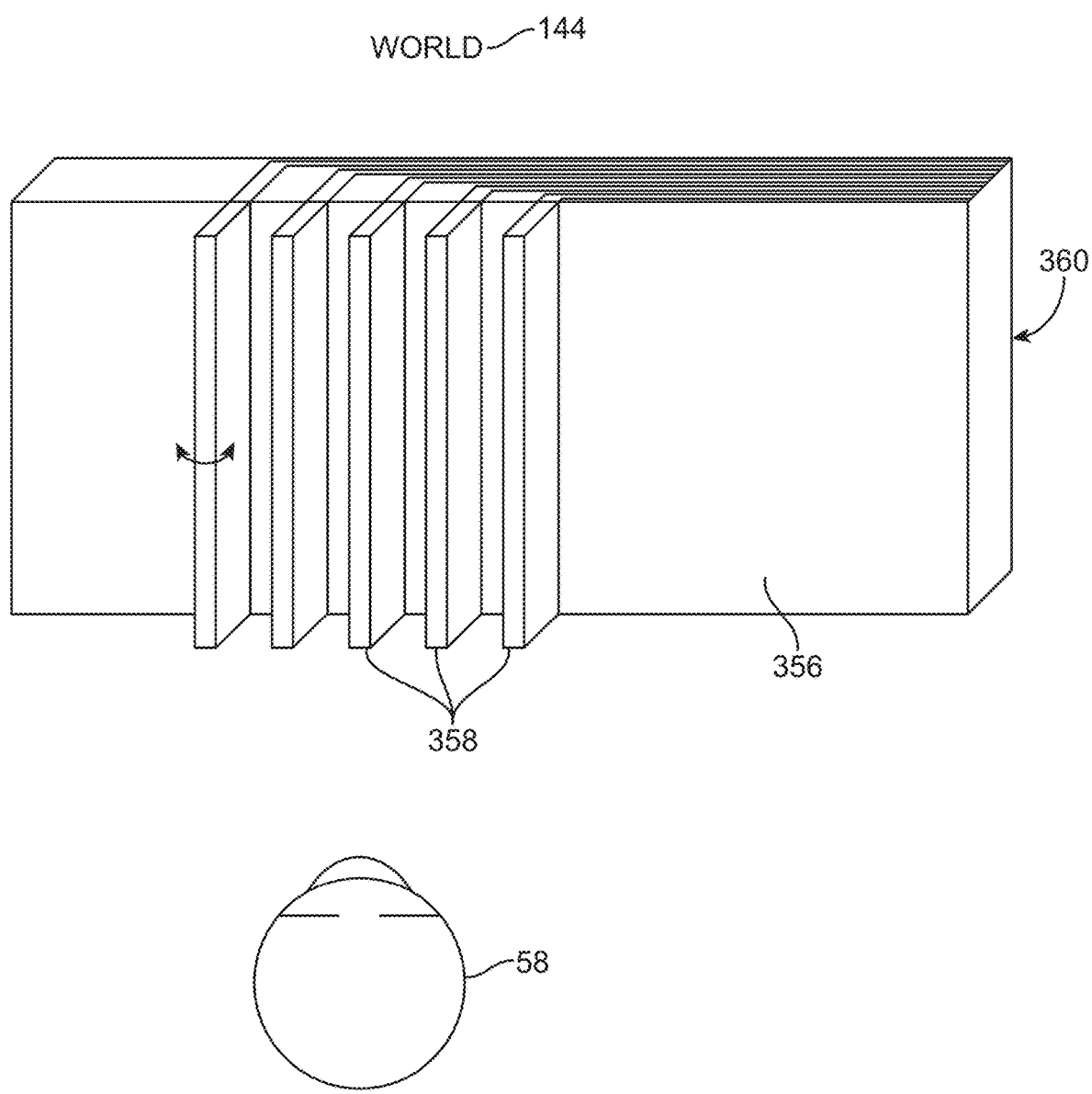

Referring to FIG. 13E, another embodiment is depicted wherein rather than using circular fibers to move cyclically, a thin series of planar waveguides (358) are configured to be cantilevered relative to a larger substrate structure (356). In one variation, the substrate (356) may be moved to produce cyclic motion (i.e., at the resonant frequency of the cantilevered members 358) of the planar waveguides relative to the substrate structure. In another variation, the cantilevered waveguide portions (358) may be actuated with piezoelectric or other actuators relative to the substrate. Image illumination information may be injected, for example, from the right side (360) of the substrate structure to be coupled into the cantilevered waveguide portions (358). In one embodiment the substrate (356) may comprise a waveguide configured (such as with an integrated DOE configuration as described above) to totally internally reflect incoming light (360) along its length and then redirect it to the cantilevered waveguide portions (358). As a person gazes toward the cantilevered waveguide portions (358) and through to the real world (144) behind, the planar waveguides are configured to minimize any dispersion and/or focus changes with their planar shape factors.

Figures 1, 13F:
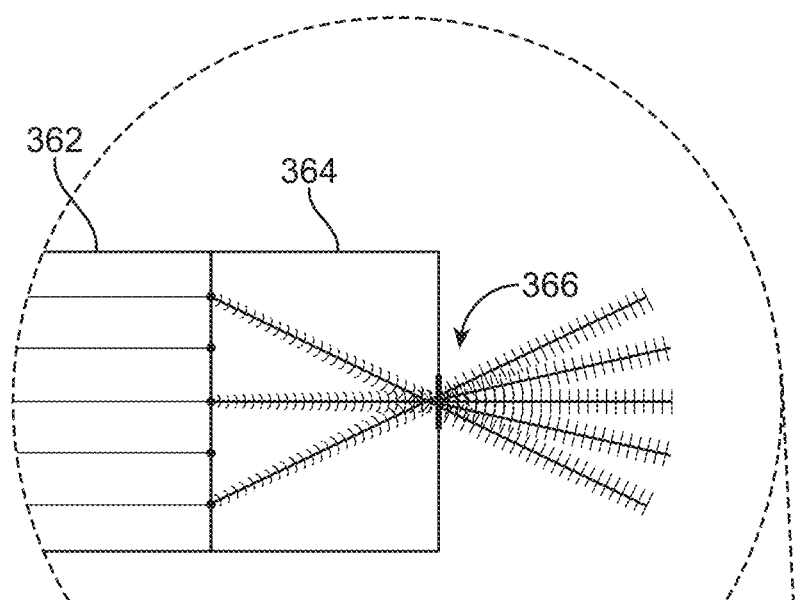
Figures 2, 13F:
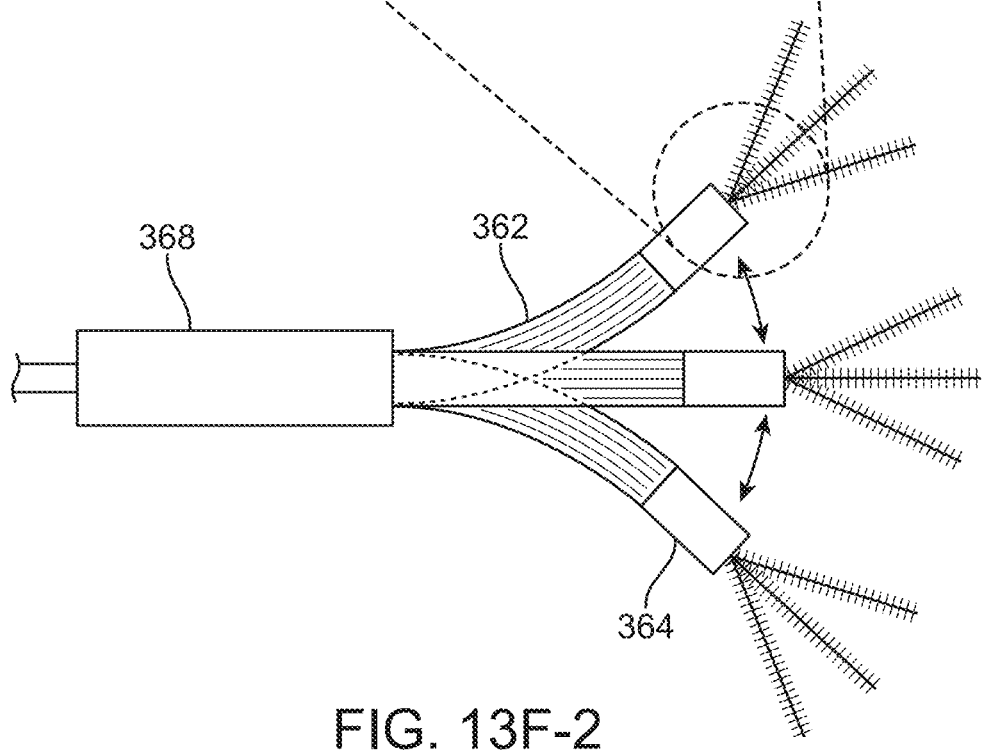

In the context of discussing discretized aggregate wavefront displays, there is value placed in having some angular diversity created for every point in the exit pupil of the eye. In other words, it is desirable to have multiple incoming beams to represent each pixel in a displayed image. Referring to FIGS. 13F-1 and 13F-2, one way to gain further angular and spatial diversity is to use a multicore fiber and place a lens at the exit point, such as a GRIN lens, so that the exit beams are deflected through a single nodal point (366); that nodal point may then be scanned back and forth in a scanned fiber type of arrangement (such as by a piezoelectric actuator 368). If a retinal conjugate is placed at the plane defined at the end of the GRIN lens, a display may be created that is functionally equivalent to the general case discretized aggregate wavefront configuration described above.

Figure 13G:
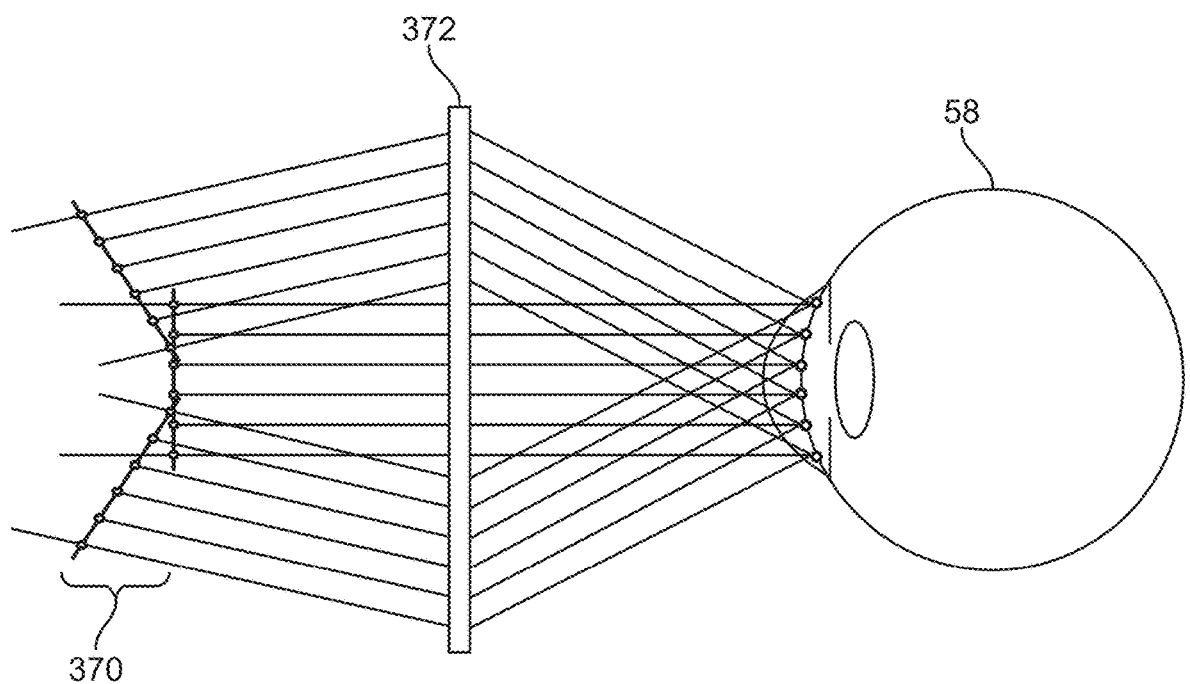
Figure 13H:
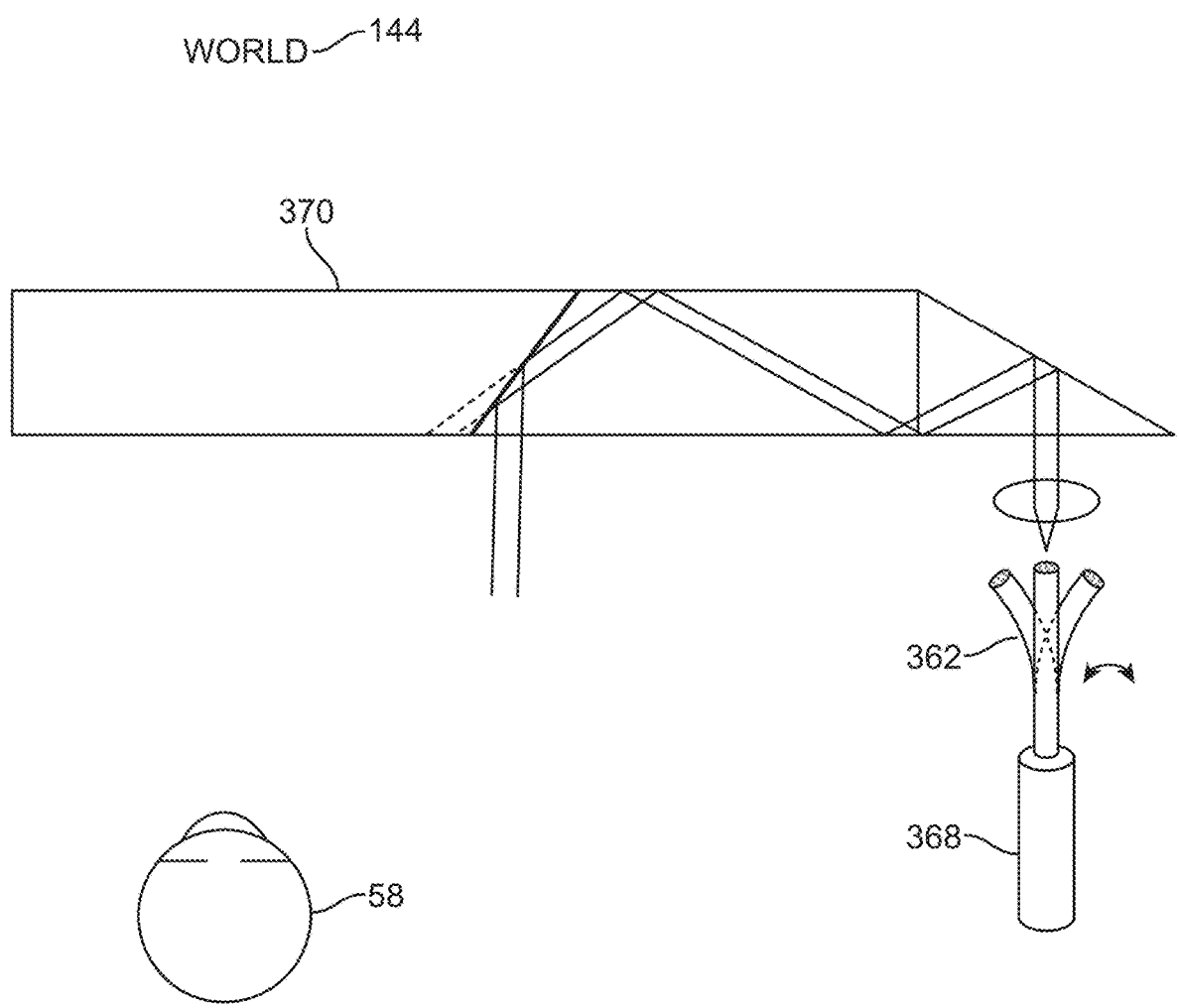
Figure 13I:
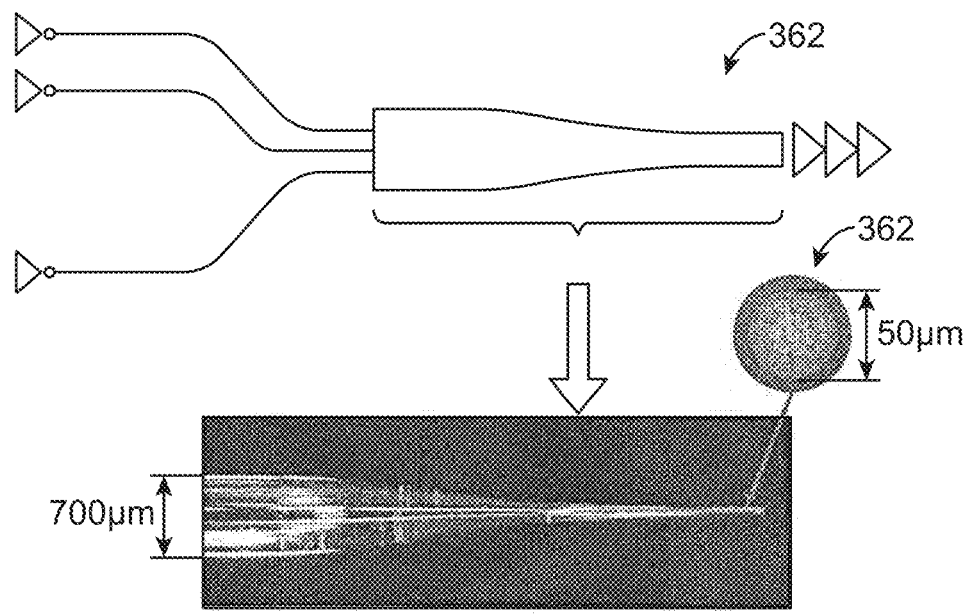
Figure 13J:
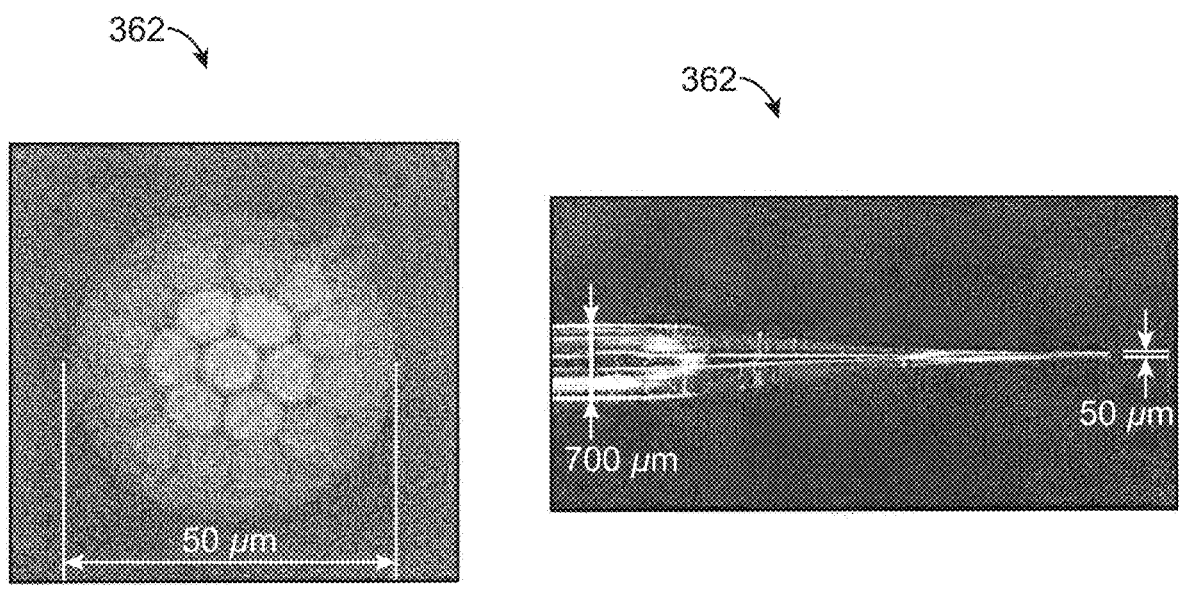
Figure 13K:
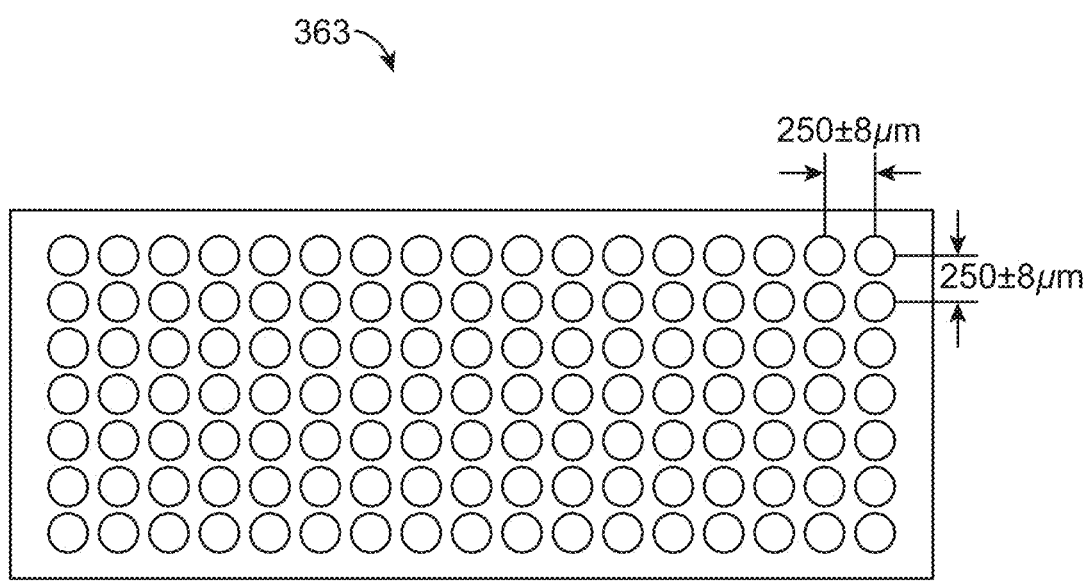
Figure 13L:
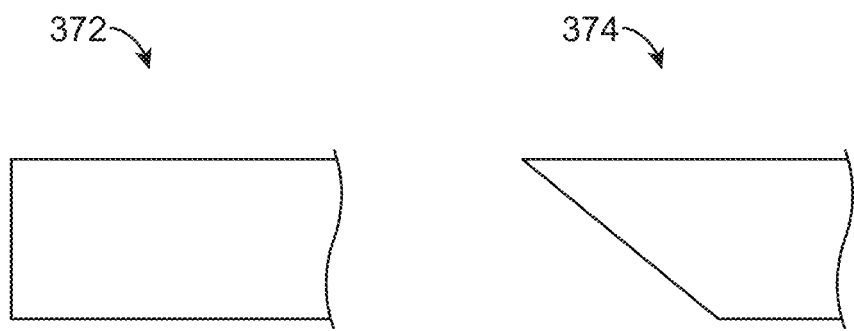

Referring to FIG. 13G, a similar effect may be achieved not by using a lens, but by scanning the face of a multicore system at the correct conjugate of an optical system (372), the goal being to create a higher angular and spatial diversity of beams. In other words, rather than having a bunch of separately scanned fiber displays as in the bundled example of FIG. 12A described above, some of this requisite angular and spatial diversity may be created through the use of multiple cores to create a plane which may be relayed by a waveguide. Referring to FIG. 13H, a multicore fiber (362) may be scanned (such as by a piezoelectric actuator 368) to create a set of beamlets with a multiplicity of angles of incidence and points of intersection which may be relayed to the eye (58) by a waveguide (370). Thus in one embodiment a collimated lightfield image may be injected into a waveguide, and without any additional refocusing elements, that lightfield display may be translated directly to the human eye.

FIGS. 13I-13L depict certain commercially available multicore fiber (362) configurations (from vendors such as Mitsubishi Cable Industries, Ltd. of Japan), including one variation (363) with a rectangular cross section, as well as variations with flat exit faces (372) and angled exit faces (374).

Figure 13M:
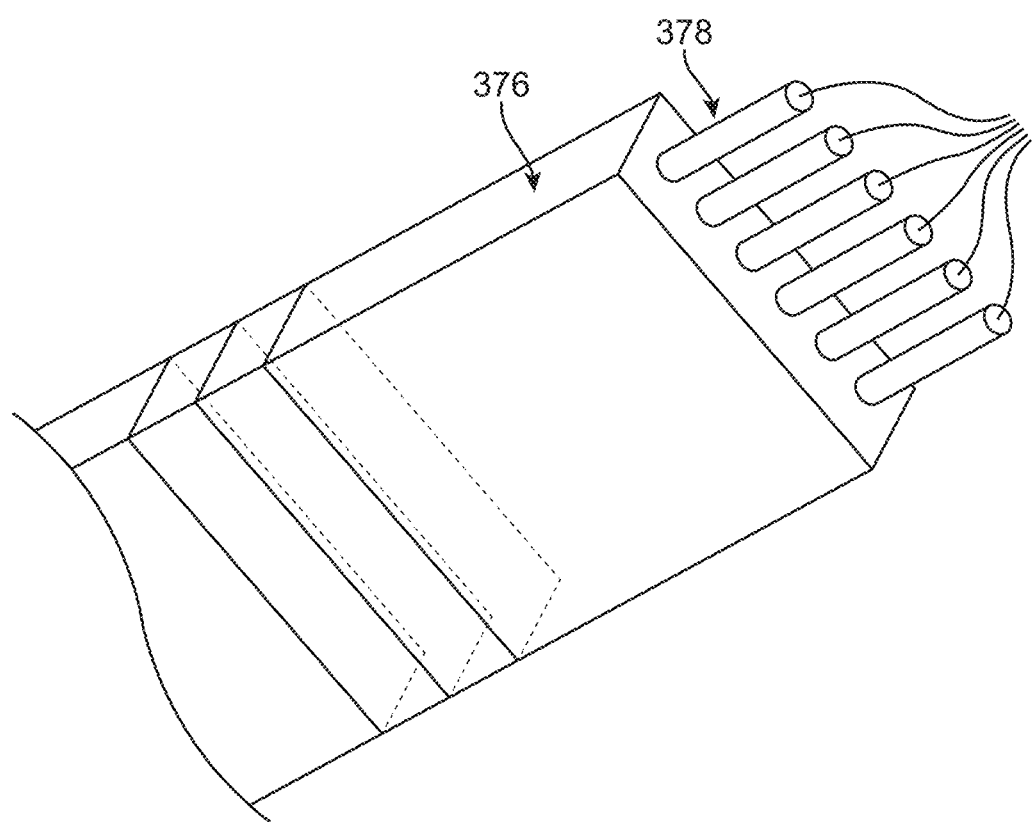

Referring to FIG. 13M, some additional angular diversity may be created by having a waveguide (376) fed with a linear array of displays (378), such as scanning fiber displays.

Referring to FIGS. 14A-14F, another group of configurations for creating a fixed viewpoint lightfield display is described. Referring back to FIG. 11A, if a two-dimensional plane was created that was intersecting all of the tiny beams coming in from the left, each beamlet would have a certain point of intersection with that plane. If another plane was created at a different distance to the left, then all of the beamlets would intersect that plane at a different location. Then going back to FIG. 14A, if various positions on each of two or more planes can be allowed to selectively transmit or block the light radiation directed through it, such a multi-planar configuration may be utilized to selectively create a lightfield by independently modulating individual beamlets.

Figure 14A:
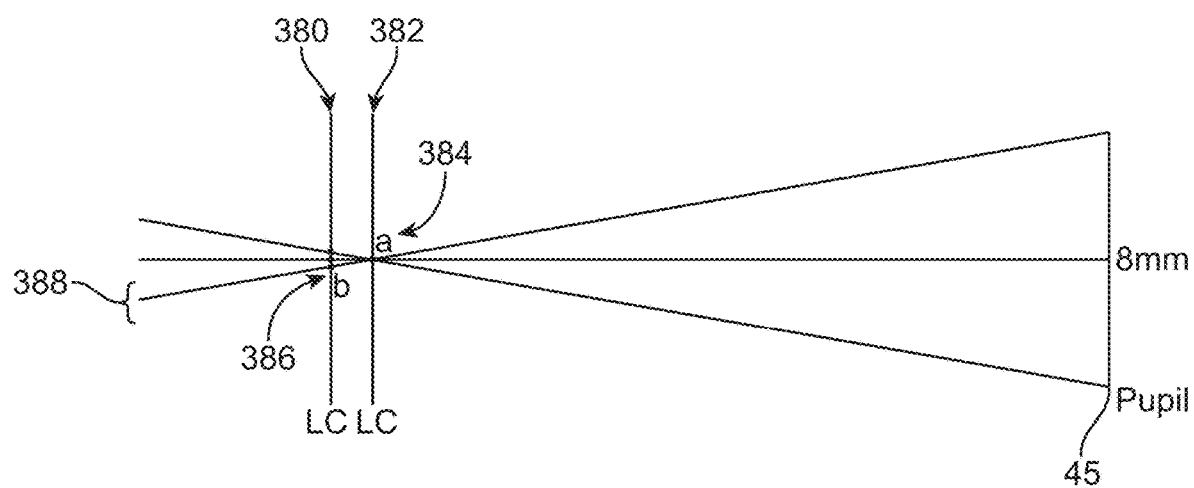
FIGS. 14A-14F illustrate embodiments of spatial light modulators coupled with optical elements, according to the illustrated embodiments.

The basic embodiment of FIG. 14A shows two spatial light modulators, such as liquid crystal display panels (380, 382; in other embodiments they may be MEMS shutter displays or DLP DMD arrays) which may be independently controlled to block or transmit different rays on a high-resolution basis. For example, referring to FIG. 14A, if the second panel (382) blocks or attenuates transmission of rays at point "a" (384), all of the depicted rays will be blocked; but if only the first panel (380) blocks or attenuates transmission of rays at point "b" (386), then only the lower incoming ray (388) will be blocked/attenuated, while the rest will be transmitted toward the pupil (45). Each of the controllable panels or planes may be deemed a "spatial light modulator" or "fatte". The intensity of each transmitted beam passed through a series of SLMs will be a function of the combination of the transparency of the various pixels in the various SLM arrays. Thus without any sort of lens elements, a set of beamlets with a multiplicity of angles and points of intersection (or a "lightfield") may be created using a plurality of stacked SLMs. Additional numbers of SLMs beyond two provides more opportunities to control which beams are selectively attenuated.

Figure 14B:
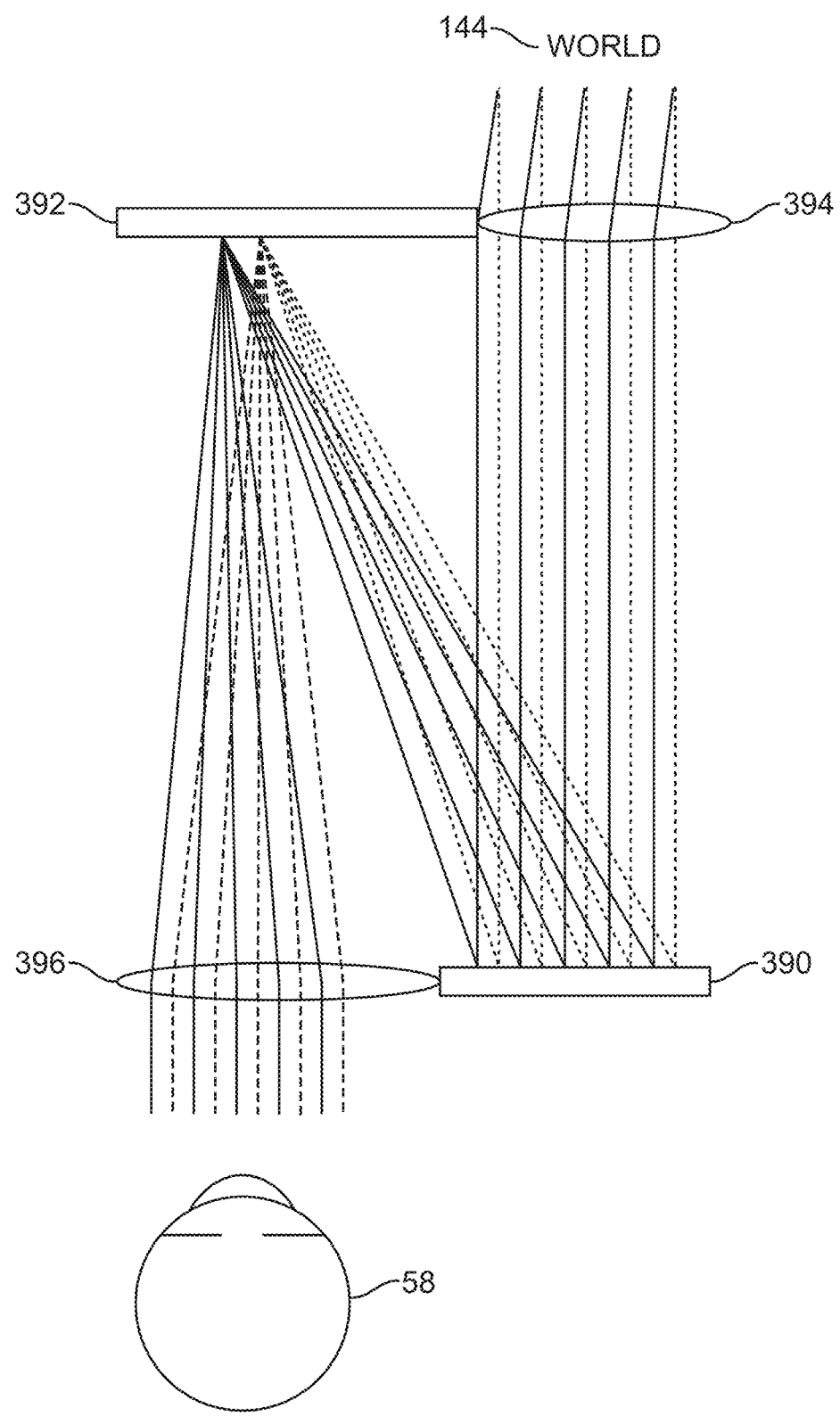
Figure 14C:
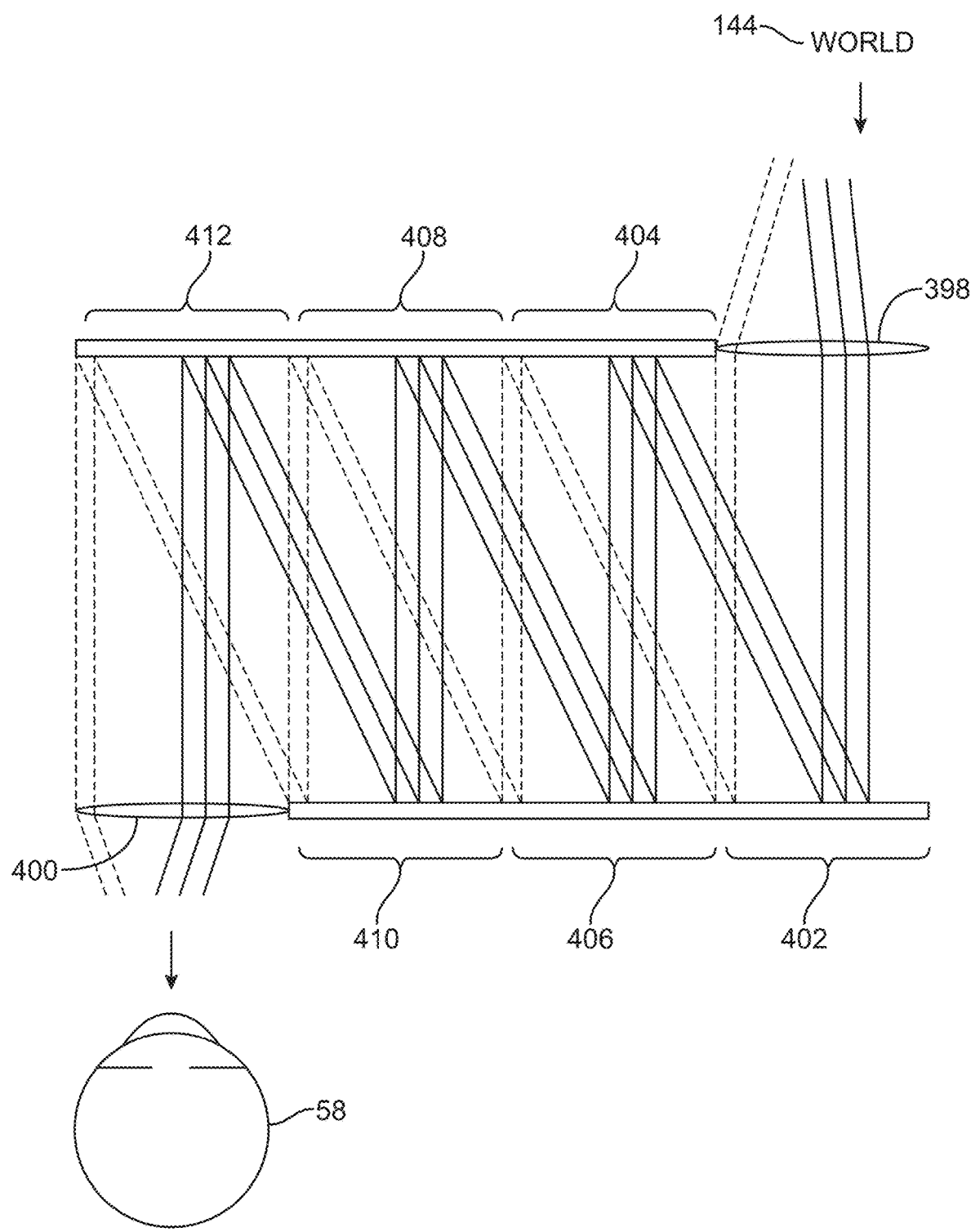

As noted briefly above, in addition to using stacked liquid crystal displays as SLMs, planes of DMD devices from DLP systems may be stacked to function as SLMs, and may be preferred over liquid crystal systems as SLMs due to their ability to more efficiently pass light (with a mirror element in a first state, reflectivity to the next element on the way to the eye may be quite efficient; with a mirror element in a second state, the mirror angle may be moved by an angle such as 12 degrees to direct the light away from the path to the eye). Referring to FIG. 14B, in one DMD embodiment, two DMDs (390, 390) may be utilized in series with a pair of lenses (394, 396) in a periscope type of configuration to maintain a high amount of transmission of light from the real world (144) to the eye (58) of the user. The embodiment of FIG. 14C provides six different DMD (402, 404, 406, 408, 410, 412) plane opportunities to intercede from an SLM functionality as beams are routed to the eye (58), along with two lenses (398, 400) for beam control.

Figure 14D:
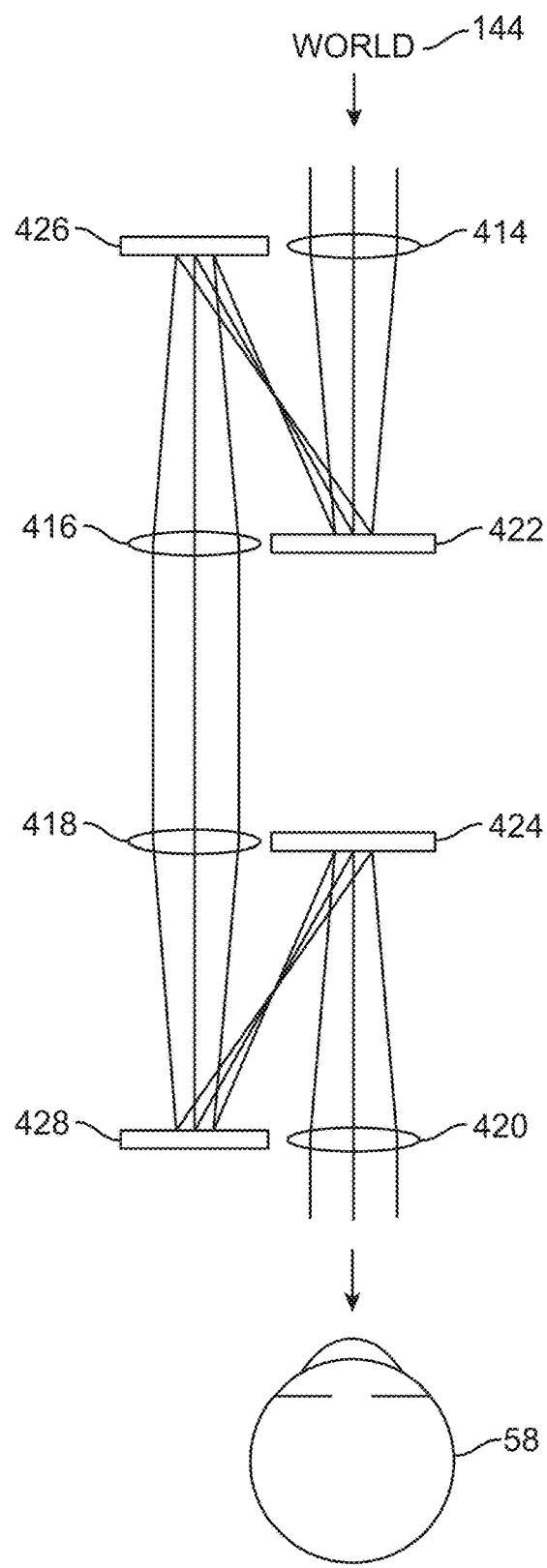
Figure 14E:
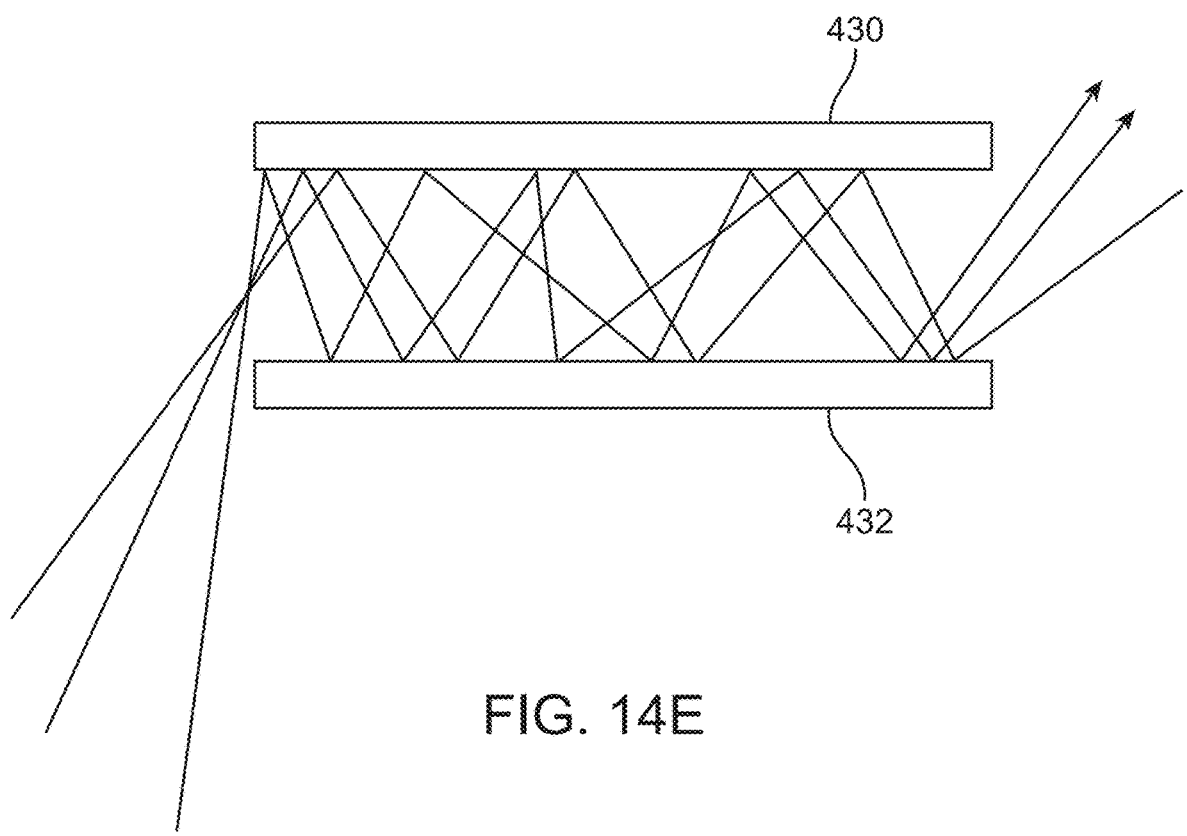
Figure 14F:
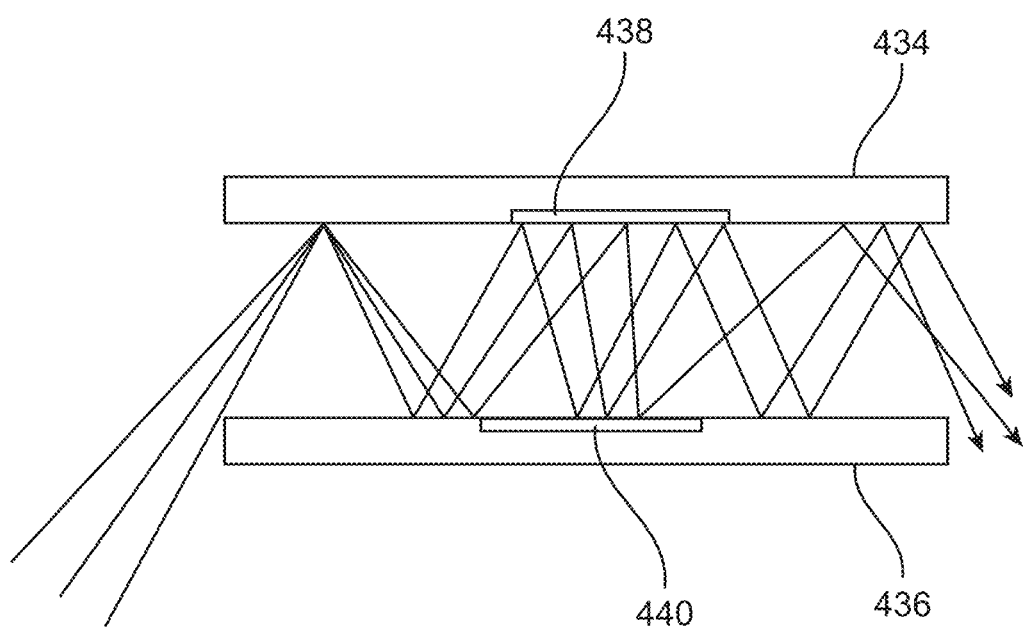

FIG. 14D illustrates a more complicated periscope type arrangement with up to four DMDs (422, 424, 426, 428) for SLM functionality and four lenses (414, 420, 416, 418); this configuration is designed to ensure that the image does not become flipped upside down as it travels through to the eye (58). FIG. 14E illustrates in embodiment wherein light may be reflected between two different DMD devices (430, 432) without any intervening lenses (the lenses in the above designs are useful in such configurations for incorporating image information from the real world), in a hall-of-mirrors type of arrangement wherein the display may be viewed through the "hall of mirrors" and operates in a mode substantially similar to that illustrated in FIG. 14A. FIG. 14F illustrates an embodiment wherein a the non-display portions of two facing DMD chips (434, 436) may be covered with a reflective layer to propagate light to and from active display regions (438, 440) of the DMD chips. In other embodiments, in place of DMDs for SLM functionality, arrays of sliding MEMS shutters (such as those available from vendors such as Pixtronics, a division of Qualcomm, Inc.) may be utilized to either pass or block light. In another embodiment, arrays of small louvers that move out of place to present light-transmitting apertures may similarly be aggregated for SLM functionality.

Figure 15A:
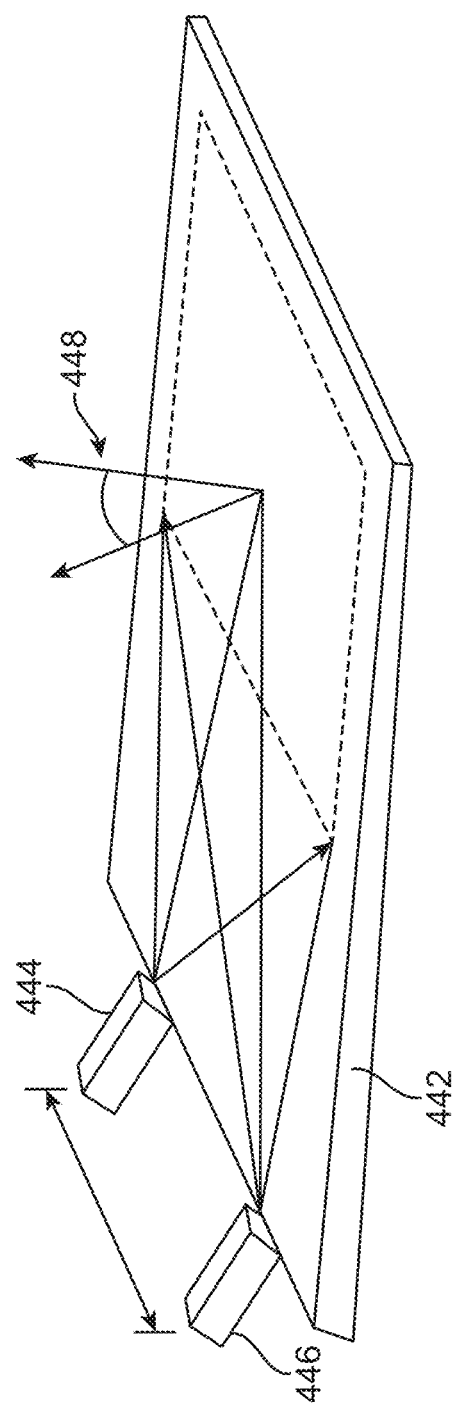
FIGS. 15A-15C illustrate the use of a wedge type waveguides along with a plurality of light sources, according to the illustrated embodiments.
Figure 15B:
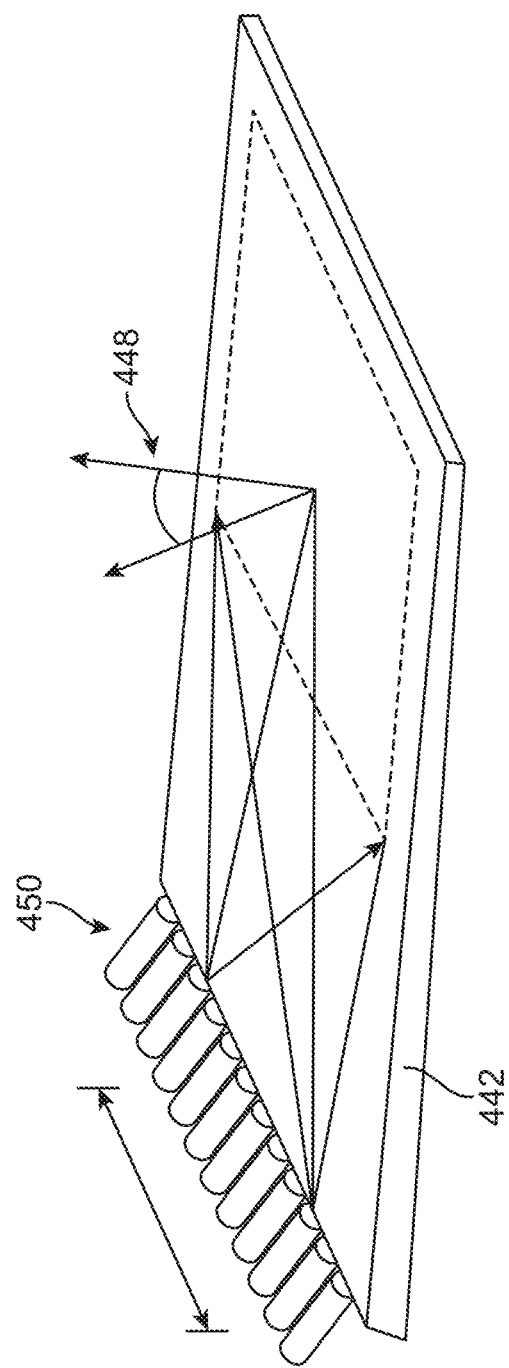
Figure 15C:
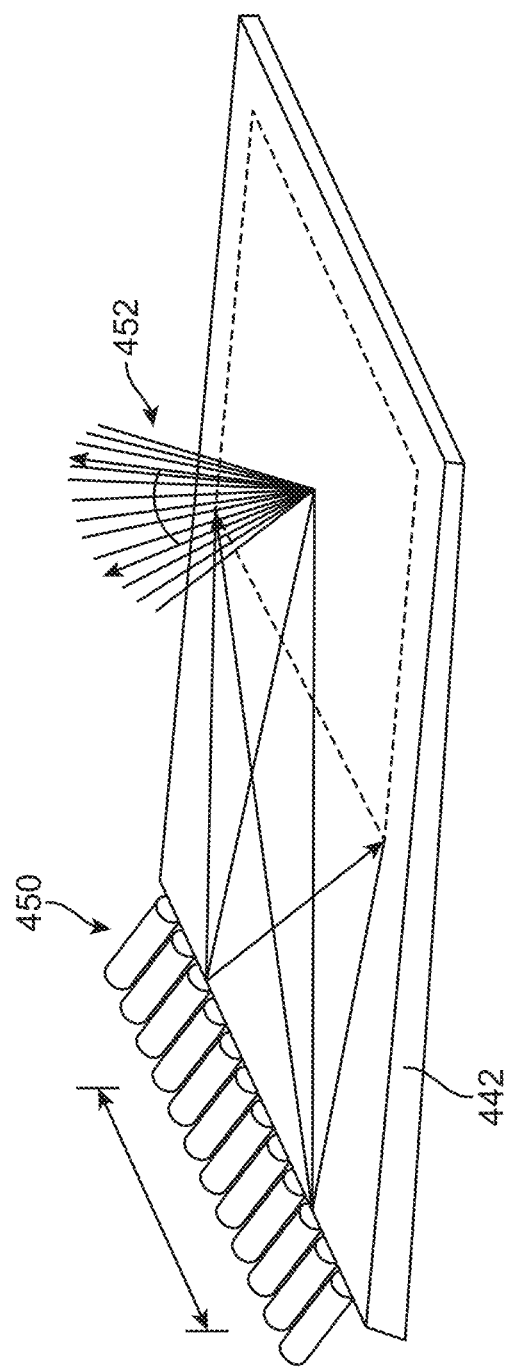

A lightfield of many small beamlets (say, less than about 0.5 mm in diameter) may be injected into and propagated through a waveguide or other optical system. For example, a conventional "birdbath" type of optical system may be suitable for transferring the light of a lightfield input, or a freeform optics design, as described below, or any number of waveguide configurations. FIGS. 15A-15C illustrate the use of a wedge type waveguide (442) along with a plurality of light sources as another configuration useful in creating a lightfield. Referring to FIG. 15A, light may be injected into the wedge-shaped waveguide (442) from two different locations/displays (444, 446), and will emerge according to the total internal reflection properties of the wedge-shaped waveguide at different angles (448) based upon the points of injection into the waveguide.

Referring to FIG. 15B, if one creates a linear array (450) of displays (such as scanning fiber displays) projecting into the end of the waveguide as shown, then a large angular diversity of beams (452) will be exiting the waveguide in one dimension, as shown in FIG. 15C. Indeed, if one contemplates adding yet another linear array of displays injecting into the end of the waveguide but at a slightly different angle, then an angular diversity of beams may be created that exits similarly to the fanned out exit pattern shown in FIG. 15C, but at an orthogonal axis; together these may be utilized to create a two-dimensional fan of rays exiting each location of the waveguide. Thus another configuration is presented for creating angular diversity to form a lightfield display using one or more scanning fiber display arrays (or alternatively using other displays which will meet the space requirements, such as miniaturized DLP projection configurations).

Alternatively, as an input to the wedge-shaped waveguides shown herein, a stack of SLM devices may be utilized, in which case rather than the direct view of SLM output as described above, the lightfield output from the SLM configuration may be used as an input to a configuration such as that shown in FIG. 15C. One of the key concepts here is that while a conventional waveguide is best suited to relay beams of collimated light successfully, with a lightfield of small-diameter collimated beams, conventional waveguide technology may be utilized to further manipulate the output of such a lightfield system as injected into the side of a waveguide, such as a wedge-shaped waveguide, due to the beam size/collimation.

In another related embodiment, rather than projecting with multiple separate displays, a multicore fiber may be used to generate a lightfield and inject it into the waveguide. Further, a time-varying lightfield may be utilized as an input, such that rather than creating a static distribution of beamlets coming out of a lightfield, one may have some dynamic elements that are methodically changing the path of the set of beams. They may be done using components such as waveguides with embedded DOEs (e.g., such as those described above in reference to FIGS. 8B-8N, or liquid crystal layers, as described in reference to FIG. 7B), wherein two optical paths are created (one smaller total internal reflection path wherein a liquid crystal layer is placed in a first voltage state to have a refractive index mismatch with the other substrate material that causes total internal reflection down just the other substrate material's waveguide; one larger total internal reflection optical path wherein the liquid crystal layer is placed in a second voltage state to have a matching refractive index with the other substrate material, so that the light totally internally reflects through the composite waveguide which includes both the liquid crystal portion and the other substrate portion). Similarly a wedge-shaped waveguide may be configured to have a bi-modal total internal reflection paradigm (for example, in one variation, wedge-shaped elements may be configured such that when a liquid crystal portion is activated, not only is the spacing changed, but also the angle at which the beams are reflected).

One embodiment of a scanning light display may be characterized simply as a scanning fiber display with a lens at the end of the scanned fiber. Many lens varieties are suitable, such as a GRIN lens, which may be used to collimate the light or to focus the light down to a spot smaller than the fiber's mode field diameter providing the advantage of producing a numerical aperture (or "NA") increase and circumventing the optical invariant, which is correlated inversely with spot size. Smaller spot size generally facilitates a higher resolution opportunity from a display perspective, which generally is preferred. In one embodiment, a GRIN lens may be long enough relative to the fiber that it may comprise the vibrating element (i.e., rather than the usual distal fiber tip vibration with a scanned fiber display)—a configuration which may be deemed a "scanned GRIN lens display".

In another embodiment, a diffractive lens may be utilized at the exit end of a scanning fiber display (i.e., patterned onto the fiber). In another embodiment, a curved mirror may be positioned on the end of the fiber that operates in a reflecting configuration. Essentially any of the configurations known to collimate and focus a beam may be used at the end of a scanning fiber to produce a suitable scanned light display.

Two significant utilities to having a lens coupled to or comprising the end of a scanned fiber (i.e., as compared to configurations wherein an uncoupled lens may be utilized to direct light after it exits a fiber) are a) the light exiting may be collimated to obviate the need to use other external optics to do so; b) the NA, or the angle of the cone at which light sprays out the end of the single-mode fiber core, may be increased, thereby decreasing the associated spot size for the fiber and increasing the available resolution for the display.

As described above, a lens such as a GRIN lens may be fused to or otherwise coupled to the end of an optical fiber or formed from a portion of the end of the fiber using techniques such as polishing. In one embodiment, a typical optical fiber with an NA of about 0.13 or 0.14 may have a spot size (also known as the "mode field diameter" for the optical fiber given the NA) of about 3 microns. This provides for relatively high resolution display possibilities given the industry standard display resolution paradigms (for example, a typical microdisplay technology such as LCD or organic light emitting diode, or "OLED" has a spot size of about 5 microns). Thus the aforementioned scanning light display may have ⅗ of the smallest pixel pitch available with a conventional display; further, using a lens at the end of the fiber, the aforementioned configuration may produce a spot size in the range of 1-2 microns.

In another embodiment, rather than using a scanned cylindrical fiber, a cantilevered portion of a waveguide (such as a waveguide created using microfabrication processes such as masking and etching, rather than drawn microfiber techniques) may be placed into scanning oscillatory motion, and may be fitted with lensing at the exit ends.

In another embodiment, an increased numerical aperture for a fiber to be scanned may be created using a diffuser (i.e., one configured to scatter light and create a larger NA) covering the exit end of the fiber. In one variation, the diffuser may be created by etching the end of the fiber to create small bits of terrain that scatter light; in another variation a bead or sandblasting technique, or direct sanding/scuffing technique may be utilized to create scattering terrain. In another variation, an engineered diffuser, similar to a diffractive element, may be created to maintain a clean spot size with desirable NA, which ties into the notion of using a diffractive lens, as noted above.

Figure 16A:
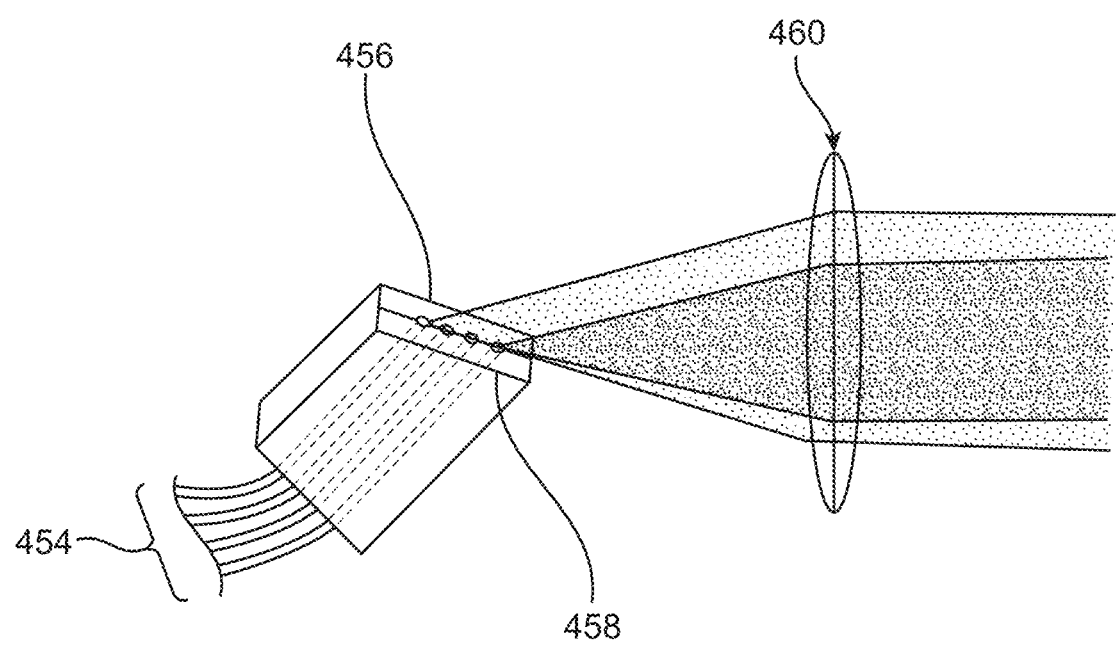
FIGS. 16A-16O illustrate embodiments of coupling optical elements to optical fibers, according to the illustrated embodiments.
Figure 16B:
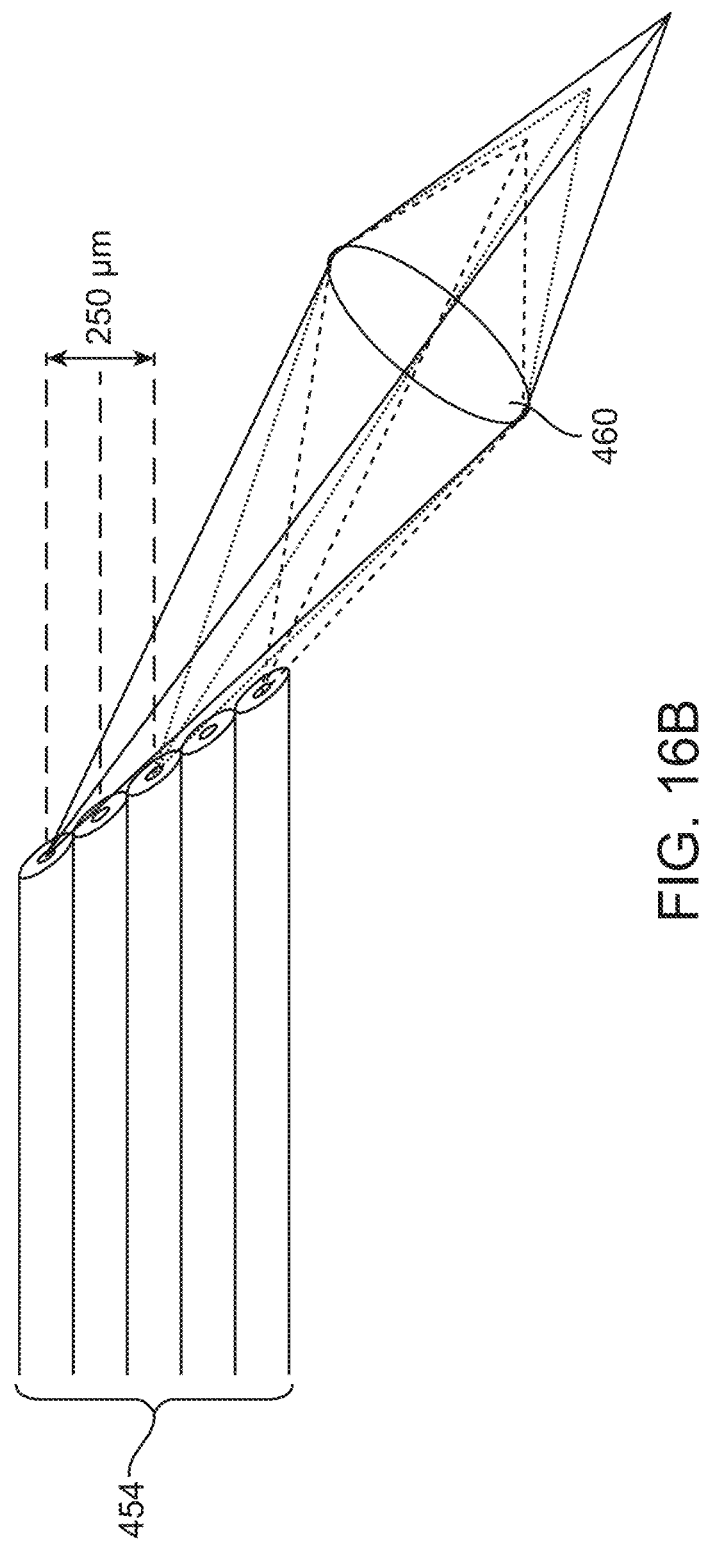

Referring to FIG. 16A, an array of optical fibers (454) is shown coupled in to a coupler (456) configured to hold them in parallel together so that their ends may be ground and polished to have an output edge at a critical angle (458; 42 degrees for most glass, for example) to the longitudinal axes of the input fibers, such that the light exiting the angled faces will exit as though it had been passing through a prism, and will bend and become nearly parallel to the surfaces of the polished faces. The beams exiting the fibers (454) in the bundle will become superimposed, but will be out of phase longitudinally due to the different path lengths (referring to FIG. 16B, for example, the difference in path lengths from angled exit face to focusing lens for the different cores is visible).

What was an X axis type of separation in the bundle before exit from the angled faces, will become a Z axis separation, a fact that is helpful in creating a multifocal light source from such a configuration. In another embodiment, rather than using a bundled/coupled plurality of single mode fibers, a multicore fiber, such as those available from Mitsubishi Cable Industries, Ltd. of Japan, may be angle polished.

In one embodiment, if a 45 degree angle is polished into a fiber and then covered with a reflective element, such as a mirror coating, the exiting light may be reflected from the polished surface and emerge from the side of the fiber (in one embodiment at a location wherein a flat-polished exit window has been created in the side of the fiber) such that as the fiber is scanned in what would normally be an X-Y Cartesian coordinate system axis, that fiber would now be functionally performing the equivalent of an X-Z scan, with the distance changing during the course of the scan. Such a configuration may be beneficially utilized to change the focus of the display as well.

Multicore fibers may be configured to play a role in display resolution enhancement (i.e., higher resolution). For example, in one embodiment, if separate pixel data is sent down a tight bundle of 19 cores in a multicore fiber, and that cluster is scanned around in a sparse spiral pattern with the pitch of the spiral being approximately equal to the diameter of the multicore, then sweeping around will effectively create a display resolution that is approximately 19× the resolution of a single core fiber being similarly scanned around. Indeed, it may be more practical to have the fibers more sparsely positioned relative to each other, as in the configuration of FIG. 16C, which has 7 clusters (464; 7 is used for illustrative purposes because it is an efficient tiling/hex pattern; other patterns or numbers may be utilized; for example, a cluster of 19; the configuration is scalable up or down) of 3 fibers each housed within a conduit (462).

Figure 16C:
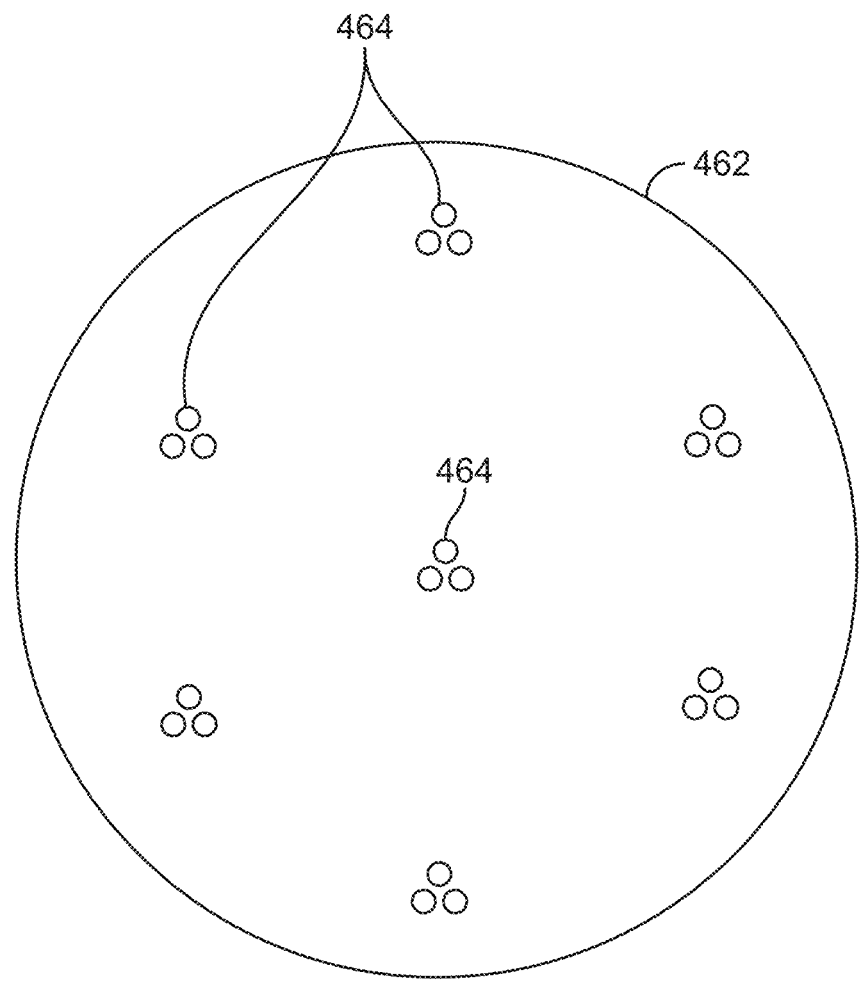

With a sparse configuration as shown in FIG. 16C, scanning of the multicore scans each of the cores through its own local region, as opposed to a configuration wherein the cores are all packed tightly together and scanned (wherein cores end up overlapping with scanning; if the cores are too close to each other, the NA of the core is not large enough and the very closely packed cores end up blurring together somewhat and not creating as discriminable a spot for display). Thus, for resolution increases, it is preferable to have sparse tiling rather than highly dense tiling, although both will work.

The notion that densely packed scanned cores can create blurring at the display may be utilized as an advantage in one embodiment wherein a plurality (say a triad or cores to carry red, green, and blue light) of cores may be intentionally packed together densely so that each triad forms a triad of overlapped spots featuring red, green, and blue light. With such a configuration, one is able to have an RGB display without having to combine red, green, and blue into a single-mode core, which is an advantage, because conventional mechanisms for combining a plurality (such as three) wavelets of light into a single core are subject to significant losses in optical energy. Referring to FIG. 16C, in one embodiment each tight cluster of 3 fiber cores contains one core that relays red light, one core that relays green light, and one core that relays blue light, with the 3 fiber cores close enough together that their positional differences are not resolvable by the subsequent relay optics, forming an effectively superimposed RGB pixel; thus, the sparse tiling of 7 clusters produces resolution enhancement while the tight packing of 3 cores within the clusters facilitates seamless color blending without the need to utilize glossy RGB fiber combiners (e.g., those using wavelength division multiplexing or evanescent coupling techniques).

Figure 16D:
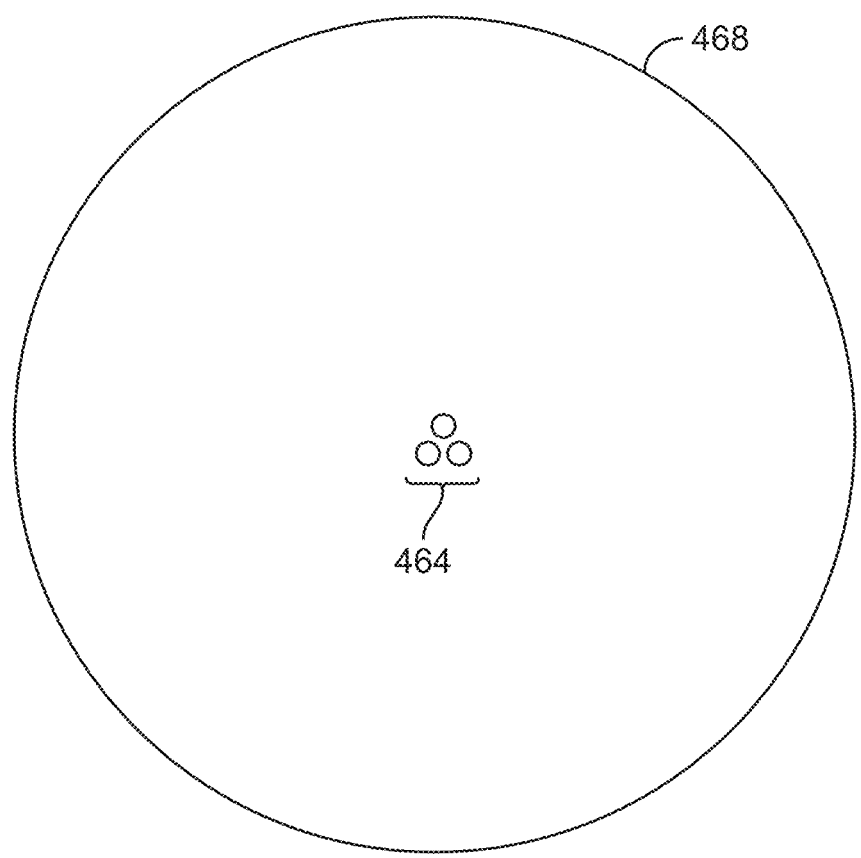
Figure 16E:
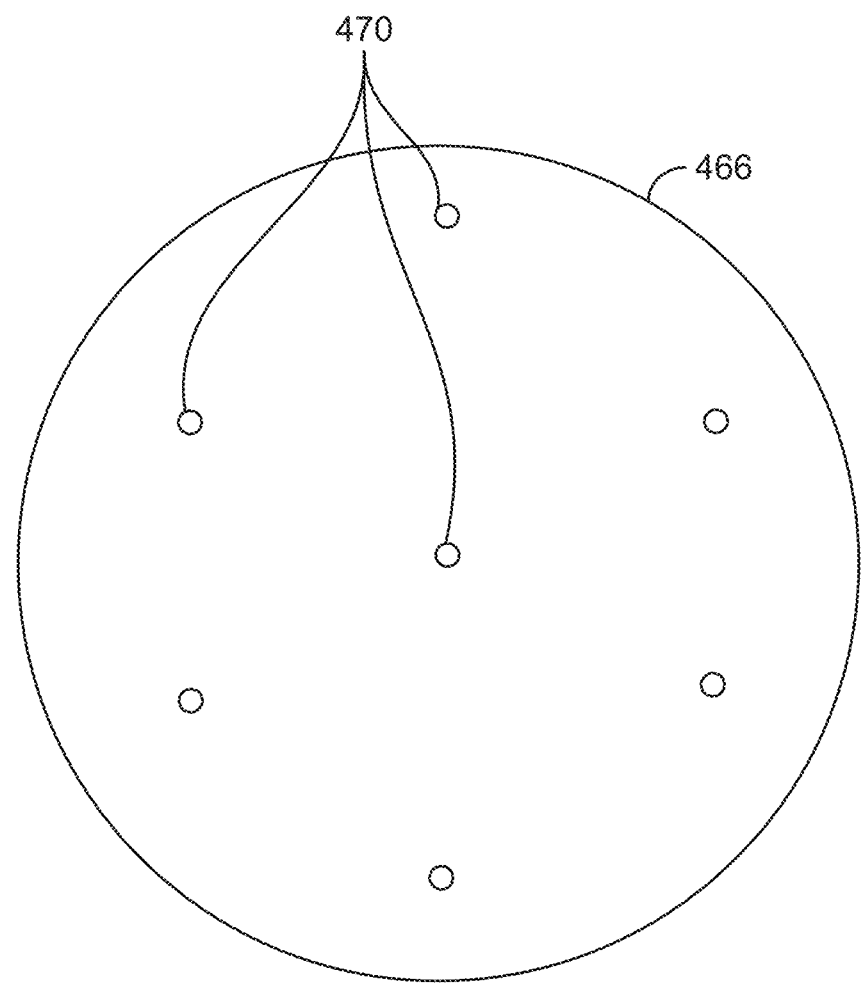

Referring to FIG. 16D, in another more simple variation, one may have just one cluster (464) housed in a conduit (468) for, say, red/green/blue (and in another embodiment, another core may be added for infrared for uses such as eye tracking). In another embodiment, additional cores may be placed in the tight cluster to carrying additional wavelengths of light to comprise a multi-primary display for increased color gamut. Referring to FIG. 16E, in another embodiment, a sparse array of single cores (470); in one variation with red, green, and blue combined down each of them) within a conduit (466) may be utilized; such a configuration is workable albeit somewhat less efficient for resolution increase, but not optimum for red/green/blue combining.

Multicore fibers also may be utilized for creating lightfield displays. Indeed, rather than keeping the cores separated enough from each other so that the cores do not scan on each other's local area at the display panel, as described above in the context of creating a scanning light display, with a lightfield display, it is desirable to scan around a densely packed plurality of fibers because each of the beams produced represents a specific part of the lightfield. The light exiting from the bundled fiber tips can be relatively narrow if the fibers have a small NA; lightfield configurations may take advantage of this and have an arrangement in which at the anatomic pupil, a plurality of slightly different beams are being received from the array. Thus there are optical configurations with scanning a multicore that are functionally equivalent to an array of single scanning fiber modules, and thus a lightfield may be created by scanning a multicore rather than scanning a group of single mode fibers.

In one embodiment, a multi-core phased array approach may be used to create a large exit pupil variable wavefront configuration to facilitate three-dimensional perception. A single laser configuration with phase modulators is described above. In a multicore embodiment, phase delays may be induced into different channels of a multicore fiber, such that a single laser's light is injected into all of the cores of the multicore configuration so that there is mutual coherence.

Figure 16F:
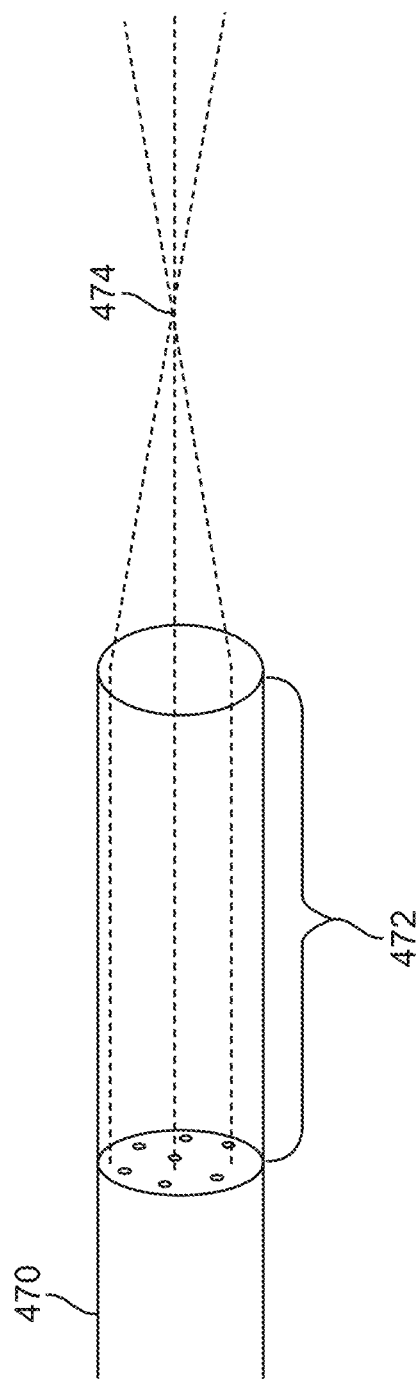

In one embodiment, a multi-core fiber may be combined with a lens, such as a GRIN lens. Such lens may be, for example, a refractive lens, diffractive lens, or a polished edge functioning as a lens. The lens may be a single optical surface, or may comprise multiple optical surfaces stacked up. Indeed, in addition to having a single lens that extends the diameter of the multicore, a smaller lenslet array may be desirable at the exit point of light from the cores of the multicore, for example. FIG. 16F shows an embodiment wherein a multicore fiber (470) is emitting multiple beams into a lens (472), such as a GRIN lens. The lens collects the beams down to a focal point (474) in space in front of the lens. In many conventional configurations, the beams would exit the multicore fiber as diverging. The GRIN or other lens is configured to function to direct them down to a single point and collimate them, such that the collimated result may be scanned around for a lightfield display, for instance.

Figure 16G:
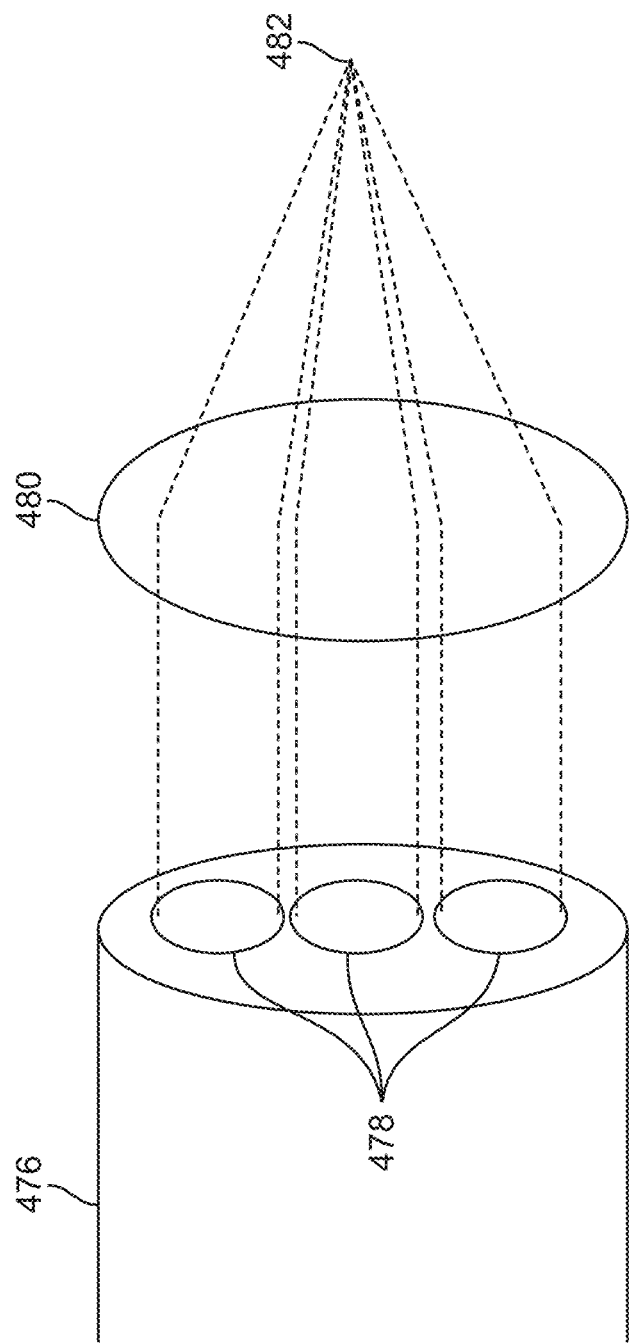

Referring to FIG. 16G, smaller lenses (478) may be placed in front of each of the cores of a multicore (476) configuration, and these lenses may be utilized to collimate; then a shared lens (480) may be configured to focus the collimated beams down to a diffraction limited spot (482) that is aligned for all of the three spots. The net result of such a configuration: by combining three collimated, narrow beams with narrow NA together as shown, one effectively combines all three into a much larger angle of emission which translates to a smaller spot size in, for example, a head mounted optical display system which may be next in the chain of light delivery to the user.

Figure 16H:
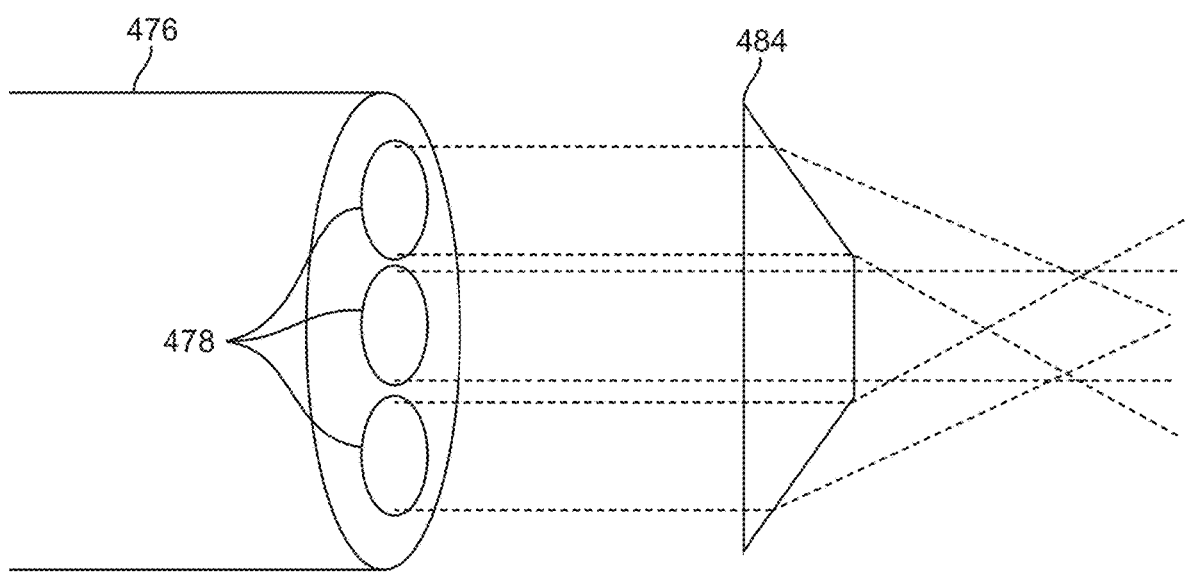

Referring to FIG. 16H, one embodiment features a multicore fiber (476) with a lenslet (478) array feeding the light to a small prism array (484) that deflects the beams generated by the individual cores to a common point. Alternatively one may have the small lenslet array shifted relative to the cores such that the light is being deflected and focused down to a single point. Such a configuration may be utilized to increase the numerical aperture.

Figure 16I:
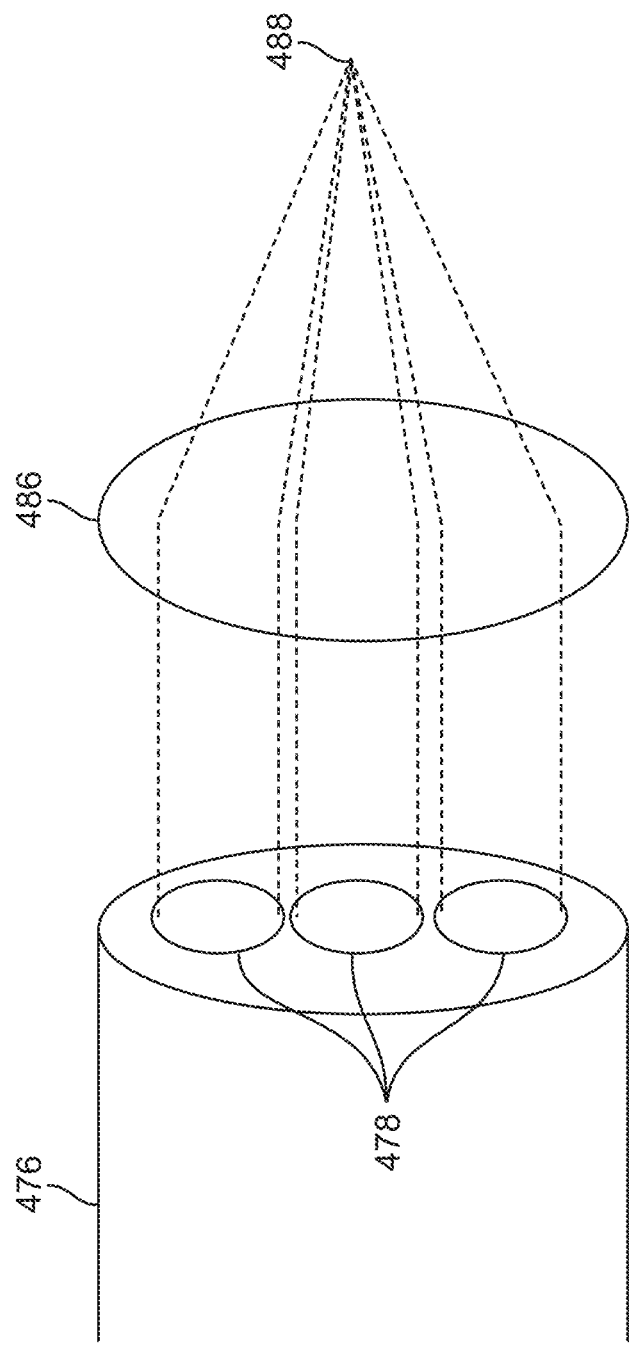

Referring to FIG. 16I, a two-step configuration is shown with a small lenslet (478) array capturing light from the multicore fiber (476), followed sequentially by a shared lens (486) to focus the beams to a single point (488). Such a configuration may be utilized to increase the numerical aperture. As discussed above, a larger NA corresponds to a smaller pixel size and higher possible display resolution.

Figure 16J:
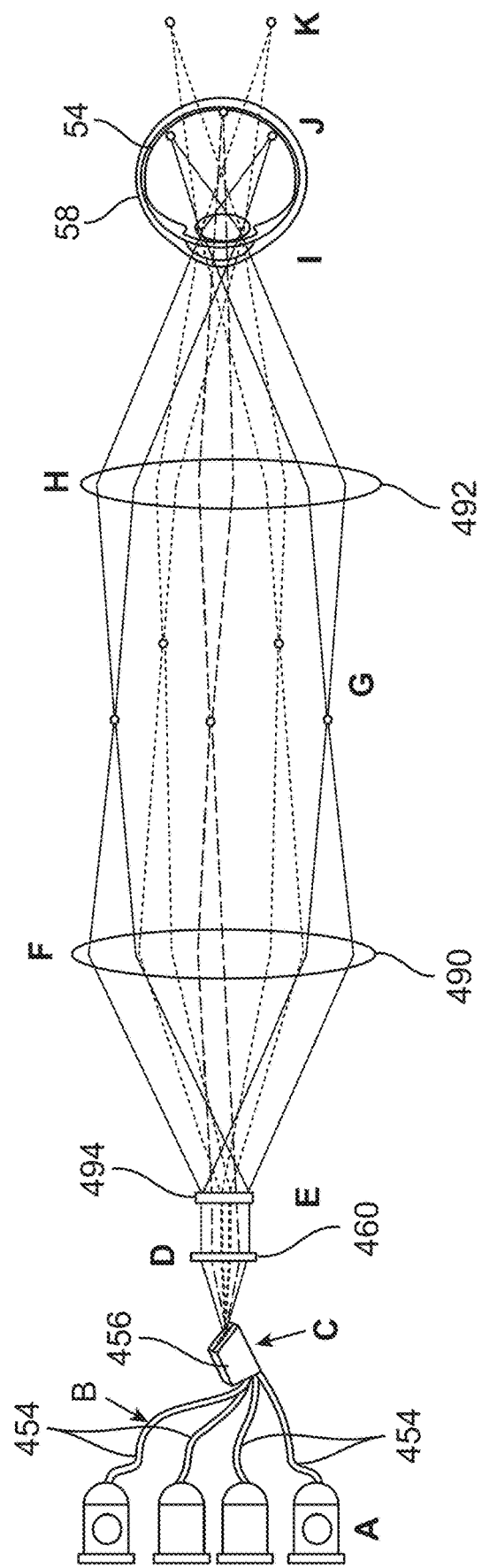

Referring to FIG. 16J, a beveled fiber array which may be held together with a coupler (456), such as those described above, may be scanned with a reflecting device (494; such as a DMD module of a DLP system). With multiple single fibers (454) coupled into the array, or a multicore instead, the superimposed light can be directed through one or more focusing lenses (490, 492) to create a multifocal beam; with the superimposing and angulation of the array, the different sources are different distances from the focusing lens, which creates different focus levels in the beams as they emerge from the lens (492) and are directed toward the retina (54) of the eye (58) of the user. For example, the farthest optical route/beam may be set up to be a collimated beam representative of optical infinity focal positions. Closer routes/beams may be associated with diverging spherical wavefronts of closer focal locations.

The multifocal beam may be passed into a scanning mirror which may be configured to create a raster scan (or, for example, a Lissajous curve scan pattern or a spiral scan pattern) of the multifocal beam which may be passed through a series of focusing lenses and then to the cornea and crystalline lens of the eye. The various beams emerging from the lenses are creating different pixels or voxels of varying focal distances that are superimposed.

Figure 16K:
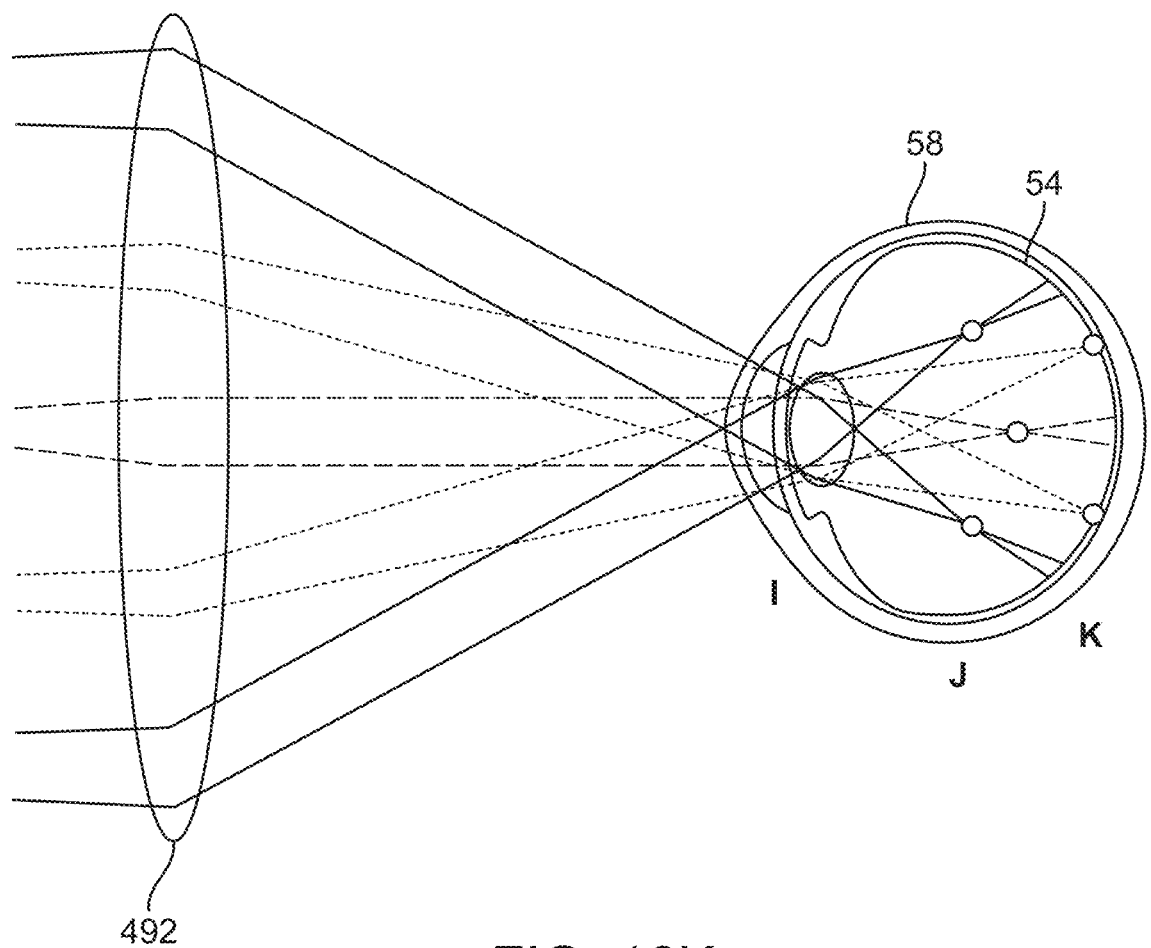
Figure 16L:
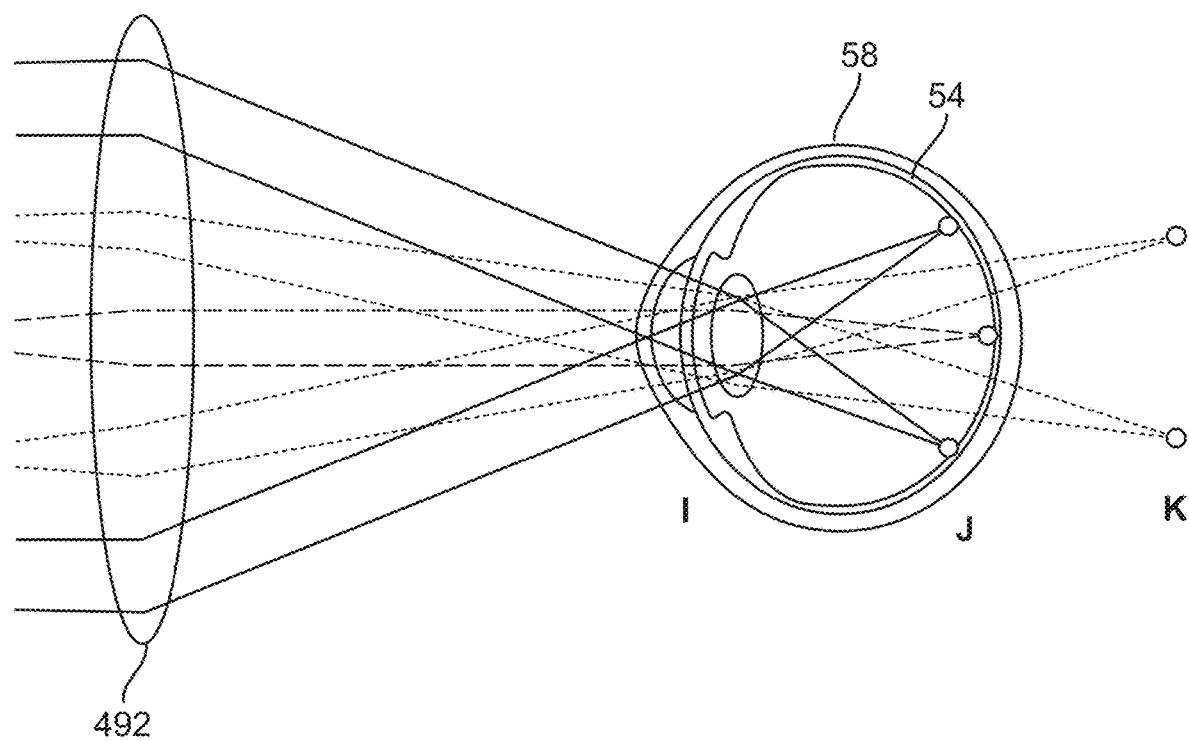

In one embodiment, one may write different data to each of the light modulation channels at the front end, thereby creating an image that is projected to the eye with one or more focus elements. By changing the focal distance of the crystalline lens (i.e., by accommodating), the user can bring different incoming pixels into and out of focus, as shown in FIGS. 16K and 16L wherein the crystalline lens is in different Z axis positions. In another embodiment, the fiber array may be actuated/moved around by a piezoelectric actuator. In another embodiment, a relatively thin ribbon array may be resonated in cantilevered form along the axis perpendicular to the arrangement of the array fibers (i.e., in the thin direction of the ribbon) when a piezoelectric actuator is activated. In one variation, a separate piezoelectric actuator may be utilized to create a vibratory scan in the orthogonal long axis. In another embodiment, a single mirror axis scan may be employed for a slow scan along the long axis while the fiber ribbon is vibrated resonantly.

Figure 16M:
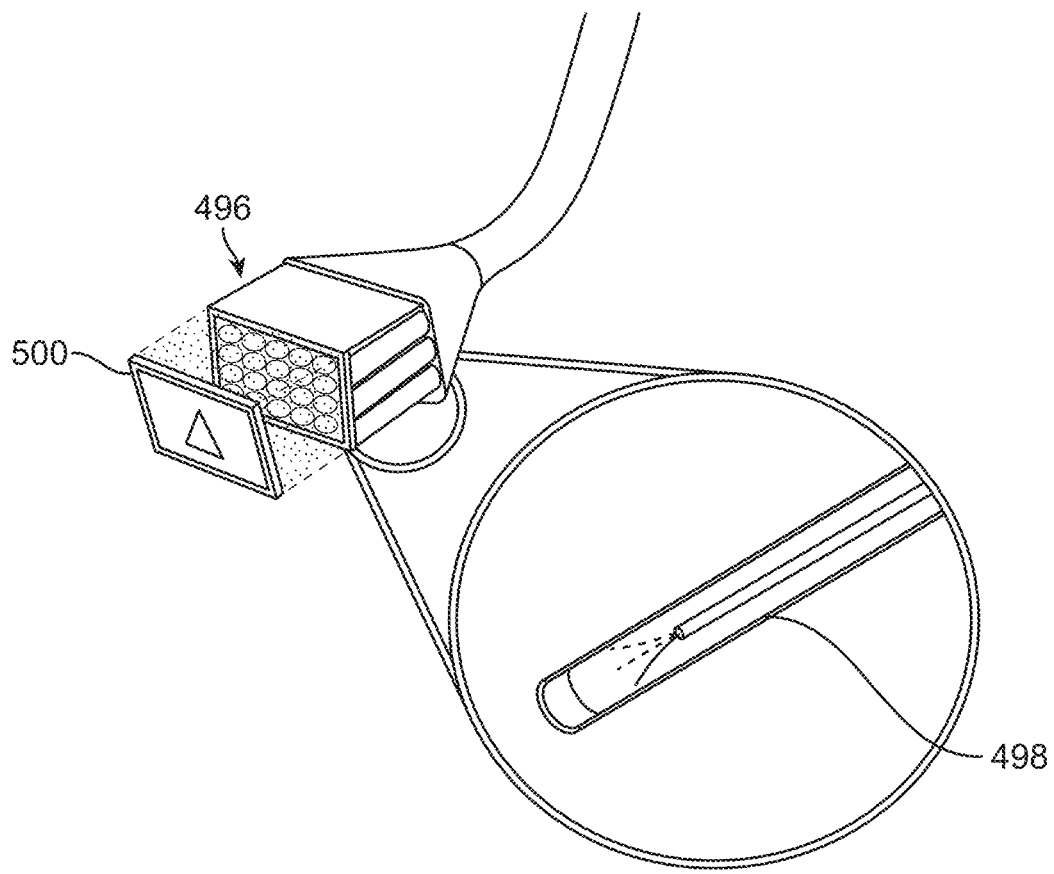
Figure 16N:
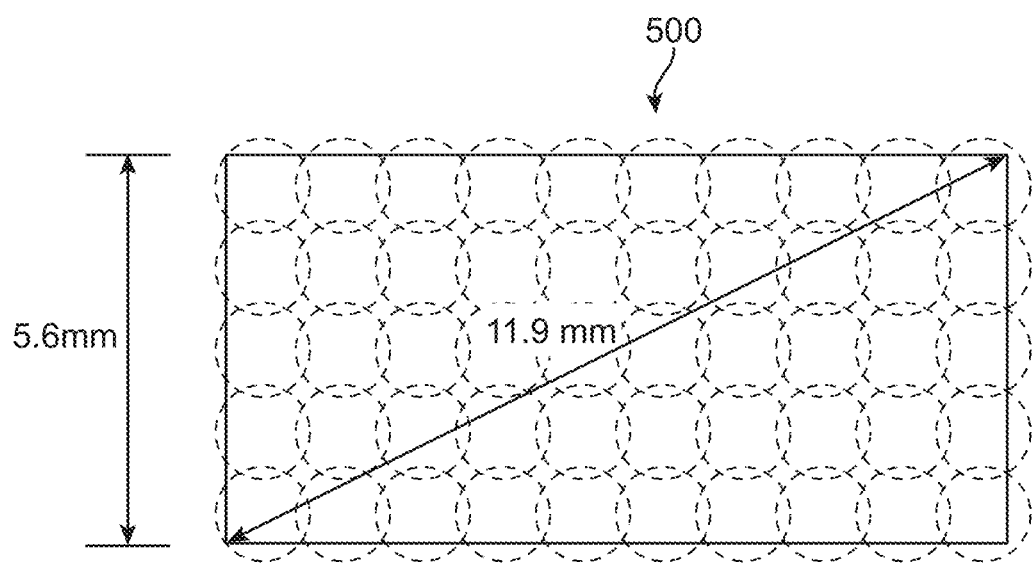

Referring to FIG. 16M, an array (496) of scanning fiber displays (498) may be beneficially bundled/tiled for an effective resolution increase, the notion being that with such as configuration, each scanning fiber of the bundle is configured to write to a different portion of the image plane (500), as shown, for example, in FIG. 16N, wherein each portion of the image plane is addressed by the emissions from a least one bundle. In other embodiments, optical configurations may be utilized that allow for slight magnification of the beams as they exit the optical fiber so that there is some overlap in the hexagonal, or other lattice pattern, that hits the display plane, so there is a better fill factor while also maintaining an adequately small spot size in the image plane and understanding that there is a subtle magnification in that image plane.

Rather than having individual lenses at the end of each scanned fiber enclosure housing, in one embodiment a monolithic lenslet array may be utilized, so that the lenses can be as closely packed as possible, which allows for even smaller spot sizes in the image plane because one may use a lower amount of magnification in the optical system. Thus arrays of fiber scan displays may be used to increase the resolution of the display, or in other words, they may be used to increase the field of view of the display, because each engine is being used to scan a different portion of the field of view.

For a lightfield configuration, the emissions may be more desirably overlapped at the image plane. In one embodiment, a lightfield display may be created using a plurality of small diameter fibers scanned around in space. For example, instead of having all of the fibers address a different part of an image plane as described above, have more overlapping, more fibers angled inward, etc., or change the focal power of the lenses so that the small spot sizes are not conjugate with a tiled image plane configuration. Such a configuration may be used to create a lightfield display to scan lots of smaller diameter rays around that become intercepted in the same physical space.

Referring back to FIG. 12B, it was discussed that one way of creating a lightfield display involves making the output of the elements on the left collimated with narrow beams, and then making the projecting array conjugate with the eye pupil on the right.

Figure 16O:
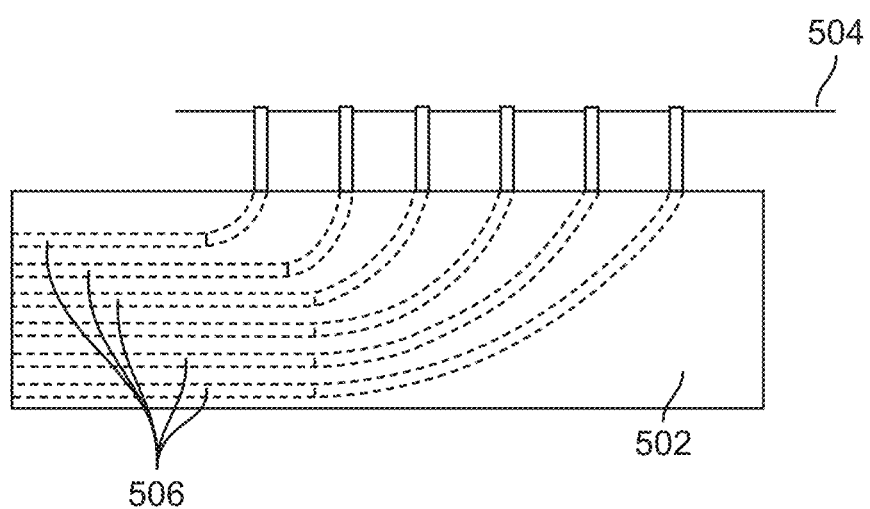

Referring to FIG. 16O, with a common substrate block (502), a single actuator may be utilized to actuate a plurality of fibers (506) in unison together. A similar configuration is discussed above in reference to FIGS. 13-C-1 and 13-C-2. It may be practically difficult to have all of the fibers retain the same resonant frequency, vibrate in a desirable phase relationship to each other, or have the same dimensions of cantilevering from the substrate block. To address this challenge, the tips of the fibers may be mechanically coupled with a lattice or sheet (504), such as a graphene sheet that is very thin, rigid, and light in weight. With such a coupling, the entire array may vibrate similarly and have the same phase relationship. In another embodiment a matrix of carbon nanotubes may be utilized to couple the fibers, or a piece of very thin planar glass (such as the kind used in creating liquid crystal display panels) may be coupled to the fiber ends. Further, a laser or other precision cutting device may be utilized to cut all associated fibers to the same cantilevered length.

Figure 17:
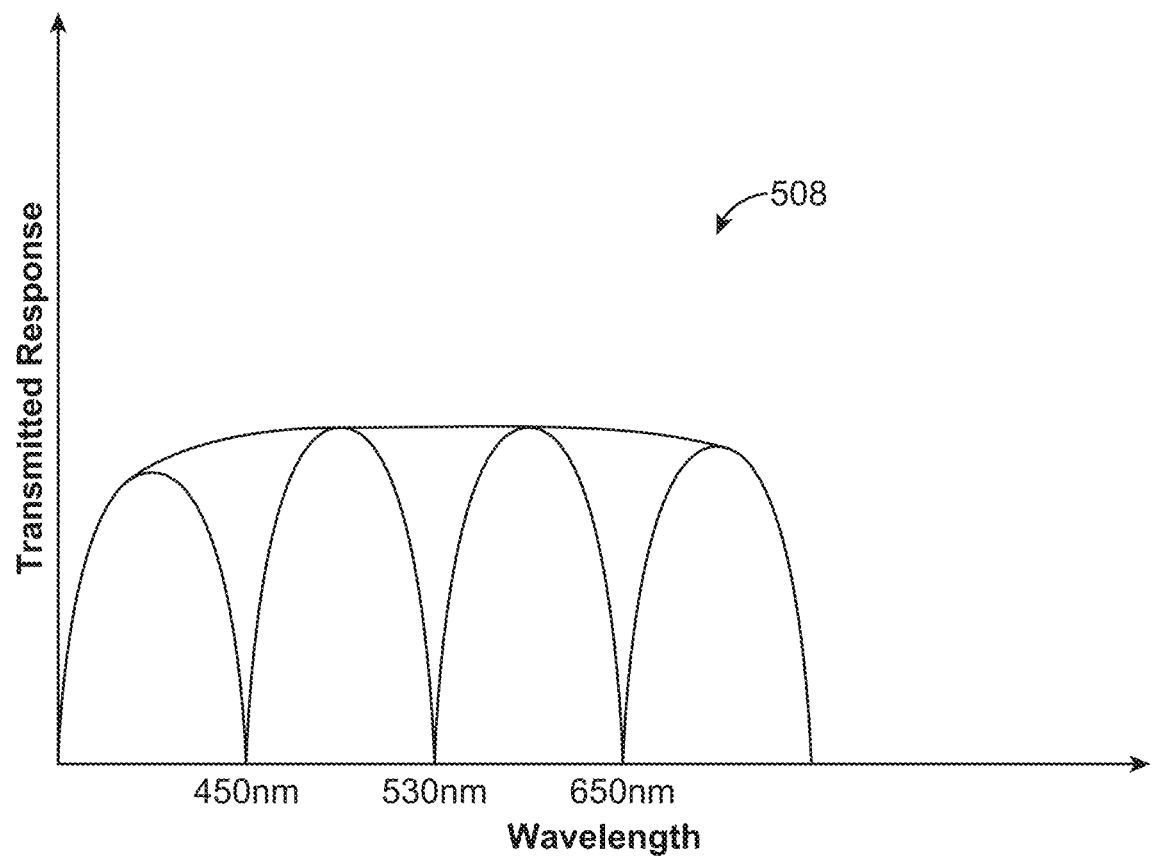
FIG. 17 illustrates a notch filter, according to one illustrated embodiment.

Referring to FIG. 17, in one embodiment it may be desirable to have a contact lens directly interfaced with the cornea, and configured to facilitate the eye focusing on a display that is quite close (such as the typical distance between a cornea and an eyeglasses lens). Rather than placing an optical lens as a contact lens, in one variation the lens may comprise a selective filter. FIG. 17 depicts a plot (508) what may be deemed a "notch filter", due to its design to block only certain wavelength bands, such as 450 nm (peak blue), 530 nm (green), and 650 nm, and generally pass or transmit other wavelengths. In one embodiment several layers of dielectric coatings may be aggregated to provide the notch filtering functionality.

Such a filtering configuration may be coupled with a scanning fiber display that is producing a very narrow band illumination for red, green, and blue, and the contact lens with the notch filtering will block out all of the light coming from the display (such as a minidisplay, such as an OLED display, mounted in a position normally occupied by an eyeglasses lens) except for the transmissive wavelengths. A narrow pinhole may be created in the middle of the contact lens filtering layers/film such that the small aperture (i.e., less than about 1.5 mm diameter) does allow passage of the otherwise blocked wavelengths. Thus a pinhole lens configuration is created that functions in a pinhole manner for red, green, and blue only to intake images from the minidisplay, while light from the real world, which generally is broadband illumination, will pass through the contact lens relatively unimpeded. Thus a large depth of focus virtual display configuration may be assembled and operated. In another embodiment, a collimated image exiting from a waveguide would be visible at the retina because of the pinhole large-depth-of-focus configuration.

It may be useful to create a display that can vary its depth of focus over time. For example, in one embodiment, a display may be configured to have different display modes that may be selected (preferably rapidly toggling between the two at the command of the operator) by an operator, such as a first mode combining a very large depth of focus with a small exit pupil diameter (i.e., so that everything is in focus all of the time), and a second mode featuring a larger exit pupil and a more narrow depth of focus. In operation, if a user is to play a three-dimensional video game with objects to be perceived at many depths of field, the operator may select the first mode; alternatively, if a user is to type in a long essay (i.e., for a relatively long period of time) using a two-dimensional word processing display configuration, it may be more desirable to switch to the second mode to have the convenience of a larger exit pupil, and a sharper image.

In another embodiment, it may be desirable to have a multi-depth of focus display configuration wherein some subimages are presented with a large depth of focus while other subimages are presented with small depth of focus. For example, one configuration may have red wavelength and blue wavelength channels presented with a very small exit pupil so that they are always in focus. Then, a green channel only may be presented with a large exit pupil configuration with multiple depth planes (i.e., because the human accommodation system tends to preferentially target green wavelengths for optimizing focus level). Thus, in order to cut costs associated with having too many elements to represent with full depth planes in red, green, and blue, the green wavelength may be prioritized and represented with various different wavefront levels. Red and blue may be relegated to being represented with a more Maxwellian approach (and, as described above in reference to Maxwellian displays, software may be utilized to induce Gaussian levels of blur). Such a display would simultaneously present multiple depths of focus.

As described above, there are portions of the retina which have a higher density of light sensors. The fovea portion, for example, generally is populated with approximately 120 cones per visual degree. Display systems have been created in the past that use eye or gaze tracking as an input, and to save computation resources by only creating really high resolution rendering for where the person is gazing at the time, while lower resolution rendering is presented to the rest of the retina; the locations of the high versus low resolution portions may be dynamically slaved to the tracked gaze location in such a configuration, which may be termed a "foveated display".

Figure 18:
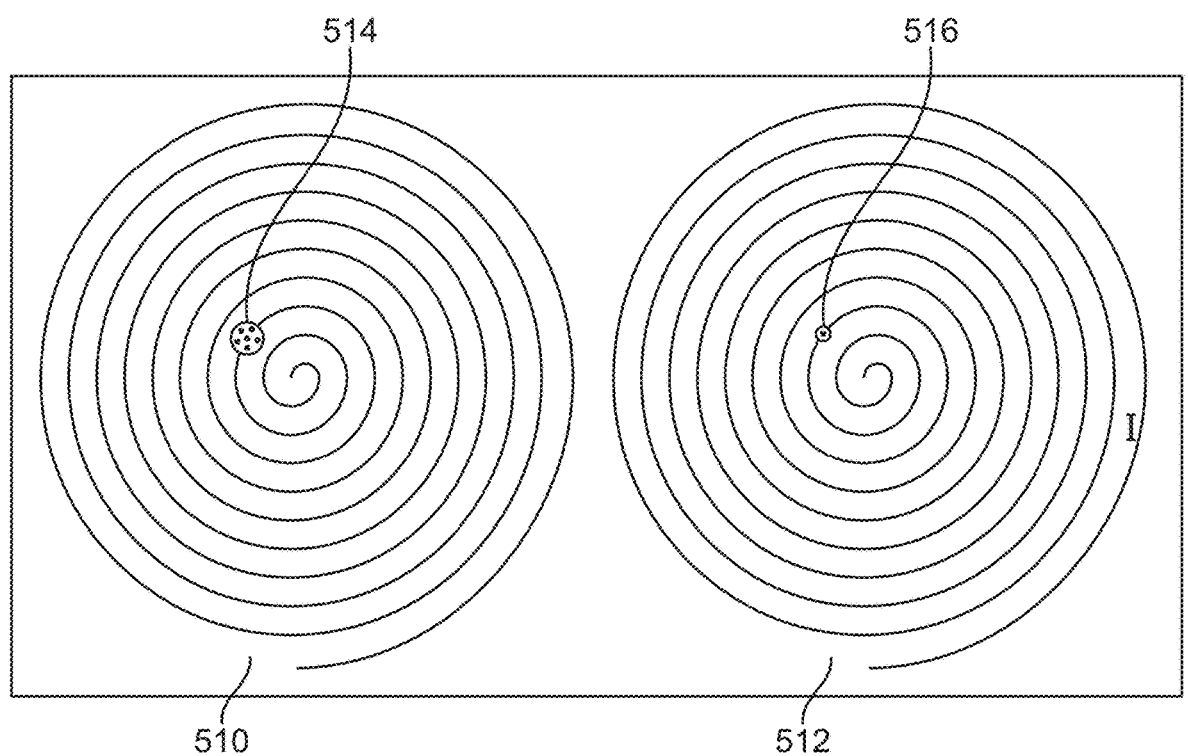
FIG. 18 illustrates a spiral pattern of a fiber scanning display, according to one illustrated embodiment.

An improvement on such configurations may comprise a scanning fiber display with pattern spacing that may be dynamically slaved to tracked eye gaze. For example, with a typical scanning fiber display operating in a spiral pattern, as shown in FIG. 18 (the leftmost portion 510 of the image in FIG. 18 illustrates a spiral motion pattern of a scanned multicore fiber 514; the rightmost portion 512 of the image in FIG. 18 illustrates a spiral motion pattern of a scanned single fiber 516 for comparison), a constant pattern pitch provides for a uniform display resolution.

In a foveated display configuration, a non-uniform scanning pitch may be utilized, with smaller/tighter pitch (and therefore higher resolution) dynamically slaved to the detected gaze location. For example, if the user's gaze was detected as moving toward the edge of the display screen, the spirals may be clustered more densely in such location, which would create a toroid-type scanning pattern for the high-resolution portions, and the rest of the display being in a lower-resolution mode. In a configuration wherein gaps may be created in the portions of the display in a lower-resolution mode, blur could be intentionally dynamically created to smooth out the transitions between scans, as well as between transitions from high-resolution to lower-resolution scan pitch.

The term lightfield may be used to describe a volumetric 3-D representation of light traveling from an object to a viewer's eye. However, an optical see-through display can only reflect light to the eye, not the absence of light, and ambient light from the real world will add to any light representing a virtual object. That is, if a virtual object presented to the eye contains a black or very dark portion, the ambient light from the real world may pass through that dark portion and obscure that it was intended to be dark.

It is nonetheless desirable to be able to present a dark virtual object over a bright real background, and for that dark virtual object to appear to occupy a volume at a desired viewing distance; i.e., it is useful to create a "darkfield" representation of that dark virtual object, in which the absence of light is perceived to be located at a particular point in space. With regard to occlusion elements and the presentation of information to the eye of the user so that he or she can perceive darkfield aspects of virtual objects, even in well lighted actual environments, certain aspects of the aforementioned spatial light modulator, or "SLM", configurations are pertinent. As described above, with a light-sensing system such as the eye, one way to get selective perception of dark field to selectively attenuate light from such portions of the display, because the subject display systems are about manipulation and presentation of light; in other words, darkfield cannot be specifically projected—it's the lack of illumination that may be perceived as darkfield, and thus, configurations for selective attenuation of illumination have been developed.

Referring back to the discussion of SLM configurations, one way to selectively attenuate for a darkfield perception is to block all of the light coming from one angle, while allowing light from other angles to be transmitted. This may be accomplished with a plurality of SLM planes comprising elements such as liquid crystal (which may not be the most optimal due to its relatively low transparency when in the transmitting state), DMD elements of DLP systems (which have relative high transmission/reflection ratios when in such mode), and MEMS arrays or shutters that are configured to controllably shutter or pass light radiation, as described above.

With regard to suitable liquid crystal display ("LCD") configurations, a cholesteric LCD array may be utilized for a controlled occlusion/blocking array. As opposed to the conventional LCD paradigm wherein a polarization state is changed as a function of voltage, with a cholesteric LCD configuration, a pigment is being bound to the liquid crystal molecule, and then the molecule is physically tilted in response to an applied voltage. Such a configuration may be designed to achieve greater transparency when in a transmissive mode than conventional LCD, and a stack of polarizing films is not needed as it is with conventional LCD.

In another embodiment, a plurality of layers of controllably interrupted patterns may be utilized to controllably block selected presentation of light using moire effects. For example, in one configuration, two arrays of attenuation patterns, each of which may comprise, for example, fine-pitched sine waves printed or painted upon a transparent planar material such as a glass substrate, may be presented to the eye of a user at a distance close enough that when the viewer looks through either of the patterns alone, the view is essentially transparent, but if the viewer looks through both patterns lined up in sequence, the viewer will see a spatial beat frequency moire attenuation pattern, even when the two attenuation patterns are placed in sequence relatively close to the eye of the user.

The beat frequency is dependent upon the pitch of the patterns on the two attenuation planes, so in one embodiment, an attenuation pattern for selectively blocking certain light transmission for darkfield perception may be created using two sequential patterns, each of which otherwise would be transparent to the user, but which together in series create a spatial beat frequency moire attenuation pattern selected to attenuate in accordance with the darkfield perception desired in the augmented reality system.

In another embodiment a controlled occlusion paradigm for darkfield effect may be created using a multi-view display style occluder. For example, one configuration may comprise one pin-holed layer that fully occludes with the exception of small apertures or pinholes, along with a selective attenuation layer in series, which may comprise an LCD, DLP system, or other selective attenuation layer configuration, such as those described above. In one scenario, with the pinhole array placed at a typical eyeglasses lens distance from the cornea (about 30 mm), and with a selective attenuation panel located opposite the pinhole array from the eye, a perception of a sharp mechanical edge out in space may be created. In essence, if the configuration will allow certain angles of light to pass, and others to be blocked or occluded, than a perception of a very sharp pattern, such as a sharp edge projection, may be created. In another related embodiment, the pinhole array layer may be replaced with a second dynamic attenuation layer to provide a somewhat similar configuration, but with more controls than the static pinhole array layer (the static pinhole layer could be simulated, but need not be).

In another related embodiment, the pinholes may be replaced with cylindrical lenses. The same pattern of occlusion as in the pinhole array layer configuration may be achieved, but with cylindrical lenses, the array is not restricted to the very tiny pinhole geometries. To prevent the eye from being presented with distortions due to the lenses when viewing through to the real world, a second lens array may be added on the side of the aperture or lens array opposite of the side nearest the eye to compensate and provide the view-through illumination with basically a zero power telescope configuration.

In another embodiment, rather than physically blocking light for occlusion and creation of darkfield perception, the light may be bent or bounced, or a polarization of the light may be changed if a liquid crystal layer is utilized. For example, in one variation, each liquid crystal layer may act as a polarization rotator such that if a patterned polarizing material is incorporated on one face of a panel, then the polarization of individual rays coming from the real world may be selectively manipulated so they catch a portion of the patterned polarizer. There are polarizers known in the art that have checkerboard patterns wherein half of the "checker boxes" have vertical polarization and the other half have horizontal polarization. In addition, if a material such as liquid crystal is used in which polarization may be selectively manipulated, light may be selectively attenuated with this.

As described above, selective reflectors may provide greater transmission efficiency than LCD. In one embodiment, if a lens system is placed such that it takes light coming in from the real world and focuses a plane from the real world onto an image plane, and if a DMD (i.e., DLP technology) is placed at that image plane to reflect light when in an "on" state towards another set of lenses that pass the light to the eye, and those lenses also have the DMD at their focal length, the one may create an attenuation pattern that is in focus for the eye. In other words, DMDs may be used in a selective reflector plane in a zero magnification telescope configuration, such as is shown in FIG. 19A, to controllably occlude and facilitate creating darkfield perception.

Figure 19A:
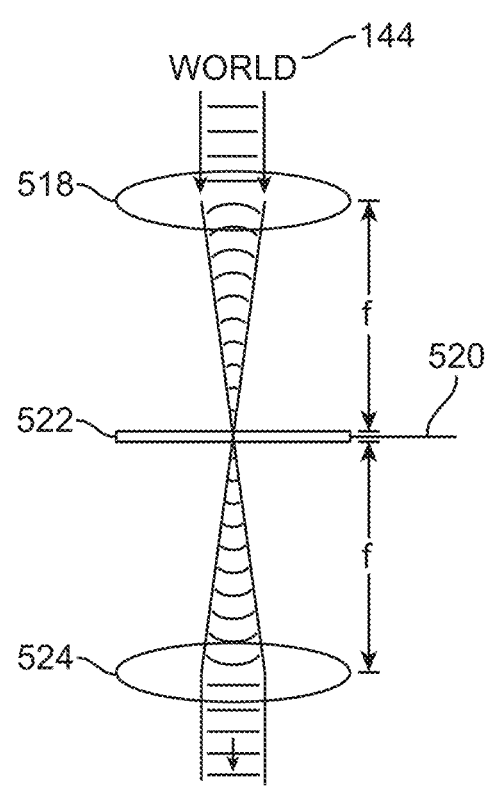
FIGS. 19A-19N illustrate occlusion effects in presenting a darkfield to a user, according to the illustrated embodiments.

As shown in FIG. 19A, a lens (518) is taking light from the real world (144) and focusing it down to an image plane (520); if a DMD (or other spatial attenuation device) (522) is placed at the focal length of the lens (i.e., at the image plane 520), the lens (518) is going to take whatever light is coming from optical infinity and focus that onto the image plane (520). Then the spatial attenuator (522) may be utilized to selectively block out things that are to be attenuated. FIG. 19A shows the attenuator DMDs in the transmissive mode wherein they pass the beams shown crossing the device. The image is then placed at the focal length of the second lens (524). Preferably the two lenses (518, 524) have the same focal power so they end up being a zero-power telescope, or a "relay", that does not magnify views to the real world (144). Such a configuration may be used to present unmagnified views of the world while also allowing selective blocking/attenuation of certain pixels.

Figure 19B:
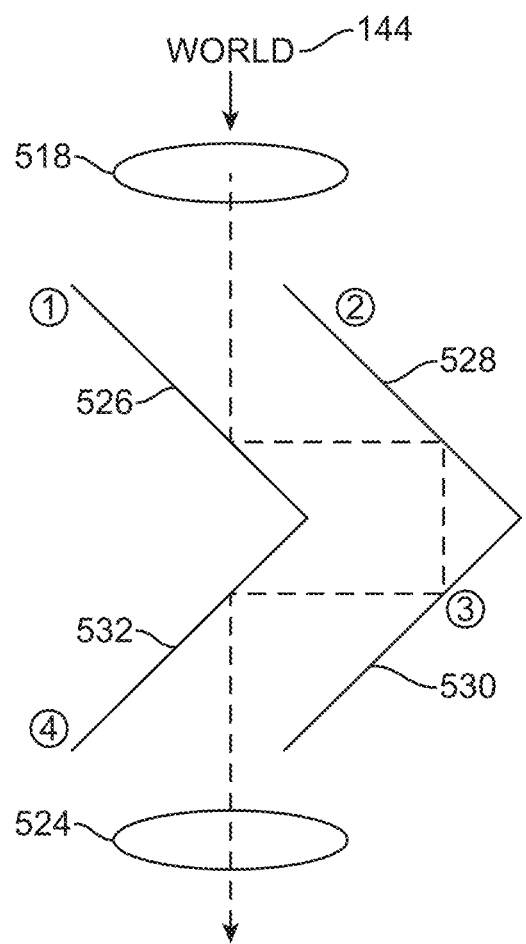
Figure 19C:
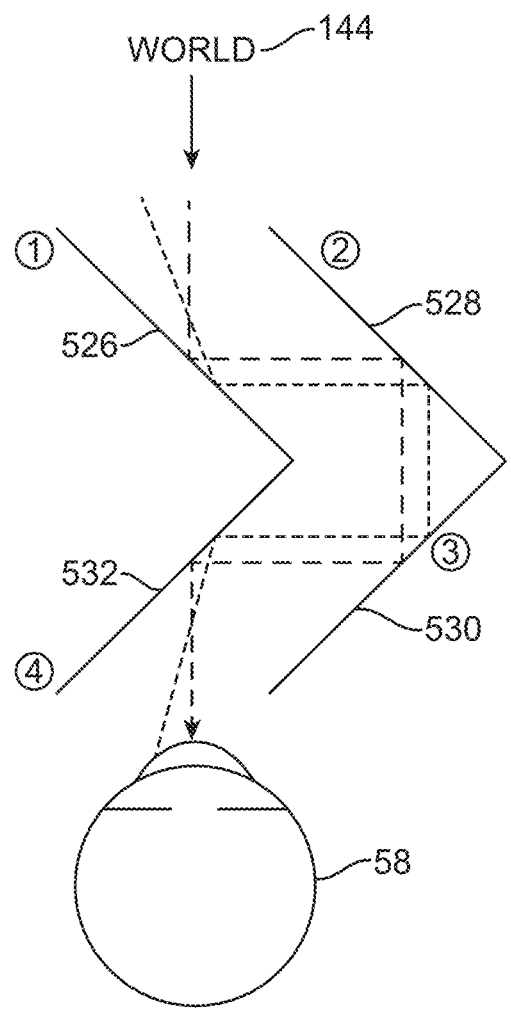

In another embodiment, as shown in FIGS. 19B and 19C, additional DMDs may be added such that light reflects from each of four DMDs (526, 528, 530, 532) before passing to the eye. FIG. 19B shows an embodiment with two lenses preferably with the same focal power (focal length "F") placed at a 2F relationship from one another (the focal length of the first being conjugate to the focal length of the second) to have the zero-power telescope effect; FIG. 19C shows an embodiment without lenses. The angles of orientation of the four reflective panels (526, 528, 530, 532) in the depicted embodiments of FIGS. 19B and 19C are shown to be around 45 degrees for simple illustration purposes, but specific relative orientation is required (for example, a typical DMD reflect at about a 12 degree angle).

In another embodiment, the panels may also be ferroelectric, or may be any other kind of reflective or selective attenuator panel or array. In one embodiment similar to those depicted in FIGS. 19B and 19C, one of the three reflector arrays may be a simple mirror, such that the other 3 are selective attenuators, thus still providing three independent planes to controllably occlude portions of the incoming illumination in furtherance of darkfield perception. By having multiple dynamic reflective attenuators in series, masks at different optical distances relative to the real world may be created.

Alternatively, referring back to FIG. 19C, one may create a configuration wherein one or more DMDs are placed in a reflective periscope configuration without any lenses. Such a configuration may be driven in lightfield algorithms to selectively attenuate certain rays while others are passed.

In another embodiment, a DMD or similar matrix of controllably movable devices may be created upon a transparent substrate as opposed to a generally opaque substrate, for use in a transmissive configuration such as virtual reality.

In another embodiment, two LCD panels may be utilized as lightfield occluders. In one variation, they may be thought of as attenuators due to their attenuating capability as described above; alternatively they may be considered polarization rotators with a shared polarizer stack. Suitable LCDs may comprise components such as blue phase liquid crystal, cholesteric liquid crystal, ferroelectric liquid crystal, and/or twisted nematic liquid crystal.

One embodiment may comprise an array of directionally-selective occlusion elements, such as a MEMS device featuring a set of louvers that can change rotation such that they pass the majority of light that is coming from a particular angle, but are presenting more of a broad face to light that is coming from a different angle (somewhat akin to the manner in which plantation shutters may be utilized with a typical human scale window). The MEMS/louvers configuration may be placed upon an optically transparent substrate, with the louvers substantially opaque. Ideally such a configuration would have a louver pitch fine enough to selectably occlude light on a pixel-by-pixel basis. In another embodiment, two or more layers or stacks of louvers may be combined to provide yet further controls. In another embodiment, rather than selectively blocking light, the louvers may be polarizers configured to change the polarization state of light on a controllably variable basis.

As described above, another embodiment for selective occlusion may comprise an array of sliding panels in a MEMS device such that the sliding panels may be controllably opened (i.e., by sliding in a planar fashion from a first position to a second position; or by rotating from a first orientation to a second orientation; or, for example, combined rotational reorientation and displacement) to transmit light through a small frame or aperture, and controllably closed to occlude the frame or aperture and prevent transmission. The array may be configured to open or occlude the various frames or apertures such that they maximally attenuate the rays that are to be attenuated, and only minimally attenuate the rays to be transmitted.

In an embodiment wherein a fixed number of sliding panels can either occupy a first position occluding a first aperture and opening a second aperture, or a second position occluding the second aperture and opening the first aperture, there will always be the same amount of light transmitted overall (because 50% of the apertures are occluded, and the other 50% are open, with such a configuration), but the local position changes of the shutters or doors may create targeted moire or other effects for darkfield perception with the dynamic positioning of the various sliding panels. In one embodiment, the sliding panels may comprise sliding polarizers, and if placed in a stacked configuration with other polarizing elements that are either static or dynamic, may be utilized to selectively attenuate.

Figure 19D:
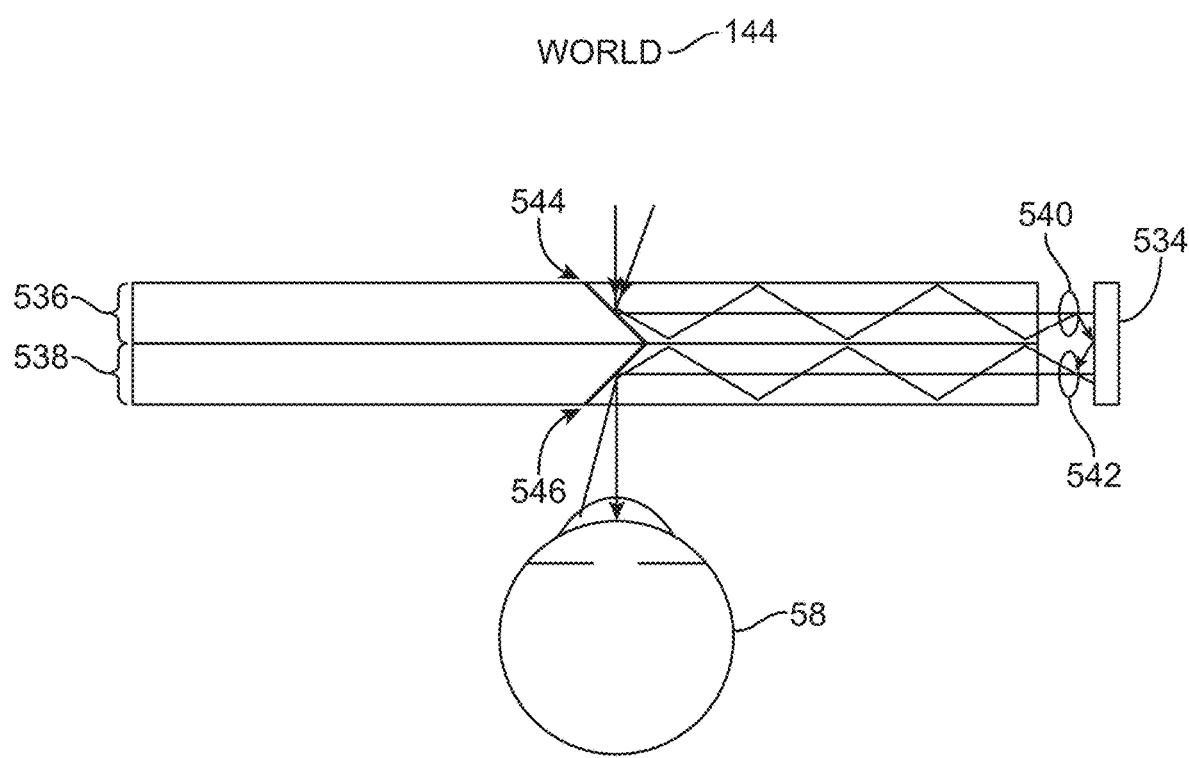

Referring to FIG. 19D, another configuration providing an opportunity for selective reflection, such as via a DMD style reflector array (534), is shown, such that a stacked set of two waveguides (536, 538) along with a pair of focus elements (540, 542) and a reflector (534; such as a DMD) may be used to capture a portion of incoming light with an entrance reflector (544). The reflected light may be totally internally reflected down the length of the first waveguide (536), into a focusing element (540) to bring the light into focus on a reflector (534) such as a DMD array, after which the DMD may selectively attenuate and reflect a portion of the light back through a focusing lens (542; the lens configured to facilitate injection of the light back into the second waveguide) and into the second waveguide (538) for total internal reflection down to an exit reflector (546) configured to exit the light out of the waveguide and toward the eye (58).

Such a configuration may have a relatively thin shape factor, and is designed to allow light from the real world (144) to be selectively attenuated. As waveguides work most cleanly with collimated light, such a configuration may be well suited for virtual reality configurations wherein focal lengths are in the range of optical infinity. For closer focal lengths, a lightfield display may be used as a layer on top of the silhouette created by the aforementioned selective attenuation/darkfield configuration to provide other cues to the eye of the user that light is coming from another focal distance. An occlusion mask may be out of focus, even nondesirably so, and then in one embodiment, a lightfield on top of the masking layer may be used to hide the fact that the darkfield may be at the wrong focal distance.

Figure 19E:
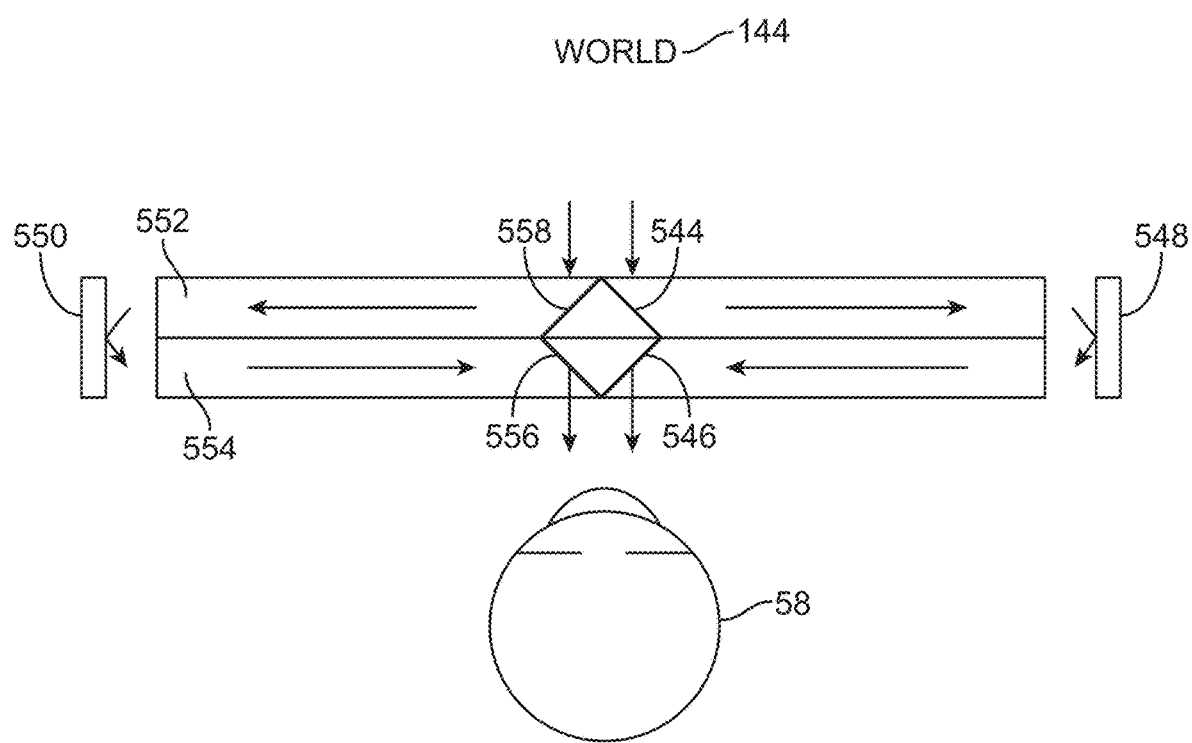

Referring to FIG. 19E, an embodiment is shown featuring two waveguides (552, 554) each having two angled reflectors (558, 544; 556, 546) for illustrative purposes shown at approximately 45 degrees; in actual configurations the angle may differ depending upon the reflective surface, reflective/refractive properties of the waveguides, etc.) directing a portion of light incoming from the real world down each side of a first waveguide (or down two separate waveguides if the top layer is not monolithic) such that it hits a reflector (548, 550) at each end, such as a DMD which may be used for selective attenuation, after which the reflected light may be injected back into the second waveguide (or into two separate waveguides if the bottom layer is not monolithic) and back toward two angled reflectors (again, they need not be at 45 degrees as shown) for exit out toward the eye (58).

Focusing lenses may also be placed between the reflectors at each end and the waveguides. In another embodiment the reflectors (548, 550) at each end may comprise standard mirrors (such as alumized mirrors). Further, the reflectors may be wavelength selective reflectors, such as dichroic mirrors or film interference filters. Further, the reflectors may be diffractive elements configured to reflect incoming light.

Figure 19F:
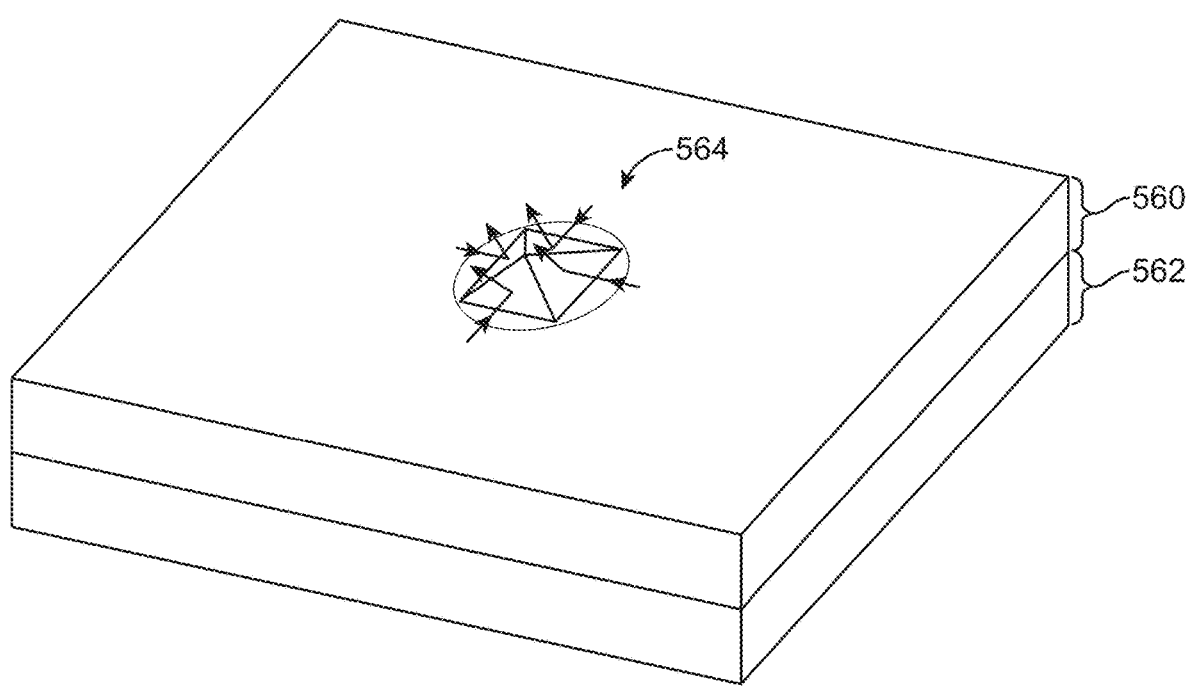

FIG. 19F illustrates a configuration wherein four reflective surfaces in a pyramid type configuration are utilized to direct light through two waveguides (560, 562), in which incoming light from the real world may be divided up and reflected to four difference axes. The pyramid-shaped reflector (564) may have more than four facets, and may be resident within the substrate prism, as with the reflectors of the configuration of FIG. 19E. The configuration of FIG. 19F is an extension of that of FIG. 19E.

Figure 19G:
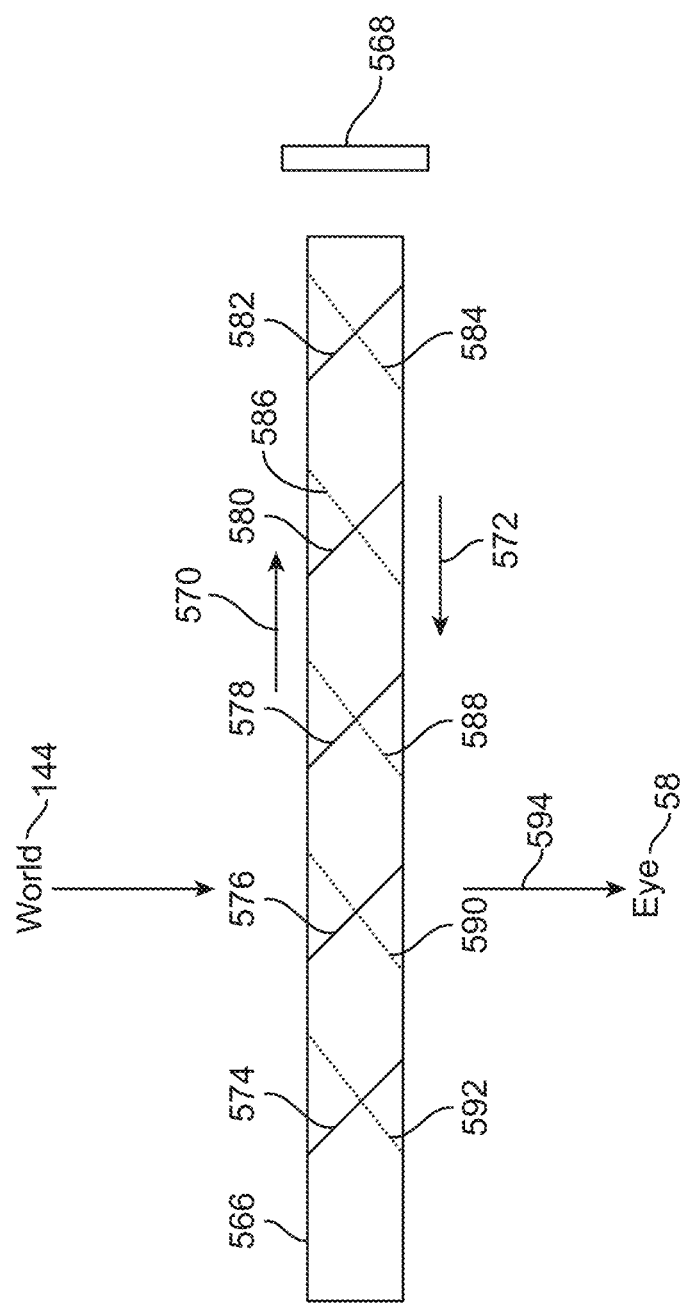

Referring to FIG. 19G, a single waveguide (566) may be utilized to capture light from the world (144) with one or more reflective surfaces (574, 576, 578, 580, 582), relay it (570) to a selective attenuator (568; such as a DMD array), and recouple it back into the same waveguide so that it propagates (572) and encounters one or more other reflective surfaces (584, 586, 588, 590, 592) that cause it to at least partially exit (594) the waveguide on a path toward the eye (58) of the user. Preferably the waveguide comprises selective reflectors such that one group (574, 576, 578, 580, 582) may be switched on to capture incoming light and direct it down to the selective attenuator, while separate another group (584, 586, 588, 590, 592) may be switched on to exit light returning from the selective attenuator out toward the eye (58).

For simplicity the selective attenuator is shown oriented substantially perpendicularly to the waveguide; in other embodiments, various optics components, such as refractive or reflective optics, may be utilized to have the selective attenuator at a different and more compact orientation relative to the waveguide.

Referring to FIG. 19H, a variation on the configuration described in reference to FIG. 19D is illustrated. This configuration is somewhat analogous to that discussed above in reference to FIG. 5B, wherein a switchable array of reflectors may be embedded within each of a pair of waveguides (602, 604). Referring to FIG. 19H, a controller may be configured to turn the reflectors (598, 600) on and off in sequence, such that multiple reflectors may be operated on a frame sequential basis; then the DMD or other selective attenuator (594) may also be sequentially driven in sync with the different mirrors being turned on and off.

Figure 19I:
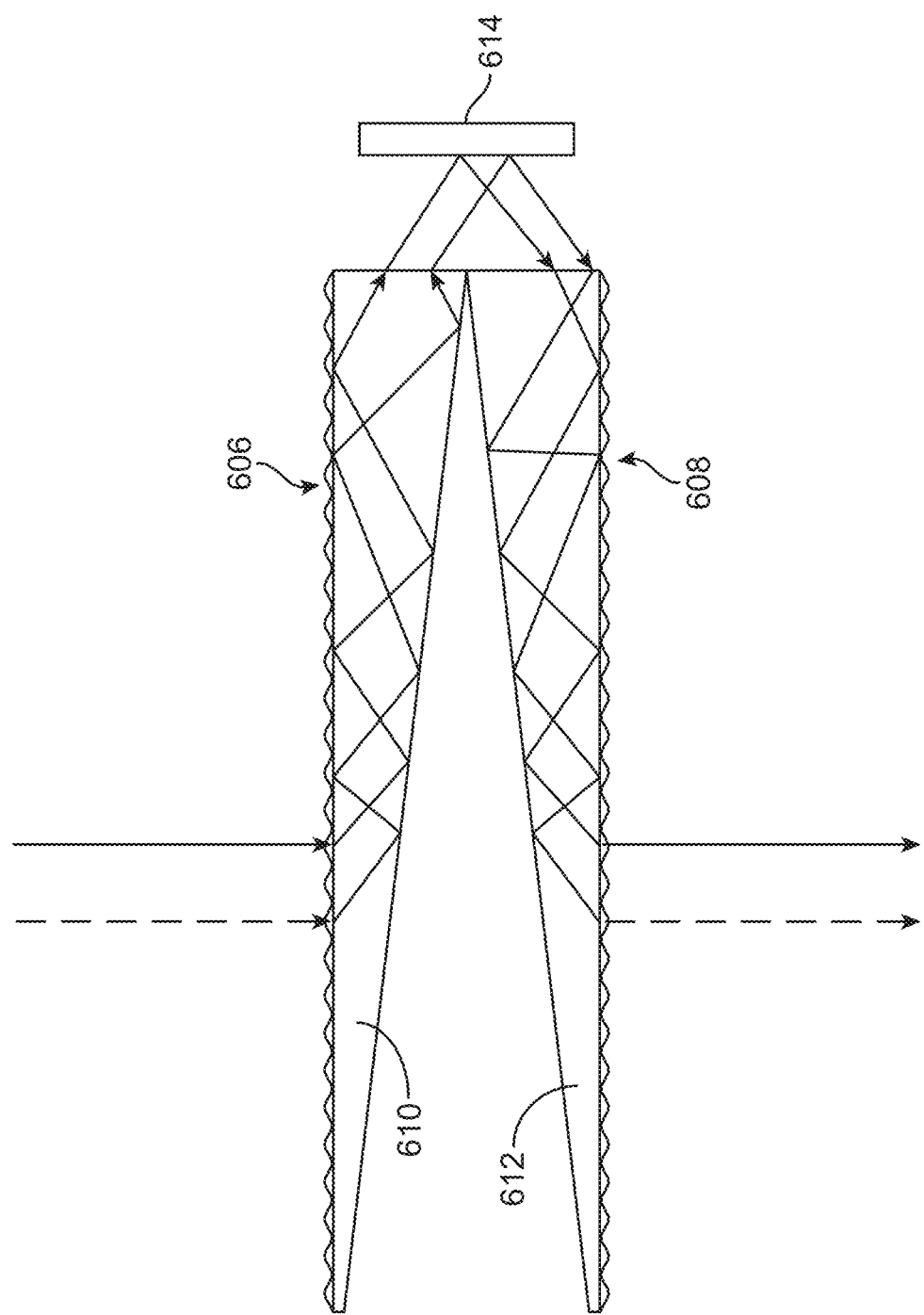

Referring to FIG. 19I, a pair of wedge-shaped waveguides similar to those described above (for example, in reference to FIGS. 15A-15C) are shown in side or sectional view to illustrate that the two long surfaces of each wedge-shaped waveguide (610, 612) are not co-planar. A "turning film" (606, 608; such as that available from 3M corporation under the trade name, "TRAF", which in essence comprises a microprism array), may be utilized on one or more surfaces of the wedge-shaped waveguides to either turn incoming rays at an angle so that they will be captured by total internal reflection, or to turn outgoing rays as they are exiting the waveguide toward an eye or other target. Incoming rays are directed down the first wedge and toward the selective attenuator (614) such as a DMD, LCD (such as a ferroelectric LCD), or an LCD stack to act as a mask).

After the selective attenuator (614), reflected light is coupled back into the second wedge-shaped waveguide which then relays the light by total internal reflection along the wedge. The properties of the wedge-shaped waveguide are intentionally such that each bounce of light causes an angle change; the point at which the angle has changed enough to be the critical angle to escape total internal reflection becomes the exit point from the wedge-shaped waveguide. Typically the exit will be at an oblique angle, so another layer of turning film may be used to "turn" the exiting light toward a targeted object such as the eye (58).

Figure 19J:
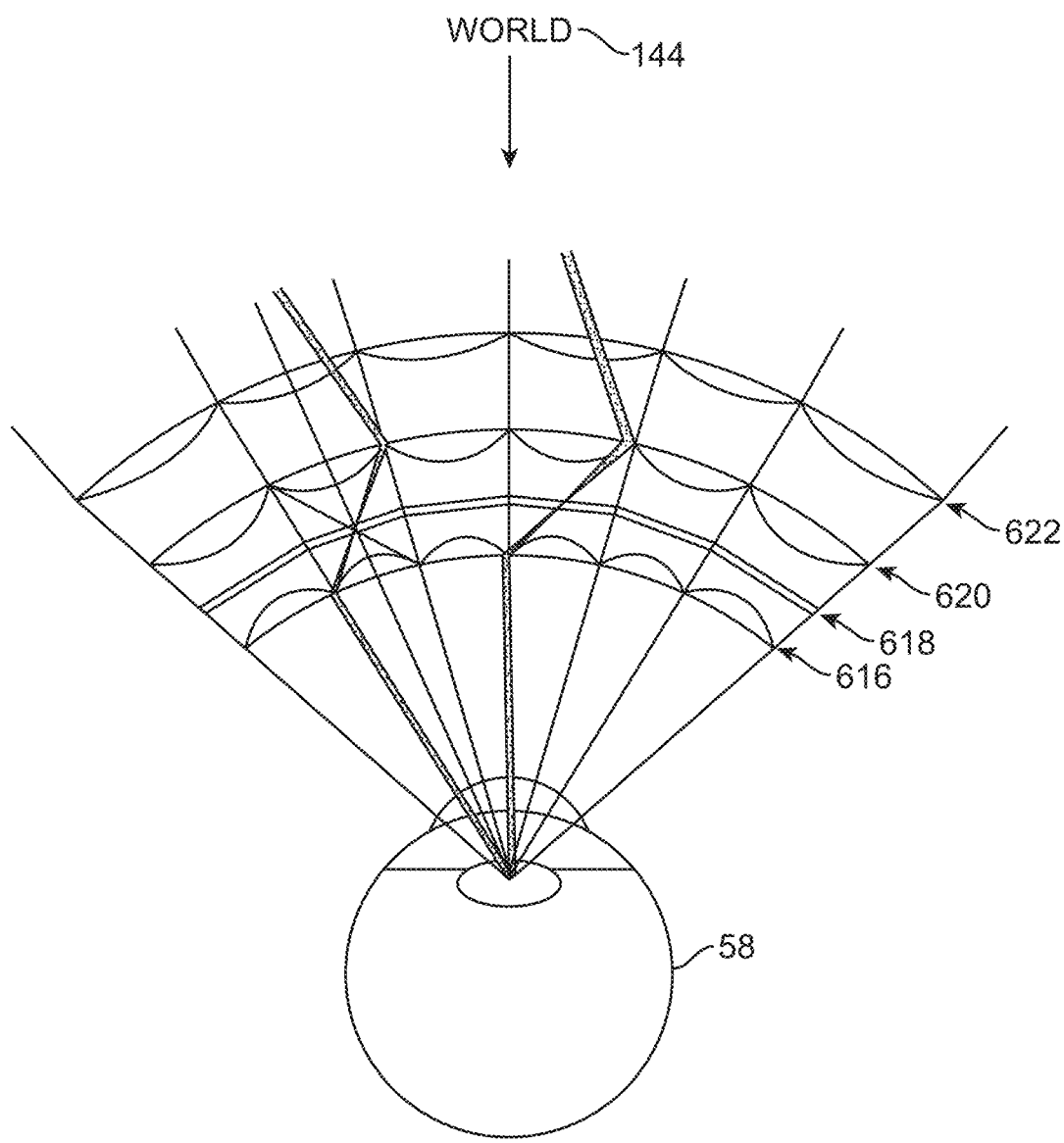

Referring to FIG. 19J, several arcuate lenslet arrays (616, 620, 622) are positioned relative to an eye and configured such that a spatial attenuator array (618) is positioned at a focal/image plane so that it may be in focus with the eye (58). The first (616) and second (620) arrays are configured such that in the aggregate, light passing from the real world to the eye is essentially passed through a zero power telescope. The embodiment of FIG. 19J shows a third array (622) of lenslets which may be utilized for improved optical compensation, but the general case does not require such a third layer. As discussed above, having telescopic lenses that are the diameter of the viewing optic may create an undesirably large form factor (somewhat akin to having a bunch of small sets of binoculars in front of the eyes).

One way to optimize the overall geometry is to reduce the diameter of the lenses by splitting them out into smaller lenslets, as shown in FIG. 19J (i.e., an array of lenses rather than one single large lens). The lenslet arrays (616, 620, 622) are shown wrapped radially or arcuately around the eye (58) to ensure that beams incoming to the pupil are aligned through the appropriate lenslets (else the system may suffer from optical problems such as dispersion, aliasing, and/or lack of focus). Thus all of the lenslets are oriented "toed in" and pointed at the pupil of the eye (58), and the system facilitates avoidance of scenarios wherein rays are propagated through unintended sets of lenses enroute to the pupil.

Figure 19K:
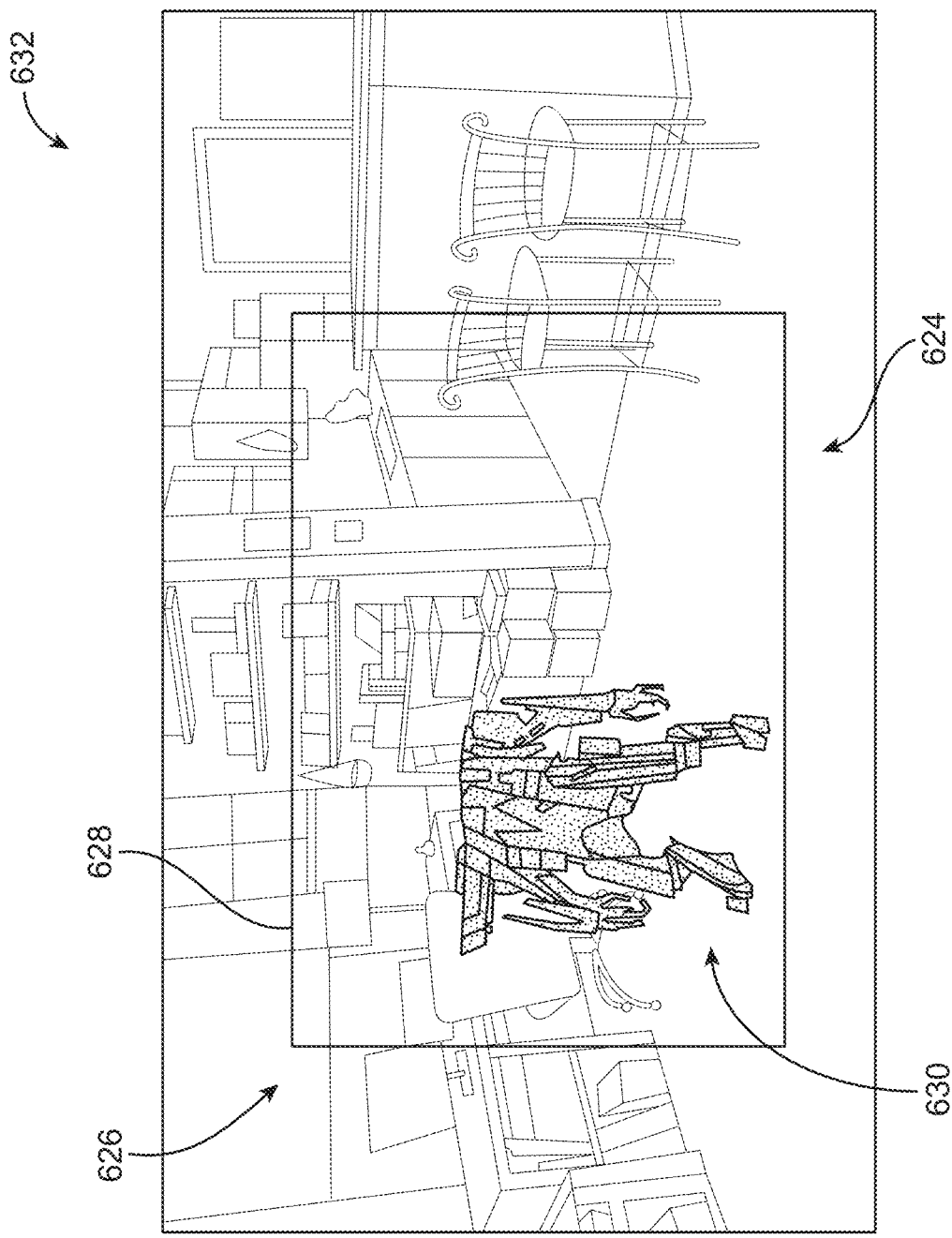

Referring to FIGS. 19K-19N, various software approaches may be utilized to assist in the presentation of darkfield in a virtual or augmented reality displace scenario. Referring to FIG. 19K, a typical challenging scenario for augmented reality is depicted (632), with a textured carpet (624) and non-uniform background architectural features (626), both of which are lightly-colored. The black box (628) depicted indicates the region of the display in which one or more augmented reality features are to be presented to the user for three-dimensional perception, and in the black box a robot creature (630) is being presented that may, for example, be part of an augmented reality game in which the user is engaged. In the depicted example, the robot character (630) is darkly-colored, which makes for a challenging presentation in three-dimensional perception, particularly with the background selected for this example scenario.

As discussed briefly above, one of the main challenges for a presenting darkfield augmented reality object is that the system generally cannot add or paint in "darkness"; generally the display is configured to add light. Thus, referring to FIG. 19L, without any specialized software treatments to enhance darkfield perception, presentation of the robot character in the augmented reality view results in a scene wherein portions of the robot character that are to be essentially flat black in presentation are not visible, and portions of the robot character that are to have some lighting (such as the lightly-pigmented cover of the shoulder gun of the robot character) are only barely visible (634)—they appear almost like a light grayscale disruption to the otherwise normal background image.

Figure 19M:
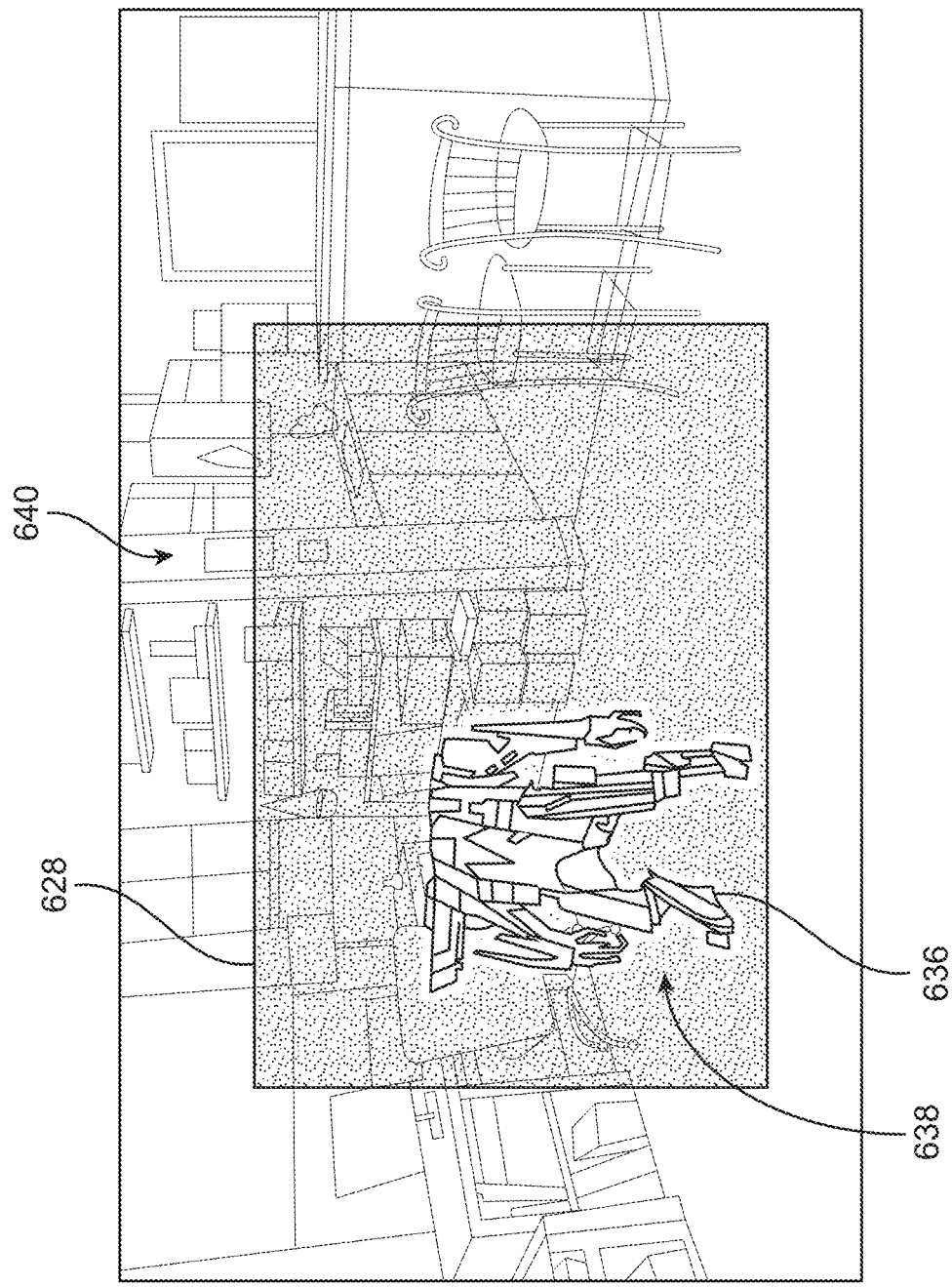

Referring to FIG. 19M, using a software-based global attenuation treatment (akin to digitally putting on a pair of sunglasses) provides enhanced visibility to the robot character because the brightness of the nearly black robot character is effective increased relative to the rest of the space, which now appears more dark (640). Also shown in FIG. 19M is a digitally-added light halo (636) which may be added to enhance and distinguish the now-more-visible robot character shapes (638) from the background. With the halo treatment, even the portions of the robot character that are to be presented as flat black become visible with the contrast to the white halo, or "aura" presented around the robot character.

Preferably the halo may be presented to the user with a perceived focal distance that is behind the focal distance of the robot character in three-dimensional space. In a configuration wherein single panel occlusion techniques such as those described above is being utilized to present darkfield, the light halo may be presented with an intensity gradient to match the dark halo that may accompany the occlusion, minimizing the visibility of either darkfield effect. Further, the halo may be presented with blurring to the background behind the presented halo illumination for further distinguishing effect. A more subtle aura or halo effect may be created by matching, at least in part, the color and/or brightness of a relatively light-colored background.

Figure 19N:
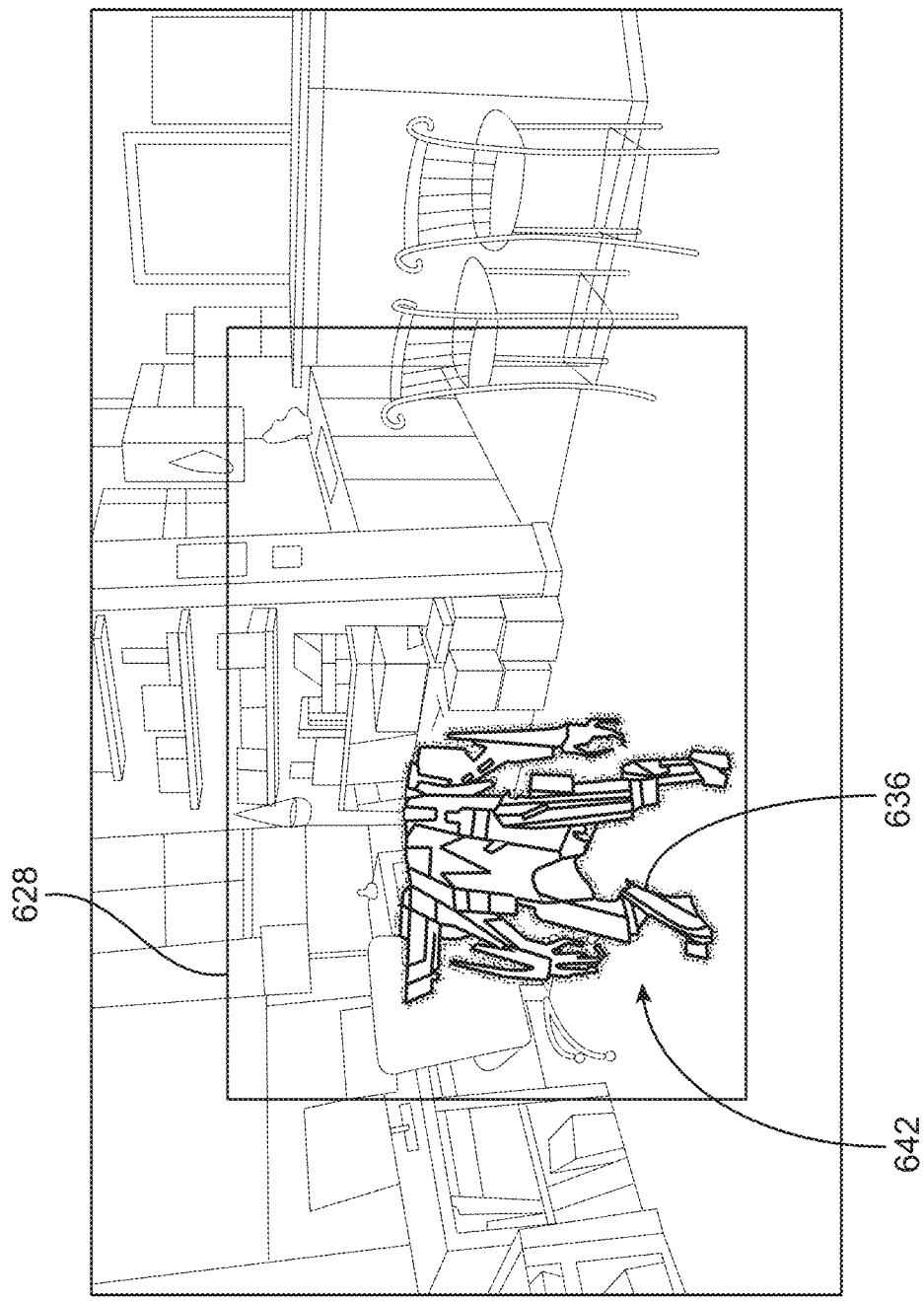

Referring to FIG. 19N, some or all of the black intonations of the robot character may be changed to dark, cool blue colors to provide a further distinguishing effect relative to the background, and relatively good visualization of the robot (642).

Wedge-shaped waveguides have been described above, such as in reference to FIGS. 15A-15D and FIG. 19I. With a wedge-shaped waveguide, every time a ray bounces off of one of the non-coplanar surfaces, it gets an angle change, which ultimately results in the ray exiting total internal reflection when its approach angle to one of the surfaces goes past the critical angle. Turning films may be used to redirect exiting light so that exiting beams leave with a trajectory that is more or less perpendicular to the exit surface, depending upon the geometric and ergonomic issues at play.

With a series or array of displays injecting image information into a wedge-shaped waveguide, as shown in FIG. 15C, for example, the wedge-shaped waveguide may be configured to create a fine-pitched array of angle-biased rays emerging from the wedge. Somewhat similarly, it has been discussed above that a lightfield display, or a variable wavefront creating waveguide, both may produce a multiplicity of beamlets or beams to represent a single pixel in space such that wherever the eye is positioned, the eye is hit by a plurality of different beamlets or beams that are unique to that particular eye position in front of the display panel.

As was further discussed above in the context of lightfield displays, a plurality of viewing zones may be created within a given pupil, and each may be used for a different focal distance, with the aggregate producing a perception similar to that of a variable wavefront creating waveguide, or similar to the actual optical physics of reality of the objects viewed were real. Thus a wedge-shaped waveguide with multiple displays may be utilized to generate a lightfield. In an embodiment similar to that of FIG. 15C with a linear array of displays injecting image information, a fan of exiting rays is created for each pixel. This concept may be extended in an embodiment wherein multiple linear arrays are stacked to all inject image information into the wedge-shaped waveguide (in one variation, one array may inject at one angle relative to the wedge-shaped waveguide face, while the second array may inject at a second angle relative to the wedge-shaped waveguide face), in which case exit beams fan out at two different axes from the wedge.

Thus such a configuration may be utilized to produce pluralities of beams spraying out at lots of different angles, and each beam may be driven separately due to the fact that under such configuration, each beam is driven using a separate display. In another embodiment, one or more arrays or displays may be configured to inject image information into wedge-shaped waveguide through sides or faces of the wedge-shaped waveguide other than that shown in FIG. 15C, such as by using a diffractive optic to bend injected image information into total an internal reflection configuration relative to the wedge-shaped waveguide.

Various reflectors or reflecting surfaces may also be utilized in concert with such a wedge-shaped waveguide embodiment to outcouple and manage light from the wedge-shaped waveguide. In one embodiment, an entrance aperture to a wedge-shaped waveguide, or injection of image information through a different face other than shown in FIG. 15C, may be utilized to facilitate staggering (geometric and/or temporal) of different displays and arrays such that a Z-axis delta may also be developed as a means for injecting three-dimensional information into the wedge-shaped waveguide. For a greater than three-dimensions array configuration, various displays may be configured to enter a wedge-shaped waveguide at multiple edges in multiple stacks with staggering to get higher dimensional configurations.

Referring to FIG. 20A, a configuration similar to that depicted in FIG. 8H is shown wherein a waveguide (646) has a diffractive optical element (648; or "DOE", as noted above) sandwiched in the middle (alternatively, as described above, the diffractive optical element may reside on the front or back face of the depicted waveguide). A ray may enter the waveguide (646) from the projector or display (644). Once in the waveguide (646), each time the ray intersects the DOE (648), part of it is exited out of the waveguide (646). As described above, the DOE may be designed such that the exit illuminance across the length of the waveguide (646) is somewhat uniform (for example, the first such DOE intersection may be configured to exit about 10% of the light; then the second DOE intersection may be configured to exit about 10% of the remaining light so that 81% is passed on, and so on; in another embodied a DOE may be designed to have a variable diffraction efficiency, such as linearly-decreasing diffraction efficiency, along its length to map out a more uniform exit illuminance across the length of the waveguide).

To further distribute remaining light that reaches an end (and in one embodiment to allow for selection of a relatively low diffraction efficiency DOE which would be favorable from a view-to-the-world transparency perspective), a reflective element (650) at one or both ends may be included. Further, referring to the embodiment of FIG. 20B, additional distribution and preservation may be achieved by including an elongate reflector (652) across the length of the waveguide as shown (comprising, for example, a thin film dichroic coating that is wavelength-selective); preferably such reflector would be blocking light that accidentally is reflected upward (back toward the real world 144 for exit in a way that it would not be utilized by the viewer). In some embodiments, such an elongate reflector may contribute to a "ghosting" effect perception by the user.

Figure 20B:
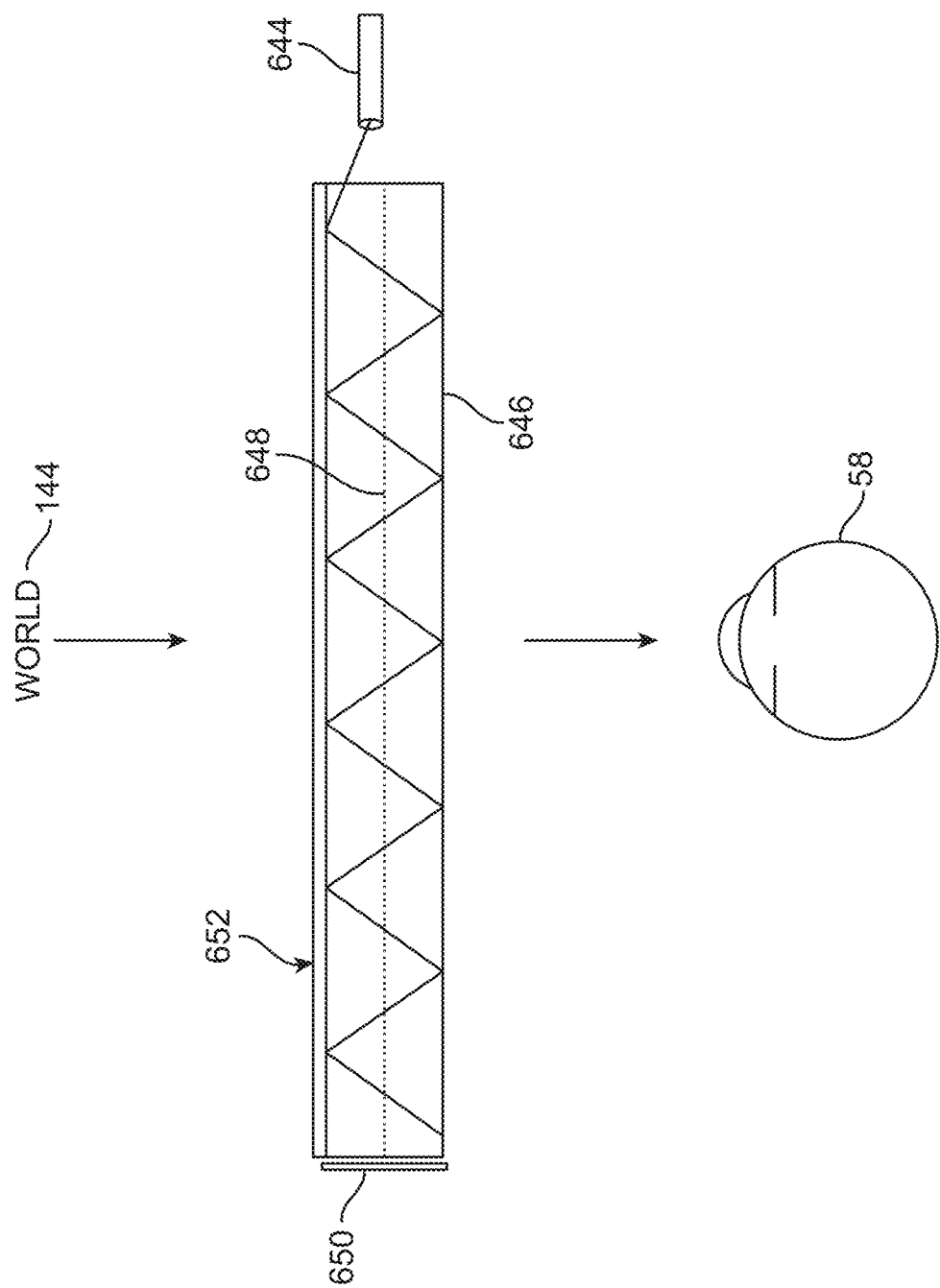
FIGS. 20A-20O illustrate embodiments of various waveguide assemblies, according to the illustrated embodiments.
Figure 20C:
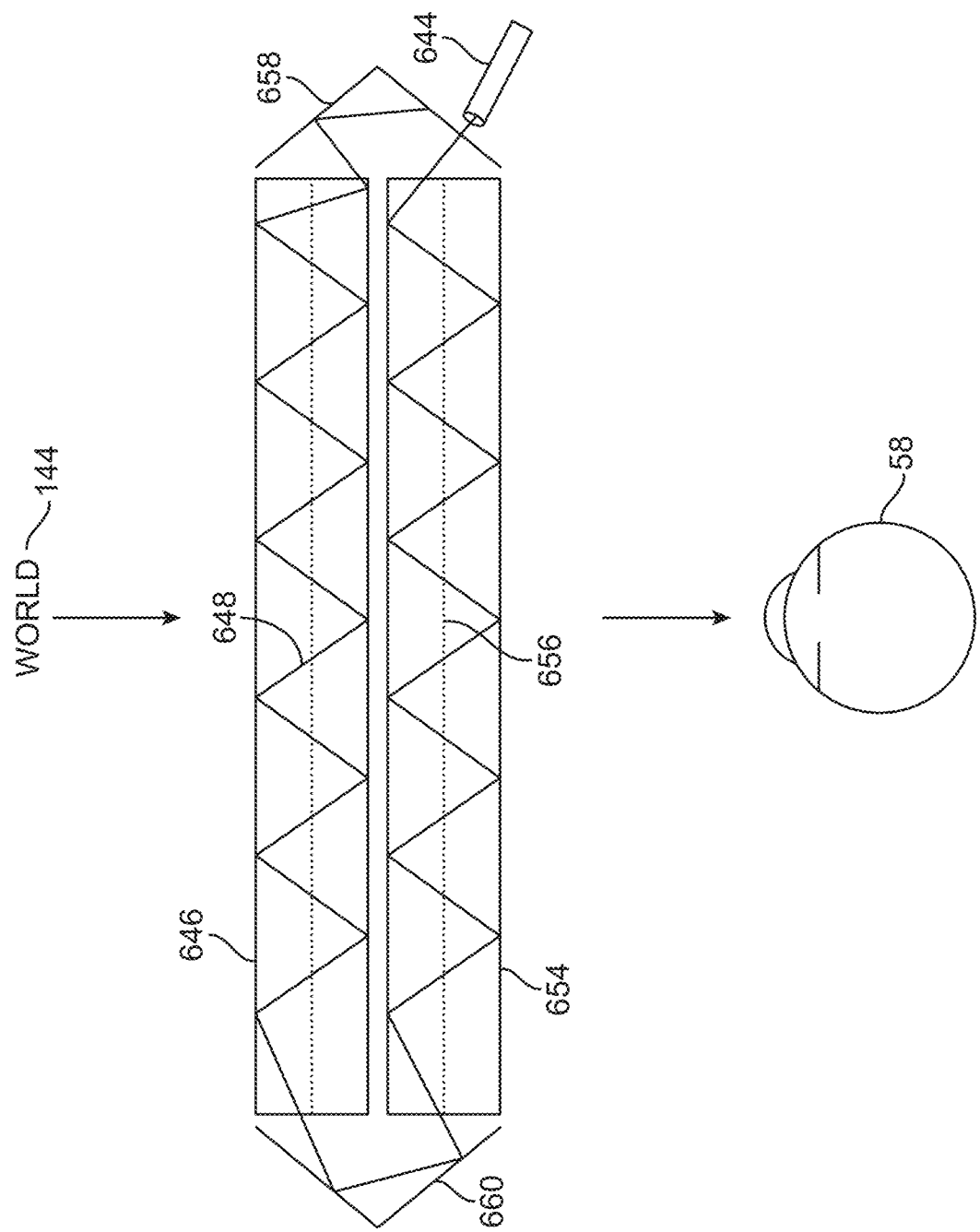

In one embodiment, this ghosting effect may be eliminated by having a dual-waveguide (646, 654) circulating reflection configuration, such as that shown in FIG. 20C, which is designed to keep the light moving around until it has been exited toward the eye (58) in a preferably substantially equally distributed manner across the length of the waveguide assembly. Referring to FIG. 20C, light may be injected with a projector or display (644), and as it travels across the DOE (656) of the first waveguide (654), it ejects a preferably substantially uniform pattern of light out toward the eye (58); light that remains in the first waveguide is reflected by a first reflector assembly (660) into the second waveguide (646). In one embodiment, the second waveguide (646) may be configured to not have a DOE, such that it merely transports or recycles the remaining light back to the first waveguide, using the second reflector assembly.

In another embodiment (as shown in FIG. 20C) the second waveguide (646) may also have a DOE (648) configured to uniformly eject fractions of travelling light to provide a second plane of focus for three-dimensional perception. Unlike the configurations of FIGS. 20A and 20B, the configuration of FIG. 20C is designed for light to travel the waveguide in one direction, which avoids the aforementioned ghosting problem that is related to passing light backwards through a waveguide with a DOE. Referring to FIG. 20D, rather than having a mirror or box style reflector assembly (660) at the ends of a waveguide for recycling the light, an array of smaller retroreflectors (662), or a retroreflective material, may be utilized.

Figure 20E:
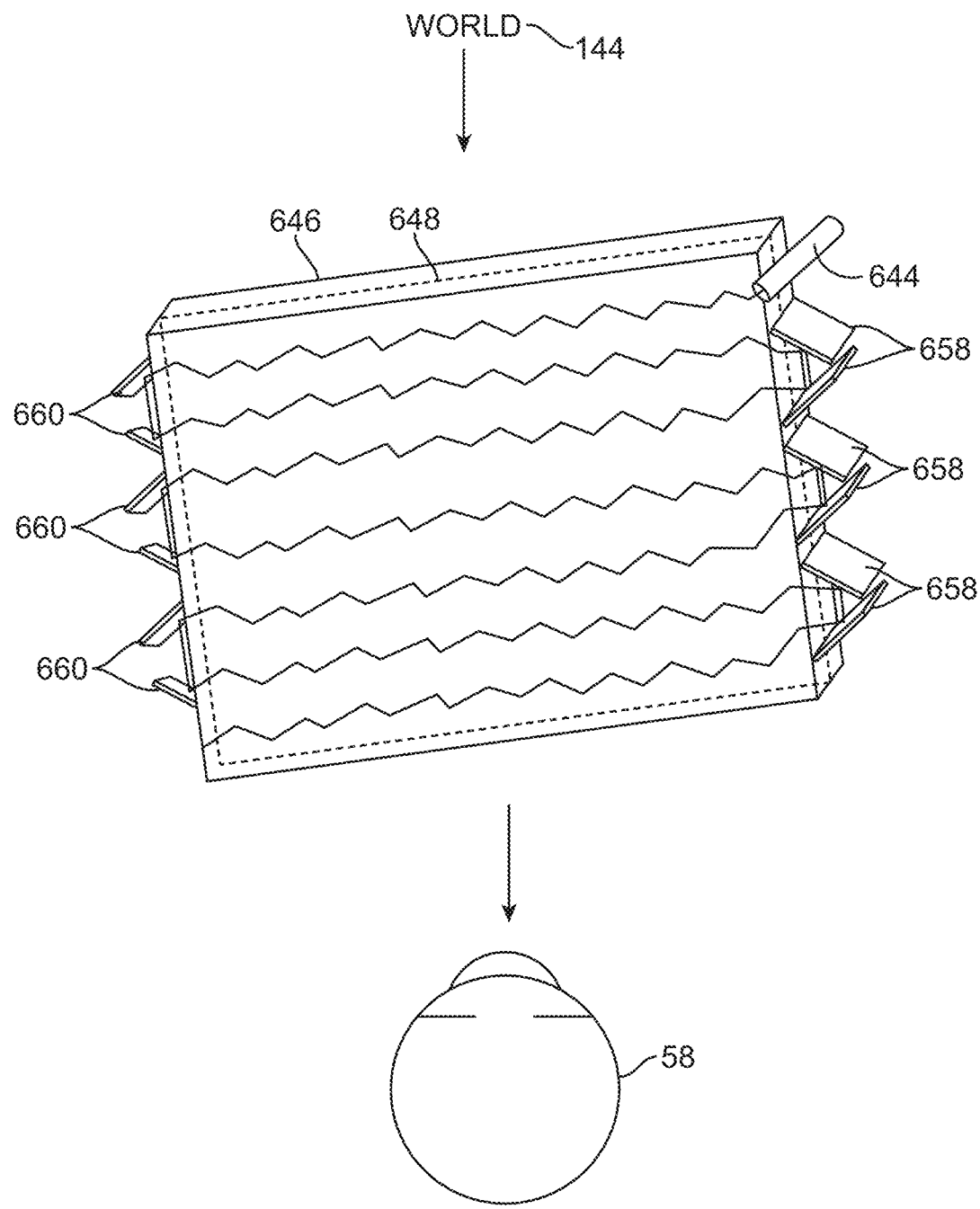

Referring to FIG. 20E, an embodiment is shown that utilizes some of the light recycling configurations of the embodiment of FIG. 20C to "snake" the light down through a waveguide (646) having a sandwiched DOE (648) after it has been injected with a display or projector (644) so that it crosses the waveguide (646) many times back and forth before reaching the bottom, at which point it may be recycled back up to the top level for further recycling. Such a configuration not only recycles the light and facilitates use of relatively low diffraction efficiency DOE elements for exiting light toward the eye (58), but also distributes the light, to provide for a large exit pupil configuration akin to that described in reference to FIG. 8K.

Figure 20F:
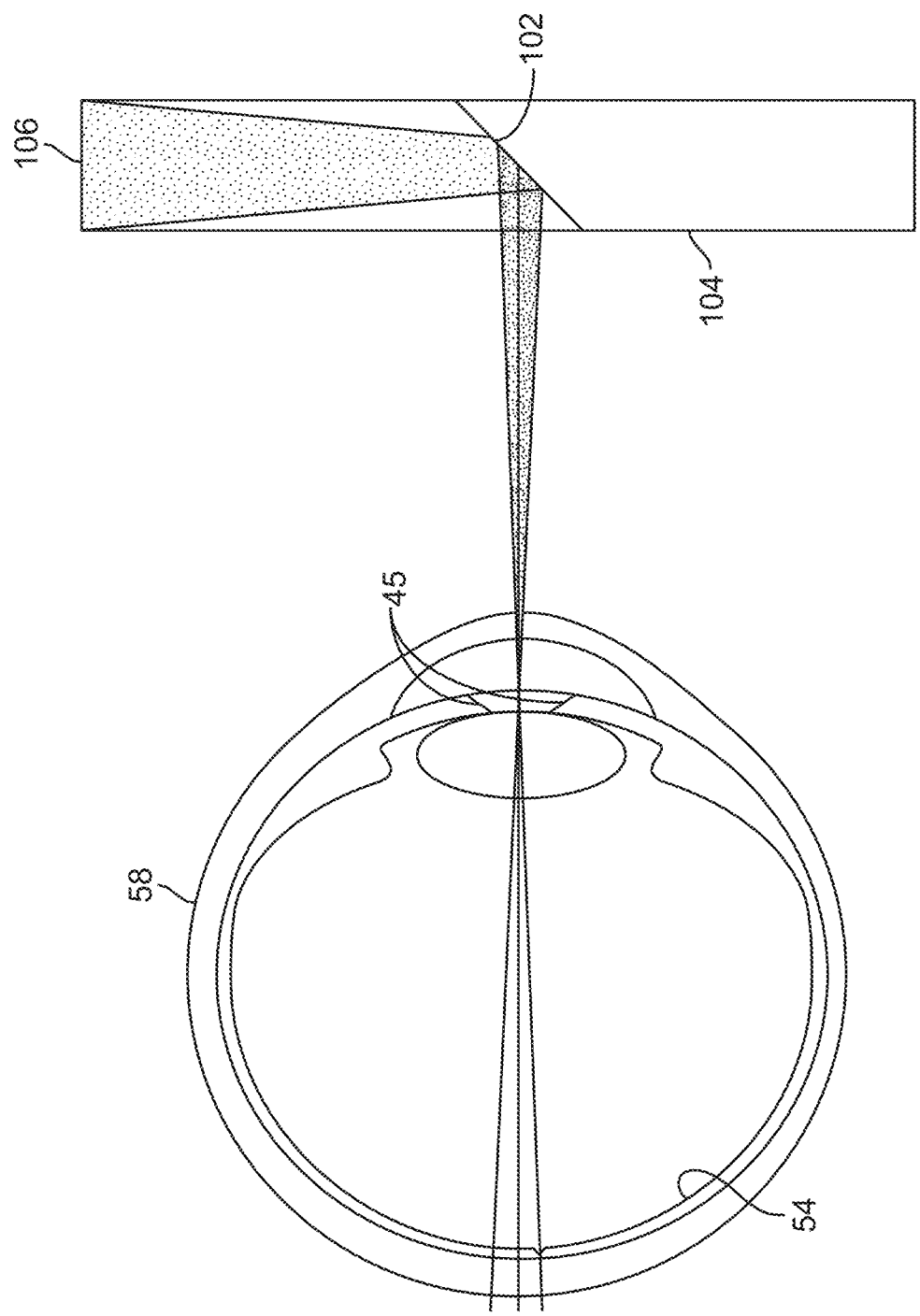

Referring to FIG. 20F, an illustrative configuration similar to that of FIG. 5A is shown, with incoming light injected along a conventional prism or beamsplitter substrate (104) to a reflector (102) without total internal reflection (i.e., without the prism being considered a waveguide) because the input projection (106), scanning or otherwise, is kept within the bounds of the prism—which means that the geometry of such prism becomes a significant constraint. In another embodiment, a waveguide may be utilized in place of the simple prism of FIG. 20F, which facilitates the use of total internal reflection to provide more geometric flexibility.

Other configurations describe above are configured to profit from the inclusion of waveguides for similar manipulations and light. For example, referring back to FIG. 7A, the general concept illustrated therein is that a collimated image injected into a waveguide may be refocused before transfer out toward an eye, in a configuration also designed to facilitate viewing light from the real world. In place of the refractive lens shown in FIG. 7A, a diffractive optical element may be used as a variable focus element.

Referring back to FIG. 7B, another waveguide configuration is illustrated in the context of having multiple layers stacked upon each other with controllable access toggling between a smaller path (total internal reflection through a waveguide) and a larger path (total internal reflection through a hybrid waveguide comprising the original waveguide and a liquid crystal isolated region with the liquid crystal switched to a mode wherein the refractive indices are substantially matched between the main waveguide and the auxiliary waveguide), so that the controller can tune on a frame-by-frame basis which path is being taken. High-speed switching electro-active materials, such as lithium niobate, facilitate path changes with such a configuration at gigahertz rates, which allows one to change the path of light on a pixel-by-pixel basis.

Referring back to FIG. 8A, a stack of waveguides paired with weak lenses is illustrated to demonstrate a multifocal configuration wherein the lens and waveguide elements may be static. Each pair of waveguide and lens may be functionally replaced with waveguide having an embedded DOE element (which may be static, in a closer analogy to the configuration of FIG. 8A, or dynamic), such as that described in reference to FIG. 8I.

Figure 20G:
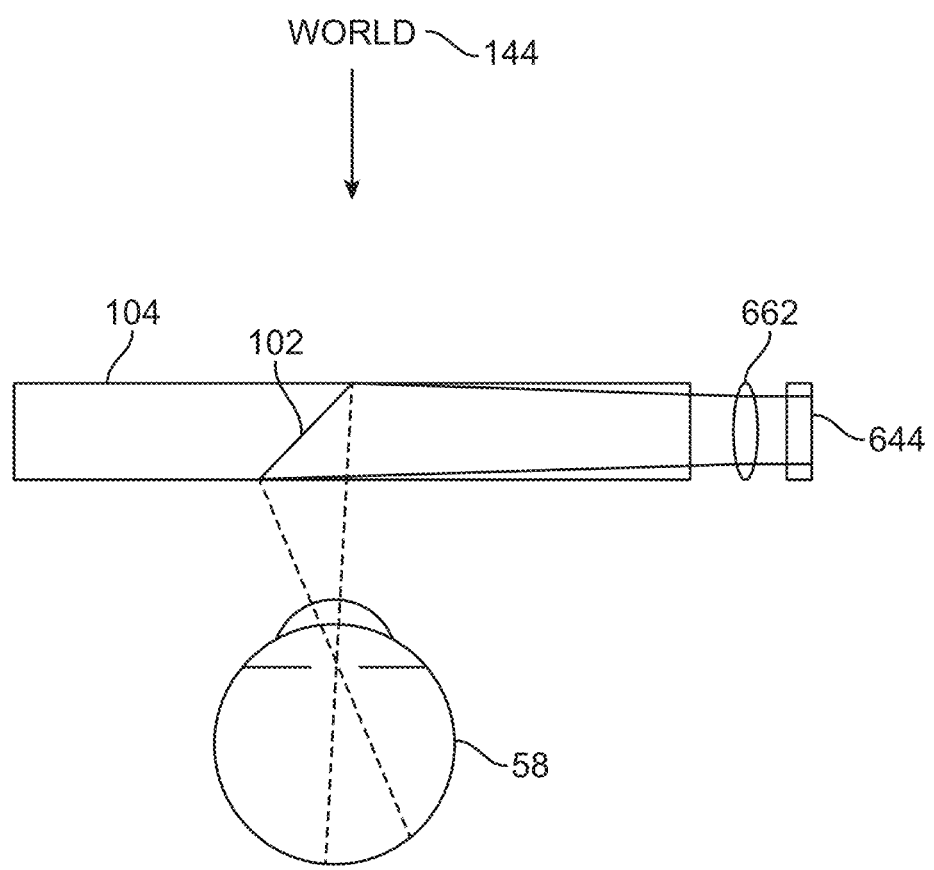
Figure 20H:
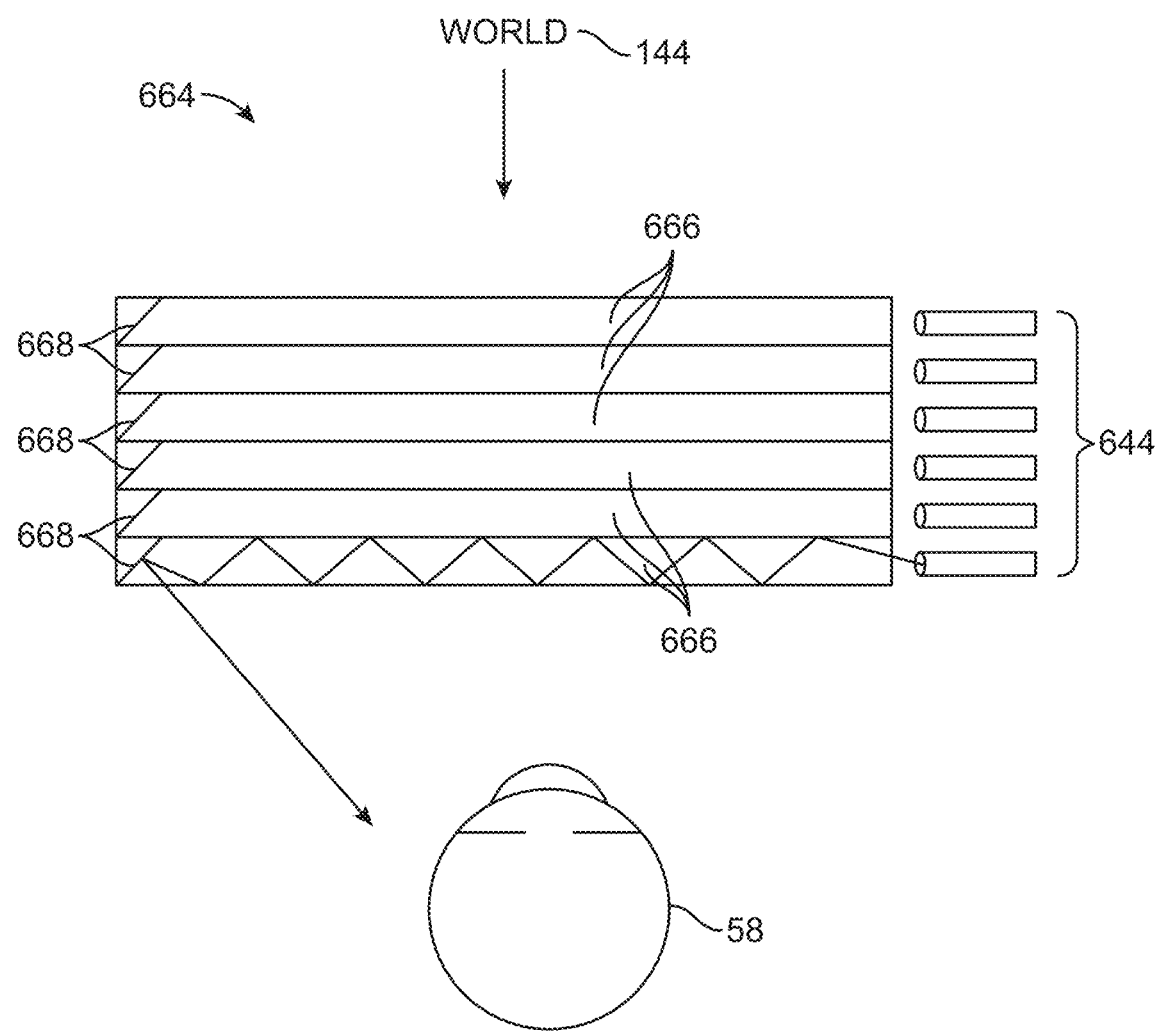

Referring to FIG. 20G, if a transparent prism or block (104; i.e., not a waveguide) is utilized to hold a mirror or reflector (102) in a periscope type of configuration to receive light from other components, such as a lens (662) and projector or display (644), the field of view is limited by the size of that reflector (102; the bigger the reflector, the wider the field of view). Thus to have a larger field of view with such configuration, a thicker substrate may be needed to hold a larger reflector; otherwise, the functionality of an aggregated plurality of reflectors may be utilized to increase the functional field of view, as described in reference to FIGS. 8O, 8P, and 8Q. Referring to FIG. 20H, a stack (664) of planar waveguides (666), each fed with a display or projector (644; or in another embodiment a multiplexing of a single display) and having an exit reflector (668), may be utilized to aggregate toward the function of a larger single reflector. The exit reflectors may be at the same angle in some cases, or not the same angle in other cases, depending upon the positioning of the eye (58) relative to the assembly.

Figure 20I:
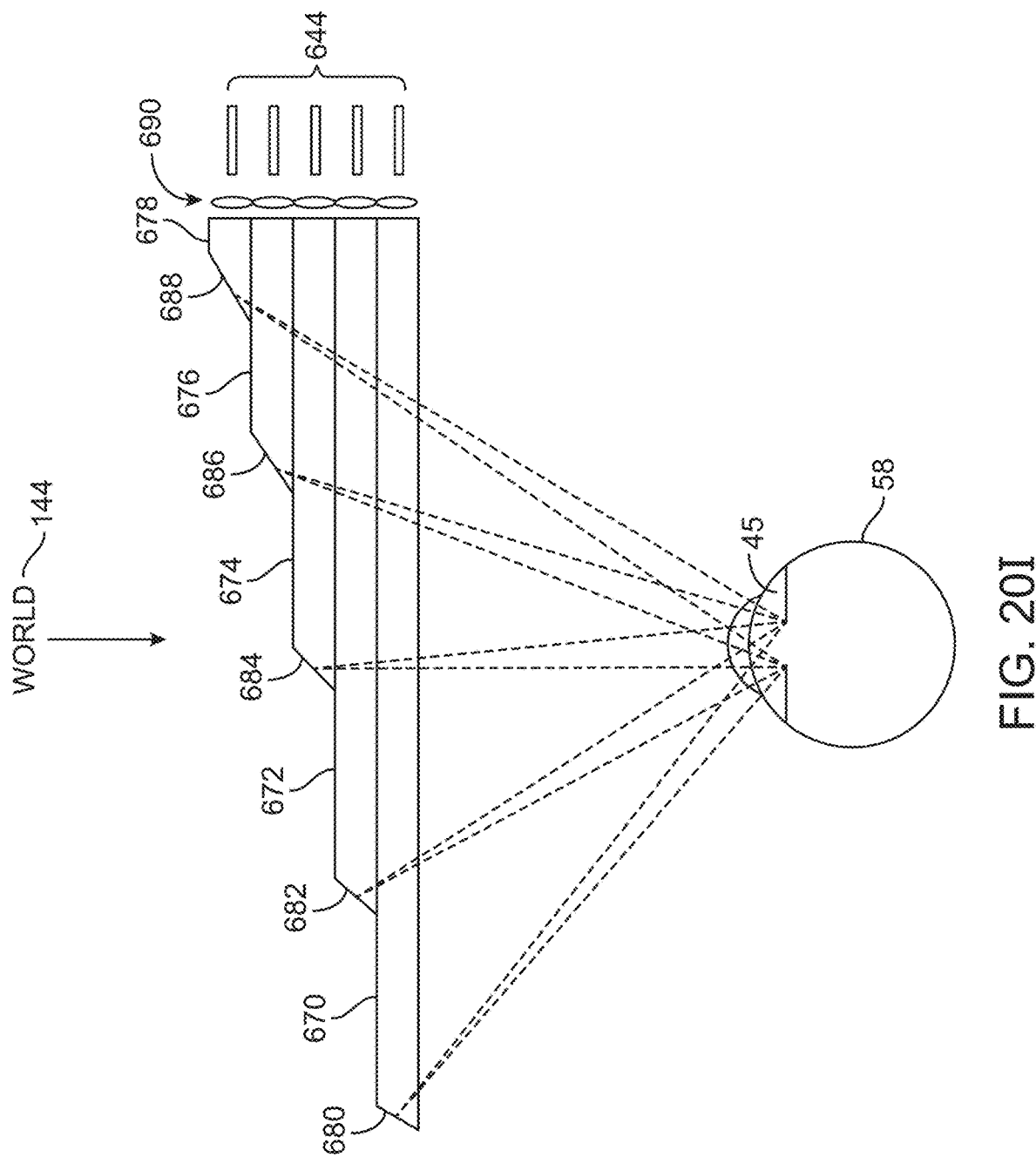

FIG. 20I illustrates a related configuration, wherein the reflectors (680, 682, 684, 686, 688) in each of the planar waveguides (670, 672, 674, 676, 678) have been offset from each other, and wherein each takes in light from a projector or display (644) which may be sent through a lens (690) to ultimately contribute exiting light to the pupil (45) of the eye (58) by virtue of the reflectors (680, 682, 684, 686, 688) in each of the planar waveguides (670, 672, 674, 676, 678). If one can create a total range of all of the angles that would be expected to be seen in the scene (i.e., preferably without blind spots in the key field of view), then a useful field of view has been achieved. As described above, the eye (58) functions based at least on what angle light rays enter the eye, and this can be simulated. The rays need not pass through the exact same point in space at the pupil—rather the light rays just need to get through the pupil and be sensed by the retina. FIG. 20K illustrates a variation wherein the shaded portion of the optical assembly may be utilized as a compensating lens to functionally pass light from the real world (144) through the assembly as though it has been passed through a zero power telescope.

Figure 20J:
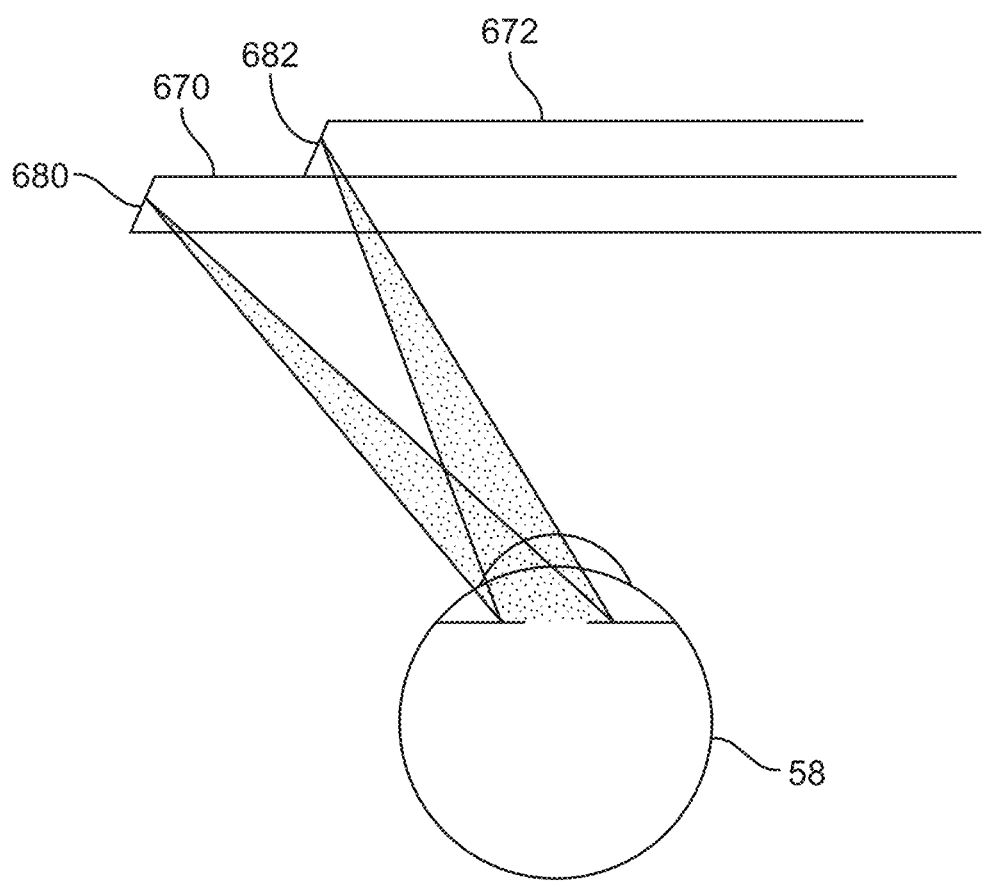

Referring to FIG. 20J, each of the aforementioned rays may also be a relative wide beam that is being reflected through the pertinent waveguide (670, 672) by total internal reflection. The reflector (680, 682) facet size will determine what the exiting beam width can be.

Referring to FIG. 20L, a further discretization of the reflector is shown, wherein a plurality of small straight angular reflectors may form a roughly parabolic reflecting surface (694) in the aggregate through a waveguide or stack thereof (696). Light coming in from the displays (644; or single MUXed display, for example), such as through a lens (690), is all directed toward the same shared focal point at the pupil (45) of the eye (58).

Referring back to FIG. 13M, a linear array of displays (378) injects light into a shared waveguide (376). In another embodiment a single display may be multiplexed to a series of entry lenses to provide similar functionality as the embodiment of FIG. 13M, with the entry lenses creating parallel paths of rays running through the waveguide.

In a conventional waveguide approach wherein total internal reflection is relied upon for light propagation, the field of view is restricted because there is only a certain angular range of rays propagating through the waveguide (others may escape out). In one embodiment, if a red/green/blue (or "RGB") laserline reflector is placed at one or both ends of the planar surfaces, akin to a thin film interference filter that is highly reflective for only certain wavelengths and poorly reflective for other wavelengths, than one can functionally increase the range of angles of light propagation. Windows (without the coating) may be provided for allowing light to exit in predetermined locations. Further, the coating may be selected to have a directional selectivity (somewhat like reflective elements that are only highly reflective for certain angles of incidence). Such a coating may be most relevant for the larger planes/sides of a waveguide.

Referring back to FIG. 13E, a variation on a scanning fiber display was discussed, which may be deemed a scanning thin waveguide configuration, such that a plurality of very thin planar waveguides (358) may be oscillated or vibrated such that if a variety of injected beams is coming through with total internal reflection, the configuration functionally would provide a linear array of beams escaping out of the edges of the vibrating elements (358). The depicted configuration has approximately five externally-projecting planar waveguide portions (358) in a host medium or substrate (356) that is transparent, but which preferably has a different refractive index so that the light will stay in total internal reflection within each of the substrate-bound smaller waveguides that ultimately feed (in the depicted embodiment there is a 90 degree turn in each path at which point a planar, curved, or other reflector may be utilized to bounce the light outward) the externally-projecting planar waveguide portions (358).

The externally-projecting planar waveguide portions (358) may be vibrated individually, or as a group along with oscillatory motion of the substrate (356). Such scanning motion may provide horizontal scanning, and for vertical scanning, the input (360) aspect of the assembly (i.e., such as one or more scanning fiber displays scanning in the vertical axis) may be utilized. Thus a variation of the scanning fiber display is presented.

Referring back to FIG. 13H, a waveguide (370) may be utilized to create a lightfield. With waveguides working best with collimated beams that may be associated with optical infinity from a perception perspective, all beams staying in focus may cause perception discomfort (i.e., the eye will not make a discernible difference in dioptric blur as a function of accommodation; in other words, the narrow diameter, such as 0.5 mm or less, collimated beamlets may open loop the eye's accommodation/vergence system, causing discomfort).

In one embodiment, a single beam may be fed in with a number of cone beamlets coming out, but if the introduction vector of the entering beam is changed (i.e., laterally shift the beam injection location for the projector/display relative to the waveguide), one may control where the beam exits from the waveguide as it is directed toward the eye. Thus one may use a waveguide to create a lightfield by creating a bunch of narrow diameter collimated beams, and such a configuration is not reliant upon a true variation in a light wavefront to be associated with the desired perception at the eye.

If a set of angularly and laterally diverse beamlets is injected into a waveguide (for example, by using a multicore fiber and driving each core separately; another configuration may utilize a plurality of fiber scanners coming from different angles; another configuration may utilize a high-resolution panel display with a lenslet array on top of it), a number of exiting beamlets can be created at different exit angles and exit locations. Since the waveguide may scramble the lightfield, the decoding is preferably predetermined.

Figure 20N:
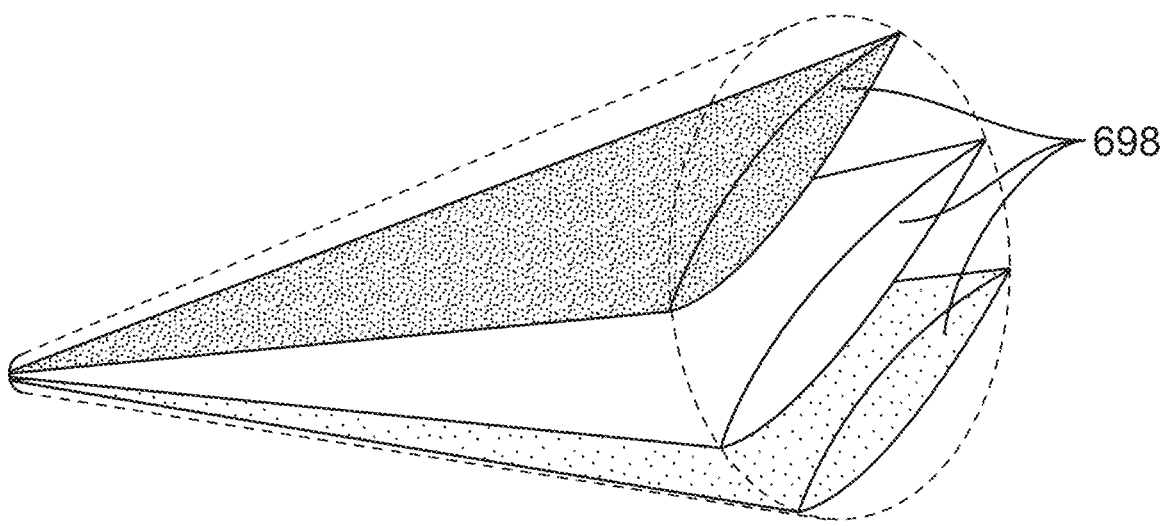

Referring to FIGS. 20M and 20N, a waveguide (646) assembly (696) is shown that comprises stacked waveguide components in the vertical or horizontal axis. Rather than having one monolithic planar waveguide, the notion with these embodiments is to stack a plurality of smaller waveguides (646) immediately adjacent each other such that light introduced into one waveguide, in addition to propagating down (i.e., propagating along a Z axis with total internal reflection in +X, −X) such waveguide by total internal reflection, also totally internally reflects in the perpendicular axis (+y, −Y) as well, such that it is not spilling into other areas. In other words, if total internal reflection is from left to right and back during Z axis propagation, the configuration will be set up to totally internally reflect any light that hits the top or bottom sides as well; each layer may be driven separately without interference from other layers. Each waveguide may have a DOE (648) embedded and configured to eject out light with a predetermined distribution along the length of the waveguide, as described above, with a predetermined focal length configuration (shown in FIG. 20M as ranging from 0.5 meters to optical infinity).

In another variation, a very dense stack of waveguides with embedded DOEs may be produced such that it spans the size of the anatomical pupil of the eye (i.e., such that multiple layers 698 of the composite waveguide are required to cross the exit pupil, as illustrated in FIG. 20N). With such a configuration, one may feed a collimated image for one wavelength, and then the portion located the next millimeter down producing a diverging wavefront that represents an object coming from a focal distance of, say, 15 meters away, and so on, with the notion being that an exit pupil is coming from a number of different waveguides as a result of the DOEs and total internal reflection through the waveguides and across the DOEs. Thus rather than creating one uniform exit pupil, such a configuration creates a plurality of stripes that, in the aggregate, facilitate the perception of different focal depths with the eye/brain.

Such a concept may be extended to configurations comprising a waveguide with a switchable/controllable embedded DOE (i.e. that is switchable to different focal distances), such as those described in relation to FIGS. 8B-8N, which allows more efficient light trapping in the axis across each waveguide. Multiple displays may be coupled into each of the layers, and each waveguide with DOE would emit rays along its own length. In another embodiment, rather than relying on total internal reflection, a laserline reflector may be used to increase angular range. In between layers of the composite waveguide, a completely reflective metallized coating may be utilized, such as aluminum, to ensure total reflection, or alternatively dichroic style or narrow band reflectors may be utilized.

Figure 20O:
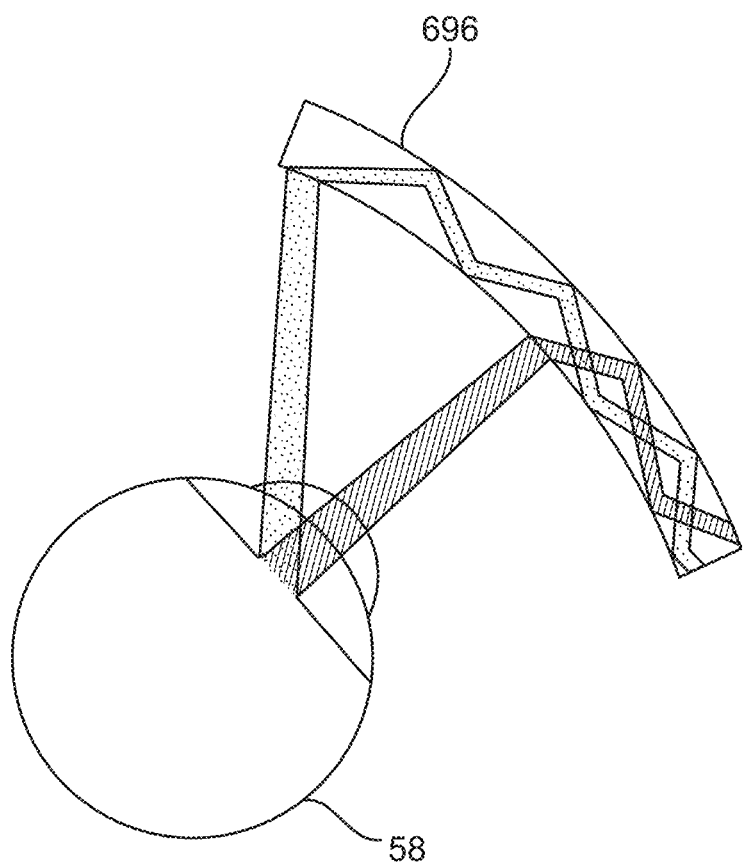

Referring to FIG. 20O, the whole composite waveguide assembly (696) maybe be curved concavely toward the eye (58) such that each of the individual waveguides is directed toward the pupil. In other words, the configuration may be designed to more efficiently direct the light toward the location where the pupil is likely to be present. Such a configuration also may be utilized to increase the field of view.

Figure 21A:
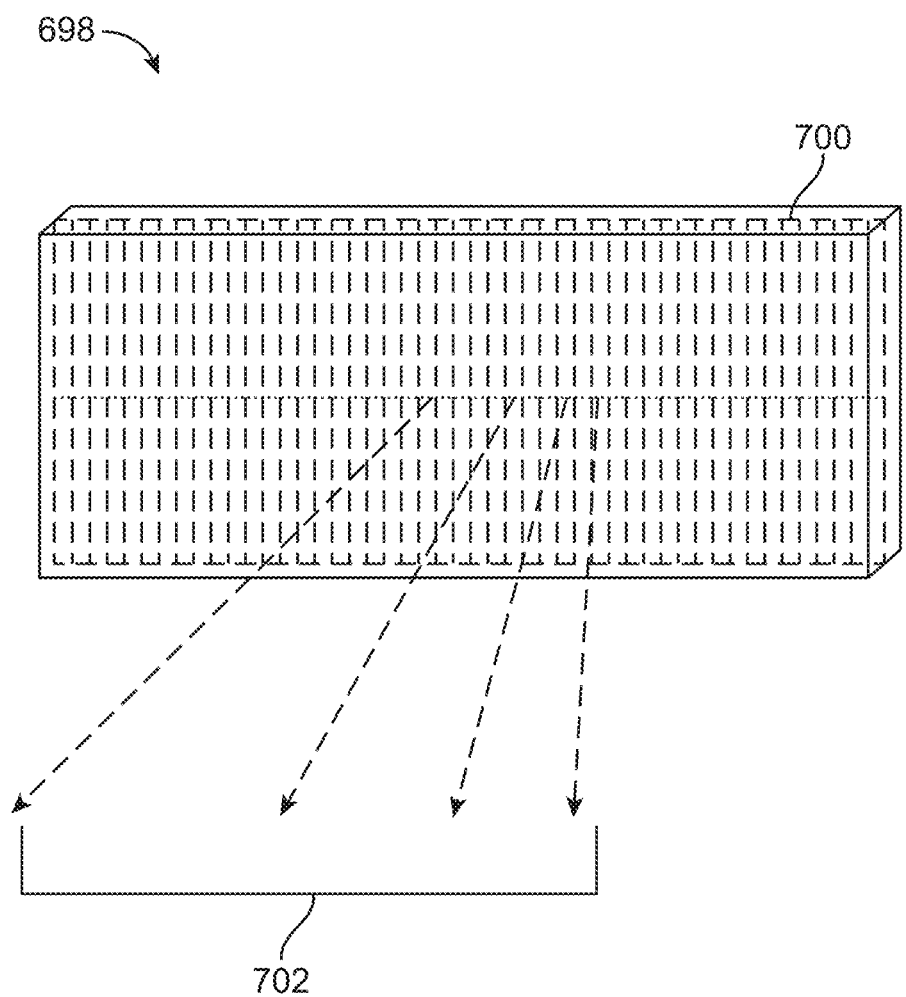
FIGS. 21A-21N illustrate various configurations of DOEs coupled to other optical elements, according to the illustrated embodiments.

As was discussed above in relation to FIGS. 8L, 8M, and 8N, a changeable diffraction configuration allows for scanning in one axis, somewhat akin to a scanning light display. FIG. 21A illustrates a waveguide (698) having an embedded (i.e., sandwiched within) DOE (700) with a linear grating term that may be changed to alter the exit angle of exiting light (702) from the waveguide, as shown. A high-frequency switching DOE material such as lithium niobate may be utilized. In one embodiment, such a scanning configuration may be used as the sole mechanism for scanning a beam in one axis; in another embodiment, the scanning configuration may be combined with other scanning axes, and may be used to create a larger field of view (i.e., if a normal field of view is 40 degrees, and by changing the linear diffraction pitch one can steer over another 40 degrees, the effective usable field of view for the system is 80 degrees).

Figure 21B:
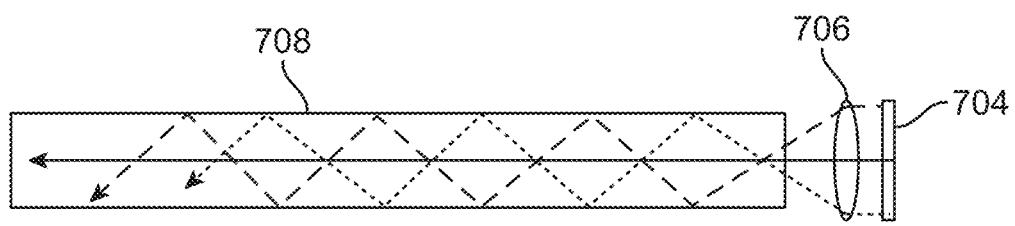

Referring to FIG. 21B, in a conventional configuration, a waveguide (708) may be placed perpendicular to a panel display (704), such as an LCD or OLED panel, such that beams may be injected from the waveguide (708), through a lens (706), and into the panel (704) in a scanning configuration to provide a viewable display for television or other purposes. Thus the waveguide may be utilized in such configuration as a scanning image source, in contrast to the configurations described in reference to FIG. 21A, wherein a single beam of light may be manipulated by a scanning fiber or other element to sweep through different angular locations, and in addition, another direction may be scanned using the high-frequency diffractive optical element.

In another embodiment, a uniaxial scanning fiber display (say scanning the fast line scan, as the scanning fiber is relatively high frequency) may be used to inject the fast line scan into the waveguide, and then the relatively slow DOE switching (i.e., in the range of 100 Hz) may be used to scan lines in the other axis to form an image.

In another embodiment, a DOE with a grating of fixed pitch may be combined with an adjacent layer of electro-active material having a dynamic refractive index (such as liquid crystal), so that light may be redirected into the grating at different angles. This is an application of the basic multipath configuration described above in reference to FIG. 7B, in which an electro-active layer comprising an electro-active material such as liquid crystal or lithium niobate may change its refractive index such that it changes the angle at which a ray emerges from the waveguide. A linear diffraction grating may be added to the configuration of FIG. 7B (in one embodiment, sandwiched within the glass or other material comprising the larger lower waveguide) such that the diffraction grating may remain at a fixed pitch, but the light is biased before it hits the grating.

Figure 21C:
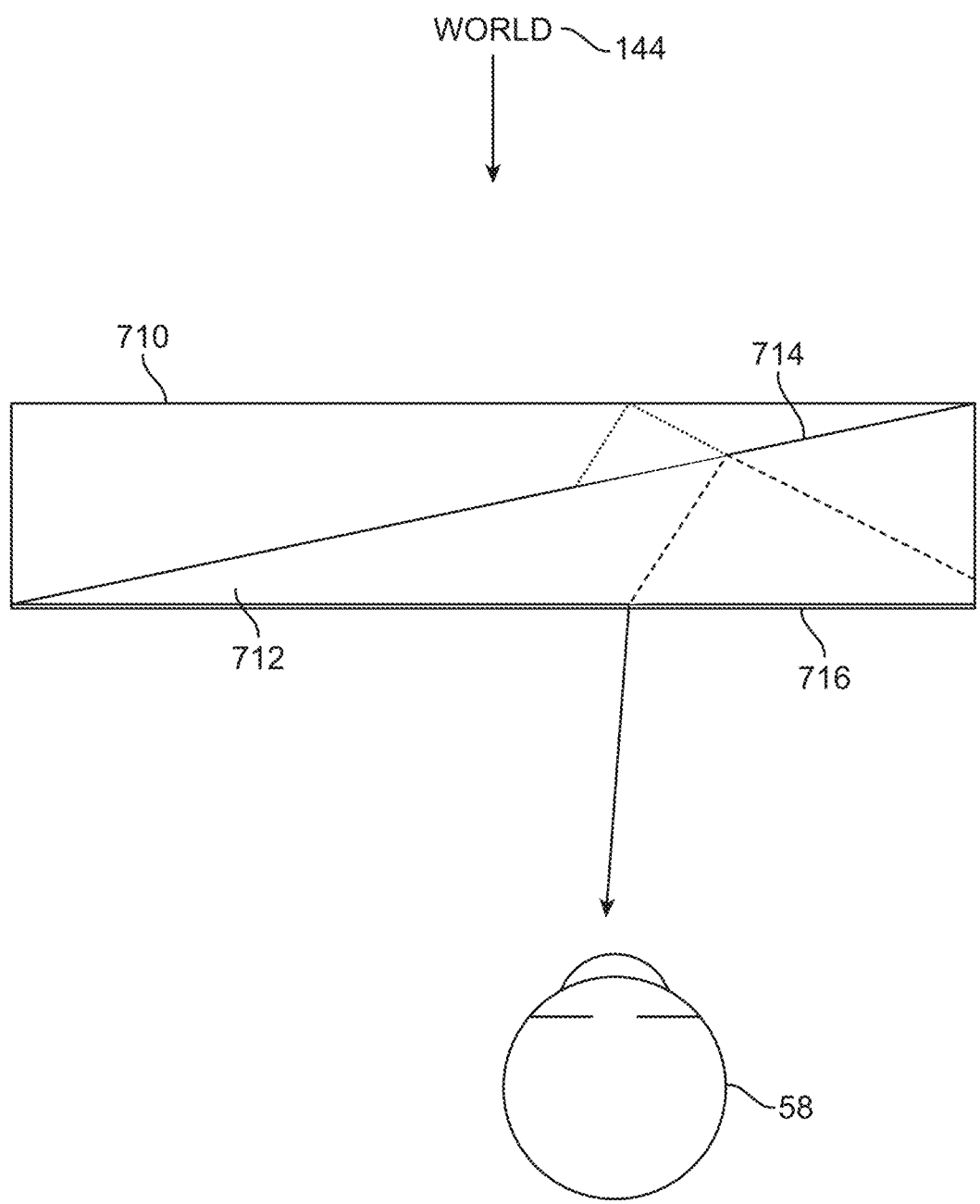
Figure 21D:
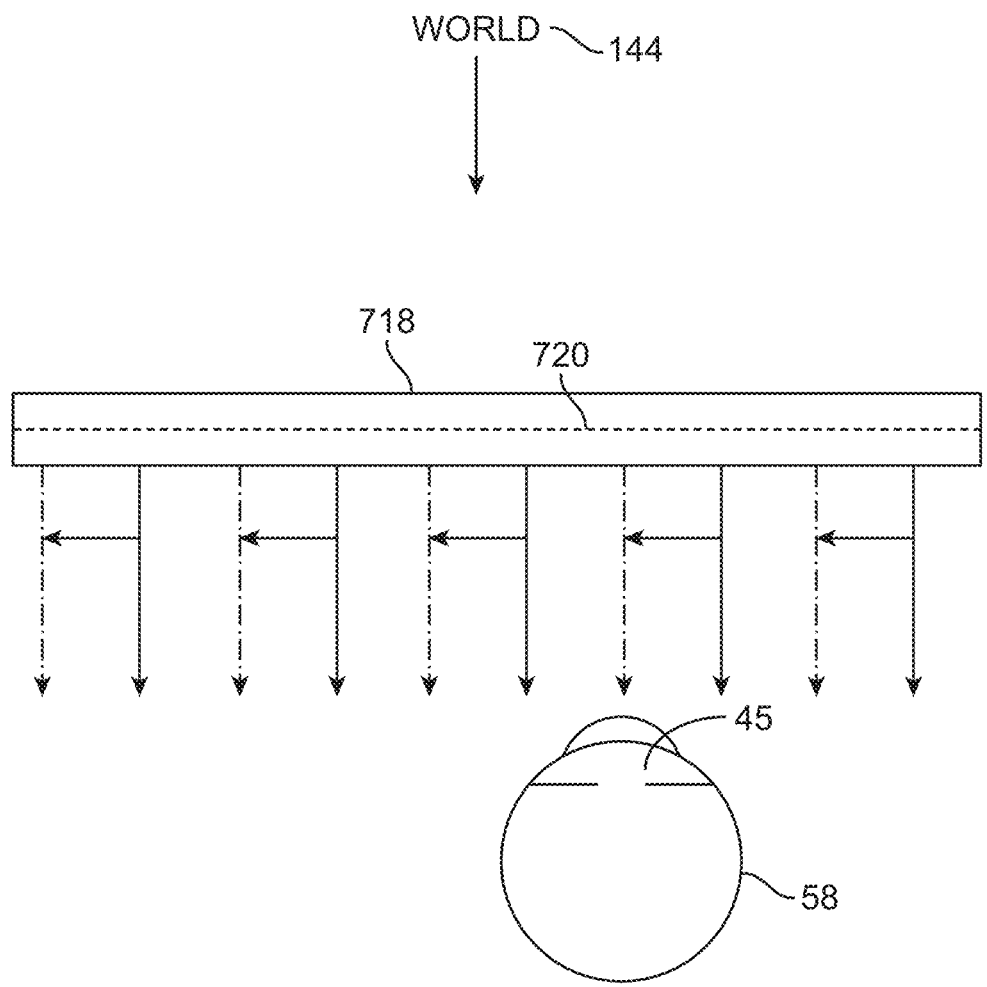

FIG. 21C shows another embodiment featuring two wedge-like waveguide elements (710, 712), wherein one or more of them may be electro-active so that the related refractive index may be changed. The elements may be configured such that when the wedges have matching refractive indices, the light totally internally reflects through the pair (which in the aggregate performs akin to a planar waveguide with both wedges matching) while the wedge interfaces have no effect. Then if one of the refractive indices is changed to create a mismatch, a beam deflection at the wedge interface (714) is caused, and there is total internal reflection from that surface back into the associated wedge. Then a controllable DOE (716) with a linear grating may be coupled along one of the long edges of the wedge to allow light to exit out and reach the eye at a desirable exit angle.

In another embodiment, a DOE such as a Bragg grating, may be configured to change pitch versus time, such as by a mechanical stretching of the grating (for example, if the grating resides on or comprises an elastic material), a moire beat pattern between two gratings on two different planes (the gratings may be the same or different pitches), Z-axis motion (i.e., closer to the eye, or farther away from the eye) of the grating, which functionally is similar in effect to stretching of the grating, or electro-active gratings that may be switched on or off, such as one created using a polymer dispersed liquid crystal approach wherein liquid crystal droplets may be controllably activated to change the refractive index to become an active grating, versus turning the voltage off and allowing a switch back to a refractive index that matches that of the host medium.

In another embodiment, a time-varying grating may be utilized for field of view expansion by creating a tiled display configuration. Further, a time-varying grating may be utilized to address chromatic aberration (failure to focus all colors/wavelengths at the same focal point). One property of diffraction gratings is that they will deflect a beam as a function of its angle of incidence and wavelength (i.e., a DOE will deflect different wavelengths by different angles: somewhat akin to the manner in which a simple prism will divide out a beam into its wavelength components).

One may use time-varying grating control to compensate for chromatic aberration in addition to field of view expansion. Thus, for example, in a waveguide with embedded DOE type of configuration as described above, the DOE may be configured to drive the red wavelength to a slightly different place than the green and blue to address unwanted chromatic aberration. The DOE may be time-varied by having a stack of elements that switch on and off (i.e. to get red, green, and blue to be diffracted outbound similarly).

In another embodiment, a time-varying grating may be utilized for exit pupil expansion. For example, referring to FIG. 21D, it is possible that a waveguide (718) with embedded DOE (720) may be positioned relative to a target pupil such that none of the beams exiting in a baseline mode actually enter the target pupil (45)—such that the pertinent pixel would be missed by the user. A time-varying configuration may be utilized to fill in the gaps in the outbound exit pattern by shifting the exit pattern laterally (shown in dashed/dotted lines) to effectively scan each of the 5 exiting beams to better ensure that one of them hits the pupil of the eye. In other words, the functional exit pupil of the display system is expanded.

In another embodiment, a time-varying grating may be utilized with a waveguide for one, two, or three axis light scanning. In a manner akin to that described in reference to FIG. 21A, one may use a term in a grating that is scanning a beam in the vertical axis, as well as a grating that is scanning in the horizontal axis. Further, if radial elements of a grating are incorporated, as is discussed above in relation to FIGS. 8B-8N, one may have scanning of the beam in the Z axis (i.e., toward/away from the eye), all of which may be time sequential scanning.

Notwithstanding the discussions herein regarding specialized treatments and uses of DOEs generally in connection with waveguides, many of these uses of DOE are usable whether or not the DOE is embedded in a waveguide. For example, the output of a waveguide may be separately manipulated using a DOE; or a beam may be manipulated by a DOE before it is injected into a waveguide; further, one or more DOEs, such as a time-varying DOE, may be utilized as an input for freeform optics configurations, as discussed below.

As discussed above in reference to FIGS. 8B-8N, an element of a DOE may have a circularly-symmetric term, which may be summed with a linear term to create a controlled exit pattern (i.e., as described above, the same DOE that outcouples light may also focus it). In another embodiment, the circular term of the DOE diffraction grating may be varied such that the focus of the beams representing those pertinent pixels is modulated. In addition, one configuration may have a second/separate circular DOE, obviating the need to have a linear term in the DOE.

Figure 21E:
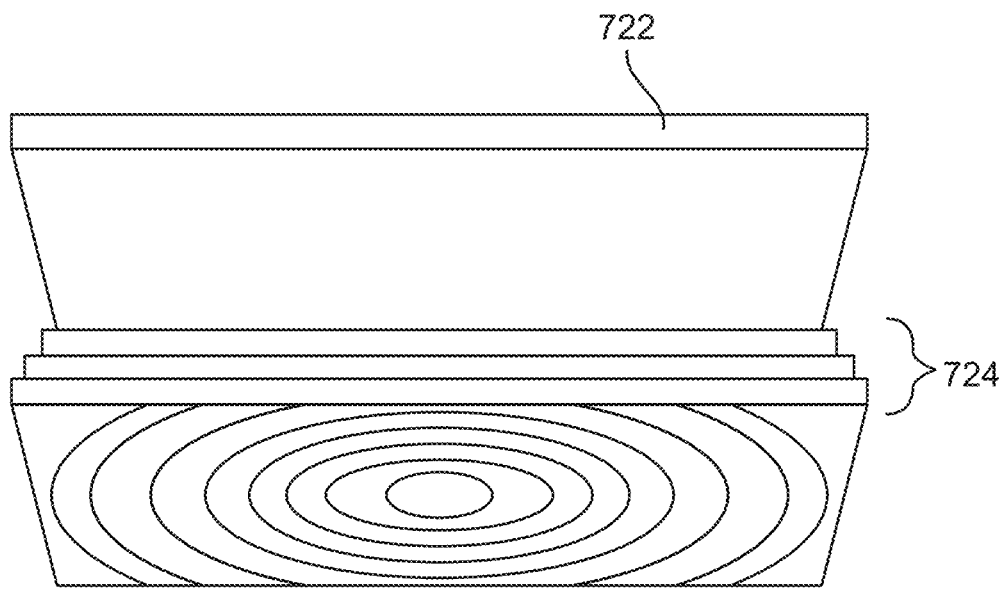
Figure 21F:
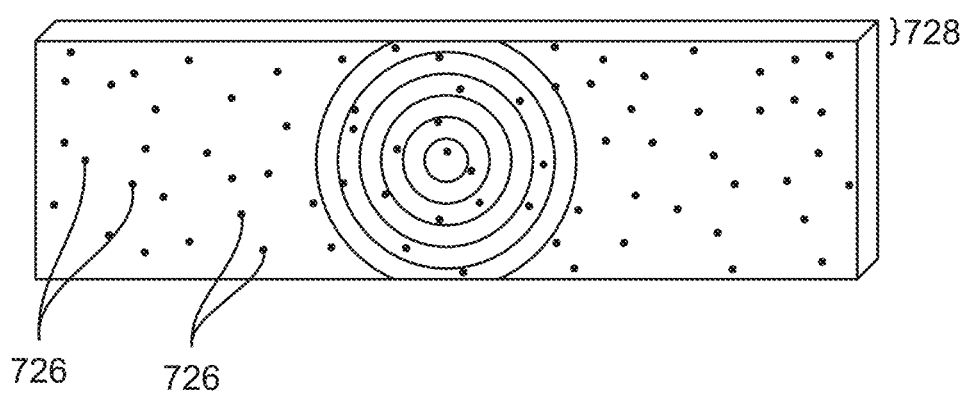

Referring to FIG. 21E, one may have a waveguide (722) outputting collimated light with no DOE element embedded, and a second waveguide that has a circularly-symmetric DOE that can be switched between multiple configurations—in one embodiment by having a stack (724) of such DOE elements (FIG. 21F shows another configuration wherein a functional stack 728 of DOE elements may comprise a stack of polymer dispersed liquid crystal elements 726, as described above, wherein without a voltage applied, a host medium refraction index matches that of a dispersed molecules of liquid crystal; in another embodiment, molecules of lithium niobate may be dispersed for faster response times; with voltage applied, such as through transparent indium tin oxide layers on either side of the host medium, the dispersed molecules change index of refraction and functionally form a diffraction pattern within the host medium) that can be switched on/off.

Figure 21G:
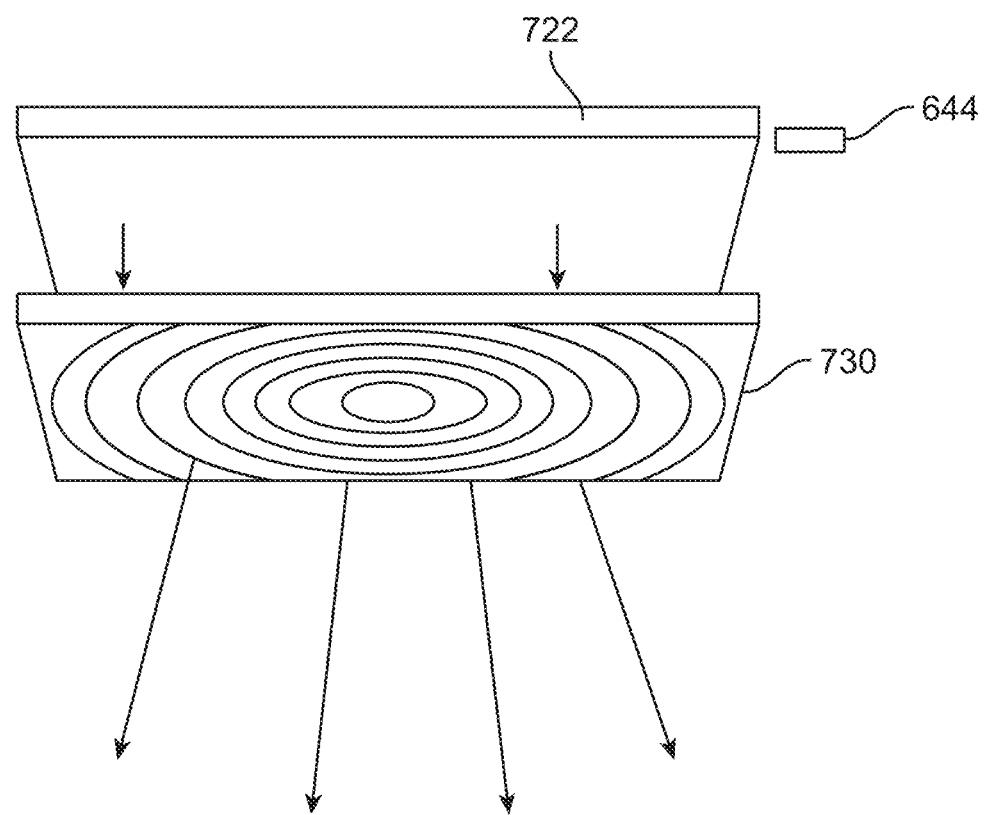
Figure 21H:
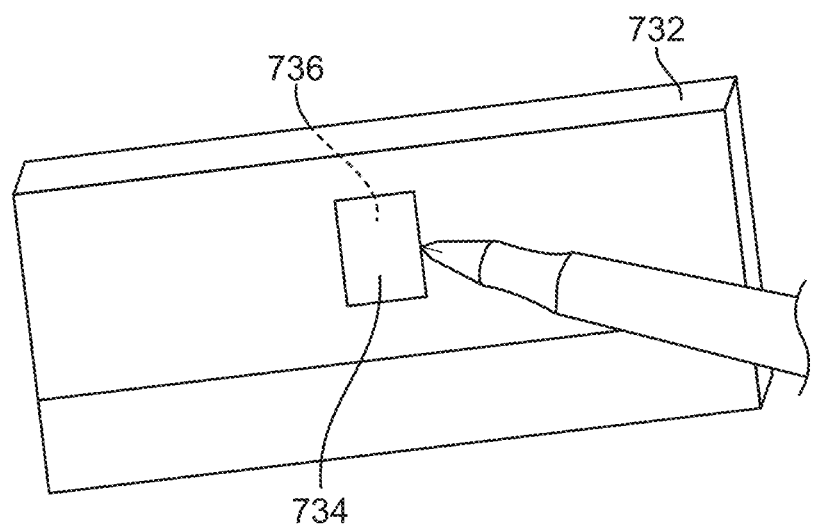

In another embodiment, a circular DOE may be layered in front of a waveguide for focus modulation. Referring to FIG. 21G, the waveguide (722) is outputting collimated light, which will be perceived as associated with a focal depth of optical infinity unless otherwise modified. The collimated light from the waveguide may be input into a diffractive optical element (730) which may be used for dynamic focus modulation (i.e., one may switch on and off different circular DOE patterns to impart various different focuses to the exiting light). In a related embodiment, a static DOE may be used to focus collimated light exiting from a waveguide to a single depth of focus that may be useful for a particular user application.

In another embodiment, multiple stacked circular DOEs may be used for additive power and many focus levels—from a relatively small number of switchable DOE layers. In other words, three different DOE layers may be switched on in various combinations relative to each other; the optical powers of the DOEs that are switched on may be added. In one embodiment wherein a range of up to 4 diopters is desired, for example, a first DOE may be configured to provide half of the total diopter range desired (in this example, 2 diopters of change in focus); a second DOE may be configured to induce a 1 diopter change in focus; then a third DOE may be configured to induce a ½ diopter change in focus. These three DOEs may be mixed and matched to provide ½, 1, 1.5, 2, 2.5, 3, and 3.5 diopters of change in focus. Thus a super large number of DOEs would not be required to get a relatively broad range of control.

In one embodiment, a matrix of switchable DOE elements may be utilized for scanning, field of view expansion, and/or exit pupil expansion. Generally in the above discussions of DOEs, it has been assume that a typical DOE is either all on or all off. In one variation, a DOE (732) may be subdivided into a plurality of functional subsections (such as the one labeled as element 734 in FIG. 21H), each of which preferably is uniquely controllable to be on or off (for example, referring to FIG. 21H, each subsection may be operated by its own set of indium tin oxide, or other control lead material, voltage application leads 736 back to a central controller). Given this level of control over a DOE paradigm, additional configurations are facilitated.

Figure 21I:
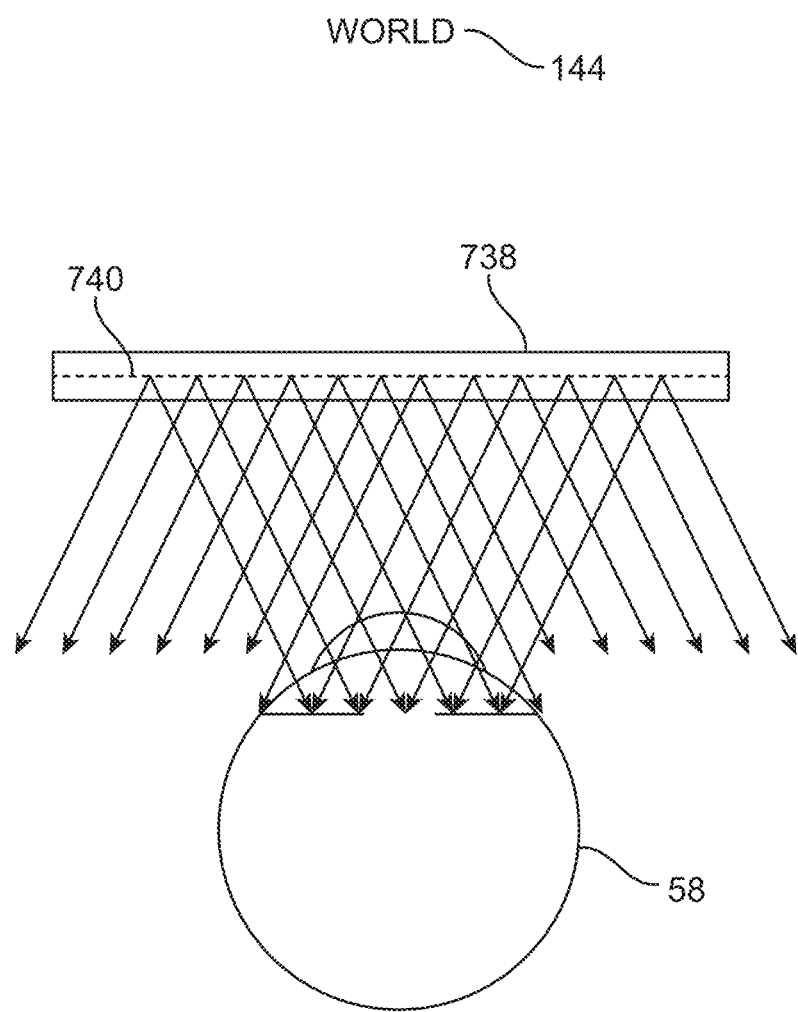
Figure 21J:
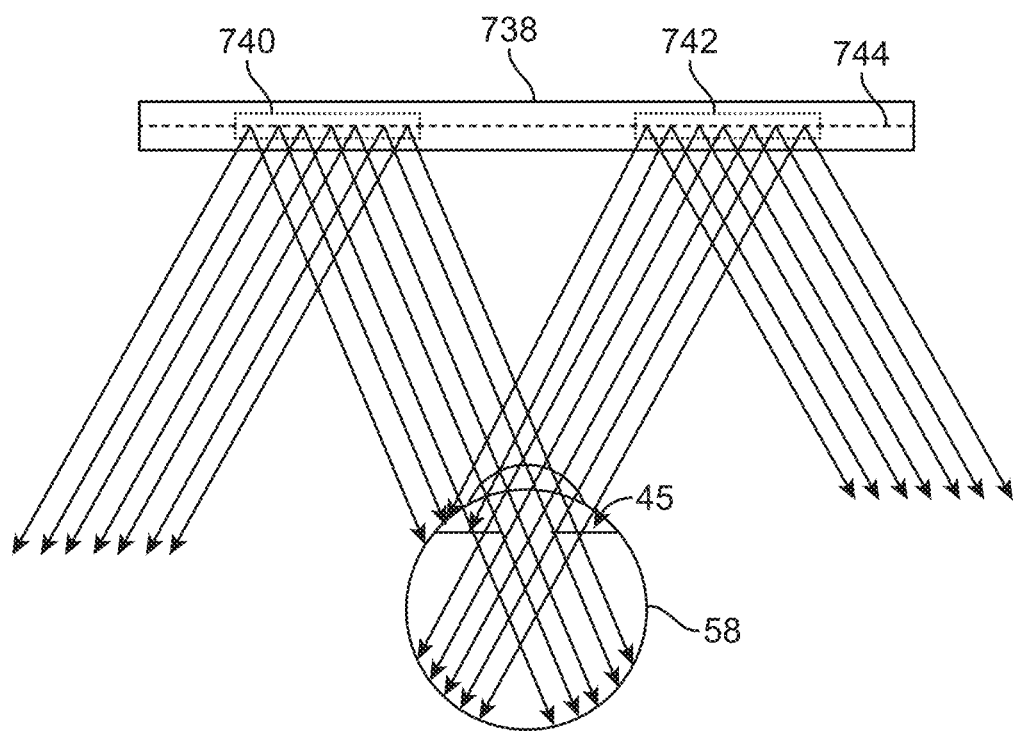

Referring to FIG. 21I, a waveguide (738) with embedded DOE (740) is viewed from the top down, with the user's eye positioned in front of the waveguide. A given pixel may be represented as a beam coming into the waveguide and totally internally reflecting along until it may be exited by a diffraction pattern to come out of the waveguide as a set of beams. Depending upon the diffraction configuration, the beams may come out parallel/collimated (as shown in FIG. 21I for convenience), or in a diverging fan configuration if representing a focal distance closer than optical infinity.

The depicted set of parallel exiting beams may represent, for example, the farthest left pixel of what the user is seeing in the real world as viewed through the waveguide, and light off to the rightmost extreme will be a different group of parallel exiting beams. Indeed, with modular control of the DOE subsections as described above, one may spend more computing resource or time creating and manipulating the small subset of beams that is likely to be actively addressing the user's pupil (i.e., because the other beams never reach the user's eye and are effectively wasted). Thus, referring to FIG. 21J, a waveguide (738) configuration is shown wherein only the two subsections (740, 742) of the DOE (744) are deemed to be likely to address the user's pupil (45) are activated. Preferably one subsection may be configured to direct light in one direction simultaneously as another subsection is directing light in a different direction.

Figure 21K:
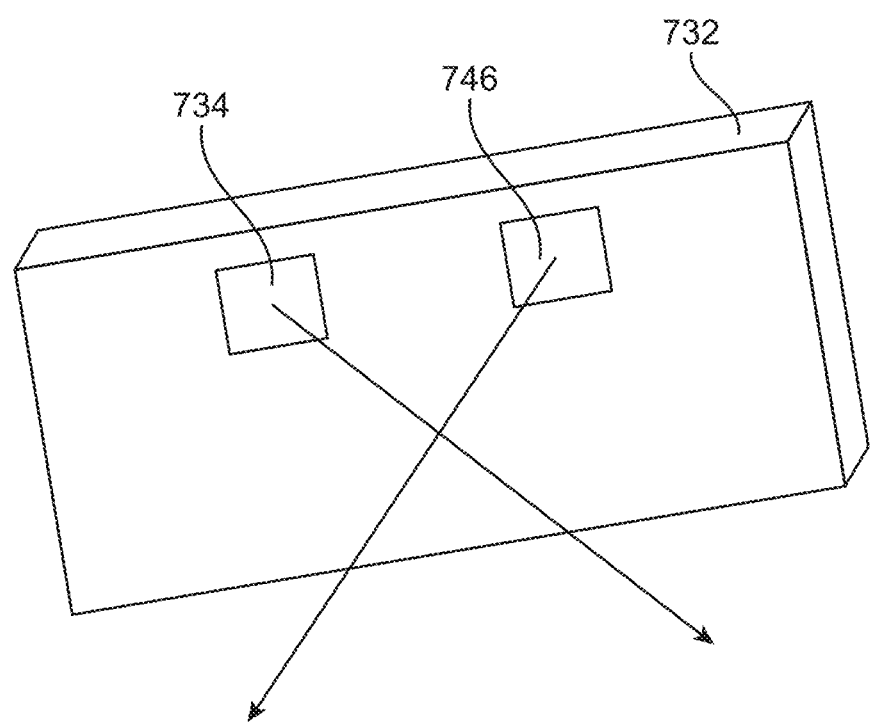
Figure 21L:
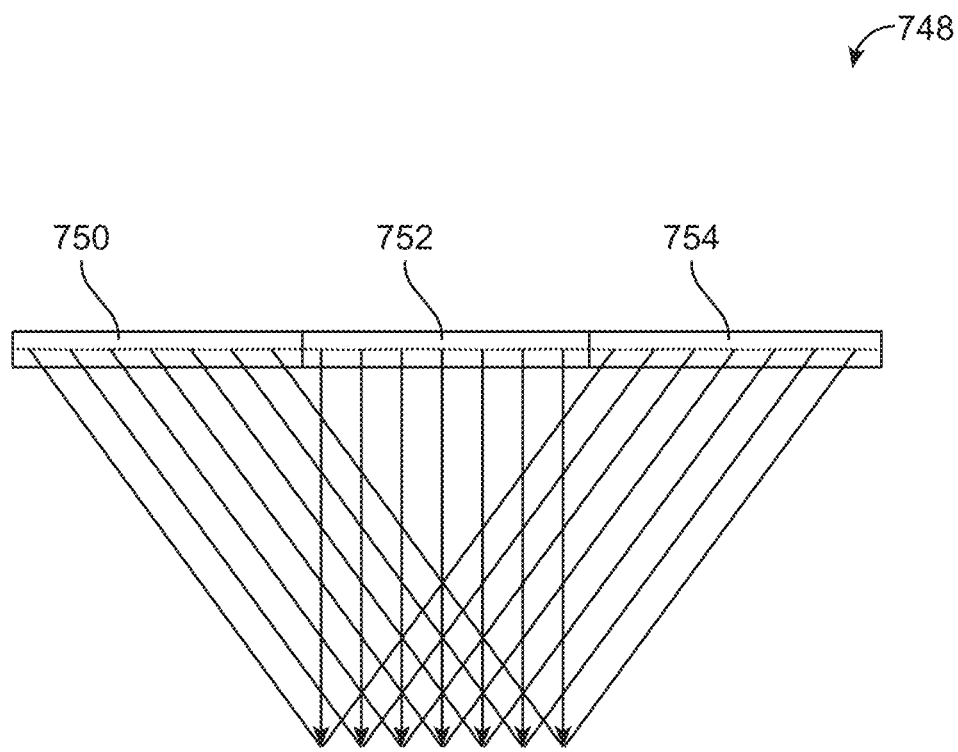

FIG. 21K shows an orthogonal view of two independently controlled subsections (734, 746) of a DOE (732). Referring to the top view of FIG. 21L, such independent control may be used for scanning or focusing light. In the configuration depicted in FIG. 21K, an assembly (748) of three independently controlled DOE/waveguide subsections (750, 752, 754) may be used to scan, increase the field of view, and/or increase the exit pupil region. Such functionality may arise from a single waveguide with such independently controllable DOE subsections, or a vertical stack of these for additional complexity.

In one embodiment, if a circular DOE may be controllably stretched radially-symmetrically, the diffraction pitch may be modulated, and the DOE may be utilized as a tunable lens with an analog type of control. In another embodiment, a single axis of stretch (for example, to adjust an angle of a linear DOE term) may be utilized for DOE control. Further, in another embodiment a membrane, akin to a drum head, may be vibrated, with oscillatory motion in the Z-axis (i.e., toward/away from the eye) providing Z-axis control and focus change over time.

Figure 21M:
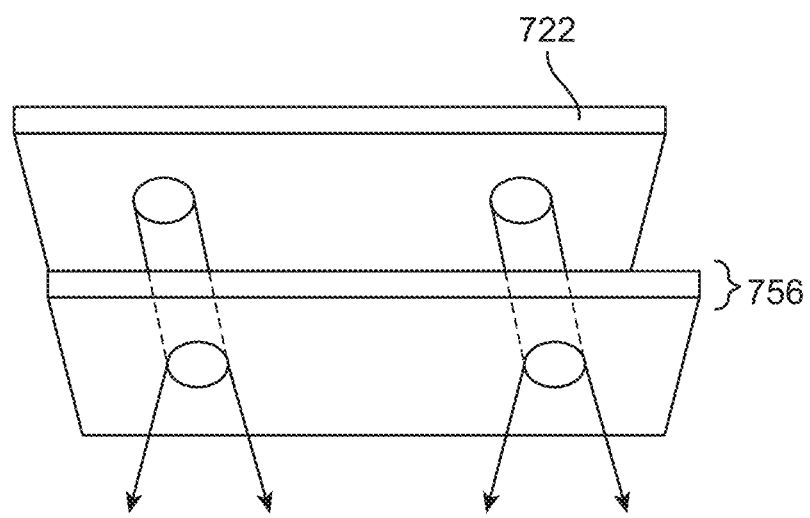

Referring to FIG. 21M, a stack of several DOEs (756) is shown receiving collimated light from a waveguide (722) and refocusing it based upon the additive powers of the activated DOEs. Linear and/or radial terms of DOEs may be modulated over time, such as on a frame sequential basis, to produce a variety of treatments (such as tiled display configurations or expanded field of view) for the light coming from the waveguide and exiting, preferably toward the user's eye. In configurations wherein the DOE or DOEs are embedded within the waveguide, a low diffraction efficiency is desired to maximize transparency for light passed from the real world; in configurations wherein the DOE or DOEs are not embedded, a high diffraction efficiency may be desired, as described above. In one embodiment, both linear and radial DOE terms may be combined outside of the waveguide, in which case high diffraction efficiency would be desired.

Figure 21N:
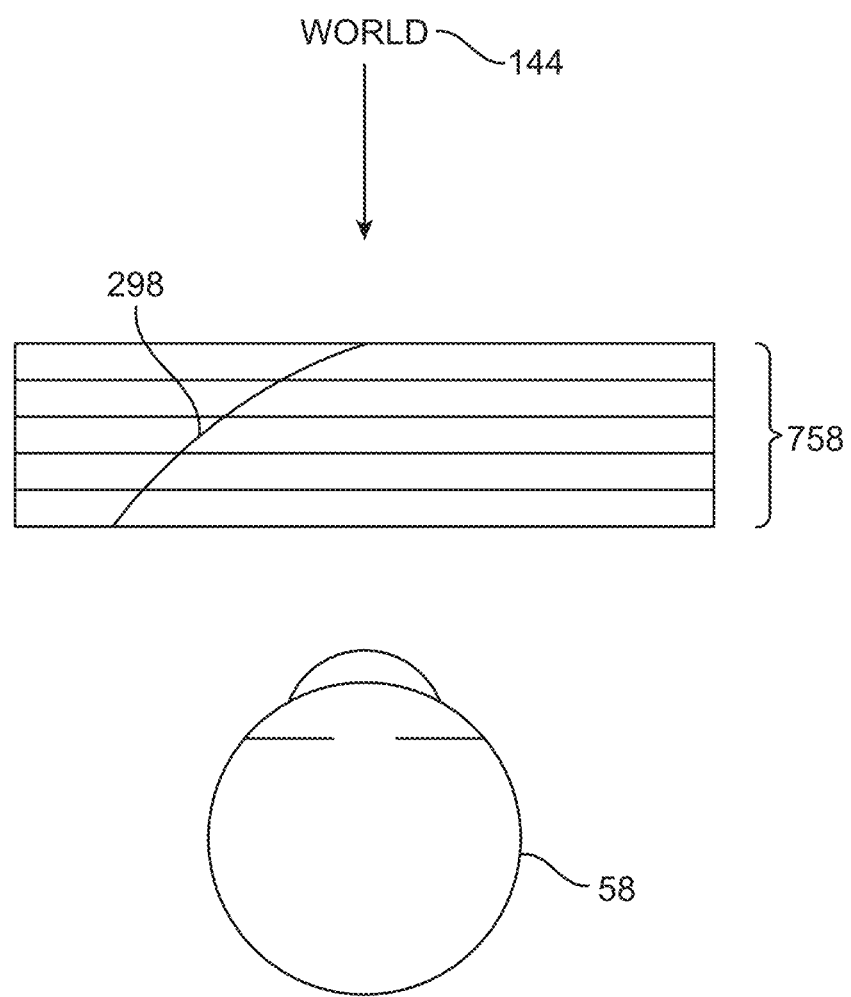

Referring to FIG. 21N, a segmented or parabolic reflector, such as those discussed above in FIG. 8Q, is shown. Rather than executing a segmented reflector by combining a plurality of smaller reflectors, in one embodiment the same functionality may result from a single waveguide with a DOE having different phase profiles for each section of it, such that it is controllable by subsection. In other words, while the entire segmented reflector functionality may be turned on or off together, generally the DOE may be configured to direct light toward the same region in space (i.e., the pupil of the user).

Figure 22A:
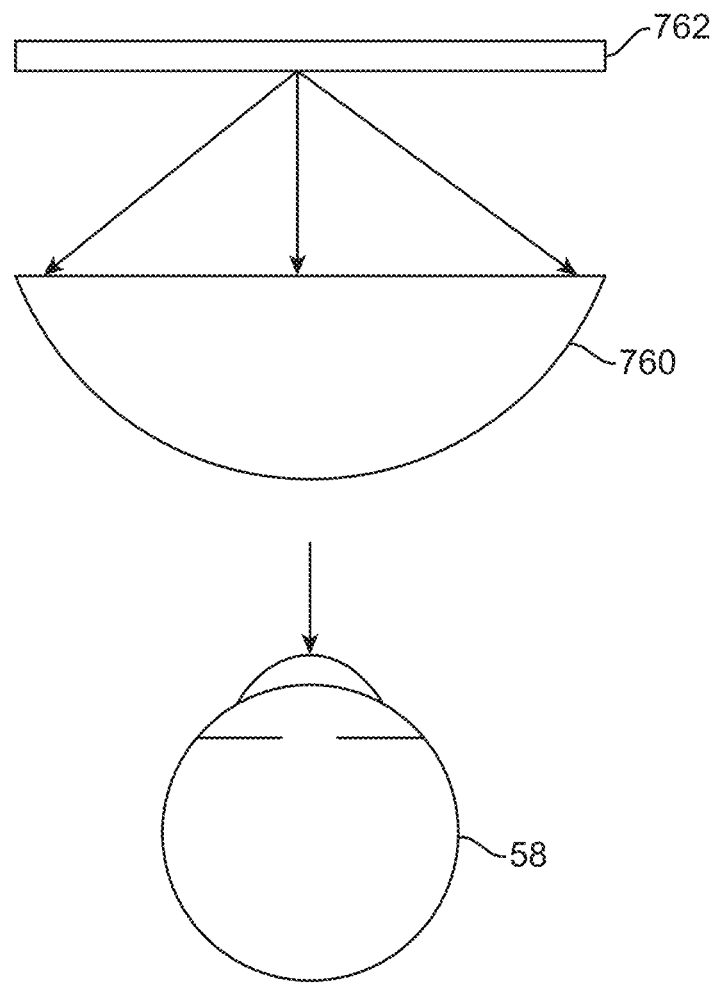
FIGS. 22A-22Y illustrate various configurations of freeform optics, according to the illustrated embodiments.

Referring to FIGS. 22A-22Z, optical configurations known as "freeform optics" may be utilized certain of the aforementioned challenges. The term "freeform" generally is used in reference to arbitrarily curved surfaces that may be utilized in situations wherein a spherical, parabolic, or cylindrical lens does not meet a design complexity such as a geometric constraint. For example, referring to FIG. 22A, one of the common challenges with display (762) configurations when a user is looking through a mirror (and also sometimes a lens 760) is that the field of view is limited by the area subtended by the final lens (760) of the system.

Figure 22B:
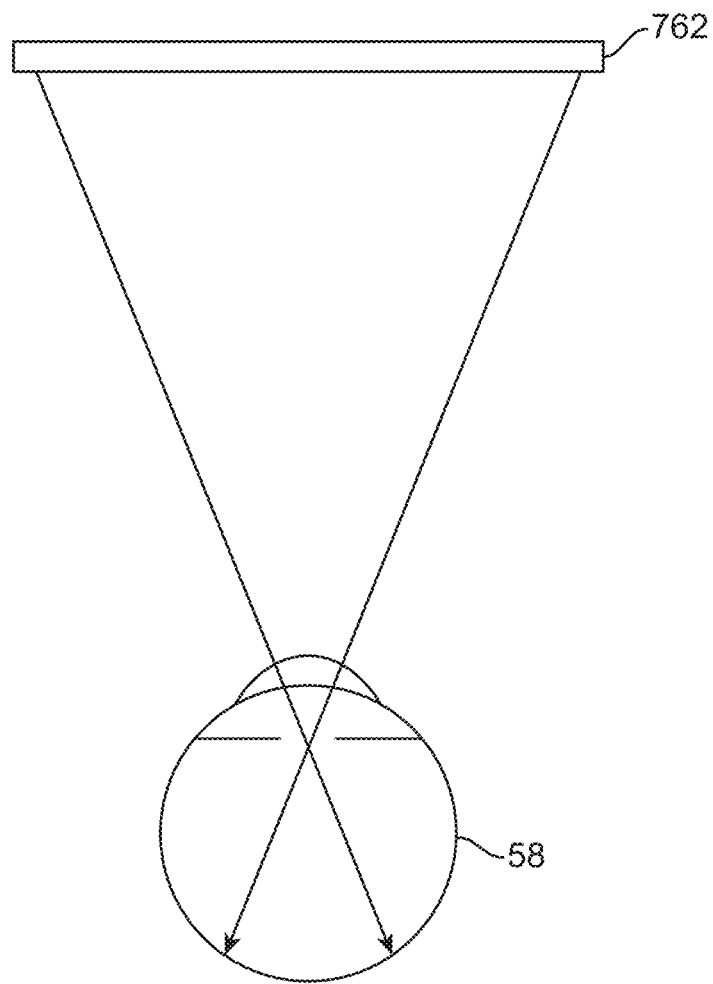
Figure 22C:
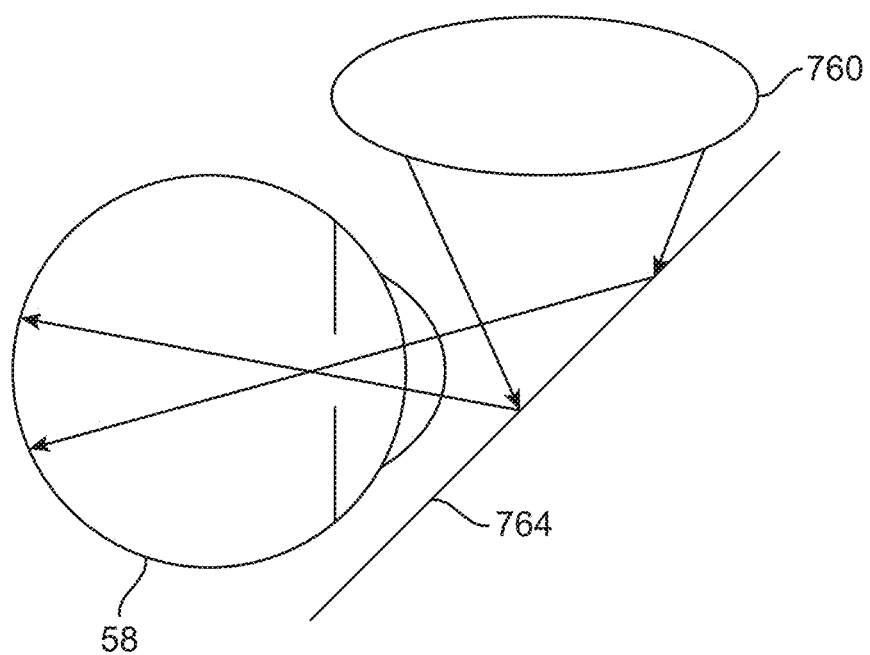

Referring to FIG. 22B, in more simple terms, if one has a display (762), which may include some lens elements, there is a straightforward geometric relationship such that the field of view cannot be larger than the angle subtended by the display (762). Referring to FIG. 22C, this challenge is exacerbated if the user is trying to have an augmented reality experience wherein light from the real world is also be to passed through the optical system, because in such case, there often is a reflector (764) that leads to a lens (760); by interposing a reflector, the overall path length to get to the lens from the eye is increased, which tightens the angle and reduces the field of view.

Given this, if one wants to increase the field of view, he must increase the size of the lens, but that might mean pushing a physical lens toward the forehead of the user from an ergonomic perspective. Further, the reflector may not catch all of the light from the larger lens. Thus, there is a practical limitation imposed by human head geometry, and it generally is a challenge to get more than a 40-degree field of view using conventional see-through displays and lenses.

Figure 22D:
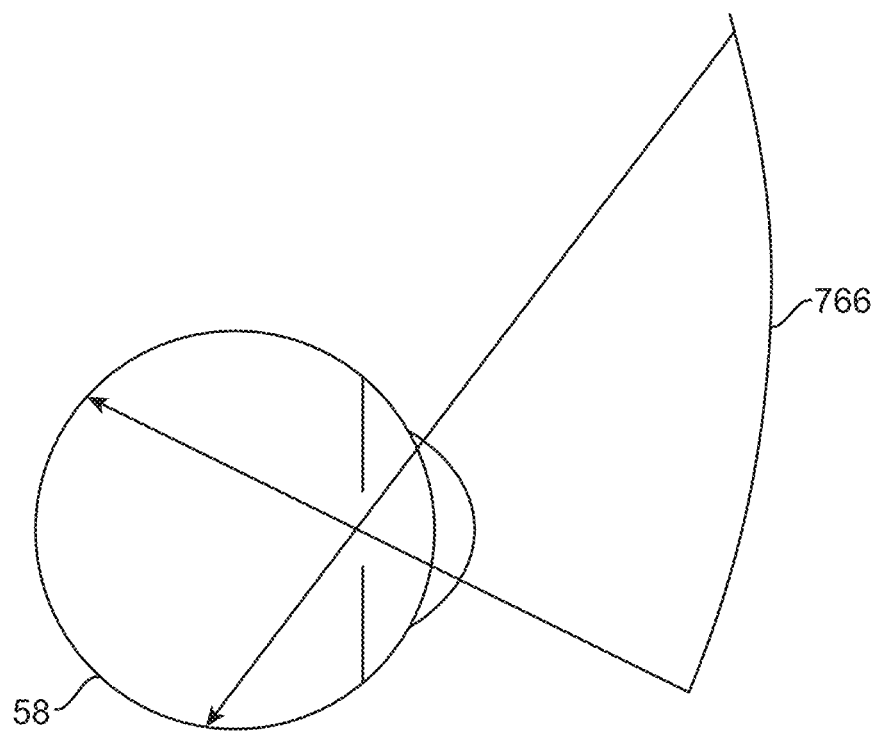

With freeform lenses, rather than having a standard planar reflector as described above, one has a combined reflector and lens with power (i.e., a curved reflector 766), which means that the curved lens geometry determines the field of view. Referring to FIG. 22D, without the circuitous path length of a conventional paradigm as described above in reference to FIG. 22C, it is possible for a freeform arrangement to realize a significantly larger field of view for a given set of optical requirements.

Figure 22E:
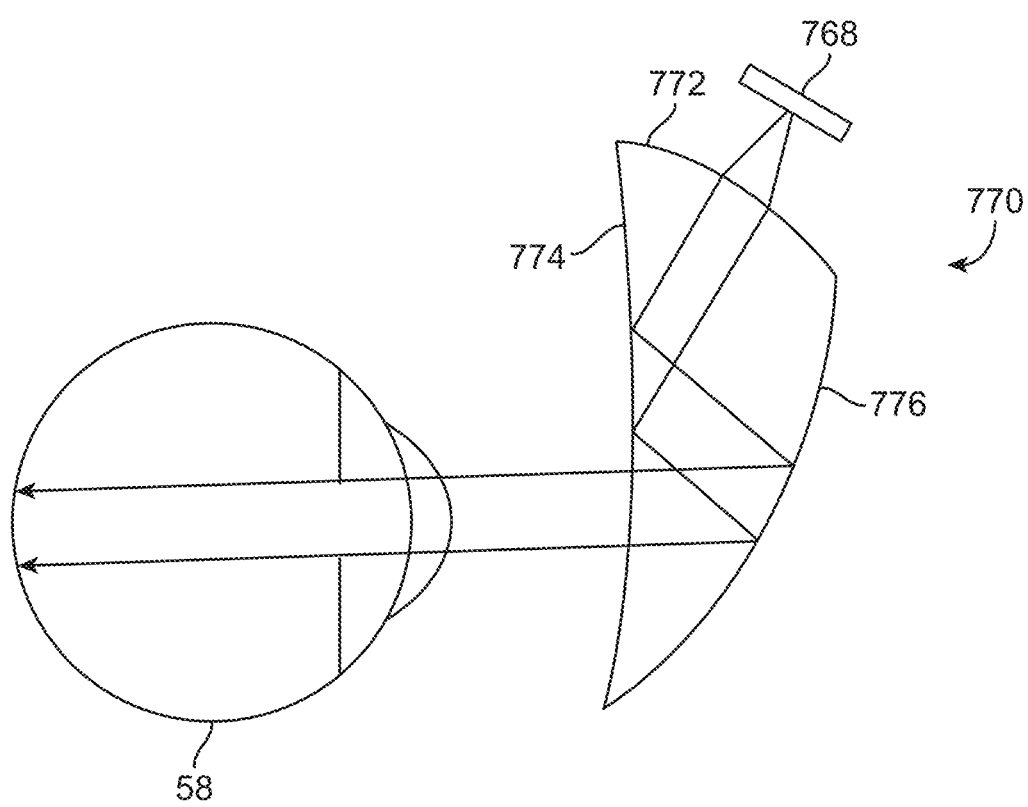

Referring to FIG. 22E, a typical freeform optic has three active surfaces. Referring to FIG. 22E, in one typical freeform optic (770) configuration, light may be directed toward the freeform optic from an image plane, such as a flat panel display (768), into the first active surface (772), which typically is a primarily transmissive freeform surface that refracts transmitted light and imparts a focal change (such as an added stigmatism, because the final bounce from the third surface will add a matching/opposite stigmatism and these are desirably canceled). The incoming light may be directed from the first surface to a second surface (774), wherein it may strike with an angle shallow enough to cause the light to be reflected under total internal reflection toward the third surface (776).

The third surface may comprise a half-silvered, arbitrarily-curved surface configured to bounce the light out through the second surface toward the eye, as shown in FIG. 22E. Thus in the depicted typical freeform configuration, the light enters through the first surface, bounces from the second surface, bounces from the third surface, and is directed out of the second surface. Due to the optimization of the second surface to have the requisite reflective properties on the first pass, as well as refractive properties on the second pass as the light is exited toward the eye, a variety of curved surfaces with higher-order shapes than a simple sphere or parabola are formed into the freeform optic.

Figure 22F:
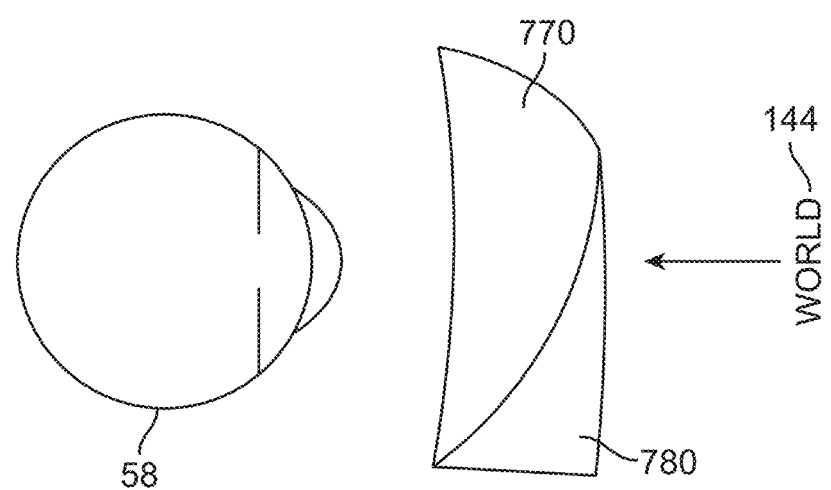

Referring to FIG. 22F, a compensating lens (780) may be added to the freeform optic (770) such that the total thickness of the optic assembly is substantially uniform in thickness, and preferably without magnification, to light incoming from the real world (144) in an augmented reality configuration.

Figure 22G:
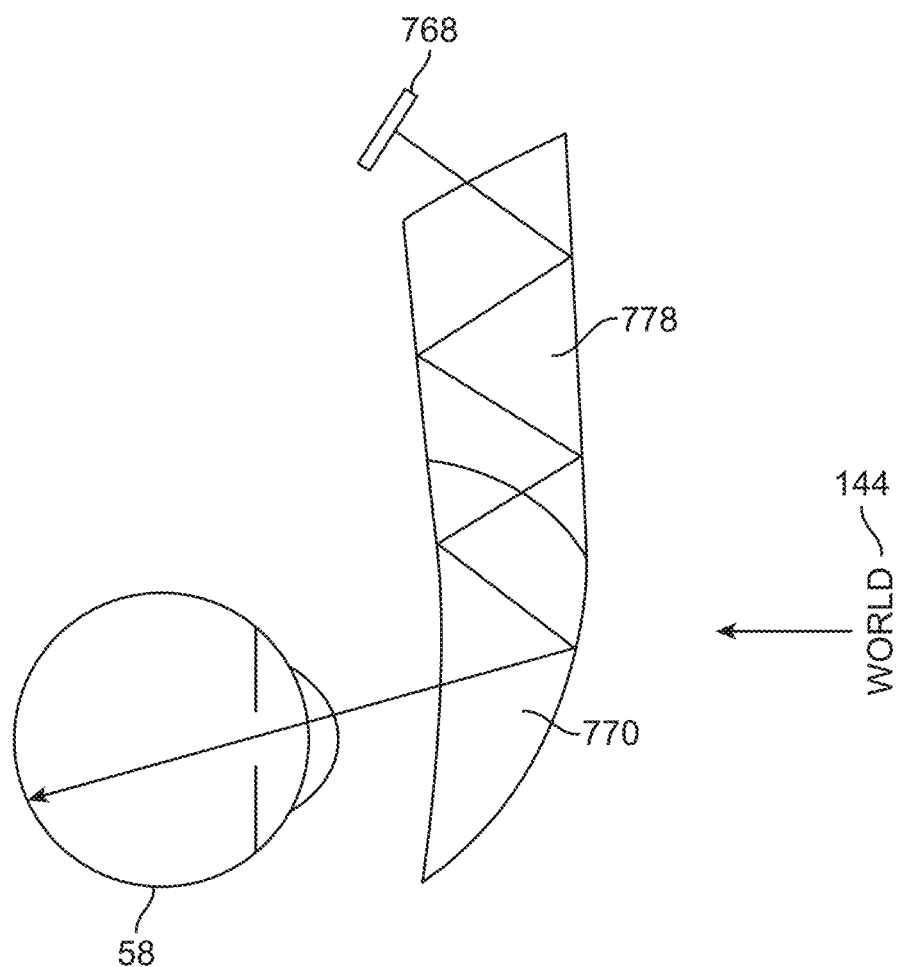

Referring to FIG. 22G, a freeform optic (770) may be combined with a waveguide (778) configured to facilitate total internal reflection of captured light within certain constraints. For example, as shown in FIG. 22G, light may be directed into the freeform/waveguide assembly from an image plane, such as a flat panel display, and totally internally reflected within the waveguide until it hits the curved freeform surface and escapes toward the eye of the user. Thus the light bounces several times in total internal reflection until it reaches the freeform wedge portion.

Figure 22H:
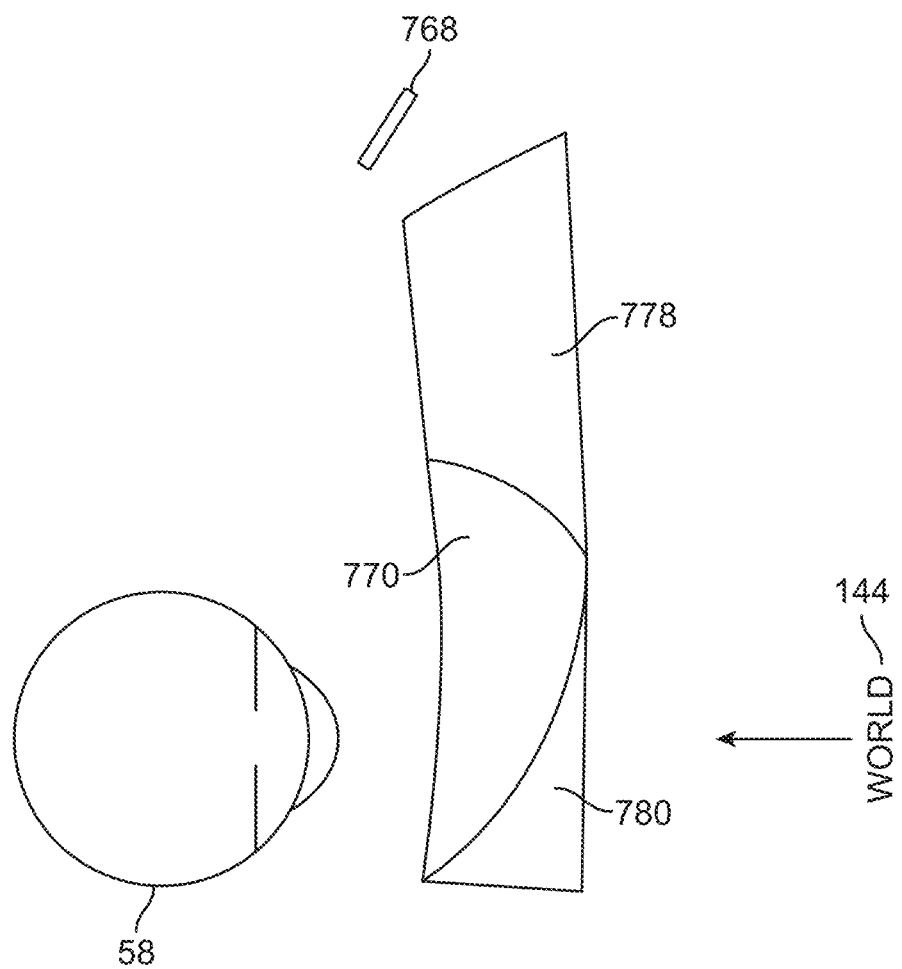

One of the main objectives with such an assembly is to try to lengthen the optic assembly while retaining as uniform a thickness as possible (to facilitate transport by total internal reflection, and also viewing of the world through the assembly without further compensation) for a larger field of view. FIG. 22H depicts a configuration similar to that of FIG. 22G, with the exception that the configuration of FIG. 22H also features a compensating lens portion to further extend the thickness uniformity and assist with viewing the world through the assembly without further compensation.

Figure 22I:
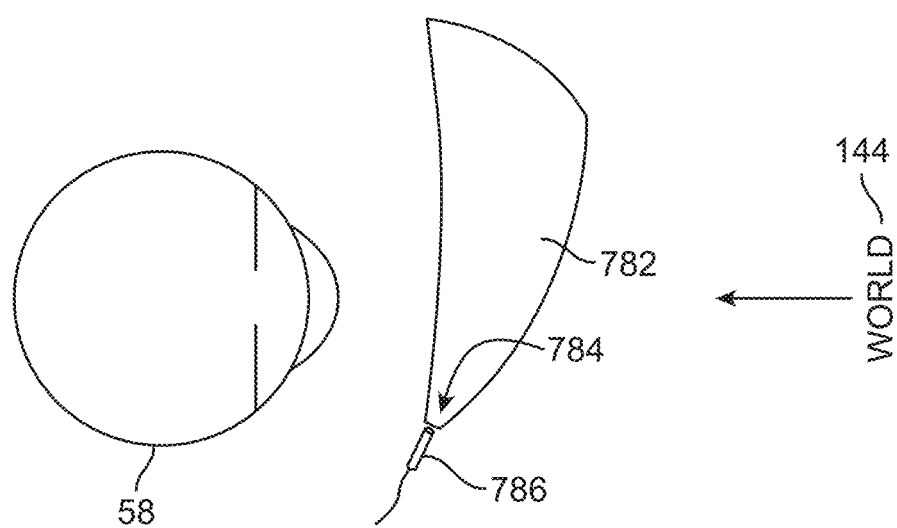

Referring to FIG. 22I, in another embodiment, a freeform optic (782) is shown with a small flat surface, or fourth face (784), at the lower left corner that is configured to facilitate injection of image information at a different location than is typically used with freeform optics. The input device (786) may comprise, for example, a scanning fiber display, which may be designed to have a very small output geometry. The fourth face may comprise various geometries itself and have its own refractive power, such as by use planar or freeform surface geometries.

Figure 22J:
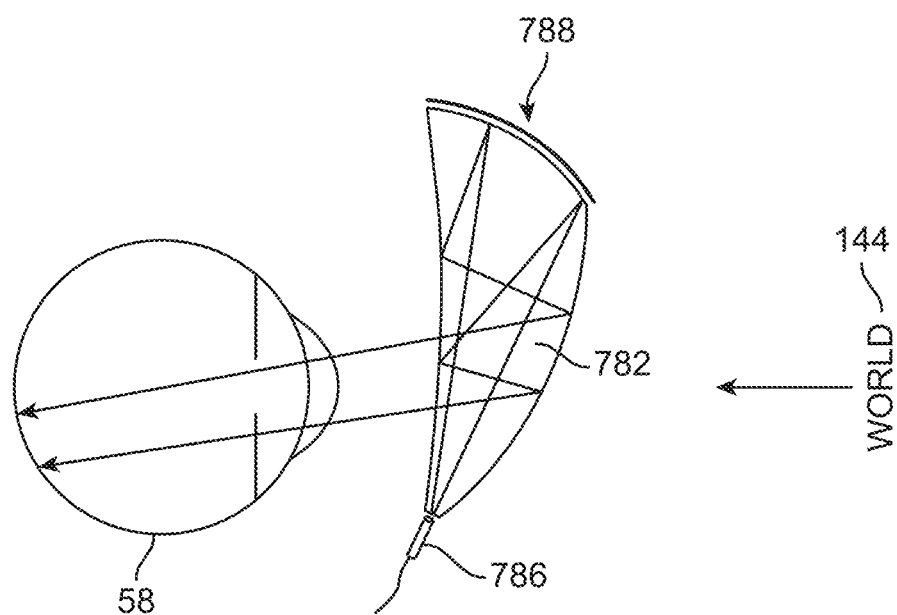

Referring to FIG. 22J, in practice, such a configuration may also feature a reflective coating (788) along the first surface such that it directs light back to the second surface, which then bounces the light to the third surface, which directs the light out across the second surface and to the eye (58). The addition of the fourth small surface for injection of the image information facilitates a more compact configuration. In an embodiment wherein a classical freeform input configuration and a scanning fiber display (790) are utilized, some lenses (792, 794) may be required in order to appropriately form an image plane (796) using the output from the scanning fiber display; these hardware components add extra bulk that may not be desired.

Figure 22K:
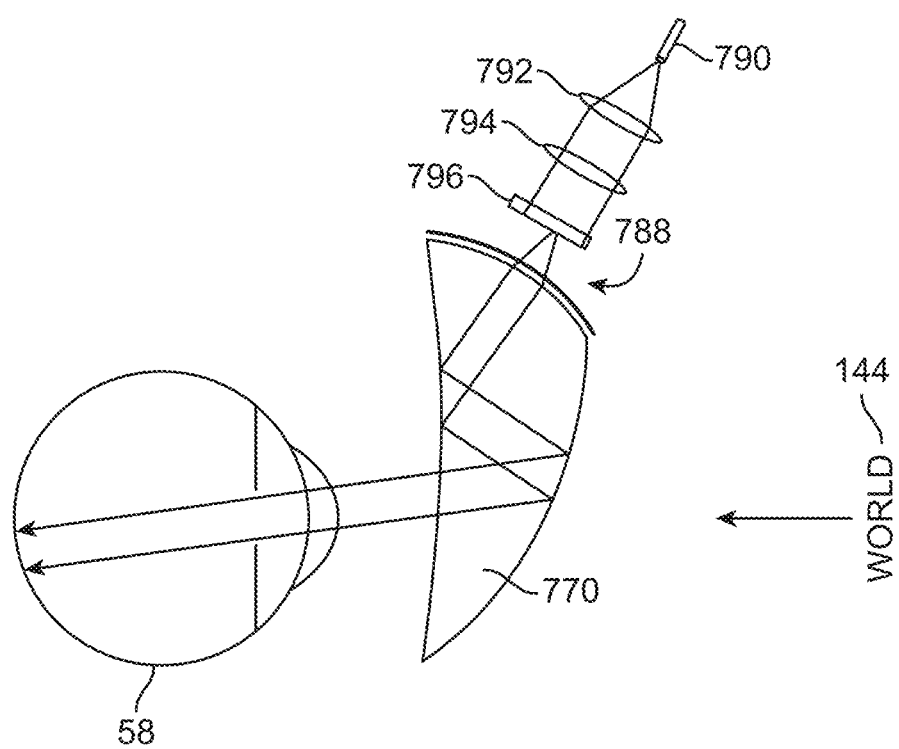

Referring to FIG. 22K, an embodiment is shown wherein light from a scanning fiber display (790) is passed through an input optics assembly (792, 794) to an image plane (796), and then directed across the first surface of the freeform optic (770) to a total internal reflection bounce off of the second surface, then another total internal reflection bounce from the third surface results in the light exiting across the second surface and being directed toward the eye (58).

An all-total-internal-reflection freeform waveguide may be created such that there are no reflective coatings (i.e., such that total-internal-reflection is being relied upon for propagation of light until a critical angle of incidence with a surface is met, at which point the light exits in a manner akin to the wedge-shaped optics described above). In other words, rather than having two planar surfaces, one may have a surface comprising one or more sub-surfaces from a set of conical curves, such as parabolas, spheres, ellipses, etc.).

Such a configuration still may produce a shallow-enough angles for total internal reflection within the optic; thus an approach that is somewhat a hybrid between a conventional freeform optic and a wedge-shaped waveguide is presented. One motivation to have such a configuration is to get away from the use of reflective coatings, which do help product reflection, but also are known to prevent transmission of a relatively large portion (such as 50%) of the light transmitting through from the real world (144). Further, such coatings also may block an equivalent amount of the light coming into the freeform optic from the input device. Thus there are reasons to develop designs that do not have reflective coatings.

As described above, one of the surfaces of a conventional freeform optic may comprise a half-silvered reflective surface. Generally such a reflective surface will be of "neutral density", meaning that it will generally reflect all wavelengths similarly. In another embodiment, such as one wherein a scanning fiber display is utilized as an input, the conventional reflector paradigm may be replaced with a narrow band reflector that is wavelength sensitive, such as a thin film laserline reflector. Thus in one embodiment, a configuration may reflect particular red/green/blue wavelength ranges and remain passive to other wavelengths, which generally will increase transparency of the optic and therefore be preferred for augmented reality configurations wherein transmission of image information from the real world (144) across the optic also is valued.

Figure 22L:
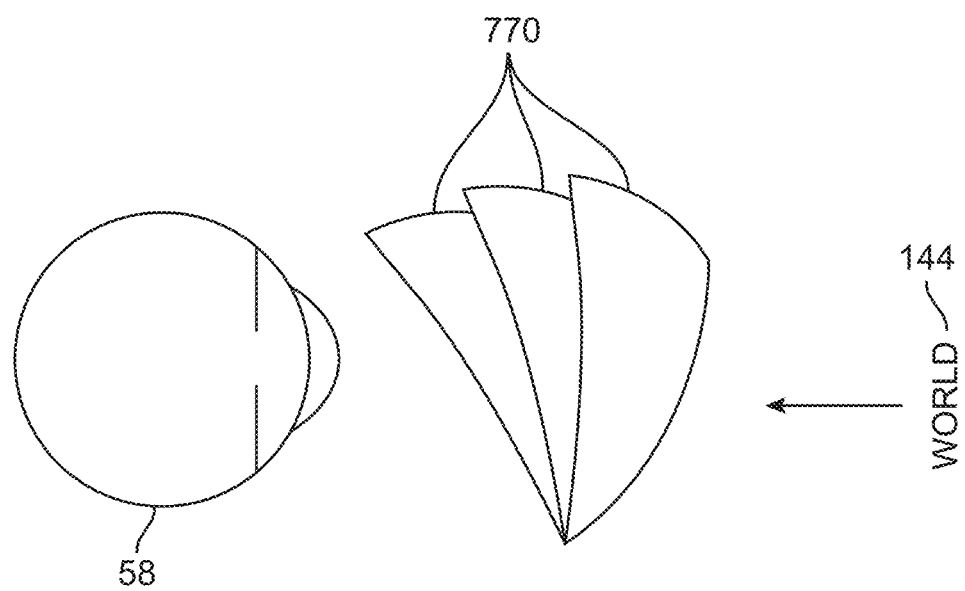

Referring to FIG. 22L, an embodiment is depicted wherein multiple freeform optics (770) may be stacked in the Z axis (i.e., along an axis substantially aligned with the optical axis of the eye). In one variation, each of the three depicted freeform optics may have a wavelength-selective coating (for example, one highly selective for blue, the next for green, the next for red) so that images may be injected into each to have blue reflected from one surface, green from another, and red from a third surface. Such a configuration may be utilized, for example, to address chromatic aberration issues, to create a lightfield, or to increase the functional exit pupil size.

Figure 22M:
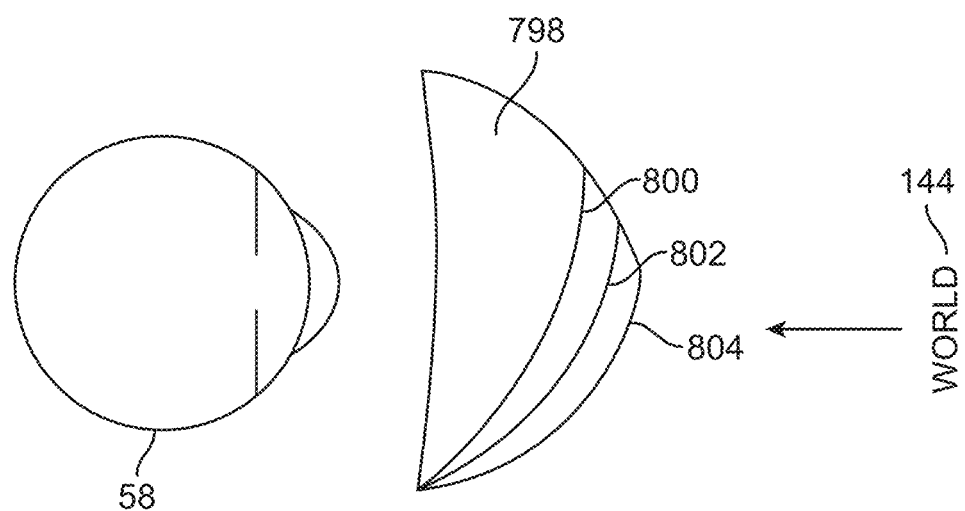

Referring to FIG. 22M, an embodiment is shown wherein a single freeform optic (798) has multiple reflective surfaces (800, 802, 804), each of which may be wavelength or polarization selective so that their reflective properties may be individually controlled.

Figure 22N:
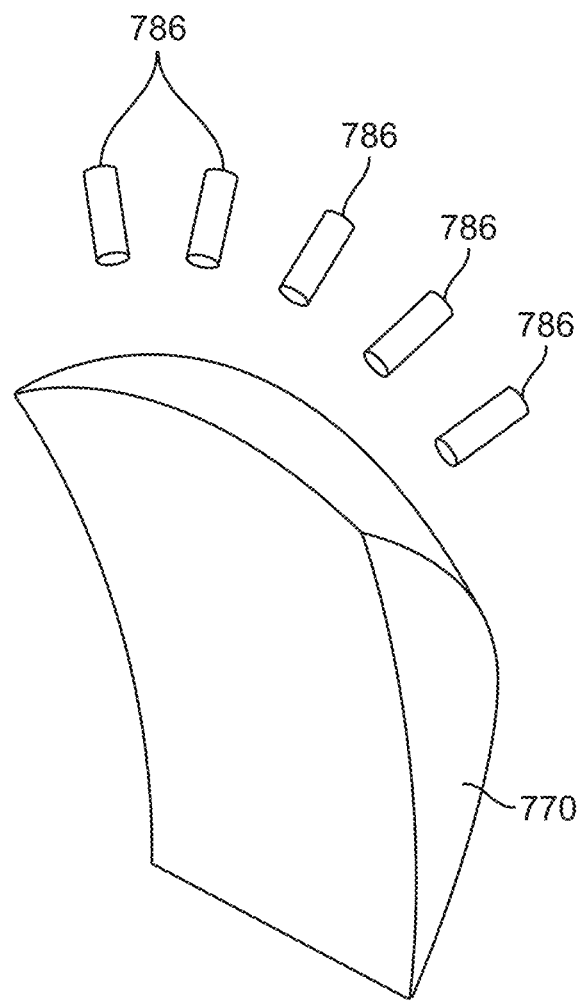

Referring to FIG. 22N, in one embodiment, multiple microdisplays, such as scanning light displays, (786) may be injected into a single freeform optic to tile images (thereby providing an increased field of view), increase the functional pupil size, or address challenges such as chromatic aberration (i.e., by reflecting one wavelength per display). Each of the depicted displays would inject light that would take a different path through the freeform optic due to the different positioning of the displays relative to the freeform optic, which would provide a larger functional exit pupil output.

In one embodiment, a packet or bundle of scanning fiber displays may be utilized as an input to overcome one of the challenges in operatively coupling a scanning fiber display to a freeform optic. One such challenge with a scanning fiber display configuration is that the output of an individual fiber is emitted with a certain numerical aperture, or "NA", which is like the projectional angle of light from the fiber; ultimately this angle determines the diameter of the beam that passes through various optics, and ultimately determines the exit functional exit pupil size; thus in order to maximize exit pupil size with a freeform optic configuration, one may either increase the NA of the fiber using optimized refractive relationships, such as between core and cladding, or one may place a lens (i.e., a refractive lens, such as a gradient refractive index lens, or "GRIN" lens) at the end of the fiber or build one into the end of the fiber as described above, or create an array of fibers that is feeding into the freeform optic, in which case all of those NAs in the bundle remain small, and at the exit pupil an array of small exit pupils is produced that in the aggregate forms the functional equivalent of a large exit pupil.

Figure 22O:
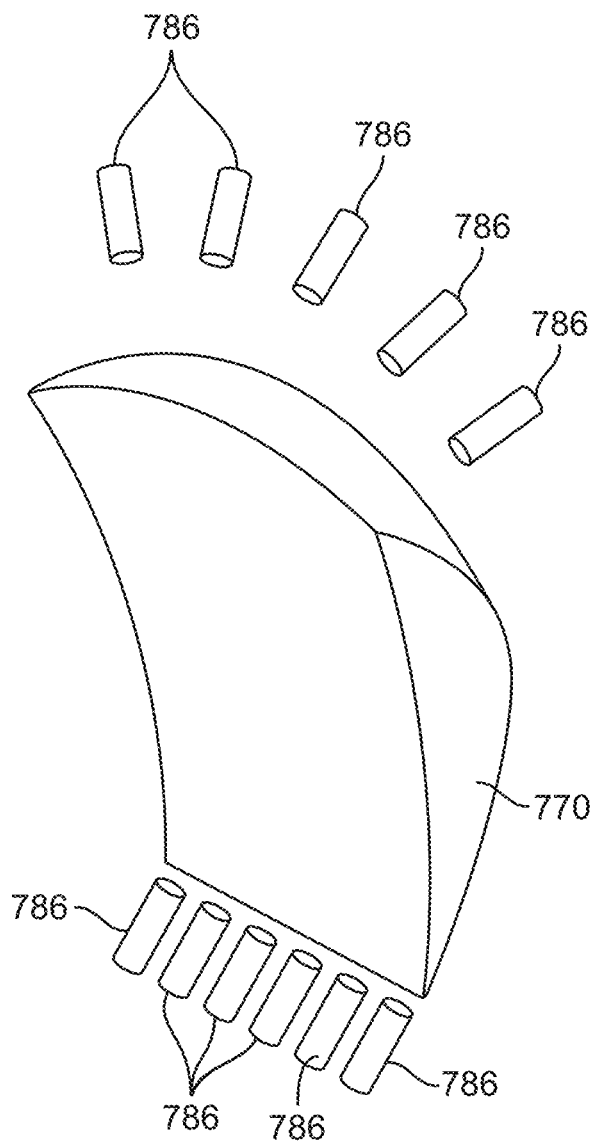
Figure 22P:
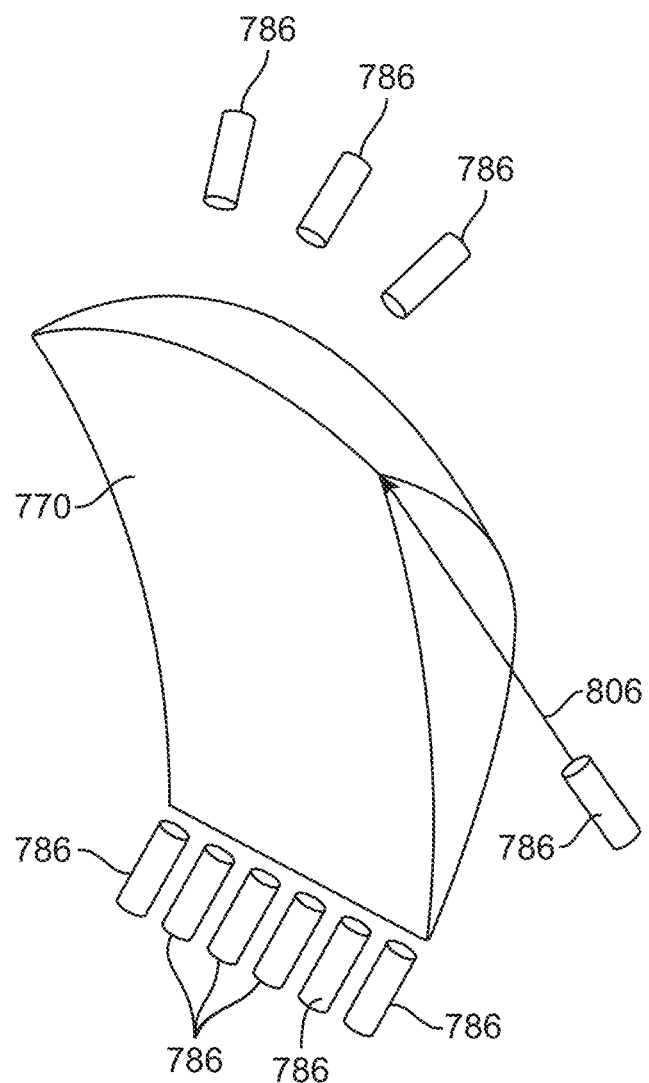

Alternatively, in another embodiment a more sparse array (i.e., not bundled tightly as a packet) of scanning fiber displays or other displays may be utilized to functionally increase the field of view of the virtual image through the freeform optic. Referring to FIG. 22O, in another embodiment, a plurality of displays or displays (786) may be injected through the top of a freeform optic (770), as well as another plurality (786) through the lower corner; the display arrays may be two or three dimensional arrays. Referring to FIG. 22P, in another related embodiment, image information also may be injected in from the side (806) of the freeform optic (770) as well.

In an embodiment wherein a plurality of smaller exit pupils is to be aggregated into a functionally larger exit pupil, one may elect to have each of the scanning fibers monochromatic, such that within a given bundle or plurality of projectors or displays, one may have a subgroup of solely red fibers, a subgroup of solely blue fibers, and a subgroup of solely green fibers. Such a configuration facilitates more efficiency in output coupling for bringing light into the optical fibers; for instance, there would be no need in such an embodiment to superimpose red, green, and blue into the same band.

Figure 22Q:
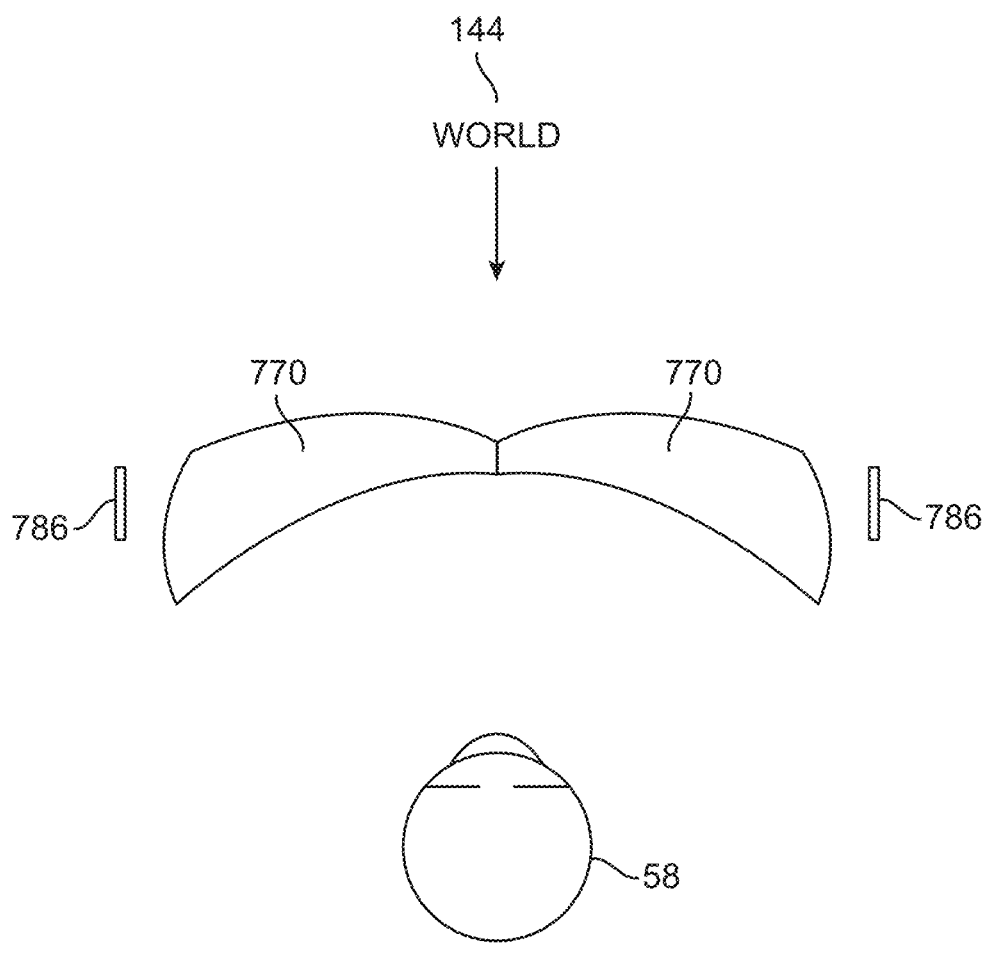

Referring to FIGS. 22Q-22V, various freeform optic tiling configurations are depicted. Referring to FIG. 22Q, an embodiment is depicted wherein two freeform optics are tiled side-by-side and a microdisplay, such as a scanning light display, (786) on each side is configured to inject image information from each side, such that one freeform optic wedge represents each half of the field of view.

Figure 22R:
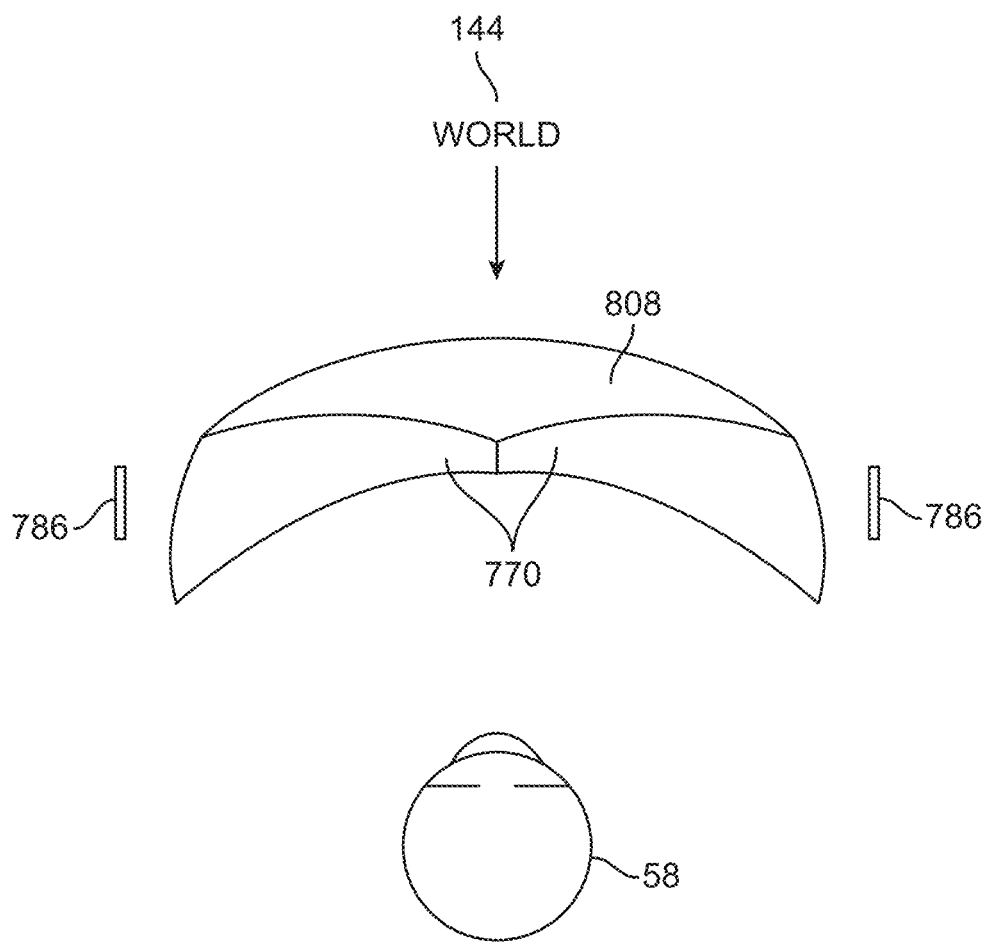
Figure 22S:
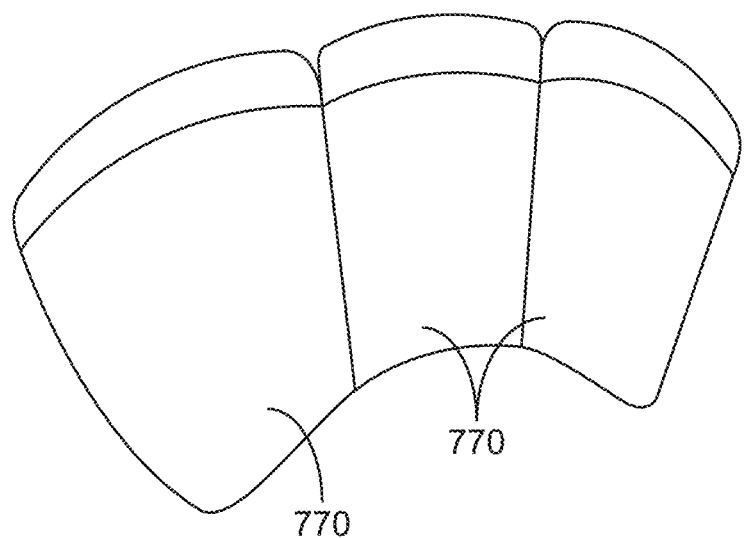

Referring to FIG. 22R, a compensator lens (808) may be included to facilitate views of the real world through the optics assembly. FIG. 22S illustrates a configuration wherein freeform optics wedges are tiled side by side to increase the functional field of view while keeping the thickness of such optical assembly relatively uniform.

Figure 22T:
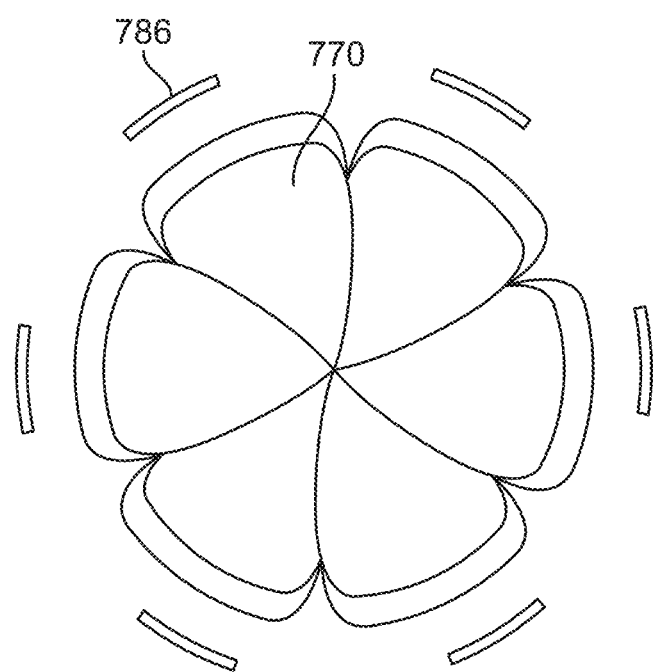

Referring to FIG. 22T, a star-shaped assembly comprises a plurality of freeform optics wedges (also shown with a plurality of displays for inputting image information) in a configuration that may provide a larger field of view expansion while also maintaining a relatively thin overall optics assembly thickness.

With a tiled freeform optics assembly, the optics elements may be aggregated to produce a larger field of view; the tiling configurations described above have addressed this notion. For example, in a configuration wherein two freeform waveguides are aimed at the eye such as that depicted in FIG. 22R, there are several ways to increase the field of view. One option is to "toe in" the freeform waveguides such that their outputs share, or are superimposed in, the space of the pupil (for example, the user may see the left half of the visual field through the left freeform waveguide, and the right half of the visual field through the right freeform waveguide).

With such a configuration, the field of view has been increased with the tiled freeform waveguides, but the exit pupil has not grown in size. Alternatively, the freeform waveguides may be oriented such that they do not toe in as much—so they create exit pupils that are side-by-side at the eye's anatomical pupil. In one example, the anatomical pupil may be 8 mm wide, and each of the side-by-side exit pupils may be 8 mm, such that the functional exit pupil is expanded by about two times. Thus such a configuration provides an enlarged exit pupil, but if the eye is moved around in the "eyebox" defined by that exit pupil, that eye may lose parts of the visual field (i.e., lose either a portion of the left or right incoming light because of the side-by-side nature of such configuration).

In one embodiment using such an approach for tiling freeform optics, especially in the Z-axis relative to the eye of the user, red wavelengths may be driven through one freeform optic, green through another, and blue through another, such red/green/blue chromatic aberration may be addressed. Multiple freeform optics also may be provided to such a configuration that are stacked up, each of which is configured to address a particular wavelength.

Figure 22U:
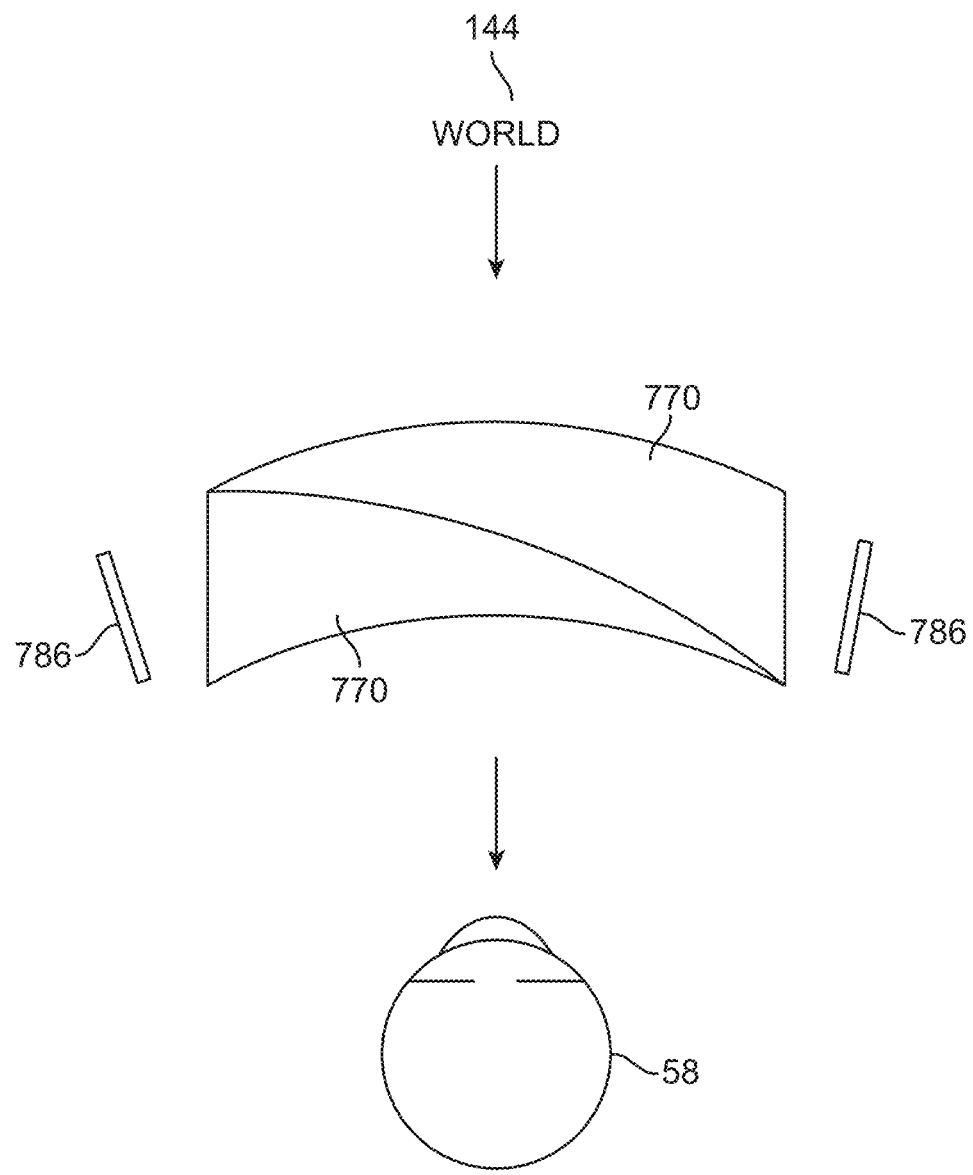
Figure 22V:
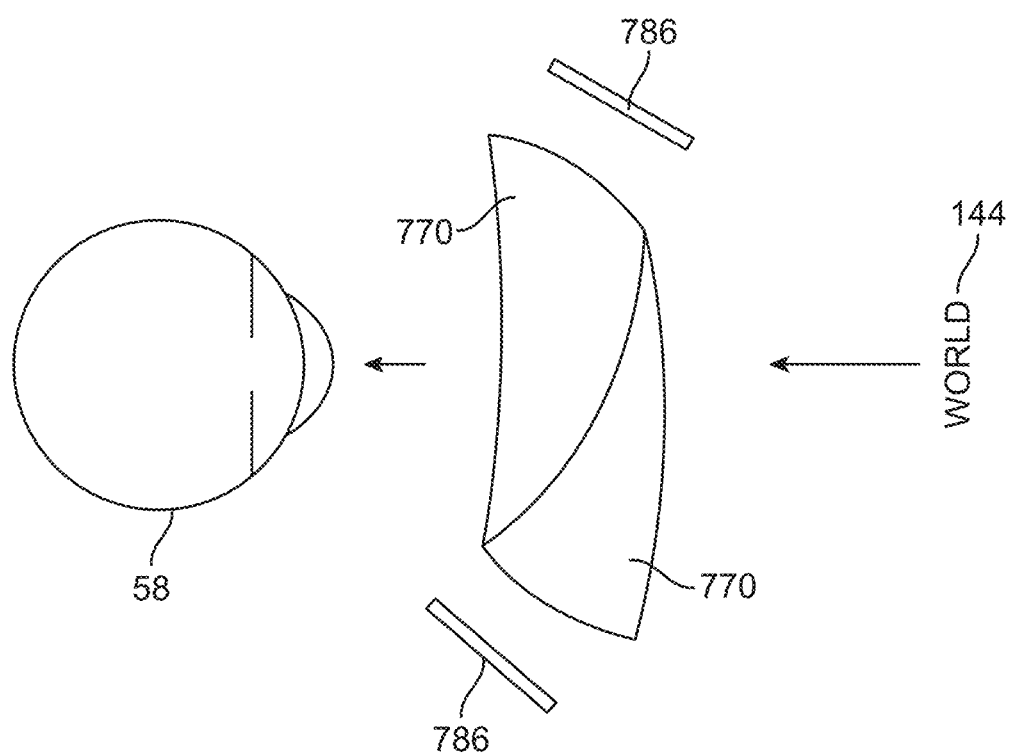

Referring to FIG. 22U, two oppositely-oriented freeform optics are shown stacked in the Z-axis (i.e., they are upside down relative to each other). With such a configuration, a compensating lens may not be required to facilitate accurate views of the world through the assembly; in other words, rather than having a compensating lens such as in the embodiment of FIG. 22F or FIG. 22R, an additional freeform optic may be utilized, which may further assist in routing light to the eye. FIG. 22V shows another similar configuration wherein the assembly of two freeform optics is presented as a vertical stack.

To ensure that one surface is not interfering with another surface in the freeform optics, one may use wavelength or polarization selective reflector surfaces. For example, referring to FIG. 22V, red, green, and blue wavelengths in the form of 650 nm, 530 nm, and 450 nm may be injected, as well as red, green, and blue wavelengths in the form of 620 nm, 550 nm, and 470 nm; different selective reflectors may be utilized in each of the freeform optics so that they do not interfere with each other. In a configuration wherein polarization filtering is used for a similar purpose, the reflection/transmission selectivity for light that is polarized in a particular axis may be varied (i.e., the images may be pre-polarized before they are sent to each freeform waveguide, to work with reflector selectivity).

Figure 22W:
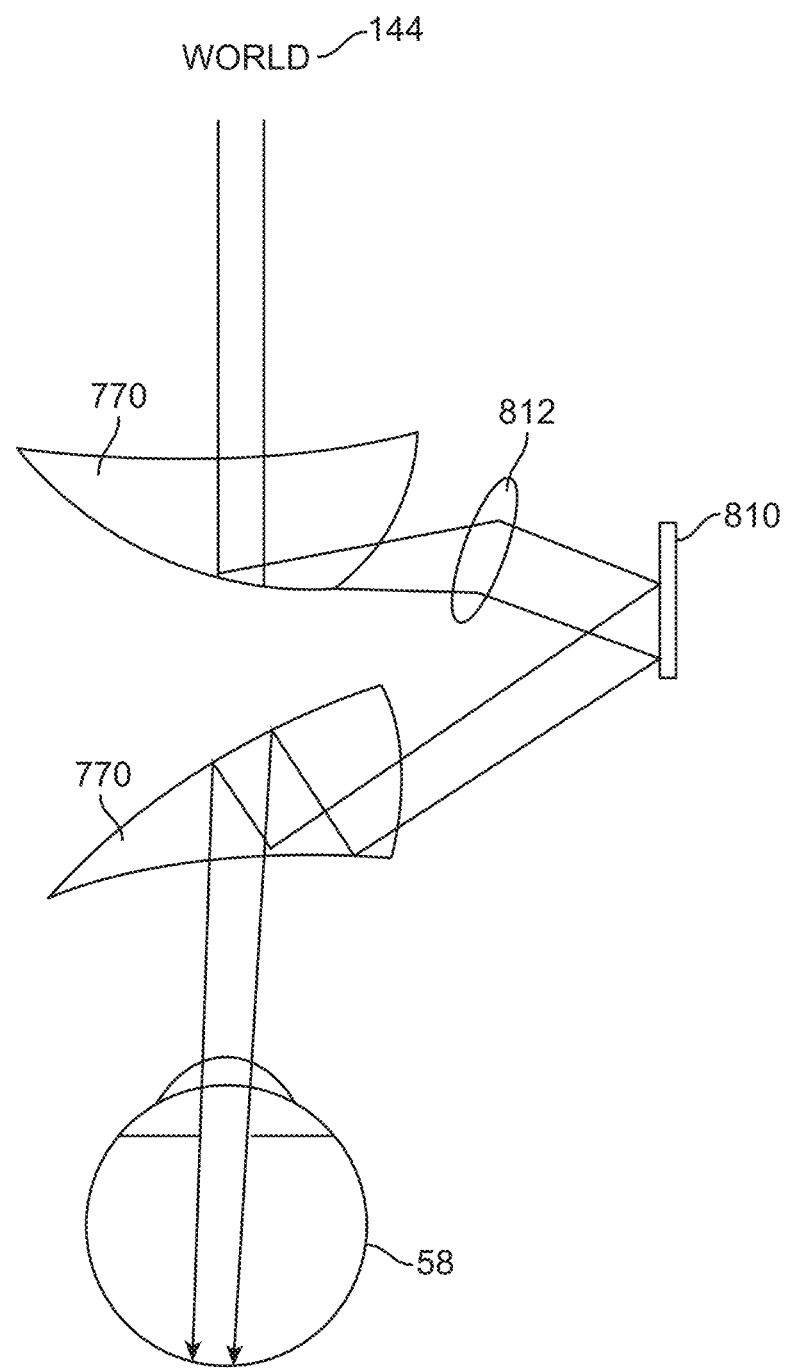
Figure 22X:
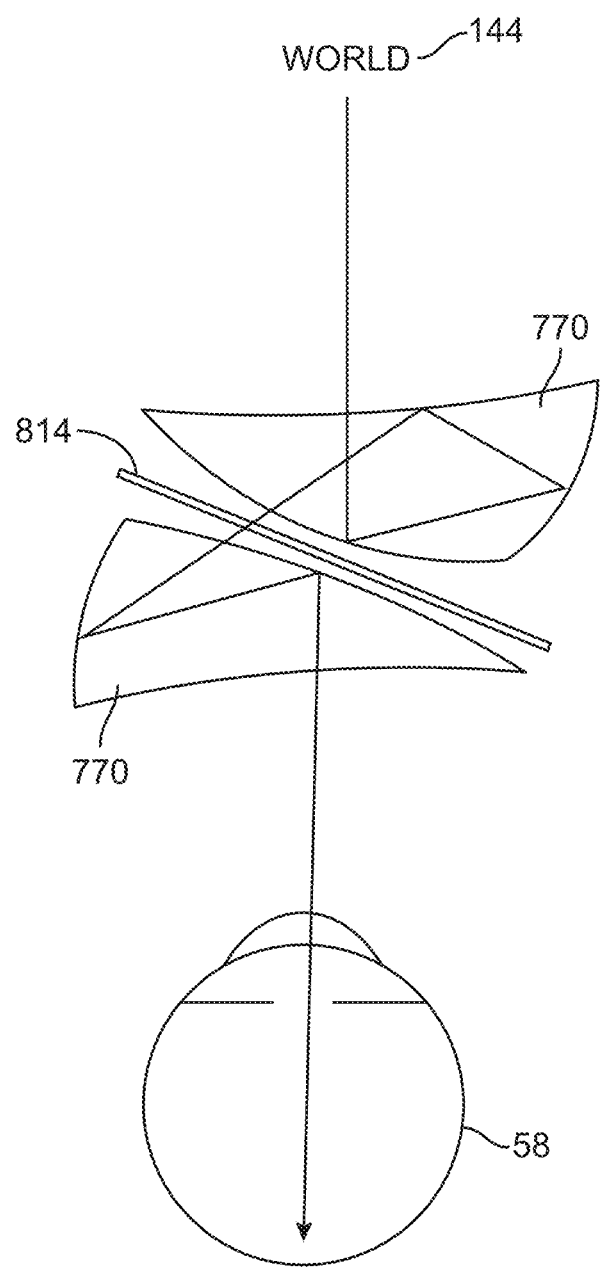

Referring to FIGS. 22W and 22X, configurations are illustrated wherein a plurality of freeform waveguides may be utilized together in series. Referring to FIG. 22W, light may enter from the real world and be directed sequentially through a first freeform optic (770), through an optional lens (812) which may be configured to relay light to a reflector (810) such as a DMD from a DLP system, which may be configured to reflect the light that has been filtered on a pixel by pixel basis (i.e., an occlusion mask may be utilized to block out certain elements of the real world, such as for darkfield perception, as described above; suitable spatial light modulators may be used which comprise DMDs, LCDs, ferroelectric LCOSs, MEMS shutter arrays, and the like, as described above) to another freeform optic (770) that is relaying light to the eye (28) of the user. Such a configuration may be more compact than one using conventional lenses for spatial light modulation.

Referring to FIG. 22X, in a scenario wherein it is very important to keep overall thickness minimized, a configuration may be utilized that has one surface that is highly-reflective so that it may bounce light straight into another compactly positioned freeform optic. In one embodiment a selective attenuator (814) may be interposed between the two freeform optics (770).

Figure 22Y:
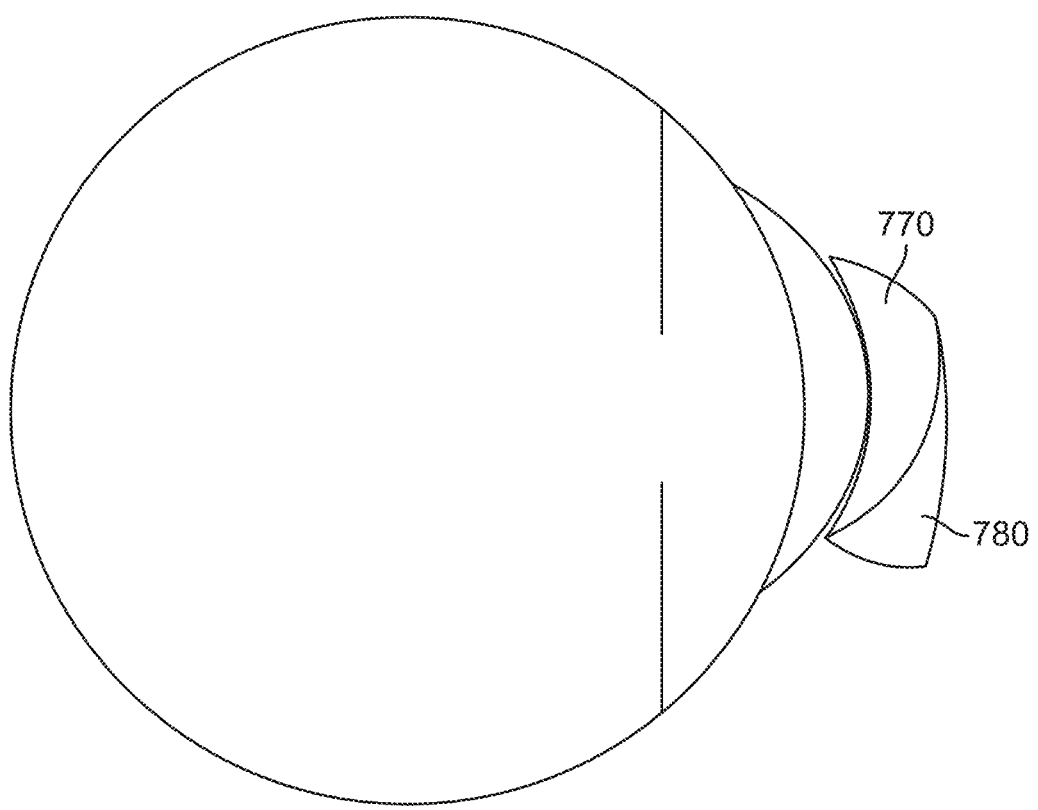

Referring to FIG. 22Y, an embodiment is depicted wherein a freeform optic (770) may comprise one aspect of a contact lens system. A miniaturized freeform optic is shown engaged against the cornea of a user's eye (58) with a miniaturized compensator lens portion (780), akin to that described in reference to FIG. 22F. Signals may be injected into the miniaturized freeform assembly using a tethered scanning fiber display which may, for example, be coupled between the freeform optic and a tear duct area of the user, or between the freeform optic and another head-mounted display configuration.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A system for displaying virtual content to a user, comprising:
    at least one light source to multiplex a plurality of light beams to display a respective plurality of light patterns associated with one or more frames of image data;
    first, second, and third planar waveguides to receive the plurality of light beams and to direct the plurality of light beams toward an exit pupil, wherein the first, second, and third planar waveguides are stacked along an optical axis of the user; and
    at least one optical element to modify a focus of a light beam of the plurality of light beams directed by the first, second, and third planar waveguides,
    wherein the first, second, and third planar waveguides have first, second, and third wavefront curvatures corresponding to respective first, second, and third focal distances,
    wherein the first focal distance is a focal distance of a determined accommodation of the user's eyes,
    wherein the second focal distance is based at least in part on the determined accommodation and is located at a first predetermined error margin farther from the user's eyes relative to the first focal distance,
    wherein the third focal distance is based at least in part on the determined accommodation and is located at a second predetermined error margin closer to the user's eyes relative to the first focal distance, and
    wherein the first, second, and third planar waveguides are configured to allow a range of accommodation before a physical adjustment of the focus level is necessary due to a change in the accommodation of the user's eyes.

2. The system of claim 1, wherein the at least one optical element modifies the plurality of light beams in a manner such that a wavefront curvature is created, and
    wherein the created wavefront curvature corresponds to a focal plane when the plurality of light beams are viewed by the user.

3. The system of claim 1, wherein the first, second, and third planar waveguides are each switchable between on and off states.

4. The system of claim 1, wherein first, second, and third planar waveguides are static planar waveguides.

5. The system of claim 1, wherein an optical element of the at least one optical elements is switchable between on and off states.

6. The system of claim 1, wherein an optical element of the at least one optical elements is a static optical element.

7. The system of claim 1, wherein an optical element of the at least one optical elements is a diffractive optical element (DOE) in one of the first, second, or third planar waveguides,
    wherein the DOE is switchable between on and off states.

8. The system of claim 1, wherein the at least one optical element comprises a weak lens.

9. The system of claim 1, wherein the at least one optical element comprises a Fresnel zone plate.

10. The system of claim 1, wherein first, second, and third frames of the one or more frames of image data are delivered through the first, second, and third planar waveguides to the user's eye simultaneously.

11. The system of claim 1, wherein first, second, and third frames of the one or more frames of image data are delivered through the first, second, and third planar waveguides to the user's eye sequentially.

12. The system of claim 1, wherein the first planar waveguide is disposed between the second and third planar waveguides, and
    wherein the first wavefront curvature corresponds to the focal distance of the determined accommodation of the user's eyes.

13. The system of claim 12, wherein the second planar waveguide is closer than the first planar waveguide to the user, and
    wherein the second wavefront curvature corresponds to the first predetermined error margin farther from the user's eyes relative to the first focal distance.

14. The system of claim 13, wherein the third planar waveguide is farther than the first planar waveguide from the user,
    wherein the third wavefront curvature corresponds to the second predetermined error margin closer to the user's eyes relative to the first focal distance,
    wherein the third wavefront curvature is greater than the first wavefront curvature, and
    wherein the first wavefront curvature is greater than the second wavefront curvature.

15. The system of claim 1, further comprising a compensating lens to compensate for a cumulative focus modification of the at least one optical elements on a light beam passing through the first, second, and third planar waveguides along the optical axis of the user.

16. The system of claim 15, wherein the compensating lens is disposed on an opposite side of the plurality of planar waveguides from the user.

17. The system of claim 1, wherein the at least one light source comprises a plurality of light sources corresponding to respective ones of the plurality of planar waveguides.

18. The system of claim 1, wherein the at least one light source is a single multiplexed light source.

19. The system of claim 1,
    wherein the first predetermined error margin is an accommodation error margin, and
    wherein the second predetermined error margin is an accommodation error margin.

20. The system of claim 1, wherein the at least one light source comprises first, second, and third light sources respectively addressing the first, second, and third planar waveguides along respective longitudinal axes of the first, second, and third planar waveguides orthogonal to the optical axis of the user.

\* \* \* \* \*